(12) United States Patent
van der Linden et al.

(10) Patent No.: US 8,578,076 B2
(45) Date of Patent: Nov. 5, 2013

(54) SYSTEMS AND METHODS FOR ESTABLISHING A CLOUD BRIDGE BETWEEN VIRTUAL STORAGE RESOURCES

(75) Inventors: Rob van der Linden, Cambridge (GB); David Halls, Cambourne (GB); Simon Waterhouse, Cambridge (GB); Peter Benoit, Kirkland, WA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 69 days.

(21) Appl. No.: 12/772,977

(22) Filed: May 3, 2010

(65) Prior Publication Data

US 2011/0022812 A1     Jan. 27, 2011

Related U.S. Application Data

(60) Provisional application No. 61/174,660, filed on May 1, 2009.

(51) Int. Cl.
*G06F 13/14* (2006.01)

(52) U.S. Cl.
USPC .............................. 710/72; 710/74; 709/227

(58) Field of Classification Search
None
See application file for complete search history.

(56) References Cited

U.S. PATENT DOCUMENTS

| | | | |
|---|---|---|---|
| 5,504,814 A | 4/1996 | Miyahara | |
| 5,517,617 A | 5/1996 | Sathaye et al. | |
| 6,067,545 A | 5/2000 | Wolff | |
| 6,185,601 B1 | 2/2001 | Wolff | |
| 6,289,382 B1 | 9/2001 | Bowman-Amuah | |
| 6,332,163 B1 | 12/2001 | Bowman-Amuah | |
| 6,339,832 B1 | 1/2002 | Bowman-Amuah | |
| 6,434,568 B1 | 8/2002 | Bowman-Amuah | |
| 6,434,628 B1 | 8/2002 | Bowman-Amuah | |
| 6,438,594 B1 | 8/2002 | Bowman-Amuah | |
| 6,442,748 B1 | 8/2002 | Bowman-Amuah | |

(Continued)

FOREIGN PATENT DOCUMENTS

| | | |
|---|---|---|
| WO | WO-0239261 A2 | 5/2002 |
| WO | WO-0239264 A2 | 5/2002 |

(Continued)

OTHER PUBLICATIONS

European Communication on 10723443.7 dated Dec. 9, 2011.

(Continued)

*Primary Examiner* — Ilwoo Park
(74) *Attorney, Agent, or Firm* — Foley and Lardner LLP; John D. Lanza

(57) ABSTRACT

Methods and systems for establishing a cloud bridge between two virtual storage resources and for transmitting data from one first virtual storage resource to the other virtual storage resource. The system can include a first virtual storage resource or cloud, and a storage delivery management service that executes on a computer and within the first virtual storage resource. The storage delivery management service can receive user credentials of a user that identify a storage adapter. Upon receiving the user credentials, the storage delivery management service can invoke the storage adapter which executes an interface that identifies a second virtual storage resource and includes an interface translation file. The storage delivery management service accesses the second virtual storage resource and establishes a cloud bridge with the second virtual storage resource using information obtained from the second virtual storage resource and information translated by the storage adapter using the interface translation file.

12 Claims, 44 Drawing Sheets

(56) References Cited

U.S. PATENT DOCUMENTS

| | | |
|---|---|---|
| 6,477,580 B1 | 11/2002 | Bowman-Amuah |
| 6,477,665 B1 | 11/2002 | Bowman-Amuah |
| 6,496,850 B1 | 12/2002 | Bowman-Amuah |
| 6,502,213 B1 | 12/2002 | Bowman-Amuah |
| 6,529,909 B1 | 3/2003 | Bowman-Amuah |
| 6,529,948 B1 | 3/2003 | Bowman-Amuah |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,571,282 B1 | 5/2003 | Bowman-Amuah |
| 6,578,068 B1 | 6/2003 | Bowman-Amuah |
| 6,601,192 B1 | 7/2003 | Bowman-Amuah |
| 6,601,234 B1 | 7/2003 | Bowman-Amuah |
| 6,606,660 B1 | 8/2003 | Bowman-Amuah |
| 6,615,199 B1 | 9/2003 | Bowman-Amuah |
| 6,615,253 B1 | 9/2003 | Bowman-Amuah |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,658,625 B1 | 12/2003 | Allen |
| 6,715,145 B1 | 3/2004 | Bowman-Amuah |
| 6,724,875 B1 | 4/2004 | Adams et al. |
| 6,728,784 B1 | 4/2004 | Mattaway |
| 6,731,625 B1 | 5/2004 | Eastep et al. |
| 6,742,015 B1 | 5/2004 | Bowman-Amuah |
| 6,801,499 B1 | 10/2004 | Anandakumar et al. |
| 6,816,904 B1 | 11/2004 | Ludwig et al. |
| 6,842,906 B1 | 1/2005 | Bowman-Amuah |
| 6,877,043 B2 | 4/2005 | Mallory et al. |
| 6,880,002 B2 | 4/2005 | Hirschfeld et al. |
| 6,882,634 B2 | 4/2005 | Bagchi et al. |
| 6,888,844 B2 | 5/2005 | Mallory et al. |
| 6,891,881 B2 | 5/2005 | Trachewsky et al. |
| 6,898,204 B2 | 5/2005 | Trachewsky et al. |
| 6,954,800 B2 | 10/2005 | Mallory |
| 6,975,655 B2 | 12/2005 | Fischer et al. |
| 6,988,236 B2 | 1/2006 | Ptasinski et al. |
| 6,993,004 B2 | 1/2006 | Boys |
| 6,993,101 B2 | 1/2006 | Trachewsky et al. |
| 7,000,031 B2 | 2/2006 | Fischer et al. |
| 7,035,285 B2 | 4/2006 | Holloway et al. |
| 7,072,807 B2 | 7/2006 | Brown et al. |
| 7,143,288 B2 | 11/2006 | Pham et al. |
| 7,162,509 B2 | 1/2007 | Brown et al. |
| 7,162,724 B2 | 1/2007 | Blaser et al. |
| 7,200,530 B2 | 4/2007 | Brown et al. |
| 7,433,885 B2 | 10/2008 | Jones |
| 7,483,983 B1 * | 1/2009 | Bonefas et al. ............... 709/226 |
| 7,574,496 B2 | 8/2009 | McCrory et al. |
| 2002/0049608 A1 | 4/2002 | Hartsell et al. |
| 2002/0049841 A1 | 4/2002 | Johnson et al. |
| 2002/0059274 A1 | 5/2002 | Hartsell et al. |
| 2002/0059425 A1 | 5/2002 | Belfiore et al. |
| 2002/0065864 A1 | 5/2002 | Hartsell et al. |
| 2002/0152373 A1 | 10/2002 | Sun et al. |
| 2002/0174227 A1 | 11/2002 | Hartsell et al. |
| 2003/0233489 A1 | 12/2003 | Blaser et al. |
| 2003/0233490 A1 | 12/2003 | Blaser et al. |
| 2003/0233647 A1 | 12/2003 | Blaser et al. |
| 2004/0078467 A1 | 4/2004 | Grosner et al. |
| 2004/0087304 A1 | 5/2004 | Buddhikot et al. |
| 2004/0107342 A1 | 6/2004 | Pham et al. |
| 2004/0181476 A1 | 9/2004 | Smith et al. |
| 2006/0095689 A1 | 5/2006 | Peinado et al. |
| 2006/0117169 A1 | 6/2006 | Peinado et al. |
| 2006/0174031 A1 * | 8/2006 | Yamakoshi et al. ......... 709/237 |
| 2006/0248285 A1 | 11/2006 | Petev |
| 2010/0027552 A1 * | 2/2010 | Hill ............................... 370/401 |
| 2010/0125898 A1 * | 5/2010 | Dubuc et al. ...................... 726/7 |
| 2012/0110209 A1 * | 5/2012 | Bonefas et al. ............... 709/246 |

FOREIGN PATENT DOCUMENTS

| | | |
|---|---|---|
| WO | WO-0239275 A2 | 5/2002 |
| WO | WO-0239666 A2 | 5/2002 |
| WO | WO-0239693 A2 | 5/2002 |
| WO | WO-0239695 A2 | 5/2002 |
| WO | WO-0241575 A2 | 5/2002 |
| WO | WO-0243364 A2 | 5/2002 |
| WO | WO-03107183 A1 | 12/2003 |
| WO | WO-03107220 A1 | 12/2003 |
| WO | WO-03107221 A1 | 12/2003 |
| WO | WO-2005024567 A2 | 3/2005 |

OTHER PUBLICATIONS

International Preliminary Report of Patentability on PCT/US2010/033442 dated Nov. 10, 2011.

* cited by examiner

```
<ScsiDeviceIDProcessor>
        <InquiryMatch>
                <Vendor>ACME</Vendor>
                <Product>A300</Product>
        </InquiryMatch>
        <VendorID value="ACME">
        </VendorID>
        <ProductID value="ASERIES">
        </ProductID>
        <EnclosureID page="0" offset="154" length="16">
        </EnclosureID>
        <DeviceID page="131" offset="8" length="16" fmt="hex">
        </DeviceID>
</ScsiDeviceIDProcessor>
```

High Order Controllers

Power Control Systems

Machine Power Control

Machines

SYSTEMS AND METHODS FOR ESTABLISHING A CLOUD BRIDGE BETWEEN VIRTUAL STORAGE RESOURCES

RELATED APPLICATIONS

This patent application claims priority to U.S. Provisional Patent Application Ser. No. 61/174,660, filed on May 1, 2009, the disclosure of which is considered part of the disclosure of this application and is herein incorporated by reference in its entirety.

FIELD OF THE DISCLOSURE

This disclosure generally relates to systems and methods for providing access to resources. In particular, this disclosure relates to systems and methods for delivering resources between local and remote enterprise hosting sites.

BACKGROUND OF THE DISCLOSURE

In some instances a user can have access to multiple clouds or virtual storage resources. In these instances, a user can use the clouds to store information and to access resources available to the user in the cloud. Clouds can be provided by one or more types of services and can be dedicated to specific functions. For example, a user can have one cloud dedicated to work information and applications, and another cloud dedicated to personal applications and information uploaded by the user. There may be points in time when it is desirable to be able to access information and resources available in one cloud from within another cloud. In other aspects, it may be desirable to ghost the resources and services available in one cloud in another cloud such that all available resources and services are available in a single cloud.

Communication between clouds can be difficult because often times it requires a translation from one set of access commands to another. Similarly, accessing a cloud requires knowledge of user credentials. It can be difficult for one cloud to obtain the user credentials required to access another cloud, and to further pass the user credential information to the other cloud. Thus, systems and methods are required to address the difficulties that arise from trying to establish a communication bridge between two different clouds.

SUMMARY OF THE DISCLOSURE

In one aspect, described herein is a method for establishing a cloud bridge between a first virtual storage resource and a second virtual storage resource, where the cloud bridge can be used to transmit data from one virtual storage resource to the other virtual storage resource. A storage delivery management service executing on a computer within a first virtual storage resource, can receive user credentials of a user, where the user credentials identify a storage adapter. The storage delivery management service, in response to receiving the user credentials, can invoke the storage adapter identified in the user credentials. The invoked storage adapter can then execute an interface identifying a second virtual storage resource and comprising an interface translation file. The storage delivery management service can then access the second virtual storage resource via the storage adapter. The storage delivery management service can then establish a cloud bridge between the first virtual storage resource and the second virtual storage resource using information stored in the second virtual storage resource, the information translated by the storage adapter using the interface translation file of the second virtual storage resource.

In some embodiments, the method can include enumerating a list of storage adapters associated with the user responsive to receiving the user credentials. In these embodiments, invoking the storage adapter can include selecting a storage adapter from the enumerated list of storage adapters, and invoking the selected storage adapter.

In other embodiments, the method includes enumerating a list of virtual storage resources associated with the storage adapter responsive to invoking the storage adapter.

In still other embodiments, the method includes enumerating a list of access ports in the second virtual storage resource responsive to invoking the storage adapter. In some instances the method can further include selecting an access port from the list of access ports, issuing a connection request to the selected access port, the connection request translated by the storage adapter using the interface translation file. In other instances, the method can further include establishing a connection to the selected access port of the second virtual storage resource, and accessing data stored in the second virtual storage resource via the access port.

In another aspect, described herein is a system for establishing a cloud bridge between a first virtual storage resource and a second virtual storage resource for transmitting data from one of either the first virtual storage resource and the second virtual storage resource to the other of the first virtual storage resource and the second virtual storage resource. The system can include a first virtual storage resource and a storage delivery management service that executes on a computer and that executes within the first virtual storage resource. The storage delivery management service can receive user credentials of a user, where the user credentials identify a storage adapter. In response to receiving the user credentials, the storage delivery management service can invoke the storage adapter identified in the user credentials, wherein the storage adapter executes an interface identifying a second virtual storage resource and comprising an interface translation file. The storage delivery management service can then access, via the storage adapter, the second virtual storage resource. The storage delivery management service can then establish a cloud bridge between the first virtual storage resource and the second virtual storage resource using information stored in the second virtual storage resource, the information translated by the storage adapter using the interface translation file of the second virtual storage resource.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 9B is a block diagram depicting one embodiment of a portion of an interface translation file;

DETAILED DESCRIPTION

Figure 1A:
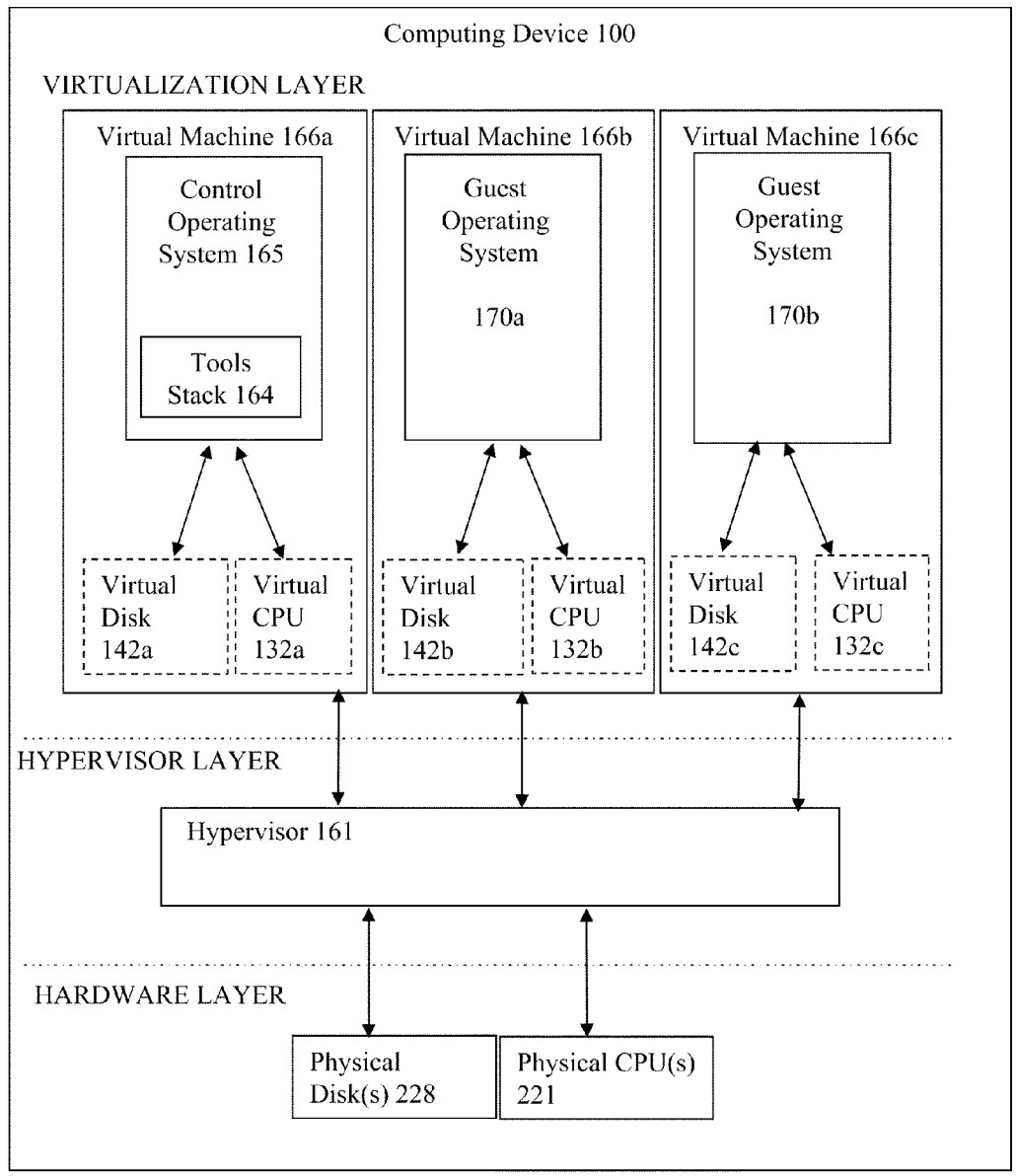
FIG. 1A is a block diagram depicting an embodiment of a computing environment comprising a hypervisor layer, a virtualization layer, and a hardware layer.

Prior to discussing the specifics of embodiments of the systems and methods for delivering resources between local and remote enterprise hosting sites, it may be helpful to discuss the network and computing environments in which such embodiments may be deployed. Referring now to FIG. 1A, a block diagram depicts one embodiment of a virtualization environment. In brief overview, a computing device 100 includes a hypervisor layer, a virtualization layer, and a hardware layer. The hypervisor layer includes a hypervisor 161 (also referred to as a virtualization manager) that allocates and manages access to a number of physical resources in the hardware layer (e.g., the processor(s) 221, and disk(s) 228) by at least one virtual machine executing in the virtualization layer. The virtualization layer includes at least one operating system 170 and a plurality of virtual resources allocated to the at least one operating system 170. Virtual resources may include, without limitation, a plurality of virtual processors 132a, 132b, 132c (generally 132), and virtual disks 142a, 142b, 142c (generally 142), as well as virtual resources such as virtual memory and virtual network interfaces. The plurality of virtual resources and the operating system 170 may be referred to as a virtual machine 166. A virtual machine 166 may include a control operating system 165 in communication with the hypervisor 161 and used to execute applications for managing and configuring other virtual machines on the computing device 100.

Referring now to FIG. 1A, and in greater detail, a hypervisor 161 may provide virtual resources to an operating system in any manner that simulates the operating system having access to a physical device. A hypervisor 161 may provide virtual resources to any number of guest operating systems 170a, 170b (generally 170). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor which creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 161 executes within an operating system executing on a computing device. In one of these embodiments, a computing device executing an operating system and a hypervisor 161 may be said to have a host operating system (the operating system executing on the computing device), and a guest operating system (an operating system executing within a computing resource partition provided by the hypervisor 161). In other embodiments, a hypervisor 161 interacts directly with hardware on a computing device, instead of executing on a host operating system. In one of these embodiments, the hypervisor 161 may be said to be executing on "bare metal," referring to the hardware comprising the computing device.

In some embodiments, a hypervisor 161 may create a virtual machine 166a-c (generally 166) in which an operating system 170 executes. In one of these embodiments, for example, the hypervisor 161 loads a virtual machine image to create a virtual machine 166. In another of these embodiments, the hypervisor 161 executes an operating system 170 within the virtual machine 166. In still another of these embodiments, the virtual machine 166 executes an operating system 170.

In some embodiments, the hypervisor 161 controls processor scheduling and memory partitioning for a virtual machine 166 executing on the computing device 100. In one of these embodiments, the hypervisor 161 controls the execution of at least one virtual machine 166. In another of these embodiments, the hypervisor 161 presents at least one virtual machine 166 with an abstraction of at least one hardware resource provided by the computing device 100. In other embodiments, the hypervisor 161 controls whether and how physical processor capabilities are presented to the virtual machine 166.

A control operating system 165 may execute at least one application for managing and configuring the guest operating systems. In one embodiment, the control operating system 165 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 161 executes the control operating system 165 within a virtual machine 166 created by the hypervisor 161. In still another embodiment, the control operating system 165 executes in a virtual machine 166 that is authorized to directly access physical resources on the computing device 100. In some embodiments, a control operating system 165a on a computing device 100a may exchange data with a control operating system 165b on a computing device 100b, via communications between a hypervisor 161a and a hypervisor 161b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 165 executes in a virtual machine 166 that is authorized to interact with at least one guest operating system 170. In another embodiment, a guest operating system 170 communicates with the control operating system 165 via the hypervisor 161 in order to request access to a disk or a network. In still another embodiment, the guest operating system 170 and the control operating system 165 may communicate via a communication channel established by the hypervisor 161, such as, for example, via a plurality of shared memory pages made available by the hypervisor 161.

In some embodiments, the control operating system 165 includes a network back-end driver for communicating directly with networking hardware provided by the computing device 100. In one of these embodiments, the network back-end driver processes at least one virtual machine request from at least one guest operating system 170. In other embodiments, the control operating system 165 includes a block back-end driver for communicating with a storage element on the computing device 100. In one of these embodiments, the block back-end driver reads and writes data from the storage element based upon at least one request received from a guest operating system 170.

In one embodiment, the control operating system 165 includes a tools stack 164. In another embodiment, a tools stack 164 provides functionality for interacting with the hypervisor 161, communicating with other control operating systems 165 (for example, on a second computing device 100b), or managing virtual machines 166b, 166c on the computing device 100. In another embodiment, the tools stack 164 includes customized applications for providing improved management functionality to an administrator of a virtual machine farm. In some embodiments, at least one of the tools stack 164 and the control operating system 165 include a management API that provides an interface for remotely configuring and controlling virtual machines 166 running on a computing device 100. In other embodiments, the control operating system 165 communicates with the hypervisor 161 through the tools stack 164.

In one embodiment, the hypervisor 161 executes a guest operating system 170 within a virtual machine 166 created by the hypervisor 161. In another embodiment, the guest operating system 170 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 170, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 161; in such an embodiment, the driver is typically aware that it executes within a virtualized environment.

In another embodiment, the guest operating system 170, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 165, as described above.

Figure 1B:
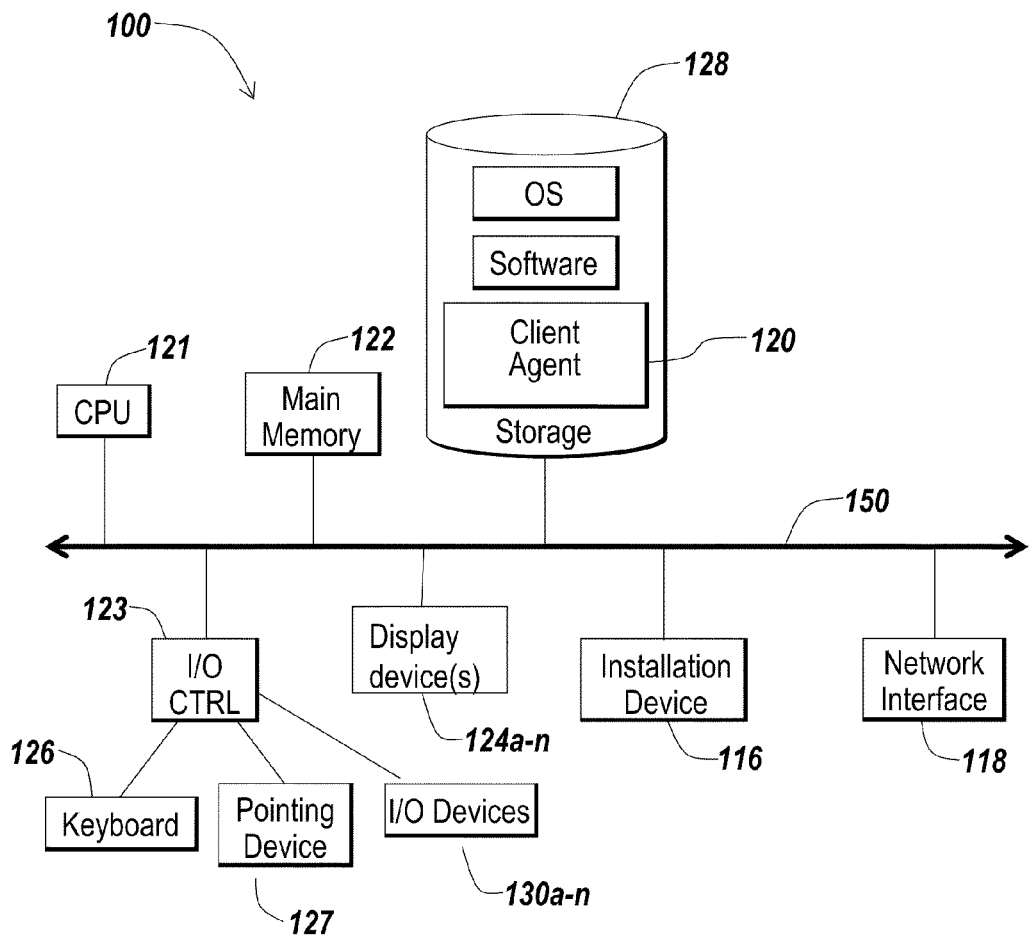
FIGS. 1B, 1C, 1D, and 1E are block diagrams depicting embodiments of computing devices useful in connection with the methods and systems described herein.
Figure 1C:
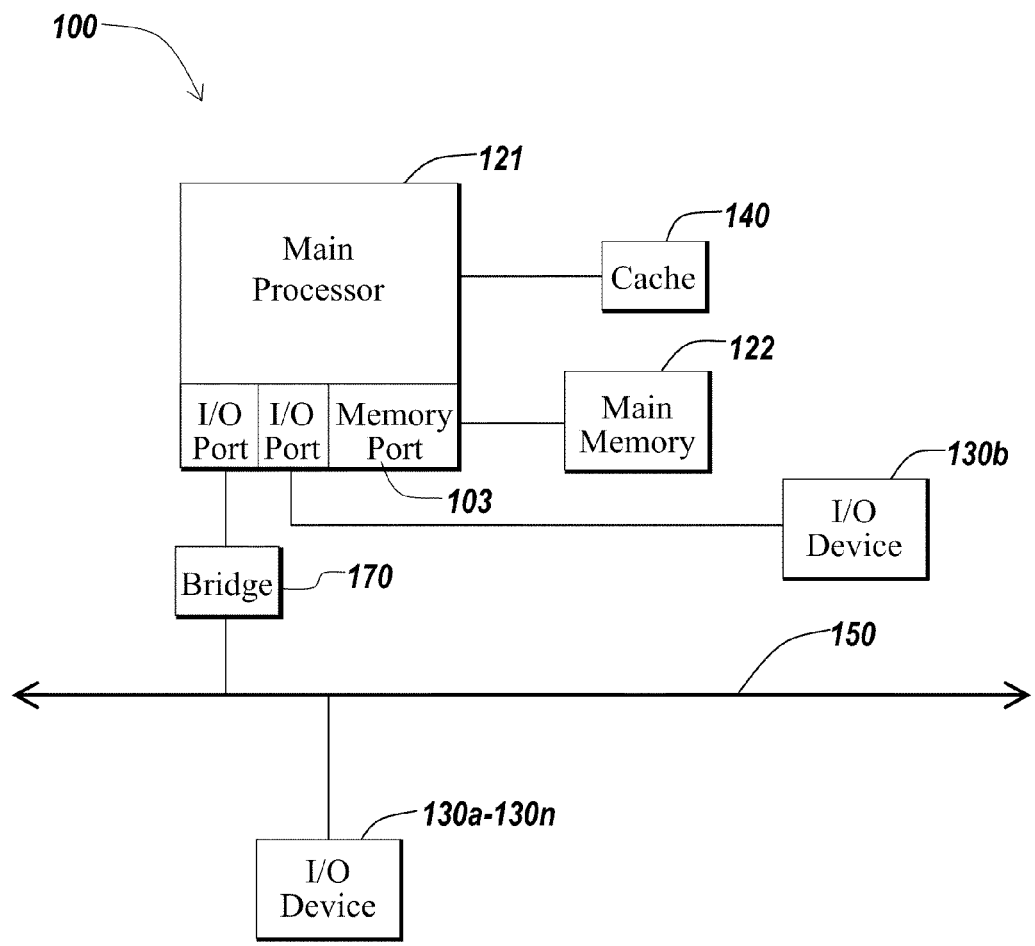

The computing device 100—and the client 102, server 106, appliance 200, and appliance 205 described in greater detail below—may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of methods and systems described herein. As shown in FIGS. 1B and 1C, a computing device 100 includes a central processing unit 121, and a main memory unit 122. As shown in FIG. 1B, a computing device 100 may include a storage device 128, an installation device 116, a network interface 118, an I/O controller 123, display devices 124a-124n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In some embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output DRAM (EDO DRAM), Burst Extended Data Output DRAM (BEDO DRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with a display device 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

Figure 1D:
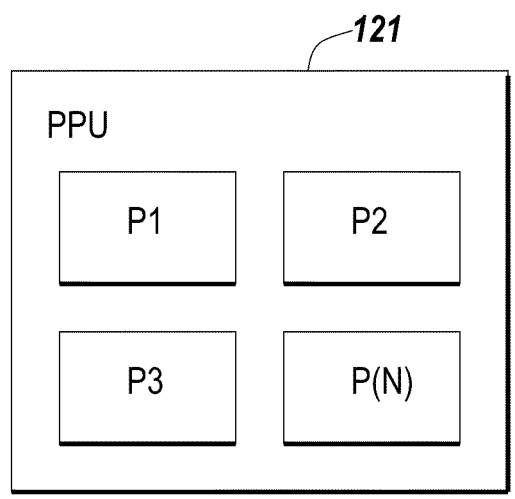

Referring ahead to FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory that is shared and some memory that can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1E:
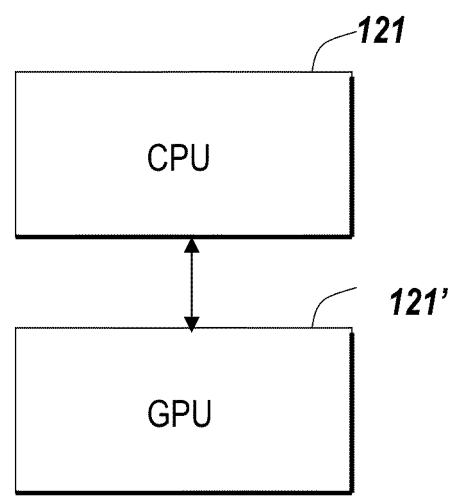

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

Referring back to FIG. 1B, a wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc., of Los Alamitos, Calif.

Referring still to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments, the computing device 100 is a mobile device, such as a JAVA-enabled cellular telephone or personal digital assistant (PDA), such as the i55sr, i58sr, i85s, i88s, i90c, i95c1, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the ZEN VISION W, the ZEN VISION series, the ZEN PORTABLE MEDIA CENTER devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4MPEG-4 (H.264/MPEG-4 AVC) video file formats.

In some embodiments, the computing device 100 includes a combination of devices, such as a mobile phone combined with a digital audio player or portable media player. In one of these embodiments, the computing device 100 is a smartphone, for example, an iPhone manufactured by Apple Computer, or a Blackberry device, manufactured by Research In Motion Limited. In yet another embodiment, the computing device 100 is a laptop or desktop computer equipped with a web browser and a microphone and speaker system, such as a telephony headset. In these embodiments, the computing devices 100 are web-enabled and can receive and initiate phone calls. In other embodiments, the communications device 100 is a Motorola RAZR or Motorola ROKR line of combination digital audio players and mobile phones.

A computing device 100 may be a file server, application server, web server, proxy server, appliance, network appliance, gateway, application gateway, gateway server, virtualization server, deployment server, SSL VPN server, or firewall. In some embodiments, a computing device 100 provides a remote authentication dial-in user service, and is referred to as a RADIUS server. In other embodiments, a computing device 100 may have the capacity to function as either an application server or as a master application server. In still other embodiments, a computing device 100 is a blade server.

In some embodiments, a computing device 100 may include an Active Directory. The computing device 100 may be an application acceleration appliance. For embodiments in which the computing device 100 is an application acceleration appliance, the computing device 100 may provide functionality including firewall functionality, application firewall functionality, or load balancing functionality. In some embodiments, the computing device 100 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a computing device 100 may be referred to as a server. In other embodiments, a computing device 100 may be referred to as a client node, a client machine, an endpoint node, or an endpoint. In some embodiments, a client 100 has the capacity to function as both a client node seeking access to resources provided by a server and as a server node providing access to hosted resources for other clients.

In some embodiments, a first computing device 100*a* communicates with a second, server computing device 100*b*. Such a computing device 100*a* may also be referred to as client nodes, client machines, endpoint nodes, or endpoints. In one embodiment, the client communicates with one of the computing devices 100 in a server farm. Over the network, the client can, for example, request execution of various applications hosted by the computing devices 100 in the server farm and receive output data of the results of the application execution for display. In another embodiment, the client executes a program neighborhood application to communicate with a computing device 100 in a server farm. In other embodiments, the first computing device 100*a* retrieves applications and resources from the second computing device 100*b* for execution on the first computing device 100*a* on behalf of a third computing device 100*c*. In one of these embodiments, both the first computing device 100*a* and the second computing device 100*b* may be referred to as servers. In still other embodiments, a computer system 100 has the capacity to function as both a client node seeking access to resources provided by a server and as a server providing access to hosted resources for other computer systems 200.

A computing device 100 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the computing device 100. In some embodiments, the application may be a server-based or a remote-based application executed on behalf of a user of a first computing device by a second computing device. In other embodiments, the second computing device may display output data to the first, client computing device using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2 Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In other embodiments, the application comprises any type of software related to voice over Internet protocol (VoIP) communications, such as a soft IP telephone. In further embodiments, the application comprises any application related to real-time data communications, such as applications for streaming video and/or audio.

In some embodiments, a first computing device 100*a* executes an application on behalf of a user of a client computing device 100*b*. In other embodiments, a computing device 100*a* executes a virtual machine, which provides an execution session within which applications execute on behalf of a user or a client computing devices 100*b*. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

In some embodiments, a first computing device 100*a* transmits a virtual machine 166 to a second computing device 100*b* for execution. In one of these embodiments, the first computing device 100*a* transmits a virtual machine image from which a hypervisor 161 on the second computing device 100*b* may execute the virtual machine 166. In another of these embodiments, a control operating system 165*b* on the second computing device 100*b* requests, from a control operating system 165*a* on the first computing device 100*a*, access to a virtual machine image for use in executing a virtual machine 166*b*. In still another of these embodiments, a control operating system 165*b* on the second computing device 100*b* retrieves, from the first computing device 100*a*, data required to execute a virtual machine 166*b*; for example, the first computing device 100*a* may be a device on a storage area network, a database, or other storage element.

In some embodiments, the first computing device 100*a* transmits the virtual machine image to the second computing device 100*b* responsive to a determination that the second computing device 100*b* requires the virtual machine image to satisfy a request from a user of the computing device 100*b*. In one of these embodiments, for example, a user of the computing device 100*b* requests access to a resource and a component on the second computing device 100*b*—for example, a control operating system 165—identifies a virtual machine 166 needed to provide access to the resource.

Figure 1F:
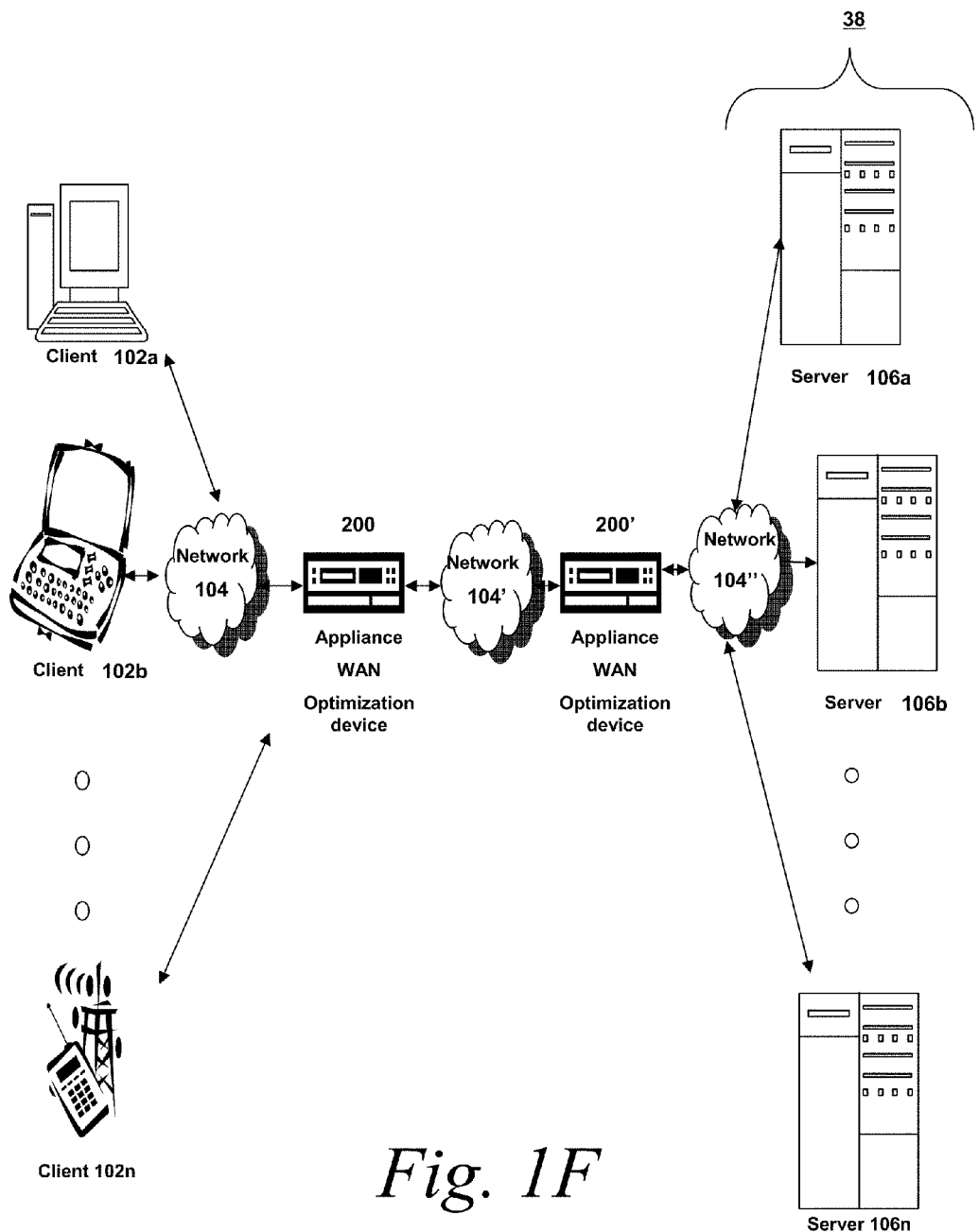
FIG. 1F is a block diagram depicting an embodiment of a network environment for a client to access a server via one or more network optimization appliances.

Referring now to FIG. 1F, an embodiment of a network environment is depicted. In brief overview, the network environment has one or more clients 102*a*-102*n* (also generally referred to as local machine(s) 102, or client(s) 102) in communication with one or more servers 106*a*-106*n* (also generally referred to as server(s) 106, or remote machine(s) 106)

via one or more networks 104, 104', 104". In one embodiment, a client 102a may request resources from a server 106a, while providing the functionality of a server 106b to another client 102b. In another embodiment, the client 102a may request resources from the server 106b on behalf of a user of the client 102a.

In some embodiments, a client 102 communicates with a server 106 via one or more network optimization appliances 200, 200' (generally referred to as appliance 200). In one embodiment, the network optimization appliance 200 is designed, configured or adapted to optimize Wide Area Network (WAN) network traffic. In some embodiments, a first appliance 200 works in conjunction or cooperation with a second appliance 200' to optimize network traffic. For example, a first appliance 200 may be located between a branch office and a WAN connection while the second appliance 200' is located between the WAN and a corporate Local Area Network (LAN). The appliances 200 and 200' may work together to optimize the WAN related network traffic between a client in the branch office and a server on the corporate LAN.

Although FIG. 1F shows a network 104, network 104' and network 104" (generally referred to as network(s) 104) between the clients 102 and the servers 106, the clients 102 and the servers 106 may be on the same network 104. The networks 104, 104', 104" can be the same type of network or different types of networks. The network 104 can be a local-area network (LAN), such as a company Intranet, a metropolitan area network (MAN), or a wide area network (WAN), such as the Internet or the World Wide Web. The networks 104, 104', 104" can be a private or public network. In one embodiment, network 104' or network 104" may be a private network and network 104 may be a public network. In some embodiments, network 104 may be a private network and network 104' and/or network 104" a public network. In another embodiment, networks 104, 104', 104" may be private networks. In some embodiments, clients 102 may be located at a branch office of a corporate enterprise communicating via a WAN connection over the network 104 to the servers 106 located on a corporate LAN in a corporate data center.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein.

As depicted in FIG. 1F, a first network optimization appliance 200 is shown between networks 104 and 104' and a second network optimization appliance 200' is also between networks 104' and 104". In some embodiments, the appliance 200 may be located on network 104. For example, a corporate enterprise may deploy an appliance 200 at a branch office. In other embodiments, the appliance 200 may be located on network 104'. In some embodiments, the appliance 200' may be located on network 104' or network 104". For example, an appliance 200 may be located at a corporate data center. In one embodiment, the appliance 200 and 200' are on the same network. In another embodiment, the appliance 200 and 200' are on different networks.

In one embodiment, the appliance 200 is a device for accelerating, optimizing or otherwise improving the performance, operation, or quality of service of any type and form of network traffic. In some embodiments, the appliance 200 is a performance enhancing proxy. In other embodiments, the appliance 200 is any type and form of WAN optimization or acceleration device, sometimes also referred to as a WAN optimization controller. In one embodiment, the appliance 200 is any of the product embodiments referred to as WAN-Scaler manufactured by Citrix Systems, Inc., of Ft. Lauderdale, Fla. In other embodiments, the appliance 200 includes any of the product embodiments referred to as BIG-IP link controller and WANjet manufactured by F5 Networks, Inc. of Seattle, Wash. In another embodiment, the appliance 200 includes any of the WX and WXC WAN acceleration device platforms manufactured by Juniper Networks, Inc. of Sunnyvale, Calif. In some embodiments, the appliance 200 includes any of the steelhead line of WAN optimization appliances manufactured by Riverbed Technology of San Francisco, Calif. In other embodiments, the appliance 200 includes any of the WAN related devices manufactured by Expand Networks Inc. of Roseland, N.J. In one embodiment, the appliance 200 includes any of the WAN related appliances manufactured by Packeteer Inc. of Cupertino, Calif., such as the PacketShaper, iShared, and SkyX product embodiments provided by Packeteer. In yet another embodiment, the appliance 200 includes any WAN related appliances and/or software manufactured by Cisco Systems, Inc. of San Jose, Calif., such as the Cisco Wide Area Network Application Services software and network modules, and Wide Area Network engine appliances.

In some embodiments, the appliance 200 provides application and data acceleration services for branch-office or remote offices. In one embodiment, the appliance 200 includes optimization of Wide Area File Services (WAFS). In another embodiment, the appliance 200 accelerates the delivery of files, such as via the Common Internet File System (CIFS) protocol. In other embodiments, the appliance 200 provides caching in memory and/or storage to accelerate delivery of applications and data. In one embodiment, the appliance 205 provides compression of network traffic at any level of the network stack or at any protocol or network layer. In another embodiment, the appliance 200 provides transport layer protocol optimizations, flow control, performance enhancements or modifications and/or management to accelerate delivery of applications and data over a WAN connection. For example, in one embodiment, the appliance 200 provides Transport Control Protocol (TCP) optimizations. In other embodiments, the appliance 200 provides optimizations, flow control, performance enhancements or modifications and/or management for any session or application layer protocol. Further details of the optimization techniques, operations and architecture of the appliance 200 are discussed below.

Still referring to FIG. 1F, the network environment may include multiple, logically grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

In one embodiment, servers 106 in the server farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection. Additionally, a heterogeneous server farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif., the Xen hypervisor, an open source product whose development is overseen by Citrix Systems, Inc., the VirtualServer or virtual PC hypervisors provided by Microsoft, or others.

In order to manage a server farm 38, at least one aspect of the performance of servers 106 in the server farm 38 should be monitored. Typically, the load placed on each server 106 or the status of sessions running on each server 106 is monitored. In some embodiments, a centralized service may provide management for server farm 38. The centralized service may gather and store information about a plurality of servers 106, respond to requests for access to resources hosted by servers 106, and enable the establishment of connections between client machines 102 and servers 106.

Alternatively, management of the server farm 38 may be de-centralized. For example, one or more servers 106 may comprise components, subsystems and modules to support one or more management services for the server farm 38. In one of these embodiments, one or more servers 106 provide functionality for management of dynamic data, including techniques for handling failover, data replication, and increasing the robustness of the server farm 38. Each server 106 may communicate with a persistent store and, in some embodiments, with a dynamic store.

In some embodiments, a hypervisor executes on a server 106 executing an operating system. In one of these embodiments, a server 106 executing an operating system and a hypervisor may be said to have a host operating system (the operating system executing on the machine), and a guest operating system (an operating system executing within a computing resource partition provided by the hypervisor). In other embodiments, a hypervisor interacts directly with hardware on a server 106, instead of executing on a host operating system. In one of these embodiments, the hypervisor may be said to be executing on "bare metal," referring to the hardware comprising the server 106.

In some embodiments, a server 106 executes an application on behalf of a user of a client 102. In other embodiments, a server 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only a master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1G:
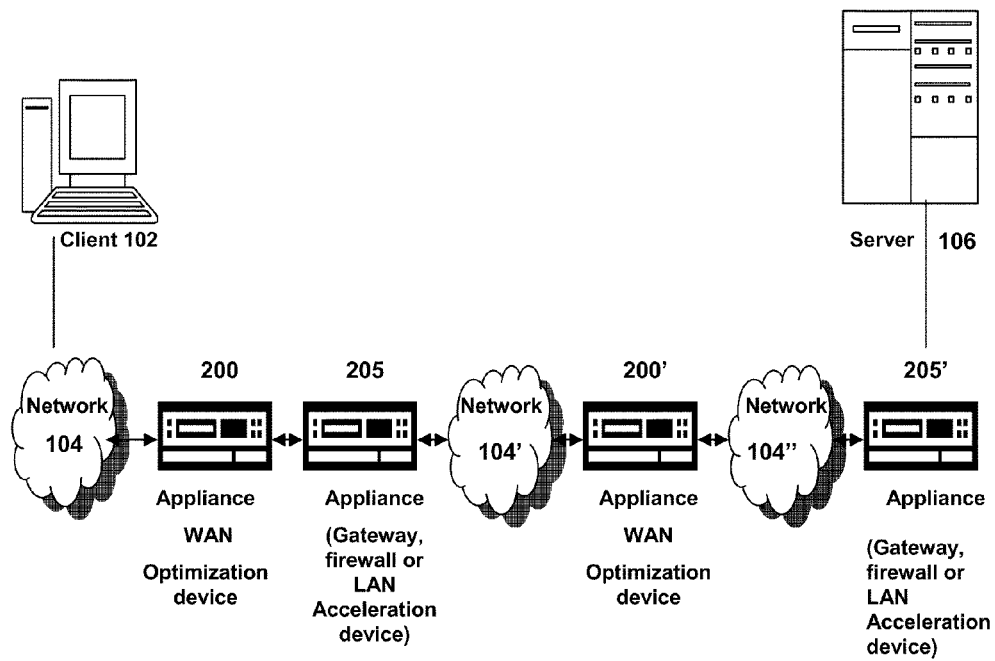
FIG. 1G is a block diagram depicting an embodiment of a network environment for a client to access a server via one or more network optimization appliances in conjunction with other network appliances.

Referring now to FIG. 1G, another embodiment of a network environment is depicted in which the network optimization appliance 200 is deployed with one or more other appliances 205, 205' (generally referred to as appliance 205 or second appliance 205) such as a gateway, firewall or acceleration appliance. For example, in one embodiment, the appliance 205 is a firewall or security appliance while appliance 205' is a LAN acceleration device. In some embodiments, a client 102 may communicate to a server 106 via one or more of the first appliances 200 and one or more second appliances 205.

One or more appliances 200 and 205 may be located at any point in the network or network communications path between a client 102 and a server 106. In some embodiments, a second appliance 205 may be located on the same network 104 as the first appliance 200. In other embodiments, the second appliance 205 may be located on a different network 104 as the first appliance 200. In yet another embodiment, a first appliance 200 and second appliance 205 is on the same network, for example network 104, while the first appliance 200' and second appliance 205' is on the same network, such as network 104".

In one embodiment, the second appliance 205 includes any type and form of transport control protocol or transport later terminating device, such as a gateway or firewall device. In one embodiment, the appliance 205 terminates the transport control protocol by establishing a first transport control protocol connection with the client and a second transport control connection with the second appliance or server. In another embodiment, the appliance 205 terminates the transport control protocol by changing, managing or controlling the behavior of the transport control protocol connection between the client and the server or second appliance. For example, the appliance 205 may change, queue, forward or transmit network packets in manner to effectively terminate the transport control protocol connection or to act or simulate as terminating the connection.

In some embodiments, the second appliance 205 is a performance enhancing proxy. In one embodiment, the appliance 205 provides a virtual private network (VPN) connection. In some embodiments, the appliance 205 provides a Secure Socket Layer VPN (SSL VPN) connection. In other embodiments, the appliance 205 provides an IPSec (Internet Protocol Security) based VPN connection. In some embodiments, the appliance 205 provides any one or more of the following functionality: compression, acceleration, load-balancing, switching/routing, caching, and Transport Control Protocol (TCP) acceleration.

In one embodiment, the appliance 205 is any of the product embodiments referred to as Access Gateway, Application Firewall, Application Gateway, or NETSCALER manufactured by Citrix Systems, Inc., of Fort Lauderdale, Fla. As such, in some embodiments, the appliance 205 includes any logic, functions, rules, or operations to perform services or functionality such as SSL VPN connectivity, SSL offloading, switching/load balancing, Domain Name Service resolution, LAN acceleration and an application firewall.

In some embodiments, the appliance 205 provides a SSL VPN connection between a client 102 and a server 106. For example, a client machine 102 on a first network 104 requests establishment of a connection to a server 106 on a second network 104'. In some embodiments, the second network 104" is not routable from the first network 104. In other embodiments, the client 102 is on a public network 104 and the server 106 is on a private network 104', such as a corporate network. In one embodiment, a client agent intercepts communications of the client 102 on the first network 104, encrypts the communications, and transmits the communications via a first transport layer connection to the appliance 205. The appliance 205 associates the first transport layer connection on the first network 104 to a second transport layer connection to the server 106 on the second network 104. The appliance 205 receives the intercepted communication from the client agent, decrypts the communications, and transmits the communication to the server 106 on the second network 104 via the second transport layer connection. The second transport layer connection may be a pooled transport layer connection. In one embodiment, the appliance 205 provides an end-to-end secure transport layer connection for the client 102 between the two networks 104, 104'.

In one embodiment, the appliance 205 hosts an Internet protocol (IP) address of the client 102 on the virtual private network 104. The client 102 has a local network identifier, such as an Internet protocol (IP) address and/or host name on the first network 104. When connected to the second network 104' via the appliance 205, the appliance 205 establishes, assigns or otherwise provides an Intranet IP address, which is a network identifier, such as IP address and/or host name, for the client 102 on the second network 104'. The appliance 205 listens for and receives on the second or private network 104' for any communications directed towards the client 102 using the client's established Intranet IP address. In one embodiment, the appliance 205 acts as or on behalf of the client 102 on the second private network 104.

In some embodiment, the appliance 205 has an encryption engine providing logic, business rules, functions or operations for handling the processing of any security related protocol, such as SSL or TLS, or any function related thereto. For example, the encryption engine encrypts and decrypts network packets, or any portion thereof, communicated via the appliance 205. The encryption engine may also setup or establish SSL or TLS connections on behalf of the client 102a-102n, server 106a-106n, or appliance 200, 205. As such, the encryption engine provides offloading and acceleration of SSL processing. In one embodiment, the encryption engine uses a tunneling protocol to provide a virtual private network between a client 102a-102n and a server 106a-106n. In some embodiments, the encryption engine uses an encryption processor. In other embodiments, the encryption engine includes executable instructions running on an encryption processor.

In some embodiments, the appliance 205 provides one or more of the following acceleration techniques to communications between the client 102 and server 106: 1) compression, 2) decompression, 3) Transmission Control Protocol pooling, 4) Transmission Control Protocol multiplexing, 5) Transmission Control Protocol buffering, and 6) caching.

In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 205 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 205, and the destination network address is changed to that of the intended server. In the case of an outbound packet (that is, one received from a server 106), the source network address is changed from that of the server 106 to that of an output port of appliance 205 and the destination address is changed from that of appliance 205 to that of the requesting client 102. The sequence numbers and acknowledgment numbers of the packet are also translated to sequence numbers and acknowledgement expected by the client 102 on the appliance's 205 transport layer connection to the client 102. In some embodiments, the packet checksum of the transport layer protocol is recalculated to account for these translations.

In another embodiment, the appliance 205 provides switching or load-balancing functionality for communications between the client 102 and server 106. In some embodiments, the appliance 205 distributes traffic and directs client requests to a server 106 based on layer 4 payload or application-layer request data. In one embodiment, although the network layer or layer 2 of the network packet identifies a destination server 106, the appliance 205 determines the server 106 to distribute the network packet by application information and data carried as payload of the transport layer packet. In one embodiment, a health monitoring program of the appliance 205 monitors the health of servers to determine the server 106 for which to distribute a client's request. In some embodiments, if the appliance 205 detects a server 106 is not available or has a load over a predetermined threshold, the appliance 205 can direct or distribute client requests to another server 106.

In some embodiments, the appliance 205 acts as a Domain Name Service (DNS) resolver or otherwise provides resolution of a DNS request from clients 102. In some embodiments, the appliance 205 intercepts a DNS request transmitted by the client 102. In one embodiment, the appliance 205 responds to a DNS request from a client with an IP address of or hosted by the appliance 205. In this embodiment, the client 102 transmits network communication for the domain name to the appliance 200. In another embodiment, the appliance 200 responds to a client's DNS request with an IP address of or hosted by a second appliance 200'. In some embodiments, the appliance 205 responds to a client's DNS request with an IP address of a server 106 determined by the appliance 200.

In yet another embodiment, the appliance 205 provides application firewall functionality for communications between the client 102 and server 106. In one embodiment, a policy engine 295' provides rules for detecting and blocking illegitimate requests. In some embodiments, the application firewall protects against denial of service (DoS) attacks. In other embodiments, the appliance inspects the content of intercepted requests to identify and block application-based attacks. In some embodiments, the rules/policy engine includes one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall of the appliance provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall of the appliance 205 ensures cookies are not modified. In other embodiments, the appliance 205 protects against forceful browsing by enforcing legal URLs.

In still yet other embodiments, the application firewall appliance 205 protects any confidential information contained in the network communication. The appliance 205 may inspect or analyze any network communication in accordance with the rules or polices of the policy engine to identify any confidential information in any field of the network packet. In some embodiments, the application firewall identifies in the network communication one or more occurrences of a credit card number, password, social security number, name, patient code, contact information, and age. The encoded portion of the network communication may include these occurrences or the confidential information. Based on these occurrences, in one embodiment, the application firewall may take a policy action on the network communication, such as prevent transmission of the network communication. In another embodiment, the application firewall may rewrite, remove or otherwise mask such identified occurrence or confidential information.

Although generally referred to as a network optimization or first appliance 200 and a second appliance 205, the first appliance 200 and second appliance 205 may be the same type and form of appliance. In one embodiment, the second appliance 205 may perform the same functionality, or portion thereof, as the first appliance 200, and vice-versa. For example, the first appliance 200 and second appliance 205 may both provide acceleration techniques. In one embodiment, the first appliance may perform LAN acceleration while the second appliance performs WAN acceleration, or vice-versa. In another example, the first appliance 200 may also be a transport control protocol terminating device as with the second appliance 205. Furthermore, although appliances 200 and 205 are shown as separate devices on the network, the appliance 200 and/or 205 could be a part of any client 102 or server 106.

Figure 1H:
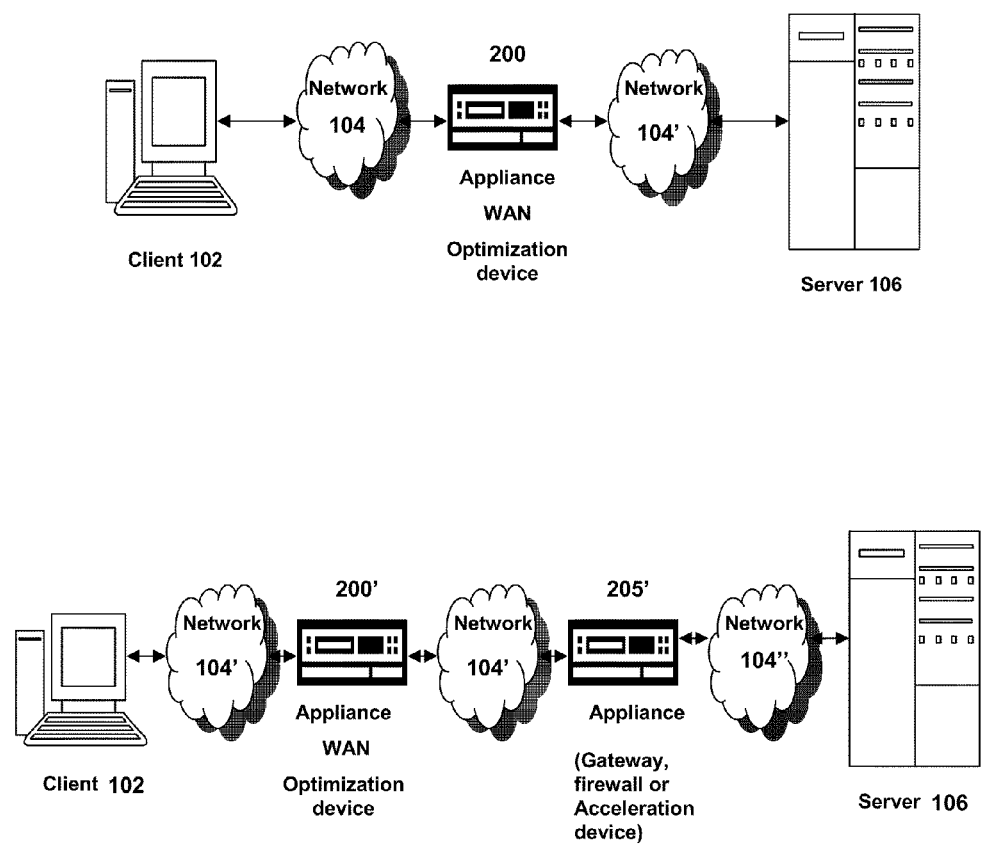
FIG. 1H is a block diagram depicting an embodiment of a network environment for a client to access a server via a single network optimization appliance deployed stand-alone or in conjunction with other network appliances.

Referring now to FIG. 1H, a block diagram depicts other embodiments of a network environment for deploying the appliance 200. In one embodiment, as depicted on the top of FIG. 1H, the appliance 200 may be deployed as a single appliance or single proxy on the network 104. For example, the appliance 200 may be designed, constructed or adapted to perform WAN optimization techniques discussed herein without a second cooperating appliance 200'. In another embodiment, as depicted on the bottom of FIG. 1H, a single appliance 200 may be deployed with one or more second appliances 205. For example, a WAN acceleration first appliance 200, such as a Citrix WANScaler appliance, may be deployed with a LAN accelerating or application firewall second appliance 205, such as a Citrix NETSCALER appliance.

Figure 1I:
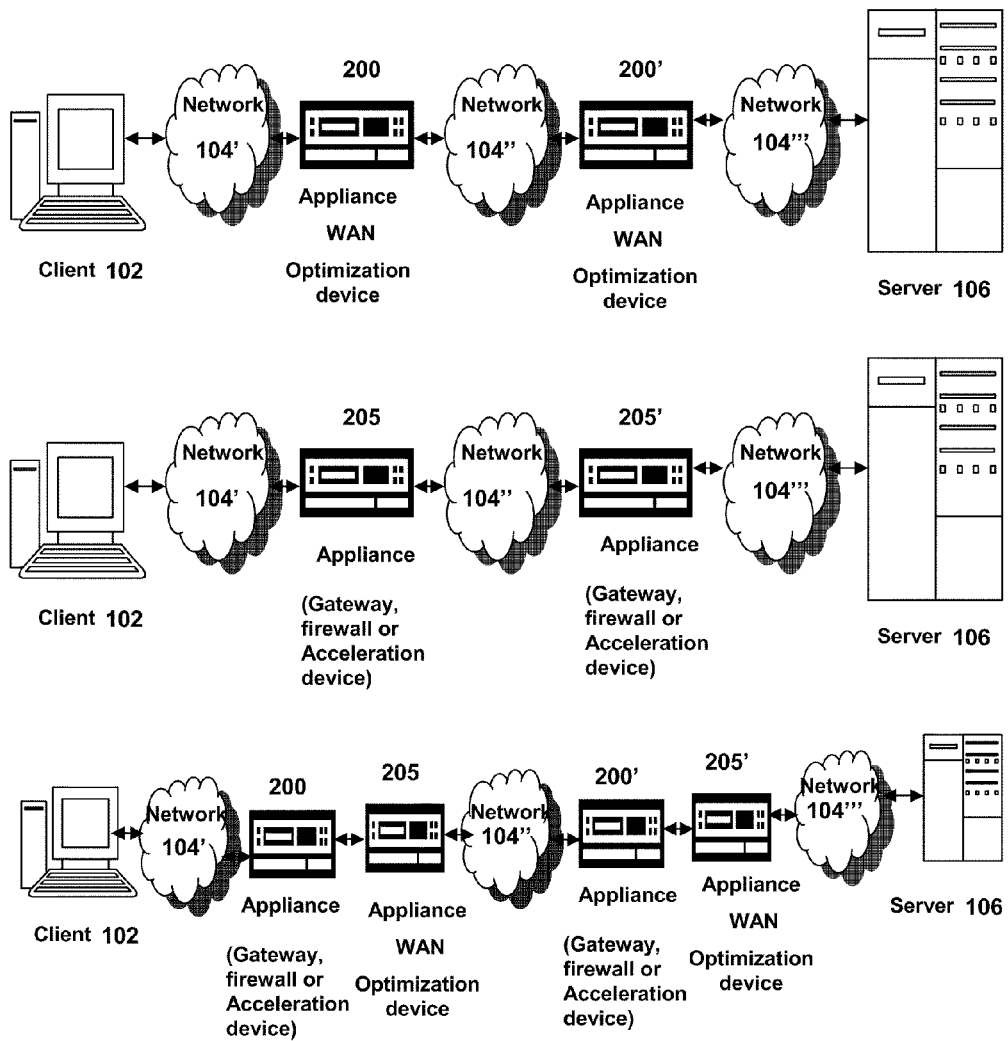
FIG. 1I is a block diagram depicting another embodiment of a network environment for a client to access a server via one or more network optimization appliances in conjunction with other network appliances across one or more networks.

Referring now to FIG. 1I, a block diagram depicts further embodiments of a network environment for deploying the appliance 200 and the appliance 205. In some embodiments, as depicted in the first row of FIG. 1L, a first appliance 200 resides on a network 104' on which a client 102 resides and a second appliance 200' resides on a network 104''' on which a server 106 resides. In one of these embodiments, the first appliance 200 and the second appliance 200' are separated by a third network, such as a Wide Area Network. In other embodiments, as depicted in the second row of FIG. 1I, a first appliance 205 resides on a network 104' on which a client 102 resides and a second appliance 205' resides on a network 104''' on which a server 106 resides. In one of these embodiments, the first appliance 205 and the second appliance 205' are separated by a third network 104'', such as a Wide Area Network. In still other embodiments, as depicted in the third row of FIG. 1I, a first appliance 200 and a first appliance 205 reside on a first network 104' on which a client 102 resides; a second appliance 200' and a second appliance 205' reside on a second network 104". In one of these embodiments, the first network 104' and the second network 104''' are separated by a third network 104". In further embodiments, the first appliance 200 and the first appliance 205 are symmetrical devices that are deployed as a pair. In one of these embodiments, the appliance 205 on a network 104''' resides between the appliance 200' and a machine in the network 104".

Figure 2A:
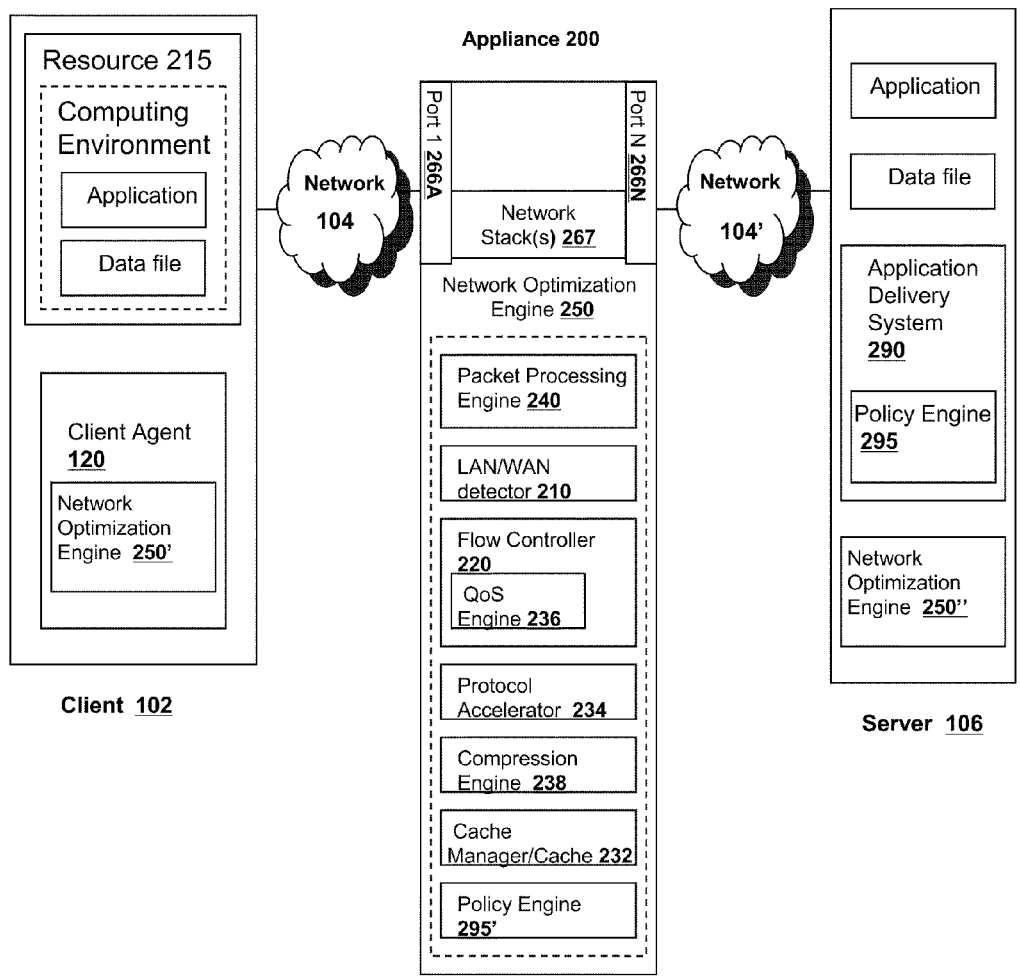
FIG. 2A is a block diagram depicting an embodiment of an appliance for processing communications between a client and a server.

Referring now to FIG. 2A, a block diagram depicts one embodiment of a system environment and architecture of an appliance 200 for delivering and/or operating a computing environment on a client. In some embodiments, a server 106 includes an application delivery system 290 for delivering a resource 215—such as a computing environment, an application, a data file, or other resource—to one or more clients 102. In brief overview, a client 102 is in communication with a server 106 via network 104 and appliance 200. For example, the client 102 may reside in a remote office of a company, e.g., a branch office, and the server 106 may reside at a corporate data center. The client 102 has a client agent 120, and a computing environment 215. The computing environment 215 may execute or operate an application that accesses, processes or uses a data file. The resource 215 may be delivered via the appliance 200 and/or the server 106.

In one embodiment, a resource 215 comprises a program, an application, a document, a file, a plurality of applications, a plurality of files, an executable program file, a desktop environment, a computing environment, or other resource made available to a user of the local machine 102. The resource 215 may be delivered to the local machine 102 via a plurality of access methods including, but not limited to, conventional installation directly on the local machine 102, delivery to the local machine 102 via a method for application streaming, delivery to the local machine 102 of output data generated by an execution of the resource 215 on a third machine 106' and communicated to the local machine 102 via a presentation layer protocol, delivery to the local machine 102 of output data generated by an execution of the resource 215 via a virtual machine executing on a remote machine 106, execution from a removable storage device connected to the local machine 102, such as a USB device, or via a virtual machine executing on the local machine 102 and generating output data. In some embodiments, the local machine 102 transmits output data generated by the execution of the resource 215 to another client machine 102'.

Referring now to FIG. 2A, and in greater detail, in some embodiments the appliance 200 accelerates delivery of a resource 215, or any portion thereof, to a client 102. In one embodiment, the appliance 200 accelerates the delivery of the resource 215 by the application delivery system 290. For example, the embodiments described herein may be used to accelerate delivery of a streamed application and/or data files processable by the streamed application from a central corporate data center to a remote user location, such as a branch office of the company. In another example, the embodiments described herein may be used to accelerate delivery of a virtual machine image, which may be the resource 215 or which may be executed to provide access to the resource 215. In another embodiment, the appliance 200 accelerates transport layer traffic between a client 102 and a server 106. In still another embodiment, the appliance 200 controls, manages, or adjusts the transport layer protocol to accelerate delivery of the computing environment. In yet another embodiment, the appliance 200 uses caching and/or compression techniques to accelerate delivery of a computing environment.

In some embodiments, the application delivery management system 290 provides application delivery techniques to deliver a computing environment to a desktop of a user, remote or otherwise, based on a plurality of execution methods and based on any authentication and authorization policies applied via a policy engine 295. With these techniques, a remote user may obtain a computing environment and access to server stored applications and data files from any network connected device 100. In one embodiment, the application delivery system 290 may reside or execute on a server 106. In another embodiment, the application delivery system 290 may reside or execute on a plurality of servers 106a-106n. In some embodiments, the application delivery system 290 may execute in a server farm 38. In one embodiment, the server 106 executing the application delivery system 290 may also store or provide the application and data file. In another embodiment, a first set of one or more servers 106 may execute the application delivery system 290, and a different server 106n may store or provide the application and data file. In some embodiments, each of the application delivery system 290, the application, and data file may reside or be located on different servers. In yet another embodiment, any portion of the application delivery system 290 may reside, execute or be stored on or distributed to the appliance 200, or a plurality of appliances.

The client 102 may include a resource 215 such as a computing environment for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 290 and/or server 106 may deliver the application and data file to the client 102. For example, in one embodiment, the server 106 may transmit the application as an application stream to operate in an environment provided by a resource 215 on client 102.

In some embodiments, the application delivery system 290 comprises any portion of the CITRIX ACCESS SUITE by Citrix Systems, Inc., such as the MetaFrame or CITRIX PRESENTATION SERVER, CITRIX XEN APPLICATION server, CITRIX XEN SERVER, and/or any of the MICROSOFT Windows Terminal Services manufactured by the Microsoft Corporation. In one embodiment, the application delivery system 290 may deliver one or more resources to clients 102 or users via a remote-display protocol or otherwise via remote-based or server-based computing. In another embodiment, the application delivery system 290 may deliver one or more resources to clients or users via steaming of the resources.

In one embodiment, the application delivery system 290 includes a policy engine 295 for controlling and managing the access to, selection of application execution methods and the delivery of applications. In some embodiments, the policy engine 295 determines the one or more applications a user or client 102 may access. In another embodiment, the policy engine 295 determines how the application should be delivered to the user or client 102, e.g., the method of execution. In some embodiments, the application delivery system 290 provides a plurality of delivery techniques from which to select a method of application execution, such as a server-based computing, streaming or delivering the application locally to the client 120 for local execution.

In one embodiment, a client 102 requests execution of an application program and the application delivery system 290 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 290 enumerates a plurality of application programs available to the client 102. The application delivery system 290 receives a request to execute an enumerated application. The application delivery system 290 selects one of a predetermined number of methods for executing the enumerated application, for example, responsive to a policy of a policy engine. The application delivery system 290 may select a method of execution of the application enabling the client 102 to receive application-output data generated by execution of the application program on a server 106. The application delivery system 290 may select a method of execution of the application enabling the client or local machine 102 to execute the application program locally after retrieving a plurality of application files comprising the application. In yet another embodiment, the application delivery system 290 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiment the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix ACCESS SUITE by Citrix Systems, Inc., such as the METAFRAME or Citrix PRESENTATION SERVER or XENAPP, XENSERVER and/or any of the MICROSOFT Windows Terminal Services manufactured by the Microsoft Corporation. In one embodiment, the application is an independent computing architecture (ICA) client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office Live Meeting provided by Microsoft Corporation of Redmond, Wash.

FIG. 2A also illustrates an example embodiment of the appliance 200. The architecture of the appliance 200 in FIG. 2A is provided by way of illustration only and is not intended to be limiting in any manner. The appliance 200 may include any type and form of computing device 100, such as any element or portion described in conjunction with FIGS. 1F and 1G above. In brief overview, the appliance 200 has one or more network ports 266A-226N and one or more networks stacks 267A-267N for receiving and/or transmitting communications via networks 104. The appliance 200 also has a network optimization engine 250 for optimizing, accelerating or otherwise improving the performance, operation, or quality of any network traffic or communications traversing the appliance 200.

The appliance 200 includes or is under the control of an operating system. The operating system of the appliance 200 may be any type and/or form of Unix operating system although the invention is not so limited. As such, the appliance 200 can be running any operating system such as any of the versions of the MICROSOFT Windows operating systems, the different releases of the Unix and Linux operating systems, any version of the MAC OS for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The operating system of appliance 200 allocates, manages, or otherwise segregates the available system memory into what is referred to as kernel or system space, and user or application space. The kernel space is typically reserved for running the kernel, including any device drivers, kernel extensions or other kernel related software. As known to those skilled in the art, the kernel is the core of the operating system, and provides access, control, and management of resources and hardware-related elements of the appliance 200. In accordance with an embodiment of the appliance 200, the kernel space also includes a number of network services or processes working in conjunction with the network optimization engine 250, or any portion thereof. Additionally, the embodiment of the kernel will depend on the embodiment of the operating system installed, configured, or otherwise used by the device 200. In contrast to kernel space, user space is the memory area or portion of the operating system used by user mode applications or programs otherwise running in user mode. A user mode application may not access kernel space directly and uses service calls in order to access kernel services. The operating system uses the user or application space for executing or running applications and provisioning of user level programs, services, processes and/or tasks.

The appliance 200 has one or more network ports 266 for transmitting and receiving data over a network 104. The network port 266 provides a physical and/or logical interface between the computing device and a network 104 or another device 100 for transmitting and receiving network communications. The type and form of network port 266 depends on the type and form of network and type of medium for connecting to the network. Furthermore, any software of, provisioned for or used by the network port 266 and network stack 267 may run in either kernel space or user space.

In one embodiment, the appliance 200 has one network stack 267, such as a TCP/IP based stack, for communicating on a network 105, such with the client 102 and/or the server 106. In one embodiment, the network stack 267 is used to communicate with a first network, such as network 104, and also with a second network 104'. In another embodiment, the appliance 200 has two or more network stacks, such as first network stack 267A and a second network stack 267N. The first network stack 267A may be used in conjunction with a first port 266A to communicate on a first network 104. The second network stack 267N may be used in conjunction with a second port 266N to communicate on a second network 104'. In one embodiment, the network stack(s) 267 has one or more buffers for queuing one or more network packets for transmission by the appliance 200.

The network stack 267 includes any type and form of software, or hardware, or any combinations thereof, for providing connectivity to and communications with a network. In one embodiment, the network stack 267 includes a software implementation for a network protocol suite. The network stack 267 may have one or more network layers, such as any networks layers of the Open Systems Interconnection (OSI) communications model as those skilled in the art recognize and appreciate. As such, the network stack 267 may have any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 267 includes a transport control protocol (TCP) over the network layer protocol of the Internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 267 has any type and form of a wireless protocol, such as IEEE 802.11 and/or mobile Internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 267 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 267, such as for voice communications or real-time data communications.

Furthermore, the network stack 267 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 267 may be customized, modified or adapted to provide a custom or modified portion of the network stack 267 in support of any of the techniques described herein.

In one embodiment, the appliance 200 provides for or maintains a transport layer connection between a client 102 and server 106 using a single network stack 267. In some embodiments, the appliance 200 effectively terminates the transport layer connection by changing, managing or controlling the behavior of the transport control protocol connection between the client and the server. In these embodiments, the appliance 200 may use a single network stack 267. In other embodiments, the appliance 200 terminates a first transport layer connection, such as a TCP connection of a client 102, and establishes a second transport layer connection to a server 106 for use by or on behalf of the client 102, e.g., the second transport layer connection is terminated at the appliance 200 and the server 106. The first and second transport layer connections may be established via a single network stack 267. In other embodiments, the appliance 200 may use multiple network stacks, for example 267A and 267N. In these embodiments, the first transport layer connection may be established or terminated at one network stack 267A, and the second transport layer connection may be established or terminated on the second network stack 267N. For example, one network stack may be for receiving and transmitting network packets on a first network, and another network stack for receiving and transmitting network packets on a second network.

As shown in FIG. 2A, the network optimization engine 250 includes one or more of the following elements, components or modules: network packet processing engine 240, LAN/WAN detector 210, flow controller 220, QoS engine 236, protocol accelerator 234, compression engine 238, cache manager 232 and policy engine 295'. The network optimization engine 250, or any portion thereof, may include software, hardware or any combination of software and hardware. Furthermore, any software of, provisioned for or used by the network optimization engine 250 may run in either kernel space or user space. For example, in one embodiment, the network optimization engine 250 may run in kernel space. In another embodiment, the network optimization engine 250 may run in user space. In yet another embodiment, a first portion of the network optimization engine 250 runs in kernel space while a second portion of the network optimization engine 250 runs in user space.

The network packet engine 240, also generally referred to as a packet processing engine or packet engine, is responsible for controlling and managing the processing of packets received and transmitted by appliance 200 via network ports 266 and network stack(s) 267. The network packet engine 240 may operate at any layer of the network stack 267. In one embodiment, the network packet engine 240 operates at layer 2 or layer 3 of the network stack 267. In some embodiments, the packet engine 240 intercepts or otherwise receives packets at the network layer, such as the IP layer in a TCP/IP embodiment. In another embodiment, the packet engine 240 operates at layer 4 of the network stack 267. For example, in some embodiments, the packet engine 240 intercepts or otherwise receives packets at the transport layer, such as intercepting packets as the TCP layer in a TCP/IP embodiment. In other embodiments, the packet engine 240 operates at any session or application layer above layer 4. For example, in one embodiment, the packet engine 240 intercepts or otherwise receives network packets above the transport layer protocol layer, such as the payload of a TCP packet in a TCP embodiment.

The packet engine 240 may include a buffer for queuing one or more network packets during processing, such as for receipt of a network packet or transmission of a network packet. Additionally, the packet engine 240 is in communication with one or more network stacks 267 to send and receive network packets via network ports 266. The packet engine 240 may include a packet processing timer. In one embodiment, the packet processing timer provides one or more time intervals to trigger the processing of incoming, i.e., received, or outgoing, i.e., transmitted, network packets. In some embodiments, the packet engine 240 processes network packets responsive to the timer. The packet processing timer provides any type and form of signal to the packet engine 240 to notify, trigger, or communicate a time related event, interval or occurrence. In many embodiments, the packet processing timer operates in the order of milliseconds, such as for example 100 ms, 50 ms, 25 ms, 10 ms, 5 ms or 1 ms.

During operations, the packet engine 240 may be interfaced, integrated or be in communication with any portion of the network optimization engine 250, such as the LAN/WAN detector 210, flow controller 220, QoS engine 236, protocol accelerator 234, compression engine 238, cache manager 232 and/or policy engine 295'. As such, any of the logic, functions, or operations of the LAN/WAN detector 210, flow controller 220, QoS engine 236, protocol accelerator 234, compression engine 238, cache manager 232 and policy engine 295' may be performed responsive to the packet processing timer and/or the packet engine 240. In some embodiments, any of the logic, functions, or operations of the encryption engine 234, cache manager 232, policy engine 236 and multi-protocol compression logic 238 may be performed at the granularity of time intervals provided via the packet processing timer, for example, at a time interval of less than or equal to 10 ms. For example, in one embodiment, the cache manager 232 may perform expiration of any cached objects responsive to the integrated packet engine 240 and/or the packet processing timer 242. In another embodiment, the expiry or invalidation time of a cached object can be set to the same order of granularity as the time interval of the packet processing timer, such as at every 10 ms.

The cache manager 232 may include software, hardware or any combination of software and hardware to store data, information and objects to a cache in memory or storage, provide cache access, and control and manage the cache. The data, objects or content processed and stored by the cache manager 232 may include data in any format, such as a markup language, or any type of data communicated via any protocol. In some embodiments, the cache manager 232 duplicates original data stored elsewhere or data previously computed, generated or transmitted, in which the original data may require longer access time to fetch, compute or otherwise obtain relative to reading a cache memory or storage element. Once the data is stored in the cache, future use can be made by accessing the cached copy rather than refetching or recomputing the original data, thereby reducing the access time. In some embodiments, the cache may comprise a data object in memory of the appliance 200. In another embodiment, the cache may comprise any type and form of storage element of the appliance 200, such as a portion of a hard disk. In some embodiments, the processing unit of the device may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any caching techniques of the appliance 200. In some embodiments, the cache manager 232 may operate as an application, library, program, service, process, thread or task. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 295' includes any logic, function or operations for providing and applying one or more policies or rules to the function, operation or configuration of any portion of the appliance 200. The policy engine 295' may include, for example, an intelligent statistical engine or other programmable application(s). In one embodiment, the policy engine 295 provides a configuration mechanism to allow a user to identify, specify, define or configure a policy for the network optimization engine 250, or any portion thereof. For example, the policy engine 295 may provide policies for what data to cache, when to cache the data, for whom to cache the data, when to expire an object in cache or refresh the cache. In other embodiments, the policy engine 236 may include any logic, rules, functions or operations to determine and provide access, control and management of objects, data or content being cached by the appliance 200 in addition to access, control and management of security, network traffic, network access, compression or any other function or operation performed by the appliance 200.

In some embodiments, the policy engine 295' provides and applies one or more policies based on any one or more of the following: a user, identification of the client, identification of the server, the type of connection, the time of the connection, the type of network, or the contents of the network traffic. In one embodiment, the policy engine 295' provides and applies a policy based on any field or header at any protocol layer of a network packet. In another embodiment, the policy engine 295' provides and applies a policy based on any payload of a network packet. For example, in one embodiment, the policy engine 295' applies a policy based on identifying a certain portion of content of an application layer protocol carried as a payload of a transport layer packet. In another example, the policy engine 295' applies a policy based on any information identified by a client, server or user certificate. In yet another embodiment, the policy engine 295' applies a policy based on any attributes or characteristics obtained about a client 102, such as via any type and form of endpoint detection (see for example the collection agent of the client agent discussed below).

In one embodiment, the policy engine 295' works in conjunction or cooperation with the policy engine 295 of the application delivery system 290. In some embodiments, the policy engine 295' is a distributed portion of the policy engine 295 of the application delivery system 290. In another embodiment, the policy engine 295 of the application delivery system 290 is deployed on or executed on the appliance 200. In some embodiments, the policy engines 295, 295' both operate on the appliance 200. In yet another embodiment, the policy engine 295', or a portion thereof, of the appliance 200 operates on a server 106.

The compression engine 238 includes any logic, business rules, function or operations for compressing one or more protocols of a network packet, such as any of the protocols used by the network stack 267 of the appliance 200. The compression engine 238 may also be referred to as a multi-protocol compression engine 238 in that it may be designed, constructed or capable of compressing a plurality of protocols. In one embodiment, the compression engine 238 applies context insensitive compression, which is compression applied to data without knowledge of the type of data. In another embodiment, the compression engine 238 applies context-sensitive compression. In this embodiment, the compression engine 238 utilizes knowledge of the data type to select a specific compression algorithm from a suite of suitable algorithms. In some embodiments, knowledge of the specific protocol is used to perform context-sensitive compression. In one embodiment, the appliance 200 or compression engine 238 can use port numbers (e.g., well-known ports), as well as data from the connection itself to determine the appropriate compression algorithm to use. Some protocols use only a single type of data, requiring only a single compression algorithm that can be selected when the connection is established. Other protocols contain different types of data at different times. For example, POP, IMAP, SMTP, and HTTP all move files of arbitrary types interspersed with other protocol data.

In one embodiment, the compression engine 238 uses a delta-type compression algorithm. In another embodiment, the compression engine 238 uses first site compression as well as searching for repeated patterns among data stored in cache, memory or disk. In some embodiments, the compression engine 238 uses a lossless compression algorithm. In other embodiments, the compression engine uses a lossy compression algorithm. In some cases, knowledge of the data type and, sometimes, permission from the user are required to use a lossy compression algorithm. Compression is not limited to the protocol payload. The control fields of the protocol itself may be compressed. In some embodiments, the compression engine 238 uses a different algorithm than that used for the payload.

In some embodiments, the compression engine 238 compresses at one or more layers of the network stack 267. In one embodiment, the compression engine 238 compresses at a transport layer protocol. In another embodiment, the compression engine 238 compresses at an application layer protocol. In some embodiments, the compression engine 238 compresses at a layer 2-4 protocol. In other embodiments, the compression engine 238 compresses at a layer 5-7 protocol. In yet another embodiment, the compression engine compresses a transport layer protocol and an application layer protocol. In some embodiments, the compression engine 238 compresses a layer 2-4 protocol and a layer 5-7 protocol.

In some embodiments, the compression engine 238 uses memory-based compression, cache-based compression or disk-based compression or any combination thereof. As such, the compression engine 238 may be referred to as a multi-layer compression engine. In one embodiment, the compression engine 238 uses a history of data stored in memory, such as RAM. In another embodiment, the compression engine 238 uses a history of data stored in a cache, such as L2 cache of the processor. In other embodiments, the compression engine 238 uses a history of data stored to a disk or storage location. In some embodiments, the compression engine 238 uses a hierarchy of cache-based, memory-based and disk-based data history. The compression engine 238 may first use the cache-based data to determine one or more data matches for compression, and then may check the memory-based data to determine one or more data matches for compression. In another case, the compression engine 238 may check disk storage for data matches for compression after checking either the cache-based and/or memory-based data history.

In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of HyperText Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine by integrating with packet processing engine 240 accessing the network stack 267 is able to compress any of the protocols carried by a transport layer protocol, such as any application layer protocol.

The LAN/WAN detector 238 includes any logic, business rules, function or operations for automatically detecting a slow side connection (e.g., a wide area network (WAN) connection such as an Intranet) and associated port 267, and a fast side connection (e.g., a local area network (LAN) connection) and an associated port 267. In some embodiments, the LAN/WAN detector 238 monitors network traffic on the network ports 267 of the appliance 200 to detect a synchronization packet, sometimes referred to as a "tagged" network packet. The synchronization packet identifies a type or speed of the network traffic. In one embodiment, the synchronization packet identifies a WAN speed or WAN type connection. The LAN/WAN detector 238 also identifies receipt of an acknowledgement packet to a tagged synchronization packet and on which port it is received. The appliance 200 then configures itself to operate the identified port on which the tagged synchronization packet arrived so that the speed on that port is set to be the speed associated with the network connected to that port. The other port is then set to the speed associated with the network connected to that port.

For ease of discussion herein, reference to "fast" side will be made with respect to connection with a wide area network (WAN), e.g., the Internet, and operating at a network speed of the WAN. Likewise, reference to "slow" side will be made with respect to connection with a local area network (LAN) and operating at a network speed the LAN. However, it is noted that "fast" and "slow" sides in a network can change on a per-connection basis and are relative terms to the speed of the network connections or to the type of network topology. Such configurations are useful in complex network topologies, where a network is "fast" or "slow" only when compared to adjacent networks and not in any absolute sense.

In one embodiment, the LAN/WAN detector 238 may be used to allow for auto-discovery by an appliance 200 of a network to which it connects. In another embodiment, the LAN/WAN detector 238 may be used to detect the existence or presence of a second appliance 200' deployed in the network 104. For example, an auto-discovery mechanism in operation in accordance with FIG. 1A functions as follows: appliance 200 and 200' are placed in line with the connection linking client 102 and server 106. The appliances 200 and 200' are at the ends of a low-speed link, e.g., Internet, connecting two LANs. In one example embodiment, appliances 200 and 200' each include two ports—one to connect with the "lower" speed link and the other to connect with a "higher" speed link, e.g., a LAN. Any packet arriving at one port is copied to the other port. Thus, appliance 200 and 200' are each configured to function as a bridge between the two networks 104.

When an end node, such as the client 102, opens a new TCP connection with another end node, such as the server 106, the client 102 sends a TCP packet with a synchronization (SYN) header bit set, or a SYN packet, to the server 106. In the present example, client 102 opens a transport layer connection to server 106. When the SYN packet passes through appliance 200, the appliance 200 inserts, attaches or otherwise provides a characteristic TCP header option to the packet, which announces its presence. If the packet passes through a second appliance, in this example appliance 200' the second appliance notes the header option on the SYN packet. The server 106 responds to the SYN packet with a synchronization acknowledgment (SYN-ACK) packet. When the SYN-ACK packet passes through appliance 200', a TCP header option is tagged (e.g., attached, inserted or added) to the SYN-ACK packet to announce appliance 200' presence to appliance 200. When appliance 200 receives this packet, both appliances 200, 200' are now aware of each other and the connection can be appropriately accelerated.

Further to the operations of the LAN/WAN detector 238, a method or process for detecting "fast" and "slow" sides of a network using a SYN packet is described. During a transport layer connection establishment between a client 102 and a server 106, the appliance 200 via the LAN/WAN detector 238 determines whether the SYN packet is tagged with an acknowledgement (ACK). If it is tagged, the appliance 200 identifies or configures the port receiving the tagged SYN packet (SYN-ACK) as the "slow" side. In one embodiment, the appliance 200 optionally removes the ACK tag from the packet before copying the packet to the other port. If the LAN/WAN detector 238 determines that the packet is not tagged, the appliance 200 identifies or configures the port receiving the untagged packet as the "fast" side. The appliance 200 then tags the SYN packet with an ACK and copies the packet to the other port.

In another embodiment, the LAN/WAN detector 238 detects fast and slow sides of a network using a SYN-ACK packet. The appliance 200 via the LAN/WAN detector 238 determines whether the SYN-ACK packet is tagged with an acknowledgement (ACK). If it is tagged, the appliance 200 identifies or configures the port receiving the tagged SYN packet (SYN-ACK) as the "slow" side. In one embodiment, the appliance 200 optionally removes the ACK tag from the packet before copying the packet to the other port. If the LAN/WAN detector 238 determines that the packet is not tagged, the appliance 200 identifies or configures the port receiving the untagged packet as the "fast" side. The LAN/WAN detector 238 determines whether the SYN packet was tagged. If the SYN packet was not tagged, the appliance 200 copied the packet to the other port. If the SYN packet was tagged, the appliance tags the SYN-ACK packet before copying it to the other port.

The appliance 200, 200' may add, insert, modify, attach or otherwise provide any information or data in the TCP option header to provide any information, data or characteristics about the network connection, network traffic flow, or the configuration or operation of the appliance 200. In this manner, not only does an appliance 200 announce its presence to another appliance 200' or tag a higher or lower speed connection, the appliance 200 provides additional information and data via the TCP option headers about the appliance or the connection. The TCP option header information may be useful to or used by an appliance in controlling, managing, optimizing, acceleration or improving the network traffic flow traversing the appliance 200, or to otherwise configure itself or operation of a network port.

Although generally described in conjunction with detecting speeds of network connections or the presence of appliances, the LAN/WAN detector 238 can be used for applying any type of function, logic or operation of the appliance 200 to a port, connection or flow of network traffic. In particular, automated assignment of ports can occur whenever a device performs different functions on different ports, where the assignment of a port to a task can be made during the unit's operation, and/or the nature of the network segment on each port is discoverable by the appliance 200.

The flow controller 220 includes any logic, business rules, function or operations for optimizing, accelerating or otherwise improving the performance, operation or quality of service of transport layer communications of network packets or the delivery of packets at the transport layer. A flow controller, also sometimes referred to as a flow control module, regulates, manages and controls data transfer rates. In some embodiments, the flow controller 220 is deployed at or connected at a bandwidth bottleneck in the network 104. In one embodiment, the flow controller 220 effectively regulates, manages and controls bandwidth usage or utilization. In other embodiments, the flow control modules may also be deployed at points on the network of latency transitions (low latency to high latency) and on links with media losses (such as wireless or satellite links).

In some embodiments, a flow controller 220 may include a receiver-side flow control module for controlling the rate of receipt of network transmissions and a sender-side flow control module for the controlling the rate of transmissions of network packets. In other embodiments, a first flow controller 220 includes a receiver-side flow control module and a second flow controller 220' includes a sender-side flow control module. In some embodiments, a first flow controller 220 is deployed on a first appliance 200 and a second flow controller 220' is deployed on a second appliance 200'. As such, in some embodiments, a first appliance 200 controls the flow of data on the receiver side and a second appliance 200' controls the data flow from the sender side. In yet another embodiment, a single appliance 200 includes flow control for both the receiver-side and sender-side of network communications traversing the appliance 200.

In one embodiment, a flow control module 220 is configured to allow bandwidth at the bottleneck to be more fully utilized, and in some embodiments, not overutilized. In some embodiments, the flow control module 220 transparently buffers (or rebuffers data already buffered by, for example, the sender) network sessions that pass between nodes having associated flow control modules 220. When a session passes through two or more flow control modules 220, one or more of the flow control modules controls a rate of the session(s).

In one embodiment, the flow control module 200 is configured with predetermined data relating to bottleneck bandwidth. In another embodiment, the flow control module 220 may be configured to detect the bottleneck bandwidth or data associated therewith. Unlike conventional network protocols such as TCP, a receiver-side flow control module 220 controls the data transmission rate. The receiver-side flow control module controls 220 the sender-side flow control module, e.g., 220, data transmission rate by forwarding transmission rate limits to the sender-side flow control module 220. In one embodiment, the receiver-side flow control module 220 piggybacks these transmission rate limits on acknowledgement (ACK) packets (or signals) sent to the sender, e.g., client 102, by the receiver, e.g., server 106. The receiver-side flow control module 220 does this in response to rate control requests that are sent by the sender side flow control module 220'. The requests from the sender-side flow control module 220' may be "piggybacked" on data packets sent by the sender 106.

In some embodiments, the flow controller 220 manipulates, adjusts, simulates, changes, improves or otherwise adapts the behavior of the transport layer protocol to provide improved performance or operations of delivery, data rates and/or bandwidth utilization of the transport layer. The flow controller 220 may implement a plurality of data flow control techniques at the transport layer, including but not limited to 1) pre-acknowledgements, 2) window virtualization, 3) recongestion techniques, 3) local retransmission techniques, 4) wavefront detection and disambiguation, 5) transport control protocol selective acknowledgements, 6) transaction boundary detection techniques and 7) repacketization.

Although a sender may be generally described herein as a client 102 and a receiver as a server 106, a sender may be any end point such as a server 106 or any computing device 100 on the network 104. Likewise, a receiver may be a client 102 or any other computing device on the network 104.

In brief overview of a pre-acknowledgement flow control technique, the flow controller 220, in some embodiments, handles the acknowledgements and retransmits for a sender, effectively terminating the sender's connection with the downstream portion of a network connection. In reference to FIG. 1B, one possible deployment of an appliance 200 into a network architecture to implement this feature is depicted. In this example environment, a sending computer or client 102 transmits data on network 104, for example, via a switch, which determines that the data is destined for VPN appliance 205. Because of the chosen network topology, all data destined for VPN appliance 205 traverses appliance 200, so the appliance 200 can apply any necessary algorithms to this data.

Continuing further with the example, the client 102 transmits a packet, which is received by the appliance 200. When the appliance 200 receives the packet, which is transmitted from the client 102 to a recipient via the VPN appliance 205 the appliance 200 retains a copy of the packet and forwards the packet downstream to the VPN appliance 205. The appliance 200 then generates an acknowledgement packet (ACK) and sends the ACK packet back to the client 102 or sending endpoint. This ACK, a pre-acknowledgment, causes the sender 102 to believe that the packet has been delivered successfully, freeing the sender's resources for subsequent processing. The appliance 200 retains the copy of the packet data in the event that a retransmission of the packet is required, so that the sender 102 does not have to handle retransmissions of the data. This early generation of acknowledgements may be called "preacking."

If a retransmission of the packet is required, the appliance 200 retransmits the packet to the sender. The appliance 200 may determine whether retransmission is required as a sender would in a traditional system, for example, determining that a packet is lost if an acknowledgement has not been received for the packet after a predetermined amount of time. To this end, the appliance 200 monitors acknowledgements generated by the receiving endpoint, e.g., server 106 (or any other downstream network entity) so that it can determine whether the packet has been successfully delivered or needs to be retransmitted. If the appliance 200 determines that the packet has been successfully delivered, the appliance 200 is free to discard the saved packet data. The appliance 200 may also inhibit forwarding acknowledgements for packets that have already been received by the sending endpoint.

In the embodiment described above, the appliance 200 via the flow controller 220 controls the sender 102 through the delivery of pre-acknowledgements, also referred to as "preacks", as though the appliance 200 was a receiving endpoint itself. Since the appliance 200 is not an endpoint and does not actually consume the data, the appliance 200 includes a mechanism for providing overflow control to the sending endpoint. Without overflow control, the appliance 200 could run out of memory because the appliance 200 stores packets that have been preacked to the sending endpoint but not yet acknowledged as received by the receiving endpoint. Therefore, in a situation in which the sender 102 transmits packets to the appliance 200 faster than the appliance 200 can forward the packets downstream, the memory available in the appliance 200 to store unacknowledged packet data can quickly fill. A mechanism for overflow control allows the appliance 200 to control transmission of the packets from the sender 102 to avoid this problem.

In one embodiment, the appliance 200 or flow controller 220 includes an inherent "self-clocking" overflow control mechanism. This self-clocking is due to the order in which the appliance 200 may be designed to transmit packets downstream and send ACKs to the sender 102 or 106. In some embodiments, the appliance 200 does not preack the packet until after it transmits the packet downstream. In this way, the sender 102 will receive the ACKs at the rate at which the appliance 200 is able to transmit packets rather than the rate at which the appliance 200 receives packets from the sender 100. This helps to regulate the transmission of packets from a sender 102.

Another overflow control mechanism that the appliance 200 may implement is to use the TCP window size parameter, which tells a sender how much buffer the receiver is permitting the sender to fill up. A nonzero window size (e.g., a size of at least one Maximum Segment Size (MSS)) in a preack permits the sending endpoint to continue to deliver data to the appliance, whereas a zero window size inhibits further data transmission. Accordingly, the appliance 200 may regulate the flow of packets from the sender, for example when the appliance's 200 buffer is becoming full, by appropriately setting the TCP window size in each preack.

Another technique to reduce this additional overhead is to apply hysteresis. When the appliance 200 delivers data to the slower side, the overflow control mechanism in the appliance 200 can require that a minimum amount of space be available before sending a nonzero window advertisement to the sender. In one embodiment, the appliance 200 waits until there is a minimum of a predetermined number of packets, such as four packets, of space available before sending a nonzero window packet, such as a window size of four packets). This reduces the overhead by approximately a factor four, since only two ACK packets are sent for each group of four data packets, instead of eight ACK packets for four data packets.

Another technique the appliance 200 or flow controller 220 may use for overflow control is the TCP delayed ACK mechanism, which skips ACKs to reduce network traffic. The TCP delayed ACKs automatically delay the sending of an ACK, either until two packets are received or until a fixed timeout has occurred. This mechanism alone can result in cutting the overhead in half; moreover, by increasing the numbers of packets above two, additional overhead reduction is realized. But merely delaying the ACK itself may be insufficient to control overflow, and the appliance 200 may also use the advertised window mechanism on the ACKs to control the sender. When doing this, the appliance 200 in one embodiment avoids triggering the timeout mechanism of the sender by delaying the ACK too long.

In one embodiment, the flow controller 220 does not preack the last packet of a group of packets. By not preacking the last packet, or at least one of the packets in the group, the appliance avoids a false acknowledgement for a group of packets. For example, if the appliance were to send a preack for a last packet and the packet were subsequently lost, the sender would have been tricked into thinking that the packet is delivered when it was not. Thinking that the packet had been delivered, the sender could discard that data. If the appliance also lost the packet, there would be no way to retransmit the packet to the recipient. By not preacking the last packet of a group of packets, the sender will not discard the packet until it has been delivered.

In another embodiment, the flow controller 220 may use a window virtualization technique to control the rate of flow or bandwidth utilization of a network connection. Though it may not immediately be apparent from examining conventional literature such as RFC 1323, there is effectively a send window for transport layer protocols such as TCP. The send window is similar to the receive window, in that it consumes buffer space (though on the sender). The sender's send window consists of all data sent by the application that has not been acknowledged by the receiver. This data must be retained in memory in case retransmission is required. Since memory is a shared resource, some TCP stack implementations limit the size of this data. When the send window is full, an attempt by an application program to send more data results in blocking the application program until space is available. Subsequent reception of acknowledgements will free send-window memory and unblock the application program. In some embodiments, this window size is known as the socket buffer size in some TCP implementations.

In one embodiment, the flow control module 220 is configured to provide access to increased window (or buffer) sizes. This configuration may also be referenced to as window virtualization. In the embodiment of TCP as the transport layer protocol, the TCP header includes a bit string corresponding to a window scale. In one embodiment, "window" may be referenced in a context of send, receive, or both.

One embodiment of window virtualization is to insert a preacking appliance 200 into a TCP session. In reference to any of the environments of FIG. 1D or 1E, initiation of a data communication session between a source node, e.g., client 102 (for ease of discussion, now referenced as source node 102), and a destination node, e.g., server 106 (for ease of discussion, now referenced as destination node 106) is established. For TCP communications, the source node 102 initially transmits a synchronization signal ("SYN") through its local area network 104 to first flow control module 220. The first flow control module 220 inserts a configuration identifier into the TCP header options area. The configuration identifier identifies this point in the data path as a flow control module.

The appliances 200 via a flow control module 220 provide window (or buffer) to allow increasing data buffering capabilities within a session despite having end nodes with small buffer sizes, e.g., typically 16 k bytes. However, RFC 1323 requires window scaling for any buffer sizes greater than 64 k bytes, which must be set at the time of session initialization (SYN, SYN-ACK signals). Moreover, the window scaling corresponds to the lowest common denominator in the data path, often an end node with small buffer size. This window scale often is a scale of 0 or 1, which corresponds to a buffer size of up to 64 k or 128 k bytes. Note that because the window size is defined as the window field in each packet shifted over by the window scale, the window scale establishes an upper limit for the buffer, but does not guarantee the buffer is actually that large. Each packet indicates the current available buffer space at the receiver in the window field.

In one embodiment of scaling using the window virtualization technique, during connection establishment (i.e., initialization of a session) when the first flow control module 220 receives from the source node 102 the SYN signal (or packet), the flow control module 220 stores the windows scale of the source node 102 (which is the previous node) or stores a 0 for window scale if the scale of the previous node is missing. The first flow control module 220 also modifies the scale, e.g., increases the scale to 4 from 0 or 1, in the SYN-FCM signal. When the second flow control module 220 receives the SYN signal, it stores the increased scale from the first flow control signal and resets the scale in the SYN signal back to the source node 103 scale value for transmission to the destination node 106. When the second flow controller 220 receives the SYN-ACK signal from the destination node 106, it stores the scale from the destination node 106 scale, e.g., 0 or 1, and modifies it to an increased scale that is sent with the SYN-ACK-FCM signal. The first flow control node 220 receives and notes the received window scale and revises the windows scale sent back to the source node 102 back down to the original scale, e.g., 0 or 1. Based on the above window shift conversation during connection establishment, the window field in every subsequent packet, e.g., TCP packet, of the session must be shifted according to the window shift conversion.

The window scale, as described above, expresses buffer sizes of over 64 k and may not be required for window virtualization. Thus, shifts for window scale may be used to express increased buffer capacity in each flow control module 220. This increase in buffer capacity in may be referenced as window (or buffer) virtualization. The increase in buffer size allows greater packet through put from and to the respective end nodes 102 and 106. Note that buffer sizes in TCP are typically expressed in terms of bytes, but for ease of discussion "packets" may be used in the description herein as it relates to virtualization.

By way of example, a window (or buffer) virtualization performed by the flow controller 220 is described. In this example, the source node 102 and the destination node 106 are configured similar to conventional end nodes having a limited buffer capacity of 16 k bytes, which equals approximately 10 packets of data. Typically, an end node 102, 106 must wait until the packet is transmitted and confirmation is received before a next group of packets can be transmitted. In one embodiment, using increased buffer capacity in the flow control modules 220, when the source node 103 transmits its data packets, the first flow control module 220 receives the packets, stores it in its larger capacity buffer, e.g., 512 packet capacity, and immediately sends back an acknowledgement signal indicating receipt of the packets ("REC-ACK") back to the source node 102. The source node 102 can then "flush" its current buffer, load it with 10 new data packets, and transmit those onto the first flow control module 220. Again, the first flow control module 220 transmits a REC-ACK signal back to the source node 102 and the source node 102 flushes its buffer and loads it with 10 more new packets for transmission.

As the first flow control module 220 receives the data packets from the source nodes, it loads up its buffer accordingly. When it is ready the first flow control module 220 can begin transmitting the data packets to the second flow control module 230, which also has an increased buffer size, for example, to receive 512 packets. The second flow control module 220' receives the data packets and begins to transmit 10 packets at a time to the destination node 106. Each REC-ACK received at the second flow control node 220 from the destination node 106 results in 10 more packets being transmitted to the destination node 106 until all the data packets are transferred. Hence, the present invention is able to increase data transmission throughput between the source node (sender) 102 and the destination node (receiver) 106 by taking advantage of the larger buffer in the flow control modules 220, 220' between the devices.

It is noted that by "preacking" the transmission of data as described previously, a sender (or source node 102) is allowed to transmit more data than is possible without the preacks, thus affecting a larger window size. For example, in one embodiment this technique is effective when the flow control module 220, 220' is located "near" a node (e.g., source node 102 or destination node 106) that lacks large windows.

Another technique or algorithm of the flow controller 220 is referred to as recongestion. The standard TCP congestion avoidance algorithms are known to perform poorly in the face of certain network conditions, including: large RTTs (round trip times), high packet loss rates, and others. When the appliance 200 detects a congestion condition such as long round trip times or high packet loss, the appliance 200 intervenes, substituting an alternate congestion avoidance algorithm that better suits the particular network condition. In one embodiment, the recongestion algorithm uses preacks to effectively terminate the connection between the sender and the receiver. The appliance 200 then resends the packets from itself to the receiver, using a different congestion avoidance algorithm. Recongestion algorithms may be dependent on the characteristics of the TCP connection. The appliance 200 monitors each TCP connection, characterizing it with respect to the different dimensions, selecting a recongestion algorithm that is appropriate for the current characterization.

In one embodiment, upon detecting a TCP connection that is limited by round trip times (RTT), a recongestion algorithm is applied which behaves as multiple TCP connections. Each TCP connection operates within its own performance limit but the aggregate bandwidth achieves a higher performance level. One parameter in this mechanism is the number of parallel connections that are applied (N). Too large a value of N and the connection bundle achieves more than its fair share of bandwidth. Too small a value of N and the connection bundle achieves less than its fair share of bandwidth. One method of establishing "N" relies on the appliance 200 monitoring the packet loss rate, RTT, and packet size of the actual connection. These numbers are plugged into a TCP response curve formula to provide an upper limit on the performance of a single TCP connection in the present configuration. If each connection within the connection bundle is achieving substantially the same performance as that computed to be the upper limit, then additional parallel connections are applied. If the current bundle is achieving less performance than the upper limit, the number of parallel connections is reduced. In this manner, the overall fairness of the system is maintained since individual connection bundles contain no more parallelism than is required to eliminate the restrictions imposed by the protocol itself. Furthermore, each individual connection retains TCP compliance.

Another method of establishing "N" is to utilize a parallel flow control algorithm such as the TCP "Vegas" algorithm or its improved version "Stabilized Vegas." In this method, the network information associated with the connections in the connection bundle (e.g., RTT, loss rate, average packet size, etc.) is aggregated and applied to the alternate flow control algorithm. The results of this algorithm are in turn distributed among the connections of the bundle controlling their number (i.e., N). Optionally, each connection within the bundle continues using the standard TCP congestion avoidance algorithm.

In another embodiment, the individual connections within a parallel bundle are virtualized, i.e., actual individual TCP connections are not established. Instead the congestion avoidance algorithm is modified to behave as though there were N parallel connections. This method has the advantage of appearing to transiting network nodes as a single connection. Thus the QOS, security and other monitoring methods of these nodes are unaffected by the recongestion algorithm. In yet another embodiment, the individual connections within a parallel bundle are real, i.e., a separate. TCP connection is established for each of the parallel connections within a bundle. The congestion avoidance algorithm for each TCP connection need not be modified.

In some embodiments, the flow controller 220 may apply a local retransmission technique. One reason for implementing preacks is to prepare to transit a high-loss link (e.g., wireless). In these embodiments, the preacking appliance 200 or flow control module 220 is located most beneficially "before" the wireless link. This allows retransmissions to be performed closer to the high loss link, removing the retransmission burden from the remainder of the network. The appliance 200 may provide local retransmission, in which case, packets dropped due to failures of the link are retransmitted directly by the appliance 200. This is advantageous because it eliminates the retransmission burden upon an end node, such as server 106, and infrastructure of any of the networks 104. With appliance 200 providing local retransmissions, the dropped packet can be retransmitted across the high loss link without necessitating a retransmit by an end node and a corresponding decrease in the rate of data transmission from the end node.

Another reason for implementing preacks is to avoid a receive time out (RTO) penalty. In standard TCP there are many situations that result in an RTO, even though a large percentage of the packets in flight were successfully received. With standard TCP algorithms, dropping more than one packet within an RTT window would likely result in a timeout. Additionally, most TCP connections experience a timeout if a retransmitted packet is dropped. In a network with a high bandwidth delay product, even a relatively small packet loss rate will cause frequent Retransmission timeouts (RTOs). In one embodiment, the appliance 200 uses a retransmit and timeout algorithm is avoid premature RTOs. The appliance 200 or flow controller 220 maintains a count of retransmissions is maintained on a per-packet basis. Each time that a packet is retransmitted, the count is incremented by one and the appliance 200 continues to transmit packets. In some embodiments, only if a packet has been retransmitted a predetermined number of times is an RTO declared.

In some embodiments, as a sender transmits data packets, the sender maintains a data structure of acknowledged instances of data packet transmissions; each instance of a data packet transmission is referenced by its sequence number and transmit number. By maintaining a transmit number for each packet, the sender retains the ordering of the transmission of data packets. When the sender receives an ACK or a SACK, the sender determines the highest transmit number associated with packets that the receiver indicated has arrived (in the received acknowledgement). Any outstanding unacknowledged packets with lower transmit numbers are presumed lost.

In some embodiments, the sender is presented with an ambiguous situation when the arriving packet has been retransmitted: a standard ACK/SACK does not contain enough information to allow the sender to determine which transmission of the arriving packet has triggered the acknowledgement. After receiving an ambiguous acknowledgement, therefore, the sender disambiguates the acknowledgement to associate it with a transmit number. In various embodiments, one or a combination of several techniques may be used to resolve this ambiguity.

In one embodiment, the sender includes an identifier with a transmitted data packet, and the receiver returns that identifier or a function thereof with the acknowledgement. The identifier may be a timestamp (e.g., a TCP timestamp as described in RFC 1323), a sequential number, or any other information that can be used to resolve between two or more instances of a packet's transmission. In an embodiment in which the TCP timestamp option is used to disambiguate the acknowledgement, each packet is tagged with up to 32-bits of unique information. Upon receipt of the data packet, the receiver echoes this unique information back to the sender with the acknowledgement. The sender ensures that the originally sent packet and its retransmitted version or versions contain different values for the timestamp option, allowing it to unambiguously eliminate the ACK ambiguity. The sender may maintain this unique information, for example, in the data structure in which it stores the status of sent data packets. This technique is advantageous because it complies with industry standards and is thus likely to encounter little or no interoperability issues. However, this technique may require ten bytes of TCP header space in some implementations, reducing the effective throughput rate on the network and reducing space available for other TCP options.

In another embodiment, another field in the packet, such as the IP ID field, is used to disambiguate in a way similar to the TCP timestamp option described above. The sender arranges for the ID field values of the original and the retransmitted version or versions of the packet to have different ID fields in the IP header. Upon reception of the data packet at the receiver, or a proxy device thereof, the receiver sets the ID field of the ACK packet to a function of the ID field of the packet that triggers the ACK. This method is advantageous, as it requires no additional data to be sent, preserving the efficiency of the network and TCP header space. The function chosen should provide a high degree of likelihood of providing disambiguation. In a preferred embodiment, the sender selects IP ID values with the most significant bit set to 0. When the receiver responds, the IP ID value is set to the same IP ID value with the most significant bit set to a one.

In another embodiment, the transmit numbers associated with non-ambiguous acknowledgements are used to disambiguate an ambiguous acknowledgement. This technique is based on the principle that acknowledgements for two packets will tend to be received closer in time as the packets are transmitted closer in time. Packets that are not retransmitted will not result in ambiguity, as the acknowledgements received for such packets can be readily associated with a transmit number. Therefore, these known transmit numbers are compared to the possible transmit numbers for an ambiguous acknowledgement received near in time to the known acknowledgement. The sender compares the transmit numbers of the ambiguous acknowledgement against the last known received transmit number, selecting the one closest to the known received transmit number. For example, if an acknowledgement for data packet 1 is received and the last received acknowledgement was for data packet 5, the sender resolves the ambiguity by assuming that the third instance of data packet 1 caused the acknowledgement.

Another technique of the appliance 200 or flow controller 220 is to implement an embodiment of transport control protocol selective acknowledgements, or TCP SACK, to determine what packets have or have not been received. This technique allows the sender to determine unambiguously a list of packets that have been received by the receiver as well as an accurate list of packets not received. This functionality may be implemented by modifying the sender and/or receiver, or by inserting sender- and receiver-side flow control modules 220 in the network path between the sender and receiver. In reference to FIG. 1D or FIG. 1E, a sender, e.g., client 102, is configured to transmit data packets to the receiver, e.g., server 106, over the network 104. In response, the receiver returns a TCP Selective Acknowledgment option, referred to as SACK packet to the sender. In one embodiment, the communication is bi-directional, although only one direction of communication is discussed here for simplicity. The receiver maintains a list, or other suitable data structure, that contains a group of ranges of sequence numbers for data packets that the receiver has actually received. In some embodiments, the list is sorted by sequence number in an ascending or descending order. The receiver also maintains a left-off pointer, which comprises a reference into the list and indicates the left-off point from the previously generated SACK packet.

Upon reception of a data packet, the receiver generates and transmits a SACK packet back to the sender. In some embodiments, the SACK packet includes a number of fields, each of which can hold a range of sequence numbers to indicate a set of received data packets. The receiver fills this first field of the SACK packet with a range of sequence numbers that includes the landing packet that triggered the SACK packet. The remaining available SACK fields are filled with ranges of sequence numbers from the list of received packets. As there are more ranges in the list than can be loaded into the SACK packet, the receiver uses the left-off pointer to determine which ranges are loaded into the SACK packet. The receiver inserts the SACK ranges consecutively from the sorted list, starting from the range referenced by the pointer and continuing down the list until the available SACK range space in the TCP header of the SACK packet is consumed. The receiver wraps around to the start of the list if it reaches the end. In some embodiments, two or three additional SACK ranges can be added to the SACK range information.

Once the receiver generates the SACK packet, the receiver sends the acknowledgement back to the sender. The receiver then advances the left-off pointer by one or more SACK range entries in the list. If the receiver inserts four SACK ranges, for example, the left-off pointer may be advanced two SACK ranges in the list. When the advanced left-off pointer reaches at the end of the list, the pointer is reset to the start of the list, effectively wrapping around the list of known received ranges. Wrapping around the list enables the system to perform well, even in the presence of large losses of SACK packets, since the SACK information that is not communicated due to a lost SACK packet will eventually be communicated once the list is wrapped around.

It can be appreciated, therefore, that a SACK packet may communicate several details about the condition of the receiver. First, the SACK packet indicates that, upon generation of the SACK packet, the receiver had just received a data packet that is within the first field of the SACK information. Secondly, the second and subsequent fields of the SACK information indicate that the receiver has received the data packets within those ranges. The SACK information also implies that the receiver had not, at the time of the SACK packet's generation, received any of the data packets that fall between the second and subsequent fields of the SACK information. In essence, the ranges between the second and subsequent ranges in the SACK information are "holes" in the received data, the data therein known not to have been delivered. Using this method, therefore, when a SACK packet has sufficient space to include more than two SACK ranges, the receiver may indicate to the sender a range of data packets that have not yet been received by the receiver.

In another embodiment, the sender uses the SACK packet described above in combination with the retransmit technique described above to make assumptions about which data packets have been delivered to the receiver. For example, when the retransmit algorithm (using the transmit numbers) declares a packet lost, the sender considers the packet to be only conditionally lost, as it is possible that the SACK packet identifying the reception of this packet was lost rather than the data packet itself. The sender thus adds this packet to a list of potentially lost packets, called the presumed lost list. Each time a SACK packet arrives, the known missing ranges of data from the SACK packet are compared to the packets in the presumed lost list. Packets that contain data known to be missing are declared actually lost and are subsequently retransmitted. In this way, the two schemes are combined to give the sender better information about which packets have been lost and need to be retransmitted.

In some embodiments, the appliance 200 or flow controller 220 applies a technique referred to as transaction boundary detection. In one embodiment, the technique pertains to ping-pong behaved connections. At the TCP layer, ping-pong behavior is when one communicant—a sender-sends data and then waits for a response from the other communicant—the receiver. Examples of ping-pong behavior include remote procedure call, HTTP and others. The algorithms described above use retransmission timeout (RTO) to recover from the dropping of the last packet or packets associated with the transaction. Since the TCP RTO mechanism is extremely coarse in some embodiments, for example requiring a minimum one second value in all cases), poor application behavior may be seen in these situations.

In one embodiment, the sender of data or a flow control module 220 coupled to the sender detects a transaction boundary in the data being sent. Upon detecting a transaction boundary, the sender or a flow control module 220 sends additional packets, whose reception generates additional ACK or SACK responses from the receiver. Insertion of the additional packets is preferably limited to balance between improved application response time and network capacity utilization. The number of additional packets that is inserted may be selected according to the current loss rate associated with that connection, with more packets selected for connections having a higher loss rate.

One method of detecting a transaction boundary is time based. If the sender has been sending data and ceases, then after a period of time the sender or flow control module 200 declares a transaction boundary. This may be combined with other techniques. For example, the setting of the PSH (TCP Push) bit by the sender in the TCP header may indicate a transaction boundary. Accordingly, combining the time-based approach with these additional heuristics can provide for more accurate detection of a transaction boundary. In another technique, if the sender or flow control module 220 understands the application protocol, it can parse the protocol data stream and directly determine transaction boundaries. In some embodiment, this last behavior can be used independent of any time-based mechanism.

Responsive to detecting a transaction boundary, the sender or flow control module 220 transmits additional data packets to the receiver to cause acknowledgements therefrom. The additional data packets should therefore be such that the receiver will at least generate an ACK or SACK in response to receiving the data packet. In one embodiment, the last packet or packets of the transaction are simply retransmitted. This has the added benefit of retransmitting needed data if the last packet or packets had been dropped, as compared to merely sending dummy data packets. In another embodiment, fractions of the last packet or packets are sent, allowing the sender to disambiguate the arrival of these packets from their original packets. This allows the receiver to avoid falsely confusing any reordering adaptation algorithms. In another embodiment, any of a number of well-known forward error correction techniques can be used to generate additional data for the inserted packets, allowing for the reconstruction of dropped or otherwise missing data at the receiver.

In some embodiments, the boundary detection technique described herein helps to avoid a timeout when the acknowledgements for the last data packets in a transaction are dropped. When the sender or flow control module 220 receives the acknowledgements for these additional data packets, the sender can determine from these additional acknowledgements whether the last data packets have been received or need to be retransmitted, thus avoiding a timeout. In one embodiment, if the last packets have been received but their acknowledgements were dropped, a flow control module 220 generates an acknowledgement for the data packets and sends the acknowledgement to the sender, thus communicating to the sender that the data packets have been delivered. In another embodiment, if the last packets have not been received, a flow control module 200 sends a packet to the sender to cause the sender to retransmit the dropped data packets.

In yet another embodiment, the appliance 200 or flow controller 220 applies a repacketization technique for improving the flow of transport layer network traffic. In some embodiments, performance of TCP is proportional to packet size. Thus increasing packet sizes improves performance unless it causes substantially increased packet loss rates or other nonlinear effects, like IP fragmentation. In general, wired media (such as copper or fibre optics) have extremely low bit-error rates, low enough that these can be ignored. For these media, it is advantageous for the packet size to be the maximum possible before fragmentation occurs (the maximum packet size is limited by the protocols of the underlying transmission media). Whereas for transmission media with higher loss rates (e.g., wireless technologies such as WiFi, etc., or high-loss environments such as power-line networking, etc.), increasing the packet size may lead to lower transmission rates, as media-induced errors cause an entire packet to be dropped (i.e., media-induced errors beyond the capability of the standard error correcting code for that media), increasing the packet loss rate. A sufficiently large increase in the packet loss rate will actually negate any performance benefit of increasing packet size. In some cases, it may be difficult for a TCP endpoint to choose an optimal packet size. For example, the optimal packet size may vary across the transmission path, depending on the nature of each link.

By inserting an appliance 200 or flow control module 220 into the transmission path, the flow controller 220 monitors characteristics of the link and repacketizes according to determined link characteristics. In one embodiment, an appliance 200 or flow controller 220 repacketizes packets with sequential data into a smaller number of larger packets. In another embodiment, an appliance 200 or flow controller 220 repacketizes packets by breaking part a sequence of large packets into a larger number of smaller packets. In other embodiments, an appliance 200 or flow controller 220 monitors the link characteristics and adjusts the packet sizes through recombination to improve throughput.

Still referring to FIG. 2A, the flow controller 220, in some embodiments, may include a QoS Engine 236, also referred to as a QoS controller. In another embodiment, the appliance 200 and/or network optimization engine 250 includes the QoS engine 236, for example, separately but in communication with the flow controller 220. The QoS Engine 236 includes any logic, business rules, function or operations for performing one or more Quality of Service (QoS) techniques improving the performance, operation or quality of service of any of the network connections. In some embodiments, the QoS engine 236 includes network traffic control and management mechanisms that provide different priorities to different users, applications, data flows or connections. In other embodiments, the QoS engine 236 controls, maintains, or assures a certain level of performance to a user, application, data flow or connection. In one embodiment, the QoS engine 236 controls, maintains or assures a certain portion of bandwidth or network capacity for a user, application, data flow or connection. In some embodiments, the QoS engine 236 monitors the achieved level of performance or the quality of service corresponding to a user, application, data flow or connection, for example, the data rate and delay. In response to monitoring, the QoS engine 236 dynamically controls or adjusts scheduling priorities of network packets to achieve the desired level of performance or quality of service.

In some embodiments, the QoS engine 236 prioritizes, schedules and transmits network packets according to one or more classes or levels of services. In some embodiments, the class or level service may include: 1) best efforts, 2) controlled load, 3) guaranteed or 4) qualitative. For a best efforts class of service, the appliance 200 makes reasonable effort to deliver packets (a standard service level). For a controlled load class of service, the appliance 200 or QoS engine 236 approximates the standard packet error loss of the transmission medium or approximates the behavior of best-effort service in lightly loaded network conditions. For a guaranteed class of service, the appliance 200 or QoS engine 236 guarantees the ability to transmit data at a determined rate for the duration of the connection. For a qualitative class of service, the appliance 200 or QoS engine 236 the qualitative service class is used for applications, users, data flows or connection that require or desire prioritized traffic but cannot quantify resource needs or level of service. In these cases, the appliance 200 or QoS engine 236 determines the class of service or prioritization based on any logic or configuration of the QoS engine 236 or based on business rules or policies. For example, in one embodiment, the QoS engine 236 prioritizes, schedules and transmits network packets according to one or more policies as specified by the policy engine 295, 295'.

The protocol accelerator 234 includes any logic, business rules, function or operations for optimizing, accelerating, or otherwise improving the performance, operation or quality of service of one or more protocols. In one embodiment, the protocol accelerator 234 accelerates any application layer protocol or protocols at layers 5-7 of the network stack. In other embodiments, the protocol accelerator 234 accelerates a transport layer or a layer 4 protocol. In one embodiment, the protocol accelerator 234 accelerates layer 2 or layer 3 protocols. In some embodiments, the protocol accelerator 234 is configured, constructed or designed to optimize or accelerate each of one or more protocols according to the type of data, characteristics and/or behavior of the protocol. In another embodiment, the protocol accelerator 234 is configured, constructed or designed to improve a user experience, response times, network or computer load, and/or network or bandwidth utilization with respect to a protocol.

In one embodiment, the protocol accelerator 234 is configured, constructed or designed to minimize the effect of WAN latency on file system access. In some embodiments, the protocol accelerator 234 optimizes or accelerates the use of the CIFS (Common Internet File System) protocol to improve file system access times or access times to data and files. In some embodiments, the protocol accelerator 234 optimizes or accelerates the use of the NFS (Network File System) protocol. In another embodiment, the protocol accelerator 234 optimizes or accelerates the use of the File Transfer protocol (FTP).

In one embodiment, the protocol accelerator 234 is configured, constructed or designed to optimize or accelerate a protocol carrying as a payload or using any type and form of markup language. In other embodiments, the protocol accelerator 234 is configured, constructed or designed to optimize or accelerate a HyperText Transfer Protocol (HTTP). In another embodiment, the protocol accelerator 234 is configured, constructed or designed to optimize or accelerate a protocol carrying as a payload or otherwise using XML (eXtensible Markup Language).

In some embodiments, the appliance 200 and/or network optimization engine 250 is transparent to any data flowing across a network connection or link, such as a WAN link. In one embodiment, the appliance 200 and/or network optimization engine 250 operates in such a manner that the data flow across the WAN is recognizable by any network monitoring, QOS management or network analysis tools. In some embodiments, the appliance 200 and/or network optimization engine 250 does not create any tunnels or streams for transmitting data that may hide, obscure or otherwise make the network traffic not transparent. In other embodiments, the appliance 200 operates transparently in that the appliance does not change any of the source and/or destination address information or port information of a network packet, such as Internet protocol addresses or port numbers. In other embodiments, the appliance 200 and/or network optimization engine 250 is considered to operate or behave transparently to the network, an application, client, server or other appliances or computing device in the network infrastructure. That is, in some embodiments, the appliance is transparent in that network related configuration of any device or appliance on the network does not need to be modified to support the appliance 200.

The appliance 200 may be deployed in any of the following deployment configurations: 1) in-line of traffic, 2) in proxy mode, or 3) in a virtual in-line mode. In some embodiments, the appliance 200 may be deployed inline to one or more of the following: a router, a client, a server or another network device or appliance. In other embodiments, the appliance 200 may be deployed in parallel to one or more of the following: a router, a client, a server or another network device or appliance. In parallel deployments, a client, server, router or other network appliance may be configured to forward, transfer or transit networks to or via the appliance 200.

In the embodiment of in-line, the appliance 200 is deployed inline with a WAN link of a router. In this way, all traffic from the WAN passes through the appliance before arriving at a destination of a LAN.

In the embodiment of a proxy mode, the appliance 200 is deployed as a proxy device between a client and a server. In some embodiments, the appliance 200 allows clients to make indirect connections to a resource on a network. For example, a client connects to a resource via the appliance 200, and the appliance provides the resource either by connecting to the resource, a different resource, or by serving the resource from a cache. In some cases, the appliance may alter the client's request or the server's response for various purposes, such as for any of the optimization techniques discussed herein. In other embodiments, the appliance 200 behaves as a transparent proxy, by intercepting and forwarding requests and responses transparently to a client and/or server. Without client-side configuration, the appliance 200 may redirect client requests to different servers or networks. In some embodiments, the appliance 200 may perform any type and form of network address translation, referred to as NAT, on any network traffic traversing the appliance.

In some embodiments, the appliance 200 is deployed in a virtual in-line mode configuration. In this embodiment, a router or a network device with routing or switching functionality is configured to forward, reroute or otherwise provide network packets destined to a network to the appliance 200. The appliance 200 then performs any desired processing on the network packets, such as any of the WAN optimization techniques discussed herein. Upon completion of processing, the appliance 200 forwards the processed network packet to the router to transmit to the destination on the network. In this way, the appliance 200 can be coupled to the router in parallel but still operate as it if the appliance 200 were inline. This deployment mode also provides transparency in that the source and destination addresses and port information are preserved as the packet is processed and transmitted via the appliance through the network.

Although the network optimization engine 250 is generally described above in conjunction with an appliance 200, the network optimization engine 250, or any portion thereof, may be deployed, distributed or otherwise operated on any end node, such as a client 102 and/or server 106. As such, a client or server may provide any of the systems and methods of the network optimization engine 250 described herein in conjunction with one or more appliances 200 or without an appliance 200.

Figure 2B:
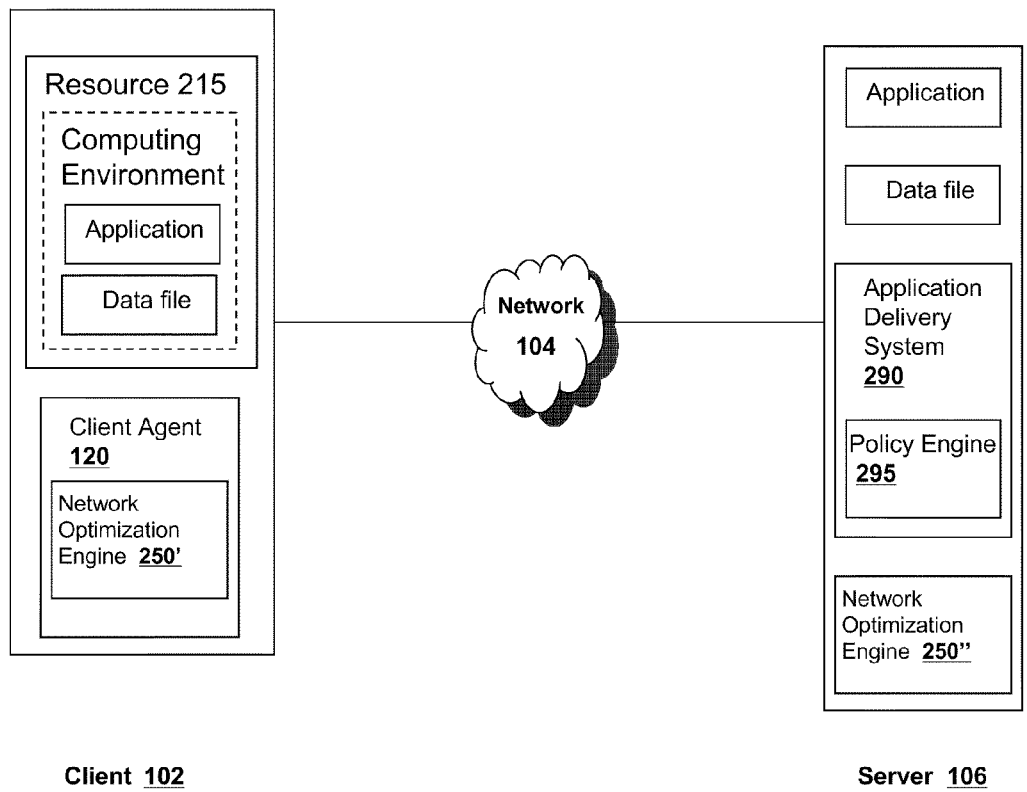
FIG. 2B is a block diagram depicting another embodiment of a client and/or server deploying the network optimization features of the appliance.

Referring now to FIG. 2B, an example embodiment of the network optimization engine 250 deployed on one or more end nodes is depicted. In brief overview, the client 102 may include a first network optimization engine 250' and the server 106 may include a second network optimization engine 250". The client 102 and server 106 may establish a transport layer connection and exchange communications with or without traversing an appliance 200.

In one embodiment, the network optimization engine 250' of the client 102 performs the techniques described herein to optimize, accelerate or otherwise improve the performance, operation or quality of service of network traffic communicated with the server 106. In another embodiment, the network optimization engine 250" of the server 106 performs the techniques described herein to optimize, accelerate or otherwise improve the performance, operation or quality of service of network traffic communicated with the client 102. In some embodiments, the network optimization engine 250' of the client 102 and the network optimization engine 250" of the server 106 perform the techniques described herein to optimize, accelerate or otherwise improve the performance, operation or quality of service of network traffic communicated between the client 102 and the server 106. In yet another embodiment, the network optimization engine 250' of the client 102 performs the techniques described herein in conjunction with an appliance 200 to optimize, accelerate or otherwise improve the performance, operation or quality of service of network traffic communicated with the client 102. In still another embodiment, the network optimization engine 250" of the server 106 performs the techniques described herein in conjunction with an appliance 200 to optimize, accelerate or otherwise improve the performance, operation or quality of service of network traffic communicated with the server 106.

Network appliances are often used to provide access to one or more network services. A network appliance may comprise a number of virtual servers, each virtual server providing access to a number of services. The virtual servers may manage incoming connections from clients, and direct client requests to one or more services. In the course of managing incoming connection requests, network appliances may provide load balancing among the virtual servers. When a virtual server is down or unavailable to service a connection request, the appliance may use a backup virtual server to manage incoming connections.

A virtual server may be operational or available but not operating at a desired performance level. A network appliance may direct a client request or connection to a virtual server operating less than an optimal performance level. For example, a network appliance may direct a client request to a virtual server that is slow. In another example, the network appliance may direct a client request to a virtual server that is servicing a high amount of responses or network traffic. The virtual server may be using significant network capacity transferring requests and responses between clients and services. In some cases, the response time of the virtual server may increase if it handles additional client connections because of the limited availability of bandwidth. In other cases, the round trip times between the server and the virtual server or between the client and server may increase due to the limited availability of bandwidth.

Figure 2C:
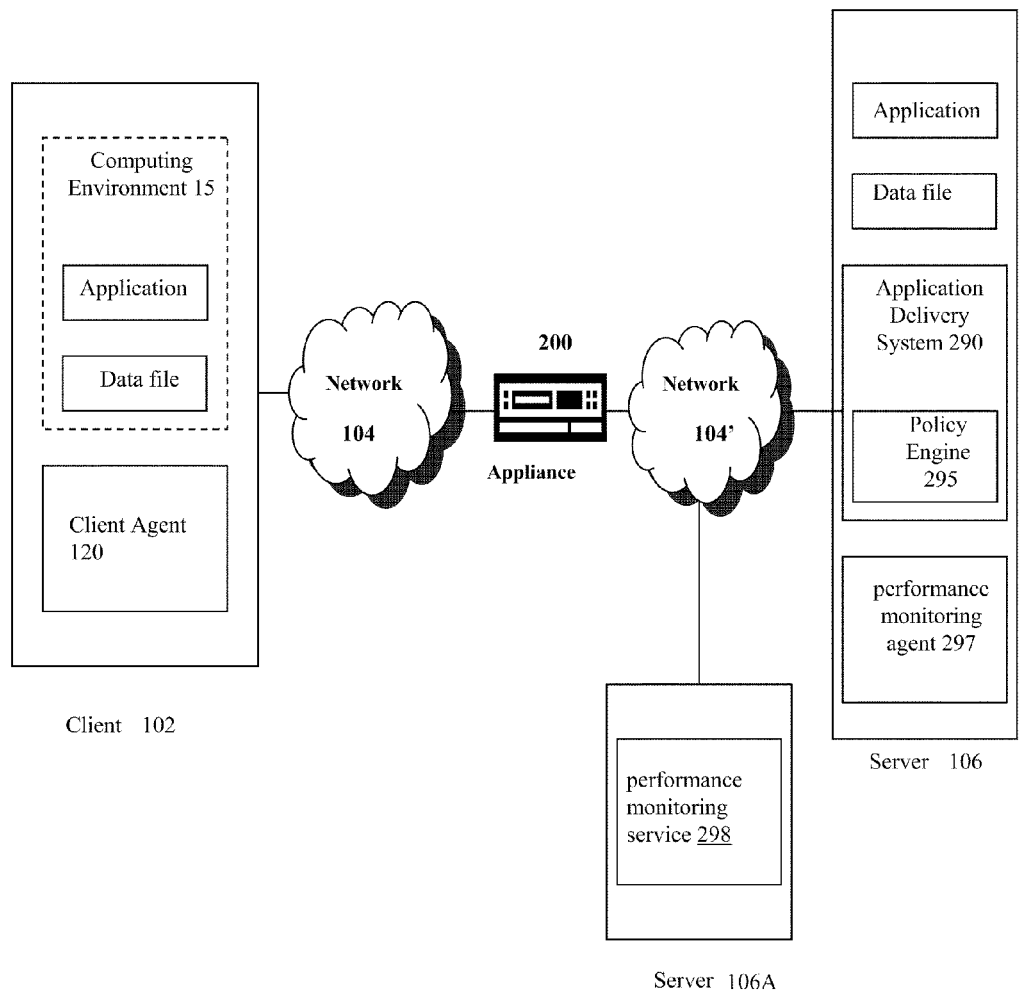
FIG. 2C is a block diagram depicting an embodiment of a network environment for delivering and/or operating a computing environment on a client including a performance monitoring service.

Referring now to FIG. 2C, another embodiment of a network environment for delivering and/or operating a computing environment 15 on a client 102 is depicted. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In one embodiment, the appliance 200 provides load balancing of servers 106 in responding to requests from clients 102. In another embodiment, the appliance 200 acts as a proxy or access server to provide access to the one or more servers 106. In still another embodiment, the appliance 200 provides a secure virtual private network connection from a first network 104 of the client 102 to a second network 104' of the server 106, such as an SSL VPN connection. In still even another embodiment, the appliance 200 provides application firewall security, control and management of the connection and communications between a client 102 and a server 106. In some embodiments, each of the application delivery system 290, the application, and data file may reside or be located on different servers. In other embodiments, any portion of the application delivery system 290 may reside, execute or be stored on or distributed to the appliance 200, or a plurality of appliances.

Still referring to FIG. 2C, an embodiment of the network environment may include a monitoring server 106A. The monitoring server 106A may include any type and form performance monitoring service 298. The performance monitoring service 298 may include monitoring, measurement and/or management software and/or hardware, including data collection, aggregation, analysis, management and reporting. In one embodiment, the performance monitoring service 298 includes one or more monitoring agents 297. The monitoring agent 297 includes any software, hardware or combination thereof for performing monitoring, measurement and data collection activities on a device, such as a client 102, server 106 or an appliance 200. In some embodiments, the monitoring agent 297 includes any type and form of script, such as VISUAL BASIC script, or JAVASCRIPT. In one embodiment, the monitoring agent 297 executes transparently to any application and/or user of the device. In some embodiments, the monitoring agent 297 is installed and operated unobtrusively to the application or client. In yet another embodiment, the monitoring agent 297 is installed and operated without any instrumentation for the application or device.

In some embodiments, the monitoring agent 297 monitors, measures and collects data on a predetermined frequency. In other embodiments, the monitoring agent 297 monitors, measures and collects data based upon detection of any type and form of event. For example, the monitoring agent 297 may collect data upon detection of a request for a web page or receipt of an HTTP response. In another example, the monitoring agent 297 may collect data upon detection of any user input events, such as a mouse click. The monitoring agent 297 may report or provide any monitored, measured or collected data to the monitoring service 298. In one embodiment, the monitoring agent 297 transmits information to the monitoring service 298 according to a schedule or a predetermined frequency. In another embodiment, the monitoring agent 297 transmits information to the monitoring service 298 upon detection of an event.

In some embodiments, the monitoring service 298 and/or monitoring agent 297 performs monitoring and performance measurement of any network resource or network infrastructure element, such as a client 102, server 106, server farm 38, appliance 200, or network connection. In one embodiment, the monitoring service 298 and/or monitoring agent 297 performs monitoring and performance measurement of any transport layer connection, such as a TCP or UDP connection. In another embodiment, the monitoring service 298 and/or monitoring agent 297 monitors and measures network latency. In yet another embodiment, the monitoring service 298 and/or monitoring agent 297 monitors and measures bandwidth utilization.

In other embodiments, the monitoring service 298 and/or monitoring agent 297 monitors and measures end-user response times. In some embodiments, the monitoring service 298 performs monitoring and performance measurement of an application. In another embodiment, the monitoring service 298 and/or monitoring agent 297 performs monitoring and performance measurement of any session or connection to the application. In one embodiment, the monitoring service 298 and/or monitoring agent 297 monitors and measures performance of a browser. In another embodiment, the monitoring service 298 and/or monitoring agent 297 monitors and measures performance of HTTP based transactions. In some embodiments, the monitoring service 298 and/or monitoring agent 297 monitors and measures performance of a Voice over IP (VoIP) application or session. In other embodiments, the monitoring service 298 and/or monitoring agent 297 monitors and measures performance of a remote display protocol application, such as an ICA client or RDP client. In yet another embodiment, the monitoring service 298 and/or monitoring agent 297 monitors and measures performance of any type and form of streaming media. In still a further embodiment, the monitoring service 298 and/or monitoring agent 297 monitors and measures performance of a hosted application or a Software-As-A-Service (SaaS) delivery model.

In some embodiments, the monitoring service 298 and/or monitoring agent 297 performs monitoring and performance measurement of one or more transactions, requests or responses related to an application. In other embodiments, the monitoring service 298 and/or monitoring agent 297 monitors and measures any portion of an application layer stack, such as any .NET or J2EE calls. In one embodiment, the monitoring service 298 and/or monitoring agent 297 monitors and measures database or SQL transactions. In yet another embodiment, the monitoring service 298 and/or monitoring agent 297 monitors and measures any method, function or application programming interface (API) call.

In one embodiment, the monitoring service 298 and/or monitoring agent 297 performs monitoring and performance measurement of a delivery of application and/or data from a server 106 to a client 102 via one or more appliances, such as appliance 200. In some embodiments, the monitoring service 298 and/or monitoring agent 297 monitors and measures performance of delivery of a virtualized application. In other embodiments, the monitoring service 298 and/or monitoring agent 297 monitors and measures performance of delivery of a streaming application. In another embodiment, the monitoring service 298 and/or monitoring agent 297 monitors and measures performance of delivery of a desktop application to a client 102 and/or the execution of the desktop application on the client 102. In another embodiment, the monitoring service 298 and/or monitoring agent 297 monitors and measures performance of a client/server application.

In one embodiment, the monitoring service 298 and/or monitoring agent 297 is designed and constructed to provide application performance management for the application delivery system 290. For example, the monitoring service 298 and/or monitoring agent 297 may monitor, measure or manage the performance of the delivery of applications via the CITRIX PRESENTATION SERVER, CITRIX XENAPP, or CITRIX XEN DESKTOP solutions. In this example, the monitoring service 298 and/or monitoring agent 297 monitors individual presentation level protocol sessions, such as ICA sessions. The monitoring service 298 and/or monitoring agent 297 may measure the total and per session system resource usage, as well as application and networking performance. The monitoring service 298 and/or monitoring agent 297 may identify the active servers for a given user and/or user session. In some embodiments, the monitoring service 298 and/or monitoring agent 297 monitors back-end connections between the application delivery system 290 and an application and/or database server. The monitoring service 298 and/or monitoring agent 297 may measure network latency, delay and volume per user-session or ICA session.

In some embodiments, the monitoring service 298 and/or monitoring agent 297 measures and monitors memory usage for the application delivery system 290, such as total memory usage, per user session and/or per process. In other embodiments, the monitoring service 298 and/or monitoring agent 297 measures and monitors CPU usage of the application delivery system 290, such as total CPU usage, per user session and/or per process. In another embodiment, the monitoring service 298 and/or monitoring agent 297 measures and monitors the time required to log-in to an application, a server, or the application delivery system, such as a CITRIX PRESENTATION SERVER, CITRIX XENAPP, or CITRIX XEN DESKTOP system. In one embodiment, the monitoring service 298 and/or monitoring agent 297 measures and monitors the duration a user is logged into an application, a server, or the application delivery system 290. In some embodiments, the monitoring service 298 and/or monitoring agent 297 measures and monitors active and inactive session counts for an application, server 106 or application delivery system session. In yet another embodiment, the monitoring service 298 and/or monitoring agent 297 measures and monitors user session latency.

In yet further embodiments, the monitoring service 298 and/or monitoring agent 297 measures and monitors any type and form of server metrics. In one embodiment, the monitoring service 298 and/or monitoring agent 297 measures and monitors metrics related to system memory, CPU usage, and disk storage. In another embodiment, the monitoring service 298 and/or monitoring agent 297 measures and monitors metrics related to page faults, such as page faults per second. In other embodiments, the monitoring service 298 and/or monitoring agent 297 measures and monitors round-trip time metrics. In yet another embodiment, the monitoring service 298 and/or monitoring agent 297 measures and monitors metrics related to application crashes, errors and/or hangs.

In some embodiments, the monitoring service 298 and monitoring agent 297 includes a performance monitoring or end-user monitoring program, such as EDGESIGHT manufactured by Citrix Systems, Inc., of Ft. Lauderdale, Fla. In another embodiment, the performance monitoring service 298 and/or monitoring agent 297 includes any portion of the product embodiments referred to as the TRUEVIEW product suite manufactured by the Symphoniq Corporation of Palo Alto, Calif. In one embodiment, the performance monitoring service 298 and/or monitoring agent 297 includes any portion of the product embodiments referred to as the TEALEAF CX product suite manufactured by the TeaLeaf Technology Inc., of San Francisco, Calif. In other embodiments, the performance monitoring service 298 and/or monitoring agent 297 includes any portion of the business service management products, such as the BMC Performance Manager and PATROL products, manufactured by BMC Software, Inc., of Houston, Tex.

In some embodiments, a monitoring agent 297 may monitor and measure performance of any application of the client. In one embodiment, the monitoring agent 297 monitors and measures the performance of a browser on the client 102. In some embodiments, the monitoring agent 297 monitors and measures performance of any application delivered via the client agent 120. In other embodiments, the monitoring agent 297 measures and monitors end user response times for an application, such as web-based or HTTP response times. The monitoring agent 297 may monitor and measure performance of an ICA or RDP client. In another embodiment, the monitoring agent 297 measures and monitors metrics for a user session or application session. In some embodiments, monitoring agent 297 measures and monitors an ICA or RDP session. In one embodiment, the monitoring agent 297 measures and monitors the performance of the appliance 200 in accelerating delivery of an application and/or data to the client 102.

In some embodiments, the appliance 200 may include a performance monitoring agent 297. In one embodiment, the appliance 200 receives the monitoring agent 297 from a monitoring service 298 or monitoring server 106A. In other embodiments, the appliance 200 stores the monitoring agent 297 in storage, such as a disk, for delivery to any client 102 or server 106 in communication with the appliance 200. For example, in one embodiment, the appliance 200 transmits the monitoring agent 297 to a client 102 upon receiving a request to establish a transport layer connection. In other embodiments, the appliance 200 transmits the monitoring agent 297 upon establishing the transport layer connection with the client 102. In another embodiment, the appliance 200 transmits the monitoring agent 297 to the client upon intercepting or detecting a request for a web page. In yet another embodiment, the appliance 200 transmits the monitoring agent 297 to a client 102 or a server 106 in response to a request from the monitoring server 298. In one embodiment, the appliance 200 transmits the monitoring agent 297 to a second appliance 200' (not shown).

In one embodiment, the appliance 200 executes the monitoring agent 297. In another embodiment, the monitoring agent 297 measures and monitors the performance of any application, program, process, service, task or thread executing on the appliance 200. For example, the monitoring agent 297 may monitor and measure performance and operation of virtual servers provided by the appliance 200. In still another embodiment, the monitoring agent 297 measures and monitors the performance of any transport layer connections of the appliance 200. In yet another embodiment, the monitoring agent 297 measures and monitors the performance of any user sessions traversing the appliance 200.

In one embodiment, the monitoring agent 297 measures and monitors the performance of any virtual private network connections and/or sessions traversing the appliance 200, such as an SSL VPN session. In another embodiment, the monitoring agent 297 measures and monitors the memory, CPU and disk usage and performance of the appliance 200. In still another embodiment, the monitoring agent 297 measures and monitors the performance of any acceleration technique performed by the appliance 200, such as SSL offloading, connection pooling and multiplexing, caching, and compression. In some embodiments, the monitoring agent 197 measures and monitors the performance of any load balancing and/or content switching performed by the appliance 200. In other embodiments, the monitoring agent 197 measures and monitors the performance of application firewall protection and processing performed by the appliance 200.

Figure 2D:
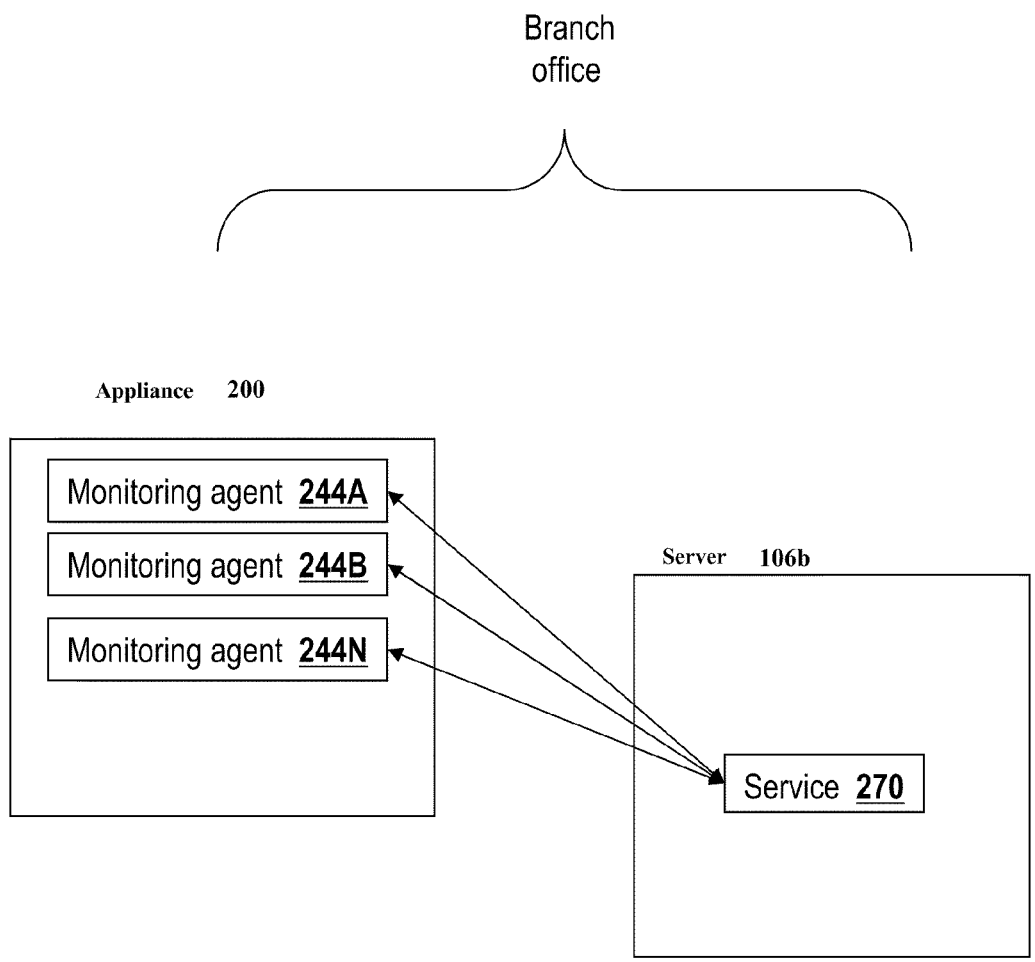
FIG. 2D is a block diagram depicting an embodiment of an appliance using a plurality of monitoring agents to monitor a network service.

Referring now to FIG. 2D, a block diagram of an appliance using a plurality of monitoring agents 244 to monitor a network service 270 is shown. In brief overview, an appliance 200 comprises a plurality of monitoring agents 244. Each of the plurality of monitoring agents is assigned to a service 270. In one embodiment, each of the plurality of monitoring agents may be assigned a weight. The monitoring agents 244 may also be referred to as probes or load monitors. In some embodiments, a monitoring agent 244 may reside in a client 120, a server 106, or a machine.

Still referring to FIG. 2D, an appliance 200 comprises a plurality of monitoring agents 244. A monitoring agent 244 may comprise any program, script, daemon, or other computing routine that reports a performance or operational characteristic of a network service 270 to the appliance 200. A monitoring agent 244 may communicate with a network service 270 once, or on a predetermined frequency, such as every millisecond or second. In some embodiments, a monitoring agent 244 may use a request/reply messaging mechanism or protocol with the server 106. In other embodiments, a monitoring agent 244 may have a custom or proprietary exchange protocol for communicating with the server 106. In some embodiments, a single monitoring agent 244 may monitor a plurality of servers 106. In other embodiments, a plurality of monitoring agents 244 may monitor a single server 106. In still other embodiments, a plurality of monitoring agents 244 may each monitor a plurality of servers 106, wherein each of the plurality of servers 106 is monitored by a plurality of monitoring agents 244.

In the embodiment shown, the one or more monitoring agents 244 are associated with one or more network services 270. In other embodiments, the one or more monitoring agents 244 may monitor an appliance 200, a virtual server, a network service 270, a client 102, or any other network resource.

In one embodiment, a user specifies a type of network service 270 to associate with the one or more monitoring agents 244. In another embodiment, a user may customize a monitoring agent 244. In still another embodiment, a generic monitoring agent 244 is used. In yet another embodiment, the one or more monitoring agents 244 determine the response time of the one or more network services 270 for responding to a request of one of the following types: ping, transport control protocol (TCP), TCP extended content verification, hypertext transfer protocol (HTTP), http extended content verification, hypertext transfer protocol secure (HTTPS), HTTPS extended content verification, user datagram protocol, domain name service, and file transfer protocol.

In some embodiments, the one or more monitoring agents 244 are protocol-specific agents, each monitoring agent 244 determining the availability for a network service of a particular protocol-type. In some embodiments, a monitoring agent 244 determines a response time of a server 106 or network service 270 to a TCP request. In one of these embodiments, the monitoring agent 244 uses a "TCP/ICMP echo request" command to send a datagram to the network service 270, receive a datagram from the network service 270 in response, and determine a response time based on the roundtrip time of the datagram. In another of these embodiments, the monitoring agent 244 verifies that the response from the network service 270 included expected content and did not contain errors.

In other embodiments, a monitoring agent 244 determines availability of a network service 270 to a UDP request. In one of these embodiments, the monitoring agent 244 uses a "UDP echo" command to send a datagram to the network service 270, receive a datagram from the network service 270 in response, and determine a response time based on the roundtrip time of the datagram. In another of these embodiments, the monitoring agent 244 verifies that the response from the network service 270 included expected content and did not contain errors. In still other embodiments, the monitoring agent 244 determines an availability of a network service 270 to an FTP request. In one of these embodiments, the monitoring agent 244 sends an FTP command, such as a "get" command or a "put" command, to the network service 270 and determines a time needed by the network service 270 to respond to the command. In another of these embodiments, the monitoring agent 244 verifies that the response from the network service 270 includes expected content, such as contents of a file requested by a "get" command, and does not contain errors.

In yet other embodiments, the monitoring agent 244 determines availability of a network service 270 to an HTTP request. In one of these embodiments, the monitoring agent 244 sends an HTTP command, such as a "get" request for a uniform resource locator (URL) or a file, to the network service 270 and determines a time needed by the network service 270 to respond to the request. In another of these embodiments, the monitoring agent 244 verifies that the response from the network service 270 includes expected content, such as the contents of a web page identified by the URL, and does not contain errors.

In further embodiments, the monitoring agent 244 determines an availability of a network service 270 to a DNS request. In one of these embodiments, the monitoring agent 244 sends a DNS request, such as a dnsquery or nslookup for a known network address, to the server 106 or network service 270 and determines a time needed by the server 106 or network service 270 to respond to the request. In another of these embodiments, the monitoring agent 244 verifies that the response from the network service 270 includes expected content, such as the domain name of a computing device 100 associated with the known network address, and does not contain errors.

A monitoring agent 244 may be assigned a weight by a network appliance 200. A weight may comprise an integer, decimal, or any other numeric indicator. In some embodiments, a user may configure the weight corresponding to a given monitoring agent 244. In some embodiments, a plurality of monitoring agents 244 may be assigned equal weight. In other embodiments, a plurality of monitoring agents may each be assigned different weights. The weights may be assigned to the monitors based on any criteria indicating relative importance, including without limitation importance of the monitored service, reliability of the monitoring mechanism, and the frequency of monitoring.

In one embodiment, a monitoring agent 244 may be assigned a weight based on the relative importance of the service 270 the appliance 200 monitors. For example, if most user requests in a given environment were HTTP requests, a monitoring agent 244 monitoring HTTP availability of a server 106 might be assigned a weight of 10, while a monitoring agent 244 monitoring FTP availability of a server 106 might be assigned a weight of three. Or, for example, if an administrator places a high priority on UDP applications, a monitoring agent 244 monitoring UDP availability of a server 106 may be assigned a weight of 20, while a DNS monitoring agent 244 may be assigned a weight of 5.

In some embodiments, an appliance 200 may compute a sum of the weights of the monitoring agents 244 currently reporting a network service 270 as operational. For example, if five monitoring agents 244, each assigned a weight of 30, are monitoring a network service 270, and three of the five monitoring agents 244 report the network service 270 as available, the appliance 200 may determine the sum of the monitoring agents 244 currently reporting the network service 270 as operational to be 90. Or for example, if only two monitoring agents 244, one with a weight of 20 and the other with a weight of 40, are reporting a server 106 as available, the appliance 200 may compute the sum of the monitoring agents 244 currently reporting a server 106 as operational to be 60.

Figure 3:
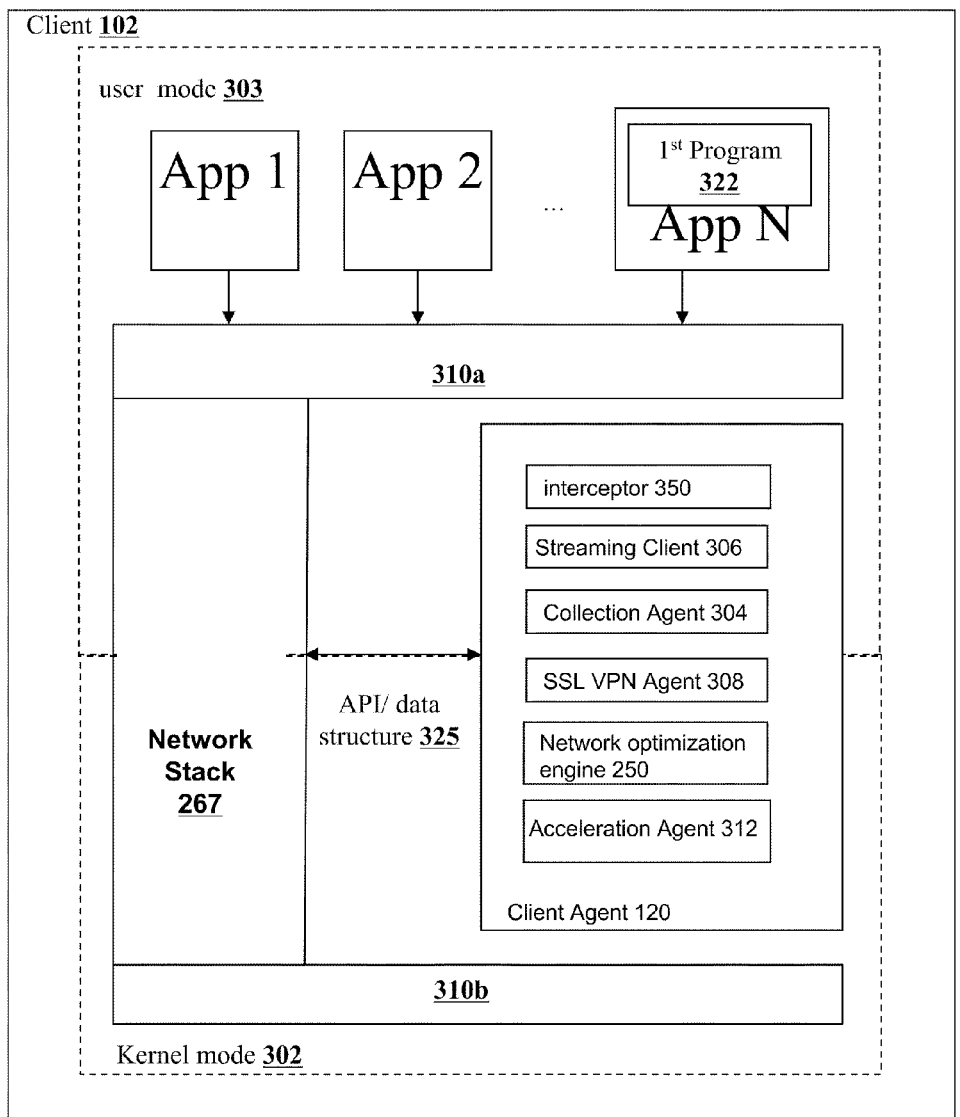
FIG. 3 is a block diagram depicting an embodiment of a client for communicating with a server using the network optimization feature.

Referring now to FIG. 3, an embodiment of a client agent 120 is depicted. The client 102 has a client agent 120 for establishing, exchanging, managing or controlling communications with the appliance 200, appliance 205 and/or server 106 via a network 104. In some embodiments, the client agent 120, which may also be referred to as a WAN client, accelerates WAN network communications and/or is used to communicate via appliance 200 on a network. In brief overview, the client 102 operates on computing device 100 having an operating system with a kernel mode 302 and a user mode 303, and a network stack 267 with one or more layers 310a-310b. The client 102 may have installed and/or execute one or more applications. In some embodiments, one or more applications may communicate via the network stack 267 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 267 from the one or more applications.

As with the appliance 200, the client has a network stack 267 including any type and form of software, hardware, or any combinations thereof, for providing connectivity to and communications with a network 104. The network stack 267 of the client 102 includes any of the network stack embodiments described above in conjunction with the appliance 200. In some embodiments, the client agent 120, or any portion thereof, is designed and constructed to operate with or work in conjunction with the network stack 267 installed or otherwise provided by the operating system of the client 102.

In further details, the network stack 267 of the client 102 or appliance 200 (or 205) may include any type and form of interfaces for receiving, obtaining, providing or otherwise accessing any information and data related to network communications of the client 102. In one embodiment, an interface to the network stack 267 includes an application programming interface (API). The interface may also have any function call, hooking or filtering mechanism, event or call back mechanism, or any type of interfacing technique. The network stack 267 via the interface may receive or provide any type and form of data structure, such as an object, related to functionality or operation of the network stack 267. For example, the data structure may include information and data related to a network packet or one or more network packets. In some embodiments, the data structure includes, references or identifies a portion of the network packet processed at a protocol layer of the network stack 267, such as a network packet of the transport layer. In some embodiments, the data structure 325 is a kernel-level data structure, while in other embodiments the data structure 325 is a user-mode data structure. A kernel-level data structure may have a data structure obtained or related to a portion of the network stack 267 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 267 may execute or operate in kernel-mode 302, for example, the data link or network layer, while other portions execute or operate in user-mode 303, such as an application layer of the network stack 267. For example, a first portion 310a of the network stack may provide user-mode access to the network stack 267 to an application while a second portion 310a of the network stack 267 provides access to a network. In some embodiments, a first portion 310a of the network stack has one or more upper layers of the network stack 267, such as any of layers 5-7. In other embodiments, a second portion 310b of the network stack 267 includes one or more lower layers, such as any of layers 1-4. Each of the first portion 310a and second portion 310b of the network stack 267 may include any portion of the network stack 267, at any one or more network layers, in user-mode 303, kernel-mode, 302, or combinations thereof, or at any portion of a network layer or interface point to a network layer or any portion of or interface point to the user-mode 302 and kernel-mode 203.

The interceptor 350 may include software, hardware, or any combination of software and hardware. In one embodiment, the interceptor 350 intercepts or otherwise receives a network communication at any point in the network stack 267, and redirects or transmits the network communication to a destination desired, managed or controlled by the interceptor 350 or client agent 120. For example, the interceptor 350 may intercept a network communication of a network stack 267 of a first network and transmit the network communication to the appliance 200 for transmission on a second network 104. In some embodiments, the interceptor 350 includes or is a driver, such as a network driver constructed and designed to interface and work with the network stack 267. In some embodiments, the client agent 120 and/or interceptor 350 operates at one or more layers of the network stack 267, such as at the transport layer. In one embodiment, the interceptor 350 includes a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 includes a driver complying with the Network Driver Interface Specification (NDIS), or a NDIS driver. In another embodiment, the interceptor 350 may be a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts or receives any transport layer connection requests. In these embodiments, the interceptor 350 executes transport layer application programming interface (API) calls to set the destination information, such as destination IP address and/or port to a desired location for the location. In this manner, the interceptor 350 intercepts and redirects the transport layer connection to an IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may include two agents 120 and 120'. In one embodiment, a first agent 120 may include an interceptor 350 operating at the network layer of the network stack 267. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 267. For example, in one embodiment, the interceptor 350 operates or interfaces with the transport layer of the network stack 267 transparently to any protocol layer below the transport layer, such as the network layer, and any protocol layer above the transport layer, such as the session, presentation or application layer protocols. This allows the other protocol layers of the network stack 267 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor 350 may operate at or interface with the network stack 267 in a manner transparent to any application, a user of the client 102, the client 102 and/or any other computing device 100, such as a server or appliance 200, 206, in communications with the client 102. The client agent 120, or any portion thereof, may be installed and/or executed on the client 102 in a manner without modification of an application. In one embodiment, the client agent 120, or any portion thereof, is installed and/or executed in a manner transparent to any network configuration of the client 102, appliance 200, 205 or server 106. In some embodiments, the client agent 120, or any portion thereof, is installed and/or executed with modification to any network configuration of the client 102, appliance 200, 205 or server 106. In one embodiment, the user of the client 102 or a computing device in communications with the client 102 are not aware of the existence, execution or operation of the client agent 12, or any portion thereof. As such, in some embodiments, the client agent 120 and/or interceptor 350 is installed, executed, and/or operated transparently to an application, user of the client 102, the client 102, another computing device, such as a server or appliance 200, 2005, or any of the protocol layers above and/or below the protocol layer interfaced to by the interceptor 350.

The client agent 120 includes a streaming client 306, a collection agent 304, an SSL VPN agent 308, a network optimization engine 250, an acceleration agent 312 and/or, a monitoring agent 297. In one embodiment, the client agent 120 is an Independent Computing Architecture (ICA) client, or any portion thereof, developed by Citrix Systems, Inc. of Fort Lauderdale, Fla., and is also referred to as an ICA client. In some embodiments, the client agent 120 has an application streaming client 306 for streaming an application from a server 106 to a client 102. In another embodiment, the client agent 120 includes a collection agent 304 for performing end-point detection/scanning and collecting end-point information for the appliance 200 and/or server 106. In some embodiments, the client agent 120 has one or more network accelerating or optimizing programs or agents, such as a network optimization engine 250 and an acceleration program 312. In one embodiment, the acceleration program 312 accelerates communications between client 102 and server 106 via appliance 205'. In some embodiments, the network optimization engine 250 provides WAN optimization techniques as discussed herein.

The streaming client 306 is an application, program, process, service, task or set of executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 is an application, program, process, service, task or set of executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 is an end-point detection and scanning program, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or version of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

The SSL VPN agent 308 is an application, program, process, service, task or set of executable instructions for establishing a Secure Socket Layer (SSL) virtual private network (VPN) connection from a first network 104 to a second network 104', 104", or a SSL VPN connection from a client 102 to a server 106. In one embodiment, the SSL VPN agent 308 establishes a SSL VPN connection from a public network 104 to a private network 104' or 104". In some embodiments, the SSL VPN agent 308 works in conjunction with appliance 205 to provide the SSL VPN connection. In one embodiment, the SSL VPN agent 308 establishes a first transport layer connection with appliance 205. In some embodiment, the appliance 205 establishes a second transport layer connection with a server 106. In another embodiment, the SSL VPN agent 308 establishes a first transport layer connection with an application on the client, and a second transport layer connection with the appliance 205. In other embodiments, the SSL VPN agent 308 works in conjunction with WAN optimization appliance 200 to provide SSL VPN connectivity.

In some embodiments, the acceleration program 312 is a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 312 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 312 may perform encryption and/or decryption of any communications received and/or transmitted by the client 102. In some embodiments, the acceleration program 312 performs one or more of the acceleration techniques in an integrated manner or fashion. Additionally, the acceleration program 312 can perform compression on any of the protocols, or multiple-protocols, carried as a payload of a network packet of the transport layer protocol.

In one embodiment, the acceleration program 312 is designed, constructed or configured to work with appliance 205 to provide LAN side acceleration or to provide acceleration techniques provided via appliance 205. For example, in one embodiment of a NETSCALER appliance 205 manufactured by Citrix Systems, Inc., the acceleration program 312 includes a NETSCALER client. In some embodiments, the acceleration program 312 provides NETSCALER acceleration techniques stand-alone in a remote device, such as in a branch office. In other embodiments, the acceleration program 312 works in conjunction with one or more NETSCALER appliances 205. In one embodiment, the acceleration program 312 provides LAN-side or LAN based acceleration or optimization of network traffic.

In some embodiments, the network optimization engine 250 may be designed, constructed or configured to work with WAN optimization appliance 200. In other embodiments, network optimization engine 250 may be designed, constructed or configured to provide the WAN optimization techniques of appliance 200, with or without an appliance 200. For example, in one embodiment of a WANScaler appliance 200 manufactured by Citrix Systems, Inc. the network optimization engine 250 includes the WANscaler client. In some embodiments, the network optimization engine 250 provides WANScaler acceleration techniques stand-alone in a remote location, such as a branch office. In other embodiments, the network optimization engine 250 works in conjunction with one or more WANScaler appliances 200.

In another embodiment, the network optimization engine 250 includes the acceleration program 312, or the function, operations and logic of the acceleration program 312. In some embodiments, the acceleration program 312 includes the network optimization engine 250 or the function, operations and logic of the network optimization engine 250. In yet another embodiment, the network optimization engine 250 is provided or installed as a separate program or set of executable instructions from the acceleration program 312. In other embodiments, the network optimization engine 250 and acceleration program 312 are included in the same program or same set of executable instructions.

In some embodiments and still referring to FIG. 3, a first program 322 may be used to install and/or execute the client agent 120, or any portion thereof, automatically, silently, transparently, or otherwise. In one embodiment, the first program 322 is a plug-in component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 is designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers and the client agent 120, or any portion thereof, on the operating system of the client 102.

In some embodiments, each or any of the portions of the client agent 120—a streaming client 306, a collection agent 304, SSL VPN agent 308, a network optimization engine 250, acceleration program 312, and interceptor 350—may be installed, executed, configured or operated as a separate application, program, process, service, task or set of executable instructions. In other embodiments, each or any of the portions of the client agent 120 may be installed, executed, configured or operated together as a single client agent 120.

Figure 4A:
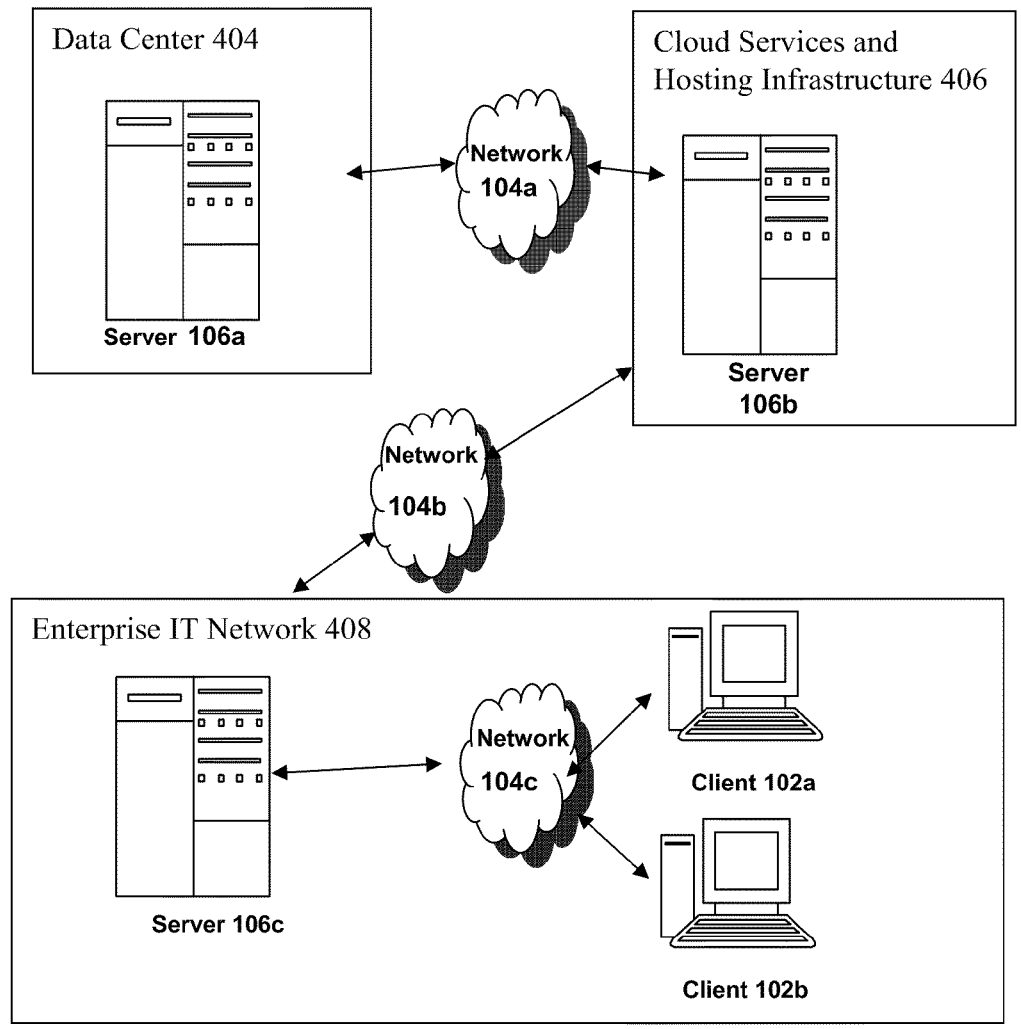
FIG. 4A is a block diagram depicting one embodiment of a system in which a plurality of networks provide hosting and delivery services.

Referring now to FIG. 4A, a block diagram depicts one embodiment of a system in which a plurality of networks provide hosting and delivery services. In brief overview, the system includes a data center 404, a cloud services and hosting infrastructure 406, and an enterprise information technology (IT) network 408.

In one embodiment, the data center 404 provides access to applications related to core business and operational data for an organization. In another embodiment, the data center 404 includes computing devices such as, without limitation, servers (including, for example, application servers, file servers, databases, and backup servers), routers, switches, and telecommunications equipment. In still another embodiment, the cloud services and hosting infrastructure 406 provides access to, without limitation, storage systems, databases, application servers, desktop servers, directory services, and web servers. In still even another embodiment, the enterprise IT network 408 may also be referred to as an on-premise network or end-user network. In some embodiments, the enterprise IT network 104c may provide local services, such as mail services and web services. In other embodiments, the enterprise IT network 104c may provide local versions of remotely located services, such as locally-cached versions of remotely-located print servers, databases, application servers, desktop servers, directory services, and web servers. In still other embodiments, the enterprise IT network 104c provides functionality allowing remotely located users to access services provided by the enterprise IT network 104c; for example, a user accessing a computer on a network 104d may connect to an application server in the network 104c to access enterprise resources.

As depicted in FIG. 4A, in some embodiments, the data center 404 and the cloud services and hosting infrastructure 406 are remotely located from an organization supported by the data center 404 and the cloud services and hosting infrastructure 406; for example, the data center 404 may reside on a first network 104a and the cloud services and hosting infrastructure 406 may reside on a second network 104b, while the enterprise IT network 408 is a separate, third network 104c. In other embodiments, the data center 404 and the cloud services and hosting infrastructure 406 reside on a first network 104a and the enterprise IT network 408 is a separate, second network 104c. In still other embodiments, the cloud services and hosting infrastructure 406 resides on a first network 104a while the data center 404 and the enterprise IT network 408 form a second network 104c. Although FIG. 4A depicts only one sever 106a, one server 106b, one server 106c, two clients 102, and three networks 104, it should be understood that the system may provide multiple ones of any or each or none of those components. For example, in some embodiments, there may be either a data center 404 or an enterprise IT network 408. The servers 106, clients 102, and networks 104 may be provided as described above in connection with FIGS. 1A-3.

In one embodiment, the system includes facilities and hardware residing in a data center 404 and provided by hosting providers. In another embodiment, the system includes at least one server providing virtualization and hypervisor functionality and residing in the cloud services and hosting infrastructure 406; a virtualization and hypervisor provider may provide such a server. In still another embodiment, the system includes at least one server providing functionality for executing virtual machines, the server residing in the cloud services and hosting infrastructure 406; a backbone hosting service provider may provide such a server. In yet another embodiment, additional servers may reside in the cloud services and hosting infrastructure 406 and be provided by other service providers including, without limitation, infrastructure service providers, application service providers, platform service providers, tools service providers, and desktop service providers.

In one embodiment, an IT infrastructure may extend from a first network—such as a network owned and managed by an enterprise—into a second network, which may be owned or managed by a separate entity than the entity owning or managing the first network. Resources provided by the second network may be said to be "in a cloud". Cloud-resident elements may include, without limitation, storage devices, servers, databases, computing environments (including virtual machines and desktops), and applications. In other embodiments, one or more networks providing computing infrastructure on behalf of customers is referred to a cloud. In one of these embodiments, a system in which users of a first network access at least a second network including a pool of abstracted, scalable, and managed computing resources capable of hosting user resources may be referred to as a cloud computing environment. In another of these embodiments, resources may include, without limitation, virtualization technology, data center resources, applications, and management tools. In some embodiments, Internet-based applications (which may be provided via a "software-as-a-service" model) may be referred to as cloud-based resources. In other embodiments, networks that provide users with computing resources, such as virtual machines or blades on blade servers, may be referred to as compute clouds. In still other embodiments, networks that provide storage resources, such as storage area networks, may be referred to as storage clouds. In further embodiments, a resource may be cached in a local network and stored in a cloud.

In one embodiment, by way of example, a first machine 106b on a first network 104b may store a virtual machine image and a second machine 106c on a second network 104c may retrieve a copy of the virtual machine image and cache it locally to provide enhanced functionality, such as redundancy or improved performance. In such an embodiment, the virtual machine image may be stored in a location remote from a user who will execute the virtual machine (the virtual machine may be said to be stored at a location "in the cloud").

Figure 4B:
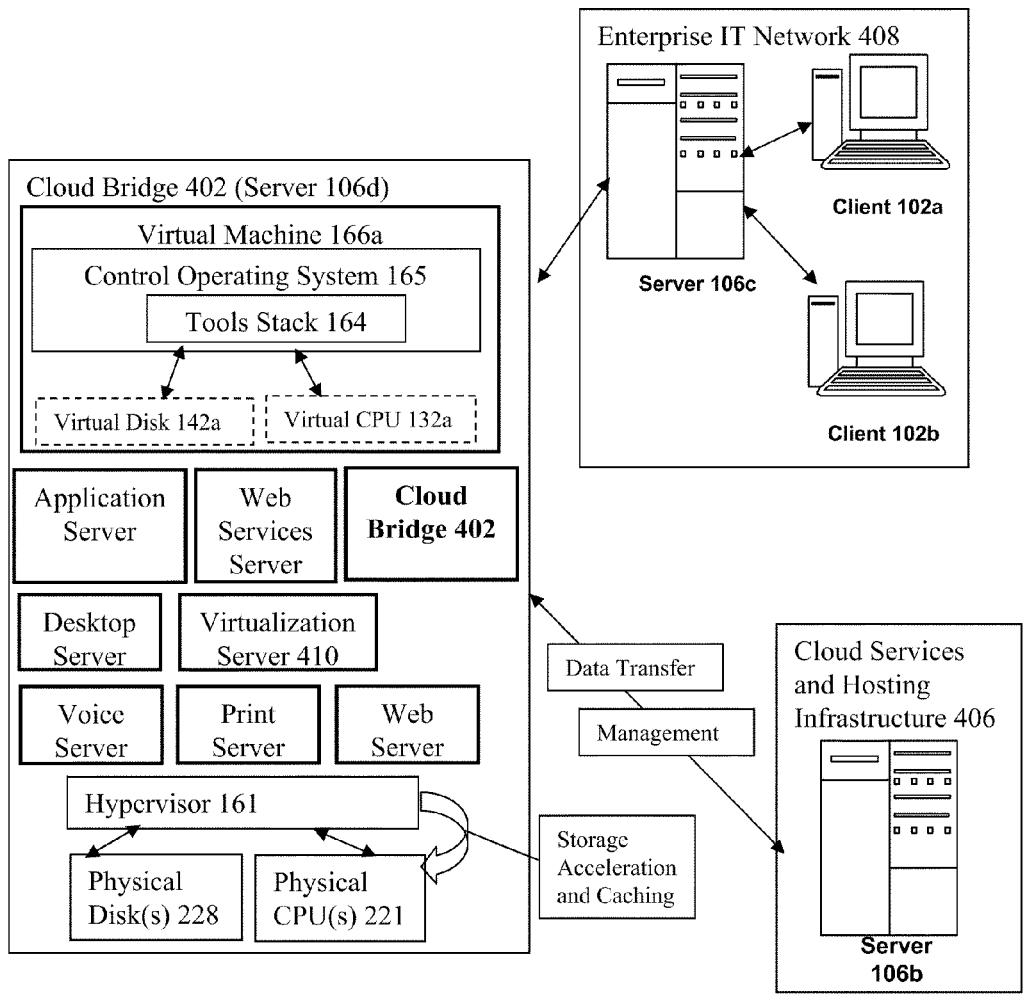
FIG. 4B is a block diagram depicting one embodiment of a system for bridging a plurality of networks, one of which provides computing and storage functionality.

Referring now to FIG. 4B, a block diagram depicts one embodiment of a system for bridging a plurality of networks, one of which provides computing and storage functionality. As noted above, in some embodiments, the systems described above are used to deliver files, applications, desktops, computing environments, or other data from one machine to another. In one embodiment, the cloud bridge server 402 includes functionality for delivering this data in situations where the supporting information technology (IT) infrastructure extends from a first network into one or more other networks.

In one embodiment, the cloud bridge server 402 includes functionality for provisioning, delivering, accelerating delivery, caching, and/or executing resources stored on one or more networks. In another embodiment, the cloud bridge server 402 provides accelerated access to cloud-resident data.

In still another embodiment, implementing the cloud bridge server 402 provides support for labs and staging environments. In still even another embodiment, the cloud bridge server 402 provides functionality for managing virtual machine life cycles. In yet another embodiment, the cloud bridge server 402 provides disaster tolerance functionality, disaster recovery functionality, and functionality for deploying additional computational or storage capacity on demand. For example, the cloud bridge server 402 may provide capacity on demand functionality via an interface that allows an administrator to execute or terminate execution of additional virtual machines as needed. As another example, the cloud bridge server 402 may provide capacity on demand functionality via utilities that allow an administrator to import or export virtual machine images, such as those stored in compliance with a standard such as an Open Virtualization Format. In some embodiments, the cloud bridge server 402 provides a second site for storing data; such a second site may provide disaster tolerance functionality.

In one embodiment, the cloud bridge server 402 includes a migration automation utility. In another embodiment, the migration automation utility includes an interface allowing a user to request migration of resources to and from a remote network or other location in a cloud. In still another embodiment, the migration automation utility provides a secure connection between the cloud services and hosting infrastructure 406 and the enterprise IT network 408. In yet another embodiment, the migration automation utility provides an interface allowing a user to load balance one or more resources.

In one embodiment, the migration automation utility includes an interface allowing a user to migrate existing infrastructure in a first network to a second network; for example the interface may allow a user, such as an administrator, to migrate existing virtualization infrastructure to a cloud services and hosting infrastructure in a network 104b or from a first cloud services and hosting infrastructure 406a to a second cloud services and hosting infrastructure 406b either on the same network 104b or on different networks 104. In another embodiment, and by way of example, the interface may include elements allowing a user to migrate functionality from a cloud services and hosting infrastructure 406 to an enterprise IT network 408. In still another embodiment, by implementing an automation utility, the cloud bridge server 402 provides zero-touch management for a user at an enterprise IT network 104c; such an implementation may result in lower operating expenses for users. In some embodiments, the cloud bridge server 402 includes management capabilities including, without limitation, application-based configuration, configuration change management process support, and monitoring and workflow integration.

In some embodiments, the cloud bridge server 402 is in communication with a system for adaptively load balancing user sessions to reduce energy consumption. In one of these embodiments, the migration automation utility is in communication with such a system. In another of these embodiments, a load balancing component of the cloud bridge server 402 is in communication with such a system. In still another of these embodiments, such a system includes a power management console identifying a session type for each of a plurality of user sessions, defining a server group providing access to a subset of the plurality of user sessions having a common session type, and defining a power management schedule for the server group; the system may also include a power management controller consolidating, onto at least one server in the server group, the subset of the plurality of user sessions. In other embodiments, the cloud bridge server 402 is in communication with a system for reducing energy consumption by dynamically managing power modes for a plurality of servers includes a power management agent monitoring a level of load on one of the plurality of servers. In one of these embodiments, the system includes a power management console, in communication with the power management agent, defining a power management schedule for the one of the plurality of servers, the power management schedule generated responsive to the monitored level of load. In another of these embodiments, the system includes a power management controller, in communication with the power management console and the power management agent, dynamically controlling a level of power to the one of the plurality of servers, responsive to the power management schedule. In further embodiments, the cloud bridge server 402 is in communication with systems such as those described in connection with FIGS. 12-18 below.

In one embodiment, the cloud bridge server 402 includes functionality providing resilient virtual machine storage. In another embodiment, the cloud bridge server 402 provides functionality for accelerating delivery of applications, computing environments, virtual machine images and other resources or user data. In still another embodiment, the cloud bridge server 402 includes a resource delivery component that streams applications, desktops, computing environments, virtual machines, and other resources to an end-user network 104c. In yet another embodiment, the cloud bridge server 402 includes functionality for providing dial-tone services.

In one embodiment, the cloud bridge server 402 implements functionality accessed by end users who are charged for the resources they use; such an embodiment may be referred to as a "pay-as-you-go" system. In another embodiment, the cloud bridge server 402 includes an agent monitoring the use of a hypervisor 161 by a user, generating use metrics, and identifying an amount to charge the user. In still another of these embodiments, the agent monitors use of physical resources such as storage, network bandwidth central processing unit (CPU) utilization, and disk utilization.

In one embodiment, the cloud bridge server 402 provides a file repeater for accelerated input/output completion. In another embodiment, the cloud bridge server 402 provides a block repeater for accelerated input/output completion. In still another embodiment, the cloud bridge server 402 provides functionality for removing, from a cloud services and hosting infrastructure 406, files or blocks also stored on the enterprise IT network 408.

In some embodiments, the systems described herein provide functionality for replicating storage. In one of these embodiments, such functionality provides fast application input/output completion, efficient de-duplication across network, resilient disaster tolerant remote storage, network disconnected operation, application and data acceleration, acceleration of input/output from virtual machines to a storage repeater, and aggregate common access and security across cloud service providers.

In one embodiment, the cloud bridge server 402 includes a branch repeater for caching files, applications, computing environments, virtual machines, and other data. In another embodiment, the cloud bridge server 402 is in communication with an appliance 200 as described above in connection with FIGS. 1F-3. In still another embodiment, the cloud bridge server 402 is an appliance 200.

In one embodiment, the cloud bridge server 402 provides a virtualization server 410. In another embodiment, the virtualization server 410 provides access to at least one virtual machine. In still another embodiment, the at least one virtual machine provides access to an enterprise service, including, without limitation, printing services, directory services (including a replicated MICROSOFT ACTIVE DIRECTORY database), and other services. In yet another embodiment, the cloud bridge server 402 is in communication with an appliance, such as an optimization device 200, and implements the methods and systems described above in connection with FIGS. 1F-3 to optimize the delivery of resources to the enterprise IT network 408. In some embodiments, the cloud bridge server 402 provides functionality for centralized management of virtual machines. In other embodiments, an optimization decision is made to determine whether to execute a service from the cloud services and hosting infrastructure 406 or from the enterprise IT network 408.

In some embodiments, the cloud bridge server 402 provides support for optimization, caching, or compression of applications based on eXtended Markup Language (XML). In one of these embodiments, the cloud bridge server 402 provides binary XML support. In another of these embodiments, the cloud bridge server 402 includes functionality for load balancing XML content. In still another of these embodiments, the cloud bridge server 402 includes functionality for content switching and routing of dynamic XML content.

In other embodiments, the cloud bridge server 402 provides support for protocols supporting web-based communities, hosted services, and resources leveraging lightweight business models enabled by syndication of content and of service. In further embodiments, the cloud bridge server 402 provides support for optimization, caching, or compression of resources leveraging the Internet to allow user participation and contribution to content and other applications which may be referred to as "Web 2.0" or "Web 3.0"; including, for example, and without limitation, social-networking sites, media-sharing sites, multi-media sharing, voice over the internet, peer-to-peer communication, wikis, blogs, location-based applications and user-generated taxonomies.

In some embodiments, the cloud bridge server 402 provides functionality to extend security capabilities. In one of these embodiments, the cloud bridge server 402 integrates with enterprise identity and access management (IAM) systems (e.g., OpenID). In another of these embodiments, the cloud bridge server 402 provides fine-grained access control for web services. In still another of these embodiments, the cloud bridge server 402 extends XML processing capabilities (e.g., to protect leakage of privacy data (HIPAA) and for threat defense.

In some embodiments, the cloud bridge server 402 includes a security manager. In one of these embodiments, the security manager provides functionality for encrypting virtual machines. In another of these embodiments, the security manager provides functionality for encrypting boot sectors of virtual machines. In still another of these embodiments, the security manager provides functionality for enforcement of policies related to virtual machine lifetimes. In still even another of these embodiments, the security manager provides functionality for enforcement of policies related to virtual machine runtimes. In another of these embodiments, the security manager provides functionality for enforcement of policies related to user updates. In yet another of these embodiments, the security manager provides functionality for static or dynamic checks on virtual machine security.

In some embodiments, the cloud bridge server 402 includes a plurality of management agents allowing users, such as administrators, to manage a plurality of physical machines, storage resources, and peripheral devices, supporting the storage, provisioning, delivery, and execution of virtual machines on at least one of the enterprise IT network 408 and the cloud services and hosting infrastructure 406. In one of these embodiments, the management agents may include, without limitation, at least one of a storage manager, a virtualization manager, an availability manager, a dynamic workload manager, and a lifecycle manager.

In one embodiment, the cloud bridge server 402 includes a storage manager allowing for the provisioning and management of storage resources. In another embodiment, the storage manager provides centralized functionality for automated provisioning of virtual machines, generating snapshots of virtual machines, cloning virtual machines, providing data backup of virtual machines, and providing disaster recovery for virtual machines. In still another embodiment, the storage manager provides a general purpose, high-speed virtual storage infrastructure. In yet another embodiment, the storage manager allows format-independence between a storage resources (such as, for example, a network attached storage or a storage area network) and a virtual machine image (which may be, for example, in an ISO or VHD format).

In one embodiment, the storage manager provides functionality to manage virtual machine images stored on a plurality of cloud services and hosting infrastructures 406. In another embodiment, the storage manager on the cloud bridge server 402 provides interface adaptation. In still another embodiment, the storage manager provides functionality for caching remotely stored virtual machine images on the enterprise IT network 408. In yet another embodiment, the storage manager provides functionality for provisioning, configuring, and de-provisioning storage resources. In some embodiments, functionality for managing storage resources is described in greater detail below in connection with FIGS. 6A-9.

In one embodiment, the cloud bridge server 402 includes a virtualization manager for management of a pool of virtualization resources. In another embodiment, the virtualization manager includes a management tool allowing a user, such as an administrator, to manage a plurality of physical machines supporting execution of a plurality of virtual machines across a plurality of networks. In such an embodiment, the plurality of physical machines may be referred to as a pool.

In one environment, the cloud bridge server 402 includes an availability manager including functionality allowing an administrator to identify at least one of a cloud services and hosting infrastructure 406 and the enterprise IT network 408 for execution of a resource. In another embodiment, such functionality allows, for example, an administrator to switch execution of the resource from the enterprise IT network 408 to the cloud services and hosting infrastructure 406 providing high availability, fail over, and disaster recovery. In still another embodiment, the availability manager includes functionality for automated, policy-controlled deployment of resources; for example, the availability manager may include an interface allowing the administrator to specify when the enterprise IT network 408 will provide access to a resource and when the cloud services and hosting infrastructure 406 will provide the access.

In one embodiment, the cloud bridge server 402 includes a dynamic workload manager allowing an administrator to select a physical host for execution of a virtual machine, the physical host residing in a cloud services and hosting infrastructure 406. In another embodiment, execution of a virtual machine is referred to as a workload. In still another embodiment, execution of a virtual appliance specified according to a standard, such as the Open Virtualization Format standard, is referred to as a workload. In yet another embodiment, a unit of work is referred to as a workload; such a unit of work may be separable from other workloads with clear deployment boundaries.

In one embodiment, a set of foundation services needed by an application or set of applications to execute is referred to as a workload. In another embodiment, a plurality of virtual machines is referred to as a workload. In still another embodiment, a workload is at least one of: a set of applications, a set of application services, a set of infrastructure services, and a set of application services.

In one embodiment, dynamic workload management refers to functionality allowing execution or migration of virtual machines responsive to stimuli, such as user requests, changes in server utilization, or changes in server availability. In another embodiment, the dynamic workload manager provides policy-based control of a virtualized data center infrastructure. In still another embodiment, the dynamic workload manager provides automated control of a virtualized data center infrastructure managed in accordance with a service level agreement. In yet another embodiment, the dynamic workload manager provides balancing and optimization of workloads across a plurality of physical hosts. In some embodiments, the dynamic workload manager includes functionality such as that described in greater detail below, in connection with FIGS. 10-11.

In one embodiment, the cloud bridge server 402 includes a lifecycle manager allowing an administrator to provision and manage virtual resources. In another embodiment, the lifecycle manager provides automated management of an application and workload lifecycle, from creation through testing, staging, and updating. In still another embodiment, the lifecycle manager facilitates management of at least one process in an application or workload lifecycle on at least one of the enterprise IT network 408 (for example, for lab management) and the cloud services and hosting infrastructure 406.

Figure 5A:
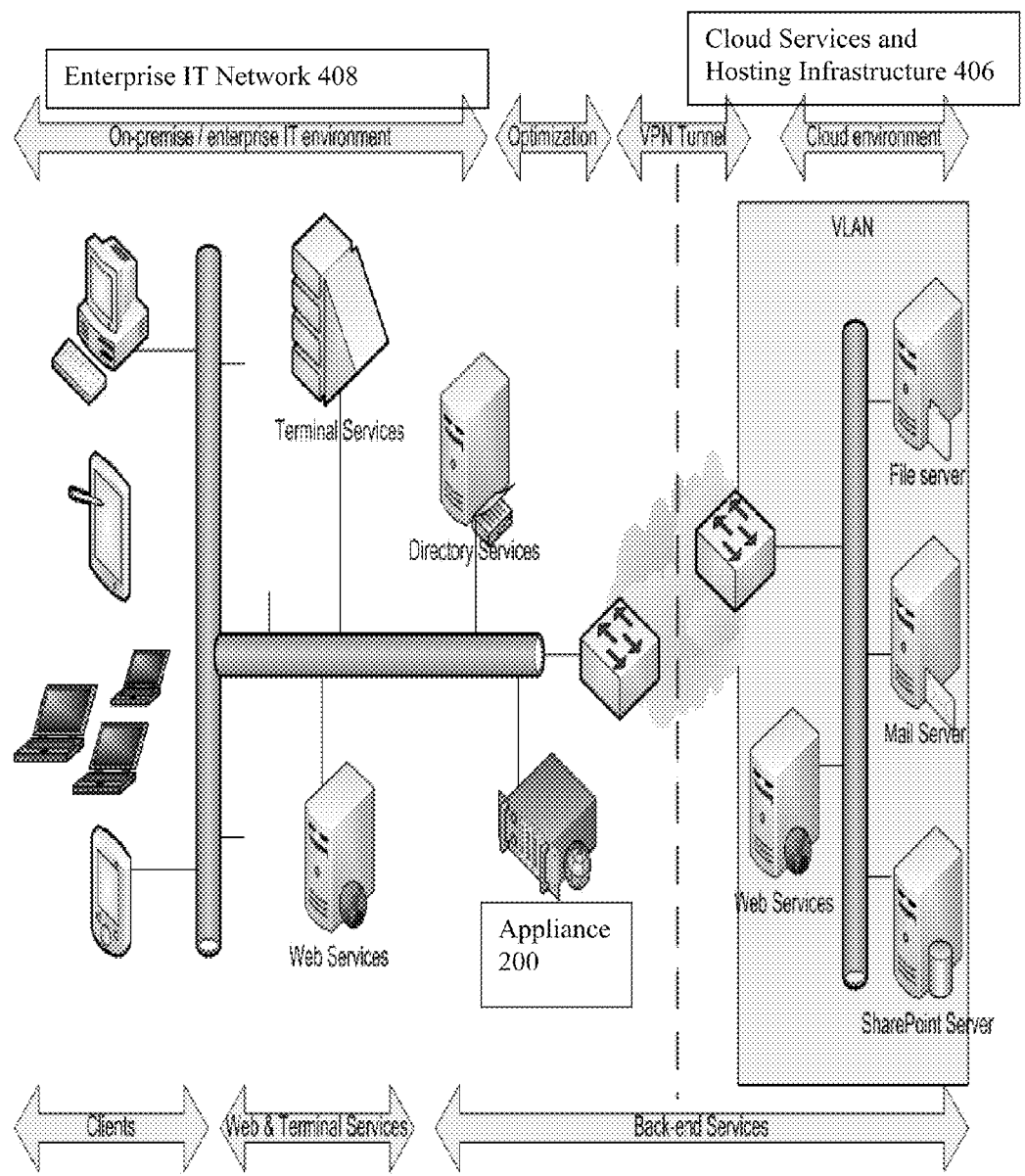
FIG. 5A is a block diagram depicting one embodiment of a system in which a cloud services and hosting infrastructure hosts at least one service on behalf of an enterprise information technology network.

Referring now to FIG. 5A, a block diagram depicts one embodiment of a system in which a cloud services and hosting infrastructure hosts at least one service on behalf of an enterprise information technology network. As shown in FIG. 5A, an administrator may identify at least one enterprise service—such as, for example, file storage, mail services, or browser-based collaboration and document-management platform—and arrange for a cloud services and hosting infrastructure 406 to host the identified at least one enterprise service. In one embodiment, a virtual local area network (VLAN) is defined that is accessible via a device such as an SSL VPN. In another embodiment, a virtual machine on the cloud services and hosting infrastructure 406 may provide access to the identified at least one enterprise service. In still another embodiment, an administrator of the cloud services and hosting infrastructure 406 provides an administrator of the enterprise IT network 408 with access to at least one physical host 100 executing a hypervisor 161 and the administrator of the enterprise IT network 408 specifies what services a virtual machine executed by the hypervisor 161 provides for users of the enterprise IT network 408. In some embodiments, the administrator of the enterprise IT network 408 may deploy an appliance 200 as described above in connection with FIGS. 1F-3.

Figure 5B:
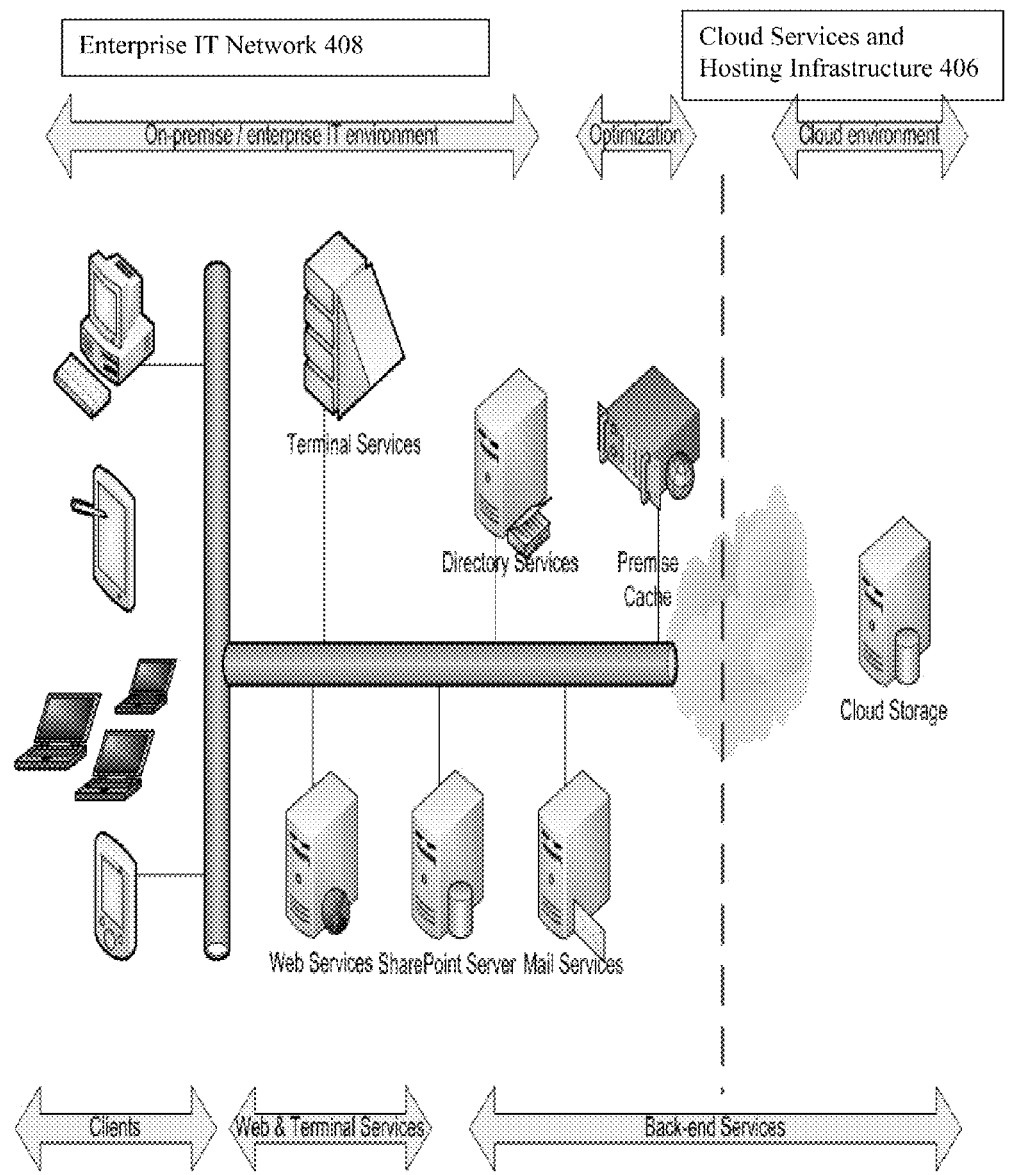
FIG. 5B is a block diagram depicting one embodiment of a system in which an enterprise IT network 408 includes a premise cache server.

Referring now to FIG. 5B, a block diagram depicts one embodiment of a system in which an enterprise IT network 408 includes a premise cache server. In one embodiment, the enterprise IT network 408 includes the systems described above in connection with FIGS. 1F-3.

Figure 5C:
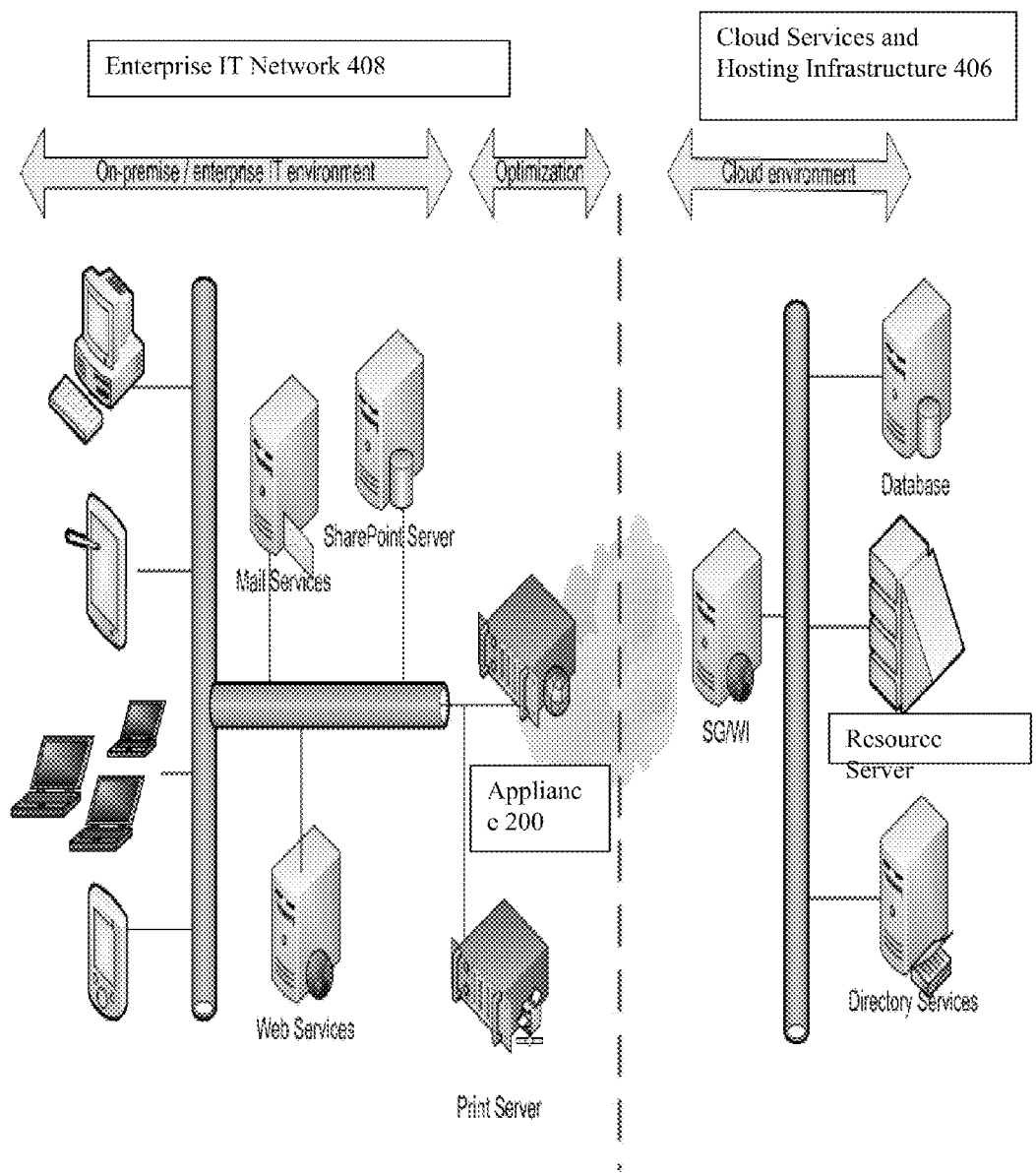
FIG. 5C is a block diagram depicting one embodiment of a system in which an enterprise IT network 408 includes a premise cache server and a cloud services and hosting infrastructure 406 includes a resource server.

Referring now to FIG. 5C, a block diagram depicts one embodiment of a system in which an enterprise IT network 408 includes a premise cache server and a cloud services and hosting infrastructure 406 includes a resource server. In one embodiment, the enterprise IT network 408 includes the systems described above in connection with FIGS. 1F-3. In another embodiment, the cloud services and hosting infrastructure 406 includes a resource server executing resources and transmitting resource output data to end users. In still another embodiment, the cloud services and hosting infrastructure 406 includes a resource server storing resources and transmitting the resources to end users via systems and methods for application streaming. In yet another embodiment, the cloud services and hosting infrastructure 406 includes a resource server executing a virtual machine which executes a resources and transmits resource output data to end users. In some embodiments, the enterprise IT network 408 includes at least one server providing local access to enterprise services, such as mail or web services.

Figure 5D:
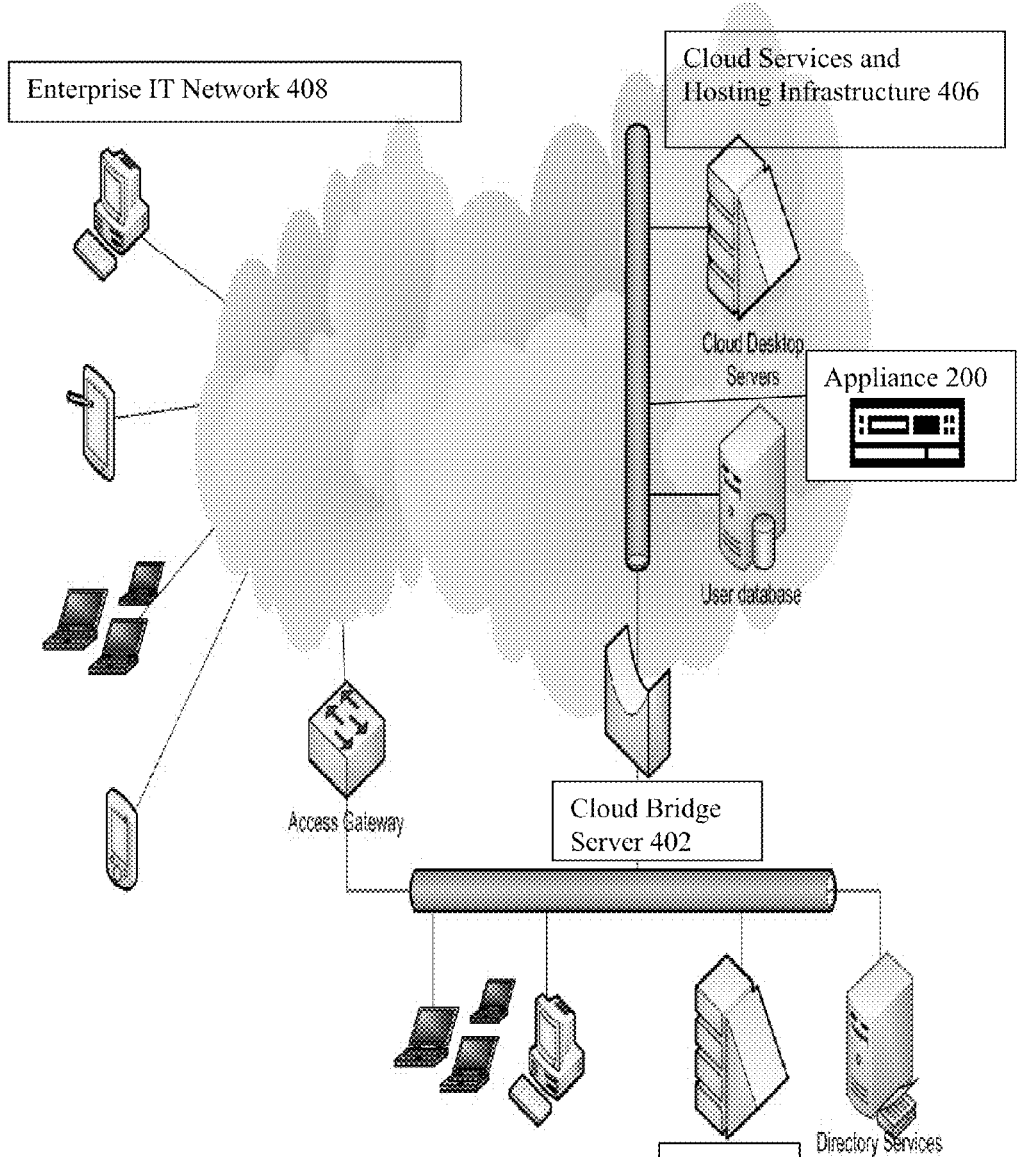
FIG. 5D is a block diagram depicting one embodiment of a system in which at least one of an enterprise IT network 408 and a cloud services and hosting infrastructure host a resource server providing end users with access to resources such as desktops.

Referring now to FIG. 5D, a block diagram depicts one embodiment of a system in which at least one of an enterprise IT network 408 and a cloud services and hosting infrastructure 406 include a resource server providing end users with access to resources such as desktops. In one embodiment, the enterprise IT network 408 delivers resources to end users. In another embodiment, the cloud services and hosting infrastructure 406 delivers resources to end users. In still another embodiment, the cloud services and hosting infrastructure 406 may include functionality allowing a user to select a resource for execution; for example, the cloud services and hosting infrastructure 406 may transmit an enumeration of available resources to a computing device 102 that displays the enumeration to a user who selects one of the enumerated resources for execution. In still another embodiment, the cloud services and hosting infrastructure 406 may deliver resources to provide additional capacity to the enterprise IT network 408; for example, an enterprise IT network 408 may deliver resources by default but, in the event of a scenario in which the enterprise IT network 408 resource servers lack the capacity to deliver additional resources, the cloud services and hosting infrastructure 406 may deliver the resources to alleviate a temporary shortage.

In one embodiment, the cloud bridge server 402 allows consolidation across an enterprise IT network 408 to improve server utilization, lower operating expense, improve disaster tolerance, tighten security, and compliance when providing server virtualization. In another embodiment, accessing applications remotely may increase demand for accelerated application delivery services. In some embodiments, implementation of the methods and systems described herein provide functionality for delivering operating systems, server virtualization services and applications independent of location and device to fulfill this need.

In other embodiments, implementation of the methods and systems described herein addresses needs that may arise in consolidating application services in a data center or hosting them in the cloud. In one of these embodiments, a "virtual office appliance" is provided that runs virtual machine appliances locally to provide a subset of services for users in a branch or remote office. In another of these embodiments, a "virtual office" includes a plurality of servers (one of which may provide failover functionality), executing a virtualization system (such as a hypervisor and control operating system 165). In still another of these embodiments, the "virtual office" servers execute services and workflows that integrate/leverage functionality—such as that described above in connection with FIGS. 1F-3—to cache and run virtual machine appliances locally. In some embodiments, virtual machine images are images from which a hypervisor may execute a virtual machine. In one of these embodiments, a virtual machine image may be in compliance with a standard, such as the Open Virtualization Format standard, the VMWARE Virtual Machine Disk Format (VMDK), a Virtual Hard Drive format (VHD), or other format.

In some embodiments, a virtual machine may be provisioned, hosted, or stored in a location in a cloud, such as a cloud services and hosting infrastructure 406. In one of these embodiments, the virtual machine may be cached to a server residing in the enterprise IT network 408 and executed from the enterprise IT network 408. In another of these embodiments, a user accessing such a virtual machine may have an improved experience due mitigated network disruption. In still another of these embodiments, such execution may leverage computational power of the enterprise IT network 408.

Referring still to FIG. 5D, the cloud services and hosting infrastructure 406 may execute a resource server 106b that provides access to, for example, presentation services, resource delivery, or virtual machines executing resources on behalf of machines in the enterprise IT network 408. In one of these embodiments, the cloud services and hosting infrastructure 406 server 106b is in communication with a resource server 106c in the enterprise IT network 408 (which may be, for example, a print server, web server, or file server). In such an embodiment, a user accessing a resource via the cloud-based server 106b may also access data residing on a server 106c in the enterprise IT network 408. In another of these embodiments, an appliance—such as the appliance 200 described above in connection with FIGS. 1F-3—provides acceleration of data transmitted between the cloud services and hosting infrastructure 406 and the enterprise IT network 408. In still another of these embodiments, an appliance—which may be the same appliance 200 or another appliance—provides functionality for securing communications between the cloud services and hosting infrastructure 406 and the enterprise IT network 408. In some embodiments, a plurality of resource servers 106b provide access to the resources. In one of these embodiments, for example, a farm of resource servers provides access machines in the enterprise IT network 408 with access to resources.

In one embodiment, a server 106b in the cloud services and hosting infrastructure 406 establishes a trust relationship with a server 106c in the enterprise IT network 408; for example, the servers may use a MICROSOFT ACTIVE DIRECTORY service to establish the trust relationship. In another embodiment, a server 106b in the enterprise IT network 408 establishes a Virtual Private Network (VPN) connection with the server 106c in the enterprise IT network 408. In some embodiments, a system such as the AMAZON ELASTIC COMPUTE CLOUD may provide the server 106b, which may be configured according to an AMAZON Machine Image specification. In other embodiments, a system such as the systems provided by SoftLayer Technologies, Inc., of Plano, Tex., may provide the server 106b.

In one embodiment, a server 106b in the cloud services and hosting infrastructure 406 establishes a trust relationship with a server 106c in the enterprise IT network 408. In another embodiment, the server 106b establishes a tunnel from a virtual machine executing in the cloud services and hosting infrastructure 406 to a machine executing in the enterprise IT network 408; the tunnel may, for example, support concurrent user sessions from the machine executing in the enterprise IT network 408.

In some embodiments, a client agent on the server 106c (residing in the enterprise IT network 408) executes when a first user connects and is authenticated. In one of these embodiments, a tunnel is automatically created between the client agent and the server 106b by the client agent. In another of these embodiments, when a second user connects, the second user receives access to the server via the same tunnel established when the first user connected. In still another of these embodiments, the client agent determines that a tunnel has already been established when the second user connects. In other embodiments, a client agent on the server 106b (residing in the cloud services and hosting infrastructure 406) executes when a first user, such as an administrator, connects and is authenticated. In one of these embodiments, a tunnel is created between the client agent and the server 106b. In another of these embodiments, when a second user connects, the second user receives access to the server via the same tunnel established when the first user connected. In still another of these embodiments, the client agent determines that a tunnel has already been established when the second user connects. In still other embodiments, establishment of site-to-site virtual private networks is provided, allowing machines in either the enterprise IT network 408 or the cloud services and hosting infrastructure 406 to initiate establishment of a connection. In further embodiments, a computing device is configured to automatically authenticate a user (such as an administrator) upon execution of the computing device (for example, when it completes a power-on or boot-up cycle). In such embodiments, the first computing device boots up, authenticates a user, and executes a client agent, which automatically establishes a secure connect, such as a secure VPN tunnel, to a second computing device; the computing devices may be two servers, two clients, or a client and a server and either machine may establish the connection.

In some embodiments, a separate domain is established in the cloud services and hosting infrastructure 406 for servers 106b that communicate with servers 106c in the enterprise IT network 408. In other embodiments, no separate domain is implemented. In still other embodiments, at least one server 106b residing in the cloud services and hosting infrastructure 406 establishes trust relationships and/or VPN sessions with a server 106c in the enterprise IT network 408; such a server may be referred to as a cloud domain controller. In further embodiments, an administrative tool stores credentials used to establish trust relationships and/or VPN sessions.

In one embodiment, an administrative tool is provided to allow a user, such as an administrator, to initially provision a server 106b. In another embodiment, a user identifies a number of servers to provision (such as a number of cloud domain controllers or a number of resource servers 106b). In still another embodiment, the administrative tool includes an interface allowing a user to configure at least one server 106b. In yet another embodiment, the administrative tool includes an interface allowing a user to provide configuration data associated with the server 106c in the enterprise IT network 408.

Figure 5E:
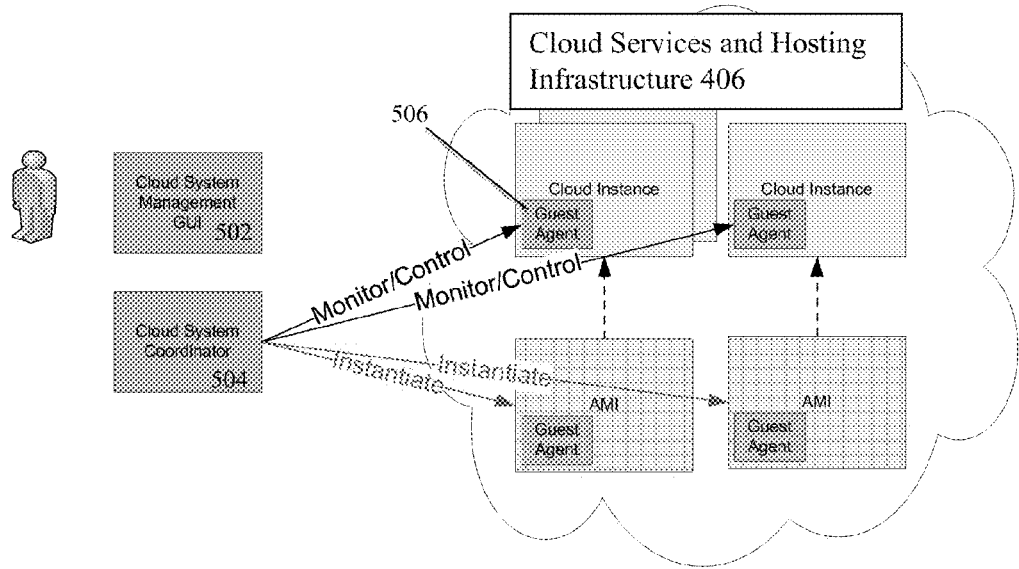
FIG. 5E is a block diagram depicting one embodiment of a system including a cloud services and hosting infrastructure, a cloud system management interface, and a cloud system coordination component.

Referring now to FIG. 5E, a block diagram depicts one embodiment of a system including a cloud services and hosting infrastructure, a cloud system management interface 502, and a cloud system coordination component 504. In some embodiments, management of cloud services provided by the cloud services and hosting infrastructure 406 on behalf of an enterprise IT network 408 include complex operations. In one of these embodiments, for example, operations may include multiple sequenced steps for a single server 106b—such as, for example, instantiating a machine image, executing a machine based upon the machine image, provisioning at least one storage resource and associating the provisioned at least one storage resource with the server, and provisioning and associating an IP address with the server. In another of these embodiments, and as another example, operations may include coordinated steps taken between multiple servers 106b—such as, for example, executing a domain controller server, associating a user profile store with the domain controller server, and instantiating at least one resource server associated with the domain controller server.

In one embodiment, the cloud system coordination component 504 executes on a server 106c in the enterprise IT network 408. In another embodiment, the cloud system coordination component 504 executes on a client machine 102. In still another embodiment, the cloud system coordination component 504 executes on a server 106c in the cloud services and hosting infrastructure 406. In yet another embodiment, the cloud system coordination component 504 provides functionality allowing a user to perform management operations in a cloud computing environment; for example, the cloud system coordination component 504 includes functionality for performing the operations described in the examples above. In some embodiments, the cloud system coordination component 504 and the cloud system management interface 502 are provided by the cloud bridge 402. In other embodiments, the cloud system coordination component 504 and the cloud system management interface 502 are in communication with the cloud bridge 402.

In one embodiment, the cloud system management interface 502 provides an interface allowing a user to interact with and execute functionality provided by the cloud system coordination component 504. In another embodiment, the cloud system management interface 502 is a graphical user interface. In still another embodiment, the cloud system management interface 502 is a tool such as the CITRIX WORKFLOW STUDIO tool. In still even another embodiment, the cloud system management interface 502 is a customized interface tool including interface elements allowing users to start, stop, or monitor the health of a machine in a cloud services and hosting infrastructure 406. In yet another embodiment, the cloud system management interface 502 includes at least one script for executing functionality provided by the cloud system coordination component 504.

In some embodiments, a guest agent 506 is provided for execution on a machine in the cloud services and hosting infrastructure 406. In one of these embodiments, the guest agent 506 provides a communication channel between the cloud system coordination component 504 and the machine in the cloud services and hosting infrastructure 406. In another of these embodiments, the guest agent 506 provides a control and monitoring channel allowing the cloud system coordination component 504 to monitor a machine in the cloud services and hosting infrastructure 406. In still another of these embodiments, the guest agent 506 provides a control and monitoring channel allowing the cloud system coordination component 504 to control the execution of functionality provided by a machine in the cloud services and hosting infrastructure 406. In yet another of these embodiments, a machine image for a machine in the cloud services and hosting infrastructure 406 may include a hooking mechanism that modifies the machine to allow execution of the guest agent 506 or to implement functionality on behalf of the guest agent 506.

In some embodiments, the guest agent 506 retrieves data or metadata during instantiation of a machine image. In one of these embodiments, the cloud system coordination component 504 provides user data to a machine in the cloud services and hosting infrastructure 406 during instantiation of the machine image. In other embodiments, a script executing on behalf of the cloud system coordination component 504 retrieves the data or metadata.

Referring back to FIG. 4B, and in some embodiments, a resource server 106c residing on the enterprise IT network 408 executes a virtual machine that provides users with access to branch office services. In one embodiment, a branch office service includes, without limitation, a file server, a print server, a telephony server providing IP-based phone services, and a web server. In another embodiment, a branch office service includes, without limitation, a network server such as a domain name server (DNS) or a dynamic host configuration protocol (DHCP) server. In still another embodiment, a branch office service includes, without limitation, a presentation service such as an application server that executes applications and transmits application output data to a client machine 102 for display to a user. In still another embodiment, a branch office service includes, without limitation, a resource delivery server delivering resources such as applications, desktops computing environments, and virtual machines, to a client machine 102 for execution on the client machine 102; such a resource delivery server may implement methods for application streaming to deliver resources. In some embodiments, by encapsulating a set of branch office services into a virtual machine, the methods and systems described herein provide centralization of service management via a data center 404 or a cloud services and hosting infrastructure 406. In one of these embodiments, services may be distributed as virtual appliances but streamed or otherwise delivered to physical or virtual devices. In another of these embodiments, the methods and systems described herein provide functionality for local (enterprise IT network 408) acceleration of applications when a client machine 102 connects to a resource server 106c for access to an application, which may improve performance as compared to a system in which most client requests for access to services are redirected to a cloud services and hosting infrastructure 406. In still another of these embodiments, and by way of example, a point-of-sale retail organization may have a low bandwidth network connection to a corporate office and, by implementing the methods and systems described herein, may provide users with access to locally cached services and resources, while benefiting from centralized hosting and management.

Figure 6A:
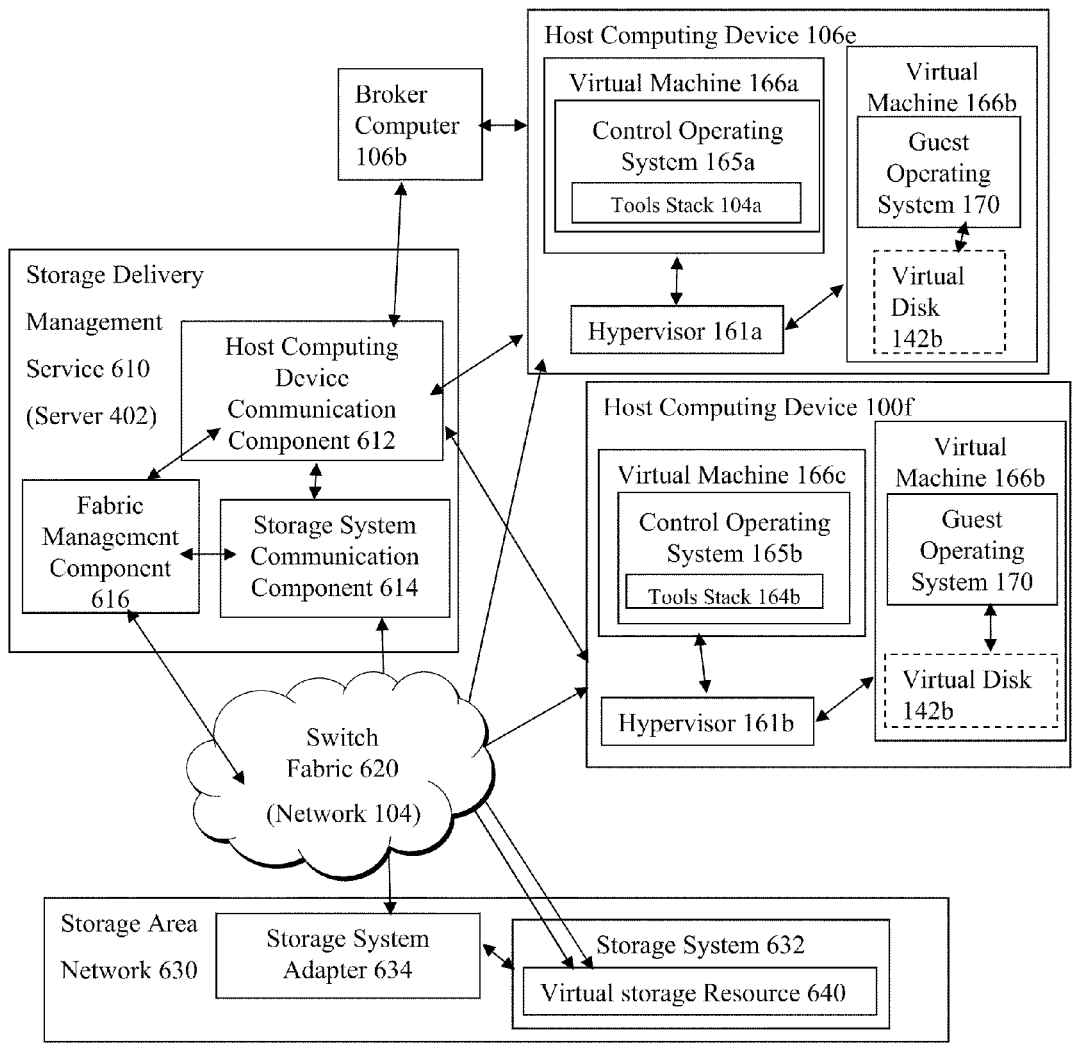
FIG. 6A is a block diagram depicting an embodiment of a system for automated provisioning, by a storage delivery management service, of virtual machines in a cloud computing environment.

Referring now to FIG. 6A, a block diagram depicts one embodiment of a system for automated provisioning, by a storage delivery management service, of virtual machines in a cloud computing environment. In brief overview, the system includes a storage delivery management service 610, a host computing device communication component 612, a storage system communication component 614, a storage area network 630, and a storage system 632. The system may include a fabric management component 616. The system may include a plurality of computing devices 100, a plurality of virtual machines 166, a plurality of hypervisors 161, and a plurality of communications components. It should be understood that the system may optionally provide multiple ones of any or each of those components. The plurality of computing devices 100 may each be provided as computing devices 100, described above in connection with FIGS. 1A-D.

The storage system communication component 614 executed by the storage delivery management service 610, communicates with a storage system adapter 634 in a storage area network 630 to identify a storage system 632 in the storage area network 630, and directs the automated provisioning of a virtual storage resource 640 on the identified storage system 632, the storage system 632 providing resources for provisioning the virtual storage resource 640. The host computing device communication component 612 receives a request for access by a host computing device 106e to the virtual storage resource 640, and responds, to the host computing device 106e, with an identification of a network port of the identified storage system 632 and an identification of the provisioned virtual storage resource 640.

Referring now to FIG. 6A, and in greater detail, the system includes a storage delivery management service 610. In one embodiment, the storage delivery management service 610 is referred to as a virtual storage manager service. In some embodiments, the storage delivery management service 610 is a computer program executing on a server 106 or other computing device 106 to provide automated provisioning functionality. In other embodiments, the storage delivery management service 610 is a hardware server 106 providing automated provisioning functionality. In further embodiments, the storage delivery management service 610 executes within a virtual machine executing on a computing device 100, such as a server 106.

In one embodiment, the host computing device communication component 612, the storage system communication component 614, the fabric management component 616, and other communications components are provided as part of the storage delivery management service 610. In another embodiment, at least one communication component or management component is provided as a plug-in, module, or other self-contained executable file or program intended to operate within the larger, host program of the storage delivery management service 610. In still another embodiment, the storage delivery management service 610 may include one or more interfaces for communicating with each of the components. In some embodiments, a communication component, such as the host computing device communication component 612, the storage system communication component 614, or the fabric management component 616, may be provided as byte code, such as an application written in the byte code programming language JAVA.

In one embodiment, the storage delivery management service 610 includes an administration console. In another embodiment, the storage delivery management service 610 is in communication with an administration console. In still another embodiment, the administration console includes a user interface accessible over a network 104; for example, the system may include a web-based graphical user interface for accessing the functionality of the storage delivery management service 610 through the administration console. In still even another embodiment, a user, such as a network administrator, accesses the administration console to request services provided by the storage delivery management service 610. In yet another embodiment, the administration console is provided as a MICROSOFT Management Console (MMC)-based graphical user interface for interacting with the functionality provided by the storage delivery management service 610.

In one embodiment, the storage delivery management service 610 includes an interface for interacting with the administration console. In another embodiment, the storage delivery management service 610 includes an interface for receiving, across a network 104, requests for services or functionality provided by the storage delivery management service 610. For example, the storage delivery management service 610 may provide a web services interface communicating with computing devices 100 according to a Simple Object Access Protocol (SOAP), or according to a framework such as .NET, which includes a library of pre-coded solutions to common programming problems and a virtual machine that manages the execution of programs written specifically for the framework. In some embodiments, the storage delivery management service 610 provides a central interface in a service-oriented architecture for communicating with other computing devices in the system.

In some embodiments, the storage delivery management service 610 and the administration console execute on a single server 106. In other embodiments, the storage delivery management service 610 and the administration console execute on separate servers 106. In further embodiments, the storage delivery management service 610 and the administration console execute on separate virtual machines within a single server 106.

In one embodiment, the host computer 106e and the host computer 106f reside on a first network 104a and the storage area network 630 resides on a second network 104b. In another embodiment, the host computer 106e and the host computer 106f communicate with one or more storage systems 632 in the storage area network 630 across a network 104, which may be provided as a switch fabric 620. In still another embodiment, the switch fabric 620 is part of the storage area network 630. In yet another embodiment, the switch fabric 620 is a network 104.

In some embodiments, the switch fabric 620 is an interconnected network of switching devices. In one of these embodiments, the switch fabric 620 contains a plurality of input and output ports for communicating with a switch in the network of switching devices. In another of these embodiments, the switch fabric 620 is an interconnect architecture for redirecting data within a system from one of the ports in a line card to another port in a different line card. In other embodiments, the switch fabric 620 is a combination of hardware and software and may include the switching units (individual boxes) in a node, the integrated circuits that they contain, and the programming that allows switching paths to be controlled.

In some embodiments, the storage system adapter 634 resides on a server 106g in the storage area network 630. In other embodiments, the storage system adapter 634 is an interface through which external components may retrieve data about the storage area network 630, such as an identification of a storage system 632, an identification of functionality or resources provided by a storage system 632, or a status of a storage system 632. In further embodiments, a provider of a storage system 632 provides a storage system adapter 634 for communicating with the server.

Figure 6B:
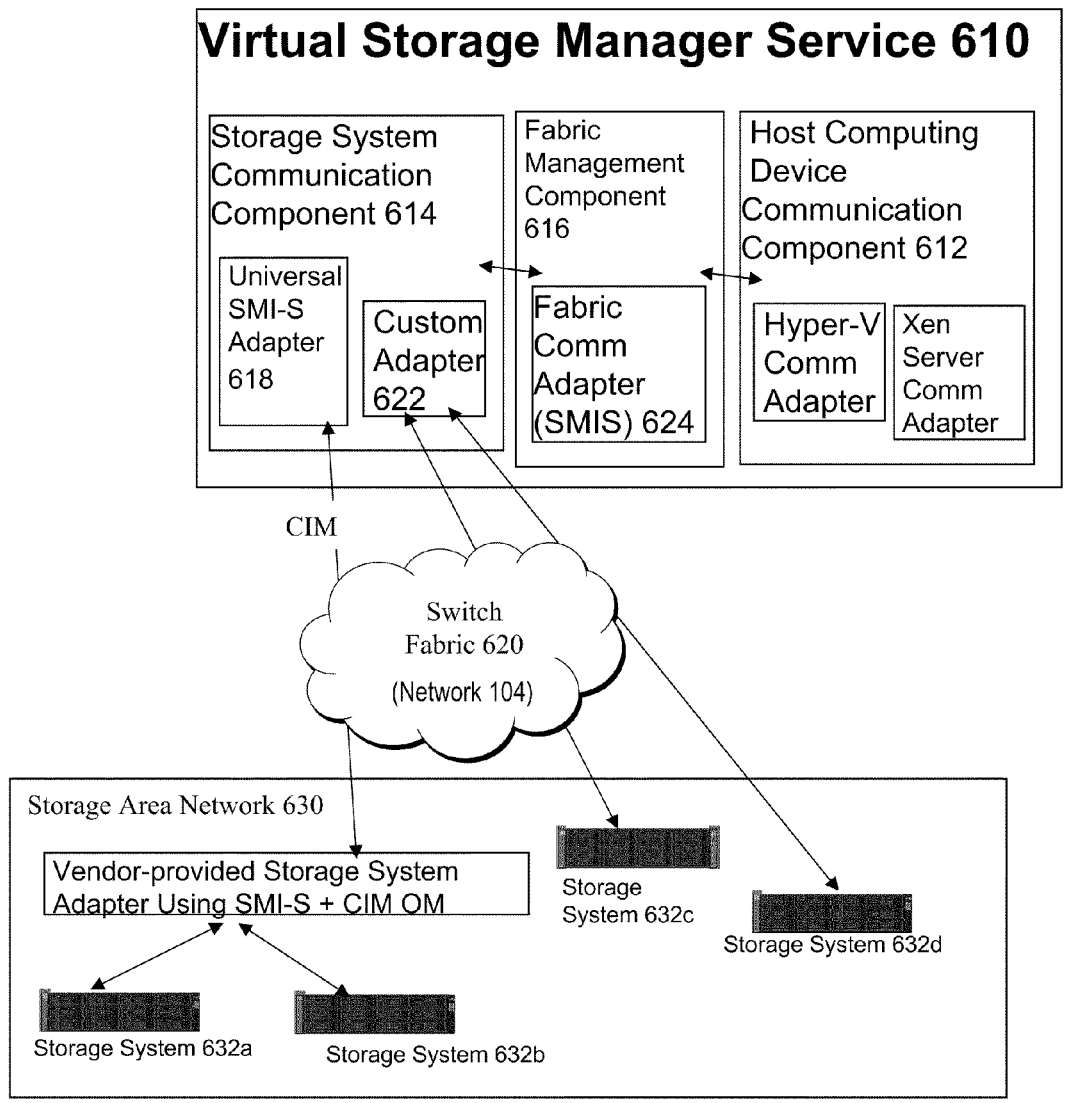
FIG. 6B is a block diagram depicting an embodiment of a system in which a storage delivery management service includes a storage system communication component.

Referring now to FIG. 6B, a block diagram depicts one embodiment of a storage delivery management service 610 including a storage system communication component 614. In some embodiments, the storage system communication component 614 includes at least one storage adapter for communicating with a storage system 632. In one of these embodiments, the storage adapter communicates with the storage adapter 634 provided by the storage system 632. In another of these embodiments, the storage system communication component 614 includes an adapter using an application programming interface to communicate with the storage adapter 632. In still another of these embodiments, the storage adapter provided as part of the storage system communication component 614 and the storage adapter 634 provided by the storage system 632 communicate according to a storage system adapter protocol, such as the Web-Based Enterprise Management protocol (WBEM), which provides a standard mechanism for retrieving data from storage systems. In some embodiments, the storage adapter provided by the storage system communication component 614 uses a standard protocol to retrieve Common Information Model Object Manager (CIM OM) data associated with a storage system 632a or 632b. In other embodiments, a provider of a storage system 632c or 632d creates a custom storage system adapter 622 and provides the custom storage system adapter 622 to the storage delivery management service 610 for use in communicating with a storage system 632c or 632d, or with the storage adapter 634.

In one embodiment, a storage system 632 includes one or more hardware devices storing data and providing access to stored data. In another embodiment, the storage system 632 is referred to as a storage array. In still another embodiment, the storage system 632 includes a partition on one or more hardware devices; for example, a plurality of hardware devices may each include a physical storage element (such as a disk drive) on which each of the plurality of hardware devices reserve a portion (such as a partition) for storing data for a particular host computing device 106. In yet another embodiment, a plurality of hardware devices in a storage area network 630 from which a storage system 632 may be created is referred to as a storage pool.

In one embodiment, the storage system 632 creates and stores a virtual storage resource for access by a remotely-located computing device 106. In another embodiment, the virtual storage resource may be a virtual disk for use by a virtual machine executing on a host computing device 106e. In still another embodiment, the virtual storage resource may be referred to as a storage node.

In one embodiment, one or more hardware devices in the storage system 632 are storage devices such as those provided by EMC Corporation of Hopkinton, Mass., Emulex Corporation of Costa Mesa, Calif., Fujitsu Siemens Computers GmBH of Maarssen, The Netherlands, Hewlett-Packard Company, of Palo Alto, Calif., Hitachi, Ltd., of Tokyo, Japan, IBM Corporation of Armonk, N.Y., NetApp, Inc., of Sunnyvale, Calif., NexSan Technologies of Thousand Oaks, Calif., Quantum Corporation, of San Jose, Calif., and Sanrad, Inc., of Mahwah, N.J.

In one embodiment, the storage system communication component 614 receives a request for provisioning of a virtual storage resource 640. The storage system communication component 614 communicates with a storage system adapter 634 in a storage area network 630 to identify a storage system 632 in the storage area network 630. In one embodiment, the storage system communication component 614 uses an application programming interface to communicate with the storage system adapter 634.

The storage system communication component 614 directs the automated provisioning of a virtual storage resource 640 on the identified storage system 632, the storage system 632 providing resources for provisioning the virtual storage resource 640. In one embodiment, the storage system communication component 614 transmits, to the identified storage system 632, an identification of the at least one network port on the first computing device 106e to associate with the virtual storage resource 640. In one embodiment, the storage system communication component 614 transmits, to the identified storage system 632, an identification of at least one network port on a second computing device 106f, to which a virtual machine accessing the virtual storage resource 640 has migrated.

In some embodiments, the storage system communication component 614 configures the storage system 632 to communicate, according to a first communications protocol, with a first physical computing device executing a virtual machine. In one of these embodiments, the storage system communication component 614 includes functionality for requesting from at least one of the storage system 632 and the storage system adapter 634 an enumeration of communications protocols supported by the storage system 632; for example, the storage system communication component 614 may transmit an instruction to the storage system adapter 634 to request CIM OM data from the storage system 632 identifying supported communications protocols. In another of these embodiments, the storage system communication component 614 configures the storage system 632 to communicate, according to a second communications protocol, with a second physical computing device executing a virtual machine. In still another of these embodiments, the first and second communications protocols are the same protocols. In yet another of these embodiments, the first and second communications protocols are different protocols.

In other embodiments, the storage system communication component 614 receives a notification of a migration of the virtual machine from the first physical computing device, to the second physical computing device. In one of these embodiments, the storage system communication component 614 configures the storage system 632 to communicate, according to the second communications protocol, with the second physical computing device upon receiving the notification.

In further embodiments, the storage system communications component 614 provides the host computing device communication component 612 an identification of a communication protocol supported by both a computing device 106 and a storage system 632. In one of these embodiments, the host computing device communication component 612 transmits, to a computing device 106, an identification of the storage system providing access to a provisioned virtual resource. In another of these embodiments, the host computing device communication component 612 transmits, to a computing device 106, an identification of a communication protocol for use in communicating with the storage system 632.

Figure 6C:
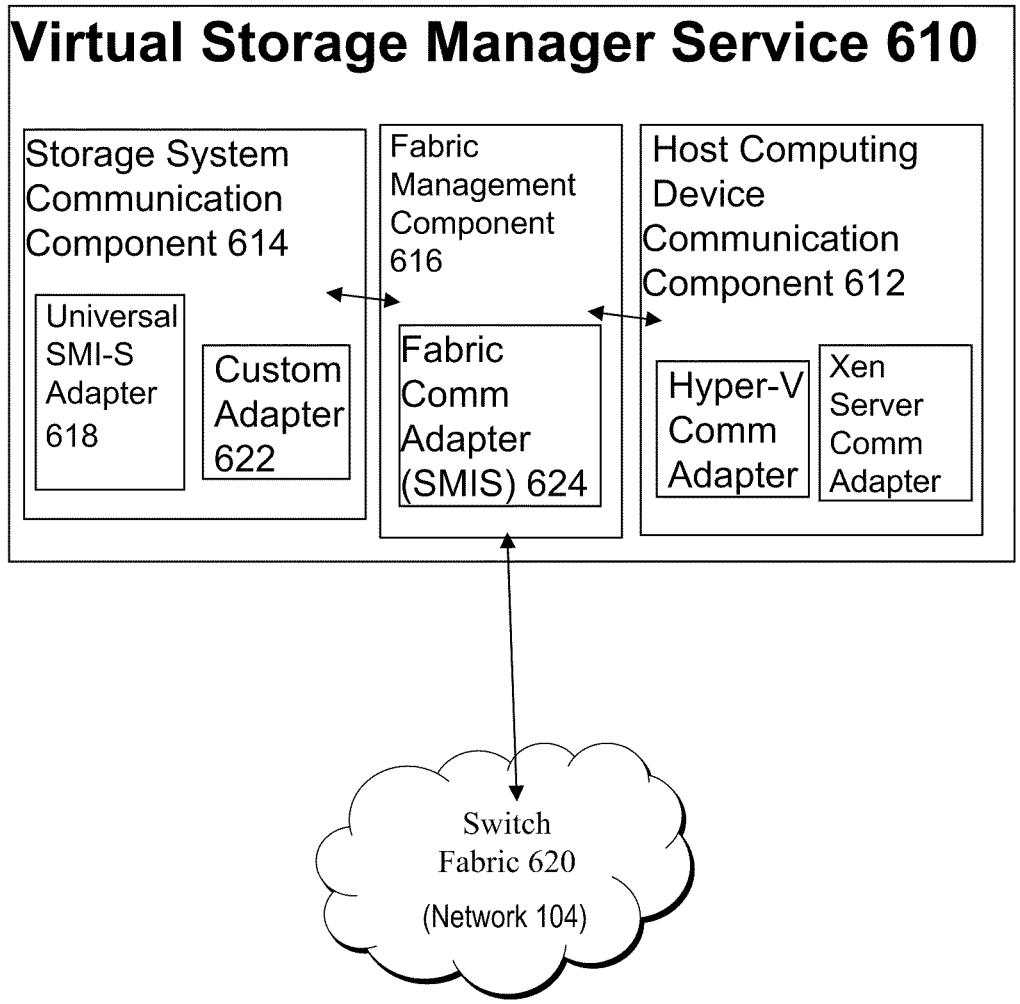
FIG. 6C is a block diagram depicting one embodiment of a system in which the storage delivery management service includes a fabric management component.

Referring now to FIG. 6C, a block diagram depicts one embodiment of a system in which the storage delivery management service 610 includes a fabric management component 616. In one embodiment, the fabric management component 616, executed by the storage delivery management service 610, generates, on at least one switch in a switch fabric 620, an access control list including the identification of at least one networking port of the identified storage system 632 and an identification of at least one network port on a host computing device 106. As shown in FIG. 6C, the fabric management component 616 communicates with the switch fabric 620. In some embodiments the storage area network 630 includes the switch fabric 620. In one of these embodiments, the storage area network 630 is both the switch fabric 620 and one or more networked storage systems 632. In other embodiments, the storage area network 630 is a network of storage systems 632 and the switch fabric 620 is a separate network from the storage area network 630. In one of these embodiments, the switch fabric 620 is a network 104 that connects the storage area network 630 to a host computing device 106—or to a network 104a on which the host computing device 106 resides. Although depicted as separate elements in FIGS. 6A, 6B and 6C, in some embodiments, the storage area network 630 is a single network including both a plurality of storage systems 632 and a plurality of switches forming a switch fabric 620. In some embodiments, the storage area network 630 is a network providing network-attached storage.

In one embodiment, the switch fabric 620 includes one or more Fibre Channel switches. In another embodiment, the switch fabric 620 includes switches communicating according to the Internet Small Computer System Interface (iSCSI) protocol. The switch fabric 620 may be heterogeneous, including switches that communicate according to either Fibre Channel protocols or Internet Small Computer System Interface (iSCSI) protocols. In another embodiment, a switch in the switch fabric 620 routes data received from servers 106 or other computing devices 100 that are associated with one or more storage systems 632 to a network port on a particular storage system 632.

In some embodiments, the switch fabric 620 includes a switch fabric controller. In one of these embodiments, the switch fabric controller includes a storage system adapter 634 with which components outside of the storage area network 630—such as the fabric management component 616 or the storage system communication component 614—may communicate. In another of these embodiments, the storage system adapter 634 resides on the storage system 632. In other embodiments, the switch fabric 620 includes a fabric name server with which the fabric management component 616 communicates.

In some embodiments, the fabric management component 616 includes a fabric communication adapter 624. In one of these embodiments, the fabric manager component 616 includes a Fibre Channel Host Bus Adapters (HBAs). In one of these embodiments, the Fibre Channel HBA handles the processing of the Fibre Channel stack using onboard Application-Specific Integrated Circuits (ASICs). In other embodiments, the fabric management component 616 modifies zoning information stored by the switch fabric. In still other embodiments, a zone control interface provided by a fabric management component in the switch fabric 620 allows the fabric management component 616 to create and modify zoning information. In further embodiments, the fabric management component 616 communicates with a switch in the switch fabric 620 according to a standard, such as the Storage Management Initiative Specification (SMI-S) to access data, which may also be formatted and retrieved according to a standard, such as CIM OM. In one of these embodiments, the switch in the switch fabric 620 executes a management service providing an application programming interface with which the fabric management component 616 interacts.

Zones include identifications of devices such as storage systems 632 and the host computing devices 100 authorized to access data stored by one or more storage systems 632. Identifications of devices may include unique identifiers of the device itself, such as its unique World Wide Name (WWN), or of a port on the device, such as a network port for a storage system 632. Typically, devices that communicate with each other—such as a storage system 632 and the host computing devices 100 authorized to access data stored by the storage system 632—are identified on a zone list, which may also be referred to as an access control list. In some embodiments, if a device is not identified on the zone list, it will not be allowed to access data stored by other devices on the zone list. In other embodiments, the zone list includes an identification of a partition on a storage system 632—for example, a logical unit or virtual disk or other virtual storage resource may be provided on one of a plurality of partitions on the storage system 632 and a port is assigned to each such partition for use in identifying the partition in an access control list. Such functionality is typically referred to as LUN masking. In one embodiment, when a host computing device 106 or server 402 communicates with or about a storage system 632—for example, to request an identification of the storage system 632, to modify an access control list identifying the storage system 632, or to access data provided by one or more storage systems—the computing device requests an identification of each of the devices listed on any access control list that also identifies the requesting computing device.

In some embodiments, the fabric management component 616 provides functionality for dynamically modifying access control lists to include identifications of virtual machines authorized to access a storage system 632. In another of these embodiments, the fabric management component 616 provides functionality for dynamically modifying access control lists to include identifications of host computing devices 100 authorized to access a storage system 632. In still another of these embodiments, the fabric management component 616 provides functionality for dynamically modifying access control lists to include identifications of host computing devices 100 executing virtual machines authorized to access a storage system 632. In yet another of these embodiments, the fabric management component 616 provides functionality for modifying an access control list identifying a network port of a first computing device executing a virtual machine to include an identification of a network port on a second computing device to which the virtual machine has migrated.

In other embodiments, the fabric management component 616 is optional. In one of these embodiments, for example, the storage delivery management service 610 interacts with a storage area network 630 providing functionality according to the iSCSI protocol instead of according to the Fibre Channel standards, in which case fabric management is not required because the storage delivery management service 610 and host computing devices 100 communicate directly with storage systems 632 without requiring modification to or management of a switch fabric 620.

Figure 6D:
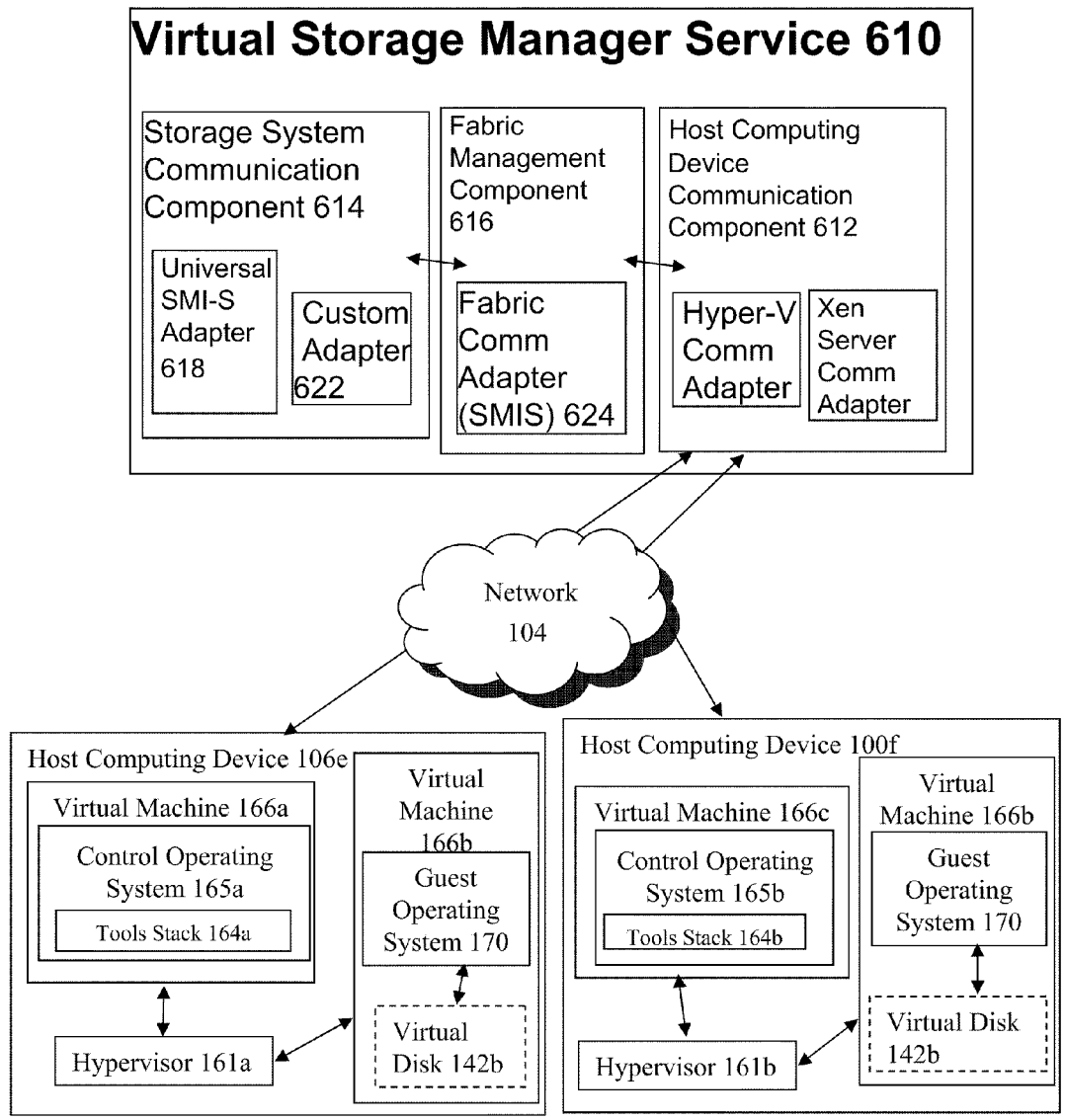
FIG. 6D is a block diagram depicting one embodiment of a system in which the storage delivery management service includes a host computing device communication component.

Referring now to FIG. 6D, a block diagram depicts one embodiment of a system in which the storage delivery management service 610 executes the host computing device communication component 612. The host computing device communication component 612 receives a request for access, by a host computing device 106, to the virtual storage resource 640. The host computing device communication component 612 responds to the request with the identification of a network port of the identified storage system 632 and an identification of the provisioned virtual storage resource 640. In some embodiments, a host computing device 106 communicates directly with a storage system 632 using the identified network port of the identified storage system 632. In other embodiments, the host computing device 106 communicates with a storage system 632 through a storage network 630, which may include the switch fabric 620.

In some embodiments, the host computing device communication component 612 includes a communication adapter for communicating with a host computing device 106. In other embodiments, the host computing device communication component 612 includes a communication adapter for communicating with a virtual machine 166*a* executing on a host computing device 106. In one of these embodiments, the computing device 106 includes a hypervisor, which receives communication data from the host computing device communication component 612 and transmits the received communication data to the control operating system 165 in the virtual machine 166*a* for processing. In another of these embodiments, the virtual machine 166*a* transmits a response from the control operating system 165 to the host computing device communication component 612. In still another of these embodiments, the control operating system 165 and the host computing device communication component 612 exchange communication related to the provisioning or management of a virtual machine 166*b* executing on the computing device 106. As described above in connection with FIG. 1A, a hypervisor may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, the host computing device communication component 612 includes a communication adapter for transmitting data to a hypervisor. In one of these embodiments, and as depicted in FIG. 6D, the host computing device communication component 612 includes a separate communication adapter for transmitting data to each different kind of hypervisor. In another of these embodiments, the host computing device communication component 612 includes a universal communication adapter (not depicted) for transmitting data to each different kind of hypervisor.

In some embodiments, the host computing device communication component 612 receives, from a broker server 100*a*, a request for provisioning of the virtual storage resource for the computing device 106*e* comprising at least one network port. In one of these embodiments, the host computing device communication component 612 transmits the request to the storage system communication component 614. In another of these embodiments, the host computing device communication component 612 transmits, to the broker server 100*a*, an identification of the provisioned virtual resource 640. In still another of these embodiments, the host computing device communication component 612 includes an interface for receiving requests from the broker server 101*a*; for example, the interface may be a graphical user interface displayed to a user of the broker server 100*a* over a network connection, or a web services interface, such as the SOAP/.NET interfaces described above. In other embodiments, the host computing device communication component 612 communicates with a control operating system 165. In still other embodiments, the host computing device communication component 612 accesses an application programming interface to communicate with the host computing devices 100.

In some embodiments, the storage delivery management service 610 executes a virtual machine migration component (not depicted). In one of these embodiments, the virtual machine migration component receives an indication of a migration of the virtual machine from the first computing device 106*e* to the second computing device 106*f*. In another of these embodiments, the virtual machine migration component receives a request for a migration of the virtual machine from the first computing device 106*e* to the second computing device 106*f*. In still another of these embodiments, the virtual machine migration component receives an identification of at least one network port on the second computing device 106*f*. In still another of these embodiments, the virtual machine migration component transmits the identification of the at least one network port on the second computing device 106*f* to the storage system communication component 614; the storage system communication component 614 may transmit, to the storage system 632, the identification of the at least one network port on the second computing device 106*f* to associate with the virtual storage resource 640. In still even another of these embodiments, the virtual machine migration component transmits the identification of the provisioned virtual storage resource 640 and the identification of the at least one network port of the storage system 632 to the second computing device 106*f*. In yet another of these embodiments, the virtual machine migration component transmits the identification of the at least one network port of the storage system 632 and the identification of the at least one network port on the second computing device 106*f* to the fabric manager communication component 616. In further embodiments, the fabric management component 616, executed by the storage delivery management service 610, generates, on at least one switch in a switch fabric 620, an access control list including the identification of at least one networking port of the identified storage system 632 and an identification of at least one network port on the host computing device 106*e* or 106*f*.

In some embodiments, the virtual machine migration component provides functionality for storing a state of execution of a virtual machine on a computing device 106e. In one of these embodiments, the virtual machine migration component transmits an instruction to terminate execution of the virtual machine. In another of these embodiments, the virtual machine migration component migrates the stored state of execution of the virtual machine and a virtual machine image associated with the terminated virtual machine to a second computing device 106f. In other embodiments, the virtual machine migration component is provided by a control operating system 165 that executes within a virtual machine 166 hosted on the same server 106 as the storage delivery management service 610. In further embodiments, the virtual machine migration component is provided by a control operating system 165 that executes within a virtual machine 166 hosted on a server 106 and is in communication with the storage delivery management service 610.

In some embodiments, the host computing device communication component 612 includes the virtual machine migration component. In other embodiments, the host computing device communication component 612 provides the functionality provided by the virtual machine migration component.

In some embodiments, a host computing device 106e and a host computing device 106f reside on a network 104a. In one of these embodiments, the host computing devices 100 execute virtual machines providing a computing environment to a user of the host computing device 106. In another of these embodiments, the virtual machines execute resources and transmit output data generated by the resources to a client computer 102 for a display on the client computer 102 to a user of the client computer 102. The client computer 102 may reside on the same network 104a as the host computing devices 100, or on a separate network 104b. In other embodiments, the host computing device 106 retrieves data needed to execute a virtual machine—for example, a virtual machine image or virtual storage resource—from a computing device 106 residing on the network 104. In still other embodiments, however, the host computing device 106 retrieves data needed to execute the virtual machine from a storage system 632 in the storage network 630, which may be a network 104c. In further embodiments, a provider of the host computing device 106 is a customer of a provider of the storage area network 630, receiving storage services from the provider of the storage area network 630. In one of these embodiments, the storage service provider may be providing storage services over one or more networks 104 (such as the storage area network 630, the switch fabric 620, and other intermediate networks 104b between the storage service provider and the provider of the host computers 100). In such an embodiment, the storage service provider may be said to be providing cloud computing services, since they are providing access to storage resources and storage services over the "cloud" of the Internet.

Figure 7:
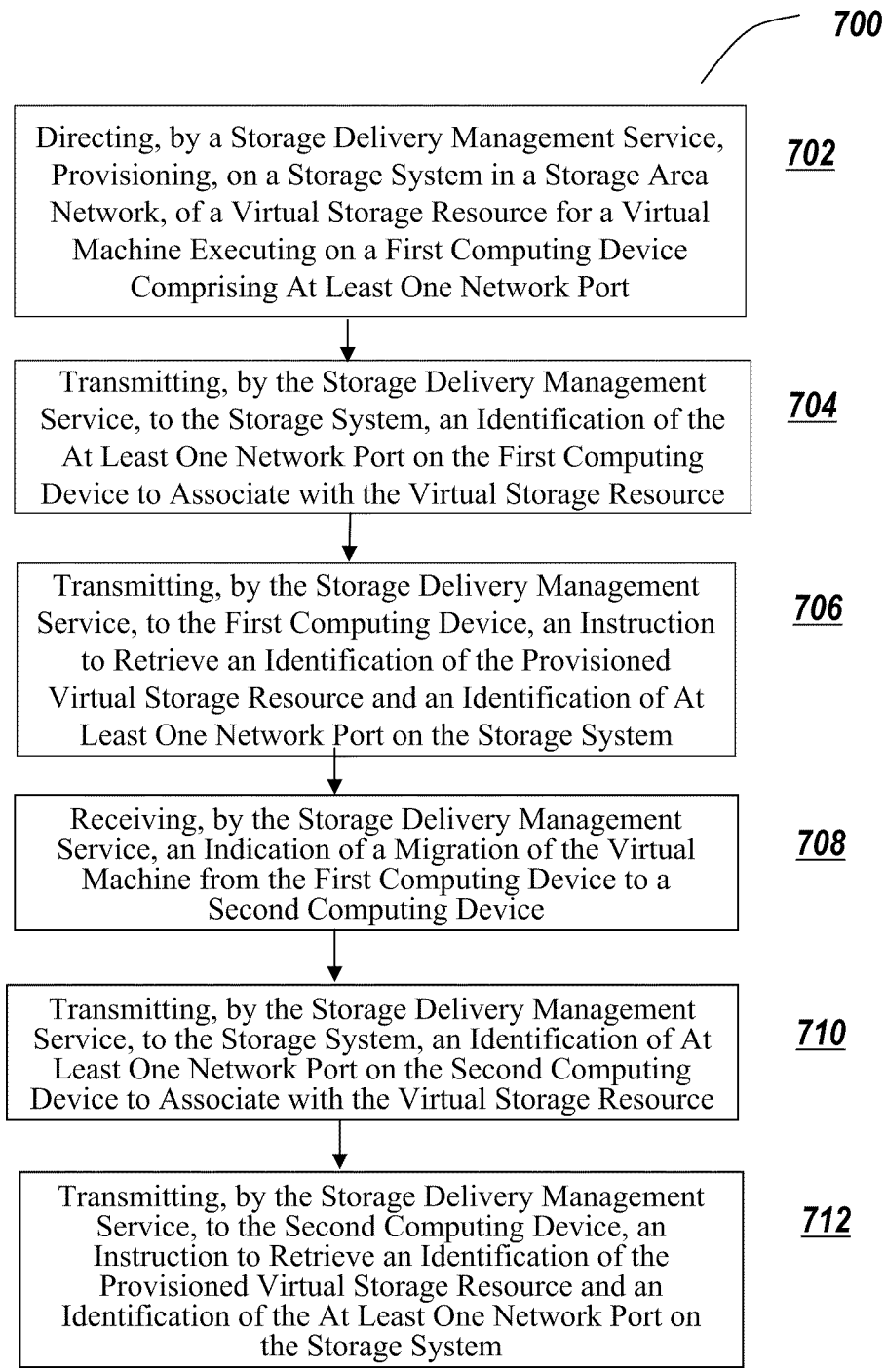
FIG. 7 is a flow diagram depicting an embodiment of a method for automated provisioning, by a storage delivery management service, of virtual machines in a cloud computing environment.

Referring now to FIG. 7, a flow diagram depicts one embodiment of a method for automated provisioning of virtual resources in a cloud computing environment. In brief overview, the method 700 includes directing, by a storage delivery management service, provisioning, on a storage system in a storage area network, of a virtual storage resource for a virtual machine executing on a first computing device comprising at least one network port (702). The method includes transmitting, by the storage delivery management service, to the storage system, an identification of the at least one network port on the first computing device to associate with the virtual storage resource (704). The method includes transmitting, by the storage delivery management service, to the first computing device, an instruction to retrieve an identification of the provisioned virtual storage resource and an identification of at least one network port on the storage system (706). The method includes receiving, by the storage delivery management service, an indication of a migration of the virtual machine from the first computing device to a second computing device (708). The method includes transmitting, by the storage delivery management service, to the storage system, an identification of at least one network port on the second computing device to associate with the virtual storage resource (710). The method includes transmitting, by the storage delivery management service, to the second computing device, an instruction to retrieve an identification of the provisioned virtual storage resource and an identification of the at least one network port on the storage system (712).

Referring now to FIG. 7, and in greater detail, a storage delivery management service 610 directs provisioning, on a storage system 632 in a storage area network 630, of a virtual storage resource 640 for a virtual machine 166 executing on a first computing device 106e comprising at least one network port (702). In some embodiments, the storage delivery management service 610 receives a request for provisioning of the virtual storage resource for the first computing device comprising at least one network port. In one of these embodiments, the storage delivery management service 610 receives the request for provisioning of the virtual storage resource 640 from a broker server 106a on behalf of a computing device 106e; the computing device 106e includes at least one network port. In another of these embodiments, the storage delivery management service 610 receives the request for provisioning of the virtual storage resource 640 from a host computing device 106e hosting a virtual machine. In still another of these embodiments, the storage delivery management service 610 identifies a storage system in a storage area network, the storage system providing resources for provisioning the virtual storage resource. In still even another of these embodiments, the storage delivery management service 610 communicates with a storage adapter 634 to identify the storage system 632. In yet another of these embodiments, the storage system communication component 614 requests an identification of an available storage system 632 providing access to resources for provisioning the virtual storage resource; for example, the storage system communication component 614 may request an enumeration of all storage systems 632 that are able to create and store a virtual disk allocated a specified amount of physical disk drive space.

In some embodiments, new virtual storage resources are provisioned. In other embodiments, existing virtual storage resources are re-assigned from one host computing device 106e to a second host computing device 106f. In still other embodiments, a new virtual storage resource is provisioned by copying into the virtual storage resource the contents of an existing virtual storage resource. In one of these embodiments, the existing virtual storage resource is cloned.

In some embodiments, new virtual storage resources are provisioned on a short term basis. In one of these embodiments, for example, a host computing device 106e may request provisioning of additional virtual storage resources to support a virtual machine that requires additional resources—additional virtual disk space, for example—but only on a temporary basis. In another of these embodiments, the virtual machine may have temporarily exceeded its allocated use of a previously provisioned virtual storage resource or begin executing a process which will result in the virtual machine exceeding allocated resources. In still another of these embodiments, virtual storage resources may be provided on a short term basis to support a virtual machine that requires additional resources.

In some embodiments, the storage delivery management service 610 receives a request to implement n_port identification virtualization when provisioning the virtual storage resource. In one of these embodiments, the request includes an identification of a virtual host bus adapter allocated to a virtual machine 166 executing on the computing device. In another of these embodiments, the storage delivery management service 610 receives a request for access to a provisioned virtual storage resource. In another of these embodiments, the storage delivery management service 610 receives a request for provisioning of a virtual storage resource for the virtual machine 166. In still another of these embodiments, the storage delivery management service 610 assigns, to the virtual host bus adapter, a unique identifier. In still even another of these embodiments, the storage delivery management service 610 transmits, to the first computing device 106e, an identification of the unique identifier. In yet another of these embodiments, the storage delivery management service 610 transmits, to the storage system 632, the unique identifier of the virtual host bus adapter. In some of these embodiments, the storage delivery management service 610 transmits, to a switch in the switch fabric 620 an identification of the unique identifier of the virtual host bus adapter for inclusion in an access control list allowing the virtual machine 166 and the storage system 632. In other embodiments, the storage system 632 provides, to the virtual host bus adapter, access to the provisioned virtual storage resource. In further embodiments, the virtual host bus adapter communicates with the storage system 632 to provide, to a virtual machine executing on the first computing device 106e, access to the virtual storage resource.

In some embodiments, the storage delivery management service 610 receives a request for provisioning of the virtual storage resource, identifies a storage system 632 capable of provisioning the requested virtual storage resource, and directs the provisioning of the virtual storage resource. In one of these embodiments, the storage system communication component 614 transmits an instruction to the storage system 632, via the storage system adapter 634, to create the virtual storage resource. In another of these embodiments, the storage system 632 transmits, to the storage system communication component 614, via the storage system adapter 634, an identification of the provisioned virtual storage resource.

In some embodiments, after the virtual storage resource 640 is created, the storage delivery management service 610 communicates with the storage system adapter 634 to request that the storage system 632 assign the new virtual storage resource 640 to one or more ports on the host computing device. In one of these embodiments, this is referred to as Logical Unit Number (LUN) masking and mapping. In another of these embodiments, the storage system 632 is asked to return information needed to identify the assigned virtual storage resource 640. In still another of these embodiments, the host computing device 106e receives a request by the storage delivery management service 610 to connect the virtual storage resource 640 to the appropriate virtual machine. In other embodiments, the storage delivery management service 610 receives an identification of a provisioned storage resource by issuing SCSI inquiry commands to retrieve the various mode pages that store the identification. In one of these embodiments, using that information, the storage delivery management service correlates identification in the mode page to the virtual storage resource 640 created in the storage system 632 via the storage adapter 634.

The storage delivery management service 610 transmits, to the storage system 632, an identification of the at least one network port on the first computing device to associate with the virtual storage resource (704). In one embodiment, a request for provisioning the virtual storage resource included the identification of the at least one network port. In another embodiment, the storage delivery management service 610 transmits, to the storage system 632, an identification of a virtual port associated with a virtual machine executing on the first computing device 106e. In still another embodiment, the storage delivery management service 610 transmits, to the storage system 632, an identification of a physical port associated with a virtual machine executing on the first computing device 106e.

In some embodiments, the storage delivery management service 610 configures the switch fabric 620 to allow the host computing device 106 to access the storage system 632. In one of these embodiments, the fabric management component 616 generates, on at least one switch in a switch fabric, an access control list including an identification of at least one network port on the storage system and an identification of the at least one network port on the computing device. In another of these embodiments, the fabric management component 616 modifies an existing access control list to include an identification of the at least one network port on the computing device. In still another of these embodiments, the fabric management component 616 modifies an existing access control list to include an identification of the at least one network port on the storage system 632.

The storage delivery management service 610 transmits, to the first computing device, an instruction to retrieve an identification of the provisioned virtual storage resource and an identification of at least one network port on the storage system (706). In one embodiment, the first computing device 106e receives a notification that a virtual storage resource has been provisioned for the virtual machine 166 executed by the first computing device 106e. In another embodiment, the first computing device 106e receives, from the storage delivery management service 610, an identification of the storage system 632 provisioning the virtual storage resource. In still another embodiment, the first computing device 106e receives an instruction to request an update to an enumeration of available storage resources. In yet another embodiment, the storage delivery management service 610 transmits, to the broker computing device 106a, an instruction for redirection to the first computing device 106e.

In some embodiments, the first computing device 106e receives an instruction to request an enumeration of available virtual storage resources. In one of these embodiments, the first computing device 106e transmits, to the storage adapter 634, a request for available virtual storage resources. In another of these embodiments, the first computing device 106e transmits, to the storage area network 630, a request for available virtual storage resources. In still another of these embodiments, the first computing device 106e transmits, to the switch fabric 620, a request for available virtual storage resources. In such an embodiment, the switch fabric 620 may retrieve an enumeration of access control lists that list the first computing device 106e—or a network port of the first computing device 106e, or a network port of a virtual machine 166 executed by the first computing device 106e—and provides the first computing device 106e with an enumeration of storage systems 632 that the first computing device 106e may access.

In one embodiment, the first computing device 106e establishes a connection to the identified at least one network port on the storage system 632. In another embodiment, the first computing device 106 requests, from a switch fabric 620, establishment of a connection to the identified at least one network port on the storage system 632. In still another embodiment, at least one switch in the switch fabric 620 establishes a connection between the identified at least one network port on the first computing device and the identified at least one network port on the storage system. In still another embodiment, the first computing device 106e provides, to the virtual machine 166, access to the provisioned virtual storage resource.

The storage delivery management service 610 receives an indication of a migration of the virtual machine from the first computing device to a second computing device (708). In one embodiment, the storage delivery management service 610 receives a request for migration of the virtual machine 166. In another embodiment, the storage delivery management service 610 receives the request from a broker computer 100a. In still another embodiment, the storage delivery management service 610 receives the request from a virtual machine migration component.

The storage delivery management service 610 transmits, to the storage system 632, an identification of the at least one network port on the second computing device to associate with the virtual storage resource (710). In one embodiment, the storage delivery management service 610 transmits, to the switch fabric 620, the identification of the at least one network port on the second computing device to associate with the virtual storage resource. In another embodiment, the storage delivery management service 610 service communicates with at least one switch in the switch fabric 620, to generate or modify an access control list allowing communication between the storage system 632 and the at least one network port on the second computing device. In still another embodiment, the storage delivery management service 610 removes associations between the storage system 632 and the identified network port on the first computing device. In yet another embodiment, the storage delivery management service 610 transmits, to the storage system 632, an identification of the at least one network port, responsive to receiving the request for migration of the virtual machine.

The storage delivery management service 610 transmits, to the second computing device, an identification of the provisioned virtual storage resource and an identification of at least one network port on the storage system (712). In one embodiment, the second computing device 106f establishes a connection with the storage system 632 to access the virtual storage resource, responsive to the received identification of the provisioned virtual storage resource. In another embodiment, the second computing device 106f establishes a connection with the storage system 632 to access the virtual storage resource, responsive to the received identification of the at least one network port on the storage system 632. In still another embodiment, the second computing device 106f requests, from the switch fabric 620, establishment of a connection to the storage system 632. In yet another embodiment, the second computing device 106f provides, to the virtual machine 166b access to the virtual storage resource. In some embodiments, the second computing device 106f retrieves a copy of the virtual storage resource—for example, by making a local copy of a virtual disk stored on the storage system 632, and on which the virtual machine 166b may execute. In other embodiments, the second computing device 106f makes requests for data stored in the virtual storage resource 640, over a network 104, which may include the switch fabric 620, rather than making a local copy of the virtual storage resource.

Figure 8:
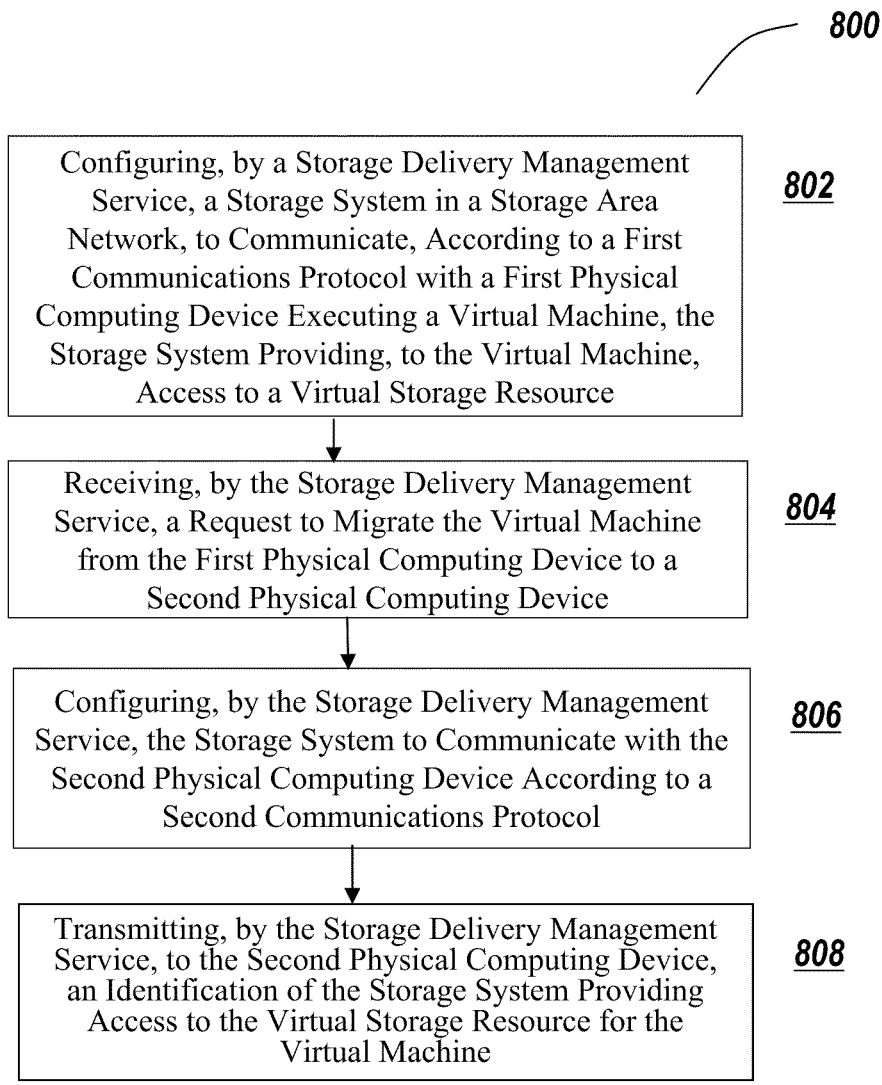
FIG. 8 is a flow diagram depicting an embodiment of a method for dynamically switching between communications protocols.

Referring now to FIG. 8, a flow diagram depicts one embodiment of a method for dynamically switching between communications protocols. In brief overview, the method 400 includes configuring, by a storage delivery management service, a storage system in a storage area network, to communicate, according to a first communications protocol with a first physical computing device executing a virtual machine, the storage system providing, to the virtual machine, access to a virtual storage resource (802). The method includes receiving, by the storage delivery management service, a request to migrate the virtual machine from the first physical computing device to a second physical computing device (804). The method includes configuring, by the storage delivery management service, the storage system to communicate with the second physical computing device according to a second communications protocol (806). The method includes transmitting, by the storage delivery management service, to the second physical computing device, an identification of the storage system providing access to the virtual storage resource for the virtual machine (808).

Referring now to FIG. 8, and in greater detail, the storage delivery management service 610 configures a storage system in a storage area network, to communicate, according to a first communications protocol with a first physical computing device executing a virtual machine, the storage system providing, to the virtual machine, access to a virtual storage resource (802). In one embodiment, the host computing device communication component 612 requests an identification of communications protocols supported by the first physical computing device 106e. In another embodiment, the storage system communication component 614 requests an identification of communications protocols supported by the storage system 632. In still another embodiment, the storage system communication component 614 transmits, to the storage system adapter 634, the request for the identification. In still even another embodiment, the storage delivery management service 610 identifies a communication protocol supported by both the first computing device 106e and by the storage system 632. In yet another embodiment, the storage system communication component 614 identifies a communication protocol supported by both the first computing device 106e and by the storage system 632.

In one embodiment, the storage system communication component 614 configures the storage system 632 to communicate with the first physical computing device 106e according to the first communication protocol in providing access to the virtual storage resource 640. In another embodiment, the storage system communication component 614 transmits, to the storage adapter 634, an identification of the storage system 632, an identification of at least one network port on the first physical computing device 106e, and an identification of a communication protocol to use in communicating with the first physical computing device 106e.

The storage delivery management service 610 receives a request to migrate the virtual machine from the first physical computing device to a second physical computing device (804). In one embodiment, the host computing device communication component 612 receives the request to migrate the virtual machine. In another embodiment, the storage delivery management service 610 receives an identification of a migration process that has begun. In still another embodiment, the migration of the virtual machine depends upon the ability of the storage system 632 to provide access to the virtual storage resource to the second physical computing device 106f; for example, the virtual storage resource may be a virtual disk upon which the virtual machine 166 executes and without which the virtual machine 166 ought not execute.

The storage delivery management service 610 configures the storage system to communicate with the second physical computing device according to a second communications protocol (806). In one embodiment, the storage delivery management service 610 requests, from the second physical computing device 106*f*, an identification of at least one communications protocol supported by the second physical computing device 106*f*. In another embodiment, the host computing device communication component 612 requests, from the second physical computing device 106*f*, an identification of at least one communications protocol supported by the second physical computing device 106*f*. In still another embodiment, the storage delivery management service 610 determines that the second physical computing device 106*f* supports a different communication protocol than the communication protocol supported by the first computing device 106*e*. In still even another embodiment, the storage system communication component 614 receives, from the host computing device communication component 612, a notification of the migration of the virtual machine to the second physical computing device 106*f*. In yet another embodiment, the storage system communication component 614 receives an identification of the communication protocol supported by the second physical computing device 106*f*.

In one embodiment, the storage delivery management service 610 requests, from the storage system 632, an enumeration of communication protocols supported by the storage system 632. In another embodiment, the storage system communication component 614 requests, from the storage system 632, an enumeration of communication protocols supported by the storage system 632. In still another embodiment, the storage delivery management service 610 determines that the storage system 632 supports the communication protocol supported by the second computing device 106*f*.

In some embodiments, the communication protocols that the computing devices use to communicate with the storage system 632 are storage protocols. In one of these embodiments, the storage protocol is a Fibre Channel-based protocol; for example, the storage protocol may be the Fibre Channel Protocol, which is an interface protocol of SCSI on the Fibre Channel, or the Fibre Channel over IP protocol, which provides a tunneling approach and is defined in the Internet Engineering Task Force (IETF) document RFC 3821. In another of these embodiments, the storage protocol is an iSCSI protocol.

The storage delivery management service 610 transmits, to the second physical computing device, an identification of the storage system providing access to the virtual storage resource for the virtual machine (808). In one embodiment, the host computing device communication component 612 transmits, to the second physical computing device 106*f*, the identification of the storage system providing access to the virtual storage resource for the virtual machine. In another embodiment, the host computing device communication component 612 transmits, to the second physical computing device 106*f*, the identification of the communication protocol for use in communicating with the storage system 632. In still another embodiment, the host computing device communication component 612 transmits, to the second physical computing device 106*f*, a confirmation of support by the storage system 632 of a default communication protocol used by the second computing device 106*f*.

In one embodiment, the fabric management component 616 configures an access control list stored by a switch in the switch fabric 620 to include an identification of at least one network port of the second physical computing device 106*f*. In another embodiment, the storage delivery management service 610 transmits an identification to a broker server 106 to migrate the virtual machine to the second physical computing device 106*f*. In still another embodiment, the storage delivery management service 610 migrates the virtual machine to the second physical computing device 106*f*. In some embodiments, the migration occurs as the virtual machine continues to execute; this may be referred to as live migration. In other embodiments, the migration occurs after a state of execution of the virtual machine has been stored and execution of the virtual machine terminates. In further embodiments, the storage delivery management service 610 disables access, by the first physical computing device 106*e*, to the virtual storage resource provided by the storage system 632. In one of these embodiments, the storage delivery management service 610 transmits, via the storage system adapter 634, to the storage system 632 an indication that the first physical computing device 106*e*—or a network port of the first physical computing device 106*e*—is no longer authorized to access the virtual storage resource. In another of these embodiments, the storage delivery management service 610 transmits, via the fabric management component 616, a request to a switch in the switch fabric 620 to remove the first physical computing device 106*e*—or a network port of the first physical computing device 106*e*—from an access control list associating the first physical computing device 106*e* with the storage system 632.

In some embodiments in which a virtual machine is migrated from one physical computing device 106*e* to a second physical computing device 106*e*, the migration occurs between heterogeneous machines providing different functionality and supporting different communications protocols. In one of these embodiments, the methods and systems described herein provide functionality for dynamically switching communication protocol configurations on storage systems accessed by the virtual machine, resulting in improved migration processes.

Figure 9A:
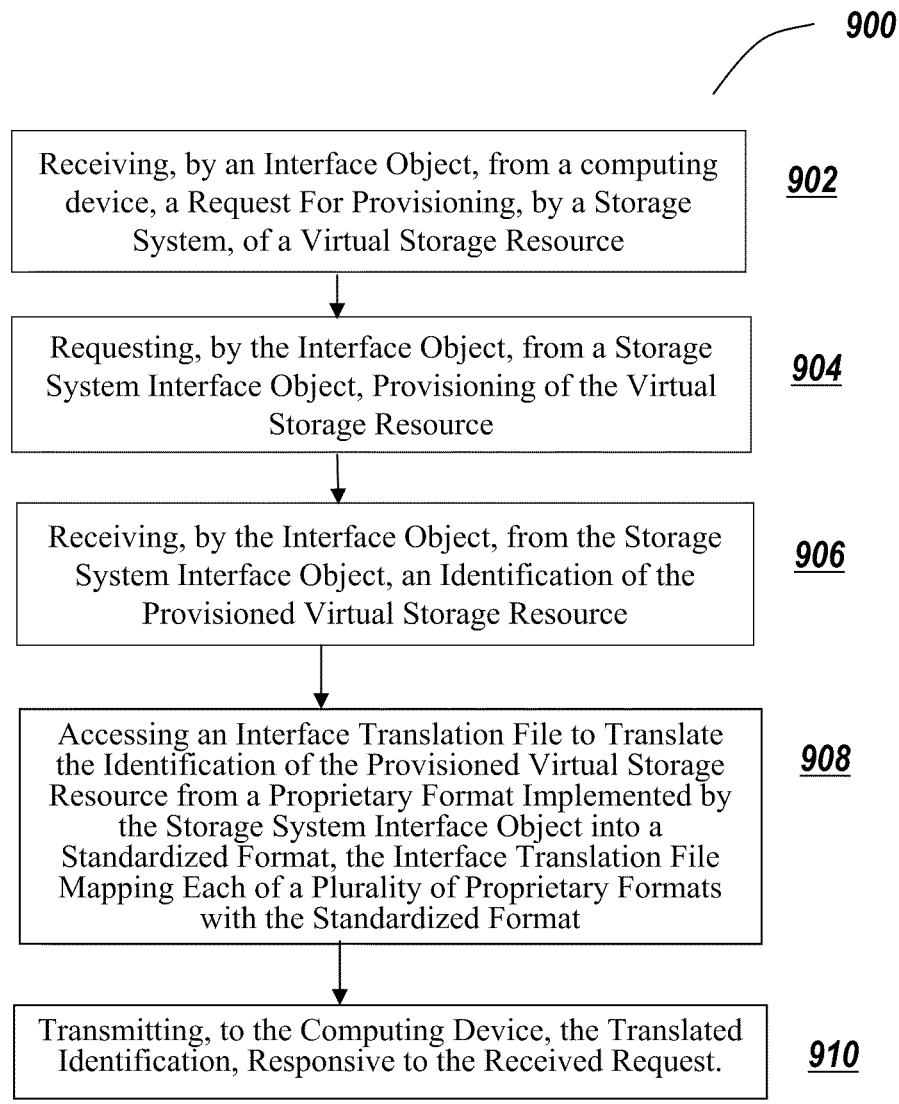
FIG. 9A is a flow diagram depicting one embodiment of a method for retrieving data from a storage system in a cloud computing environment.

Referring now to FIG. 9A, a flow diagram depicts one embodiment of a method for retrieving data from a storage system in a cloud computing environment. The method 500 includes receiving, by an interface object, from a computing device, a request for provisioning, by a storage system, of a virtual storage resource (902). The method includes requesting, by the interface object, from a storage system interface object, provisioning of the virtual storage resource (904). The method includes receiving, by the interface object, from the storage system interface object, an identification of the provisioned virtual storage resource (906). The method includes accessing an interface translation file to translate the identification of the provisioned virtual storage resource from a proprietary format implemented by the storage system interface object into a standardized format, the interface translation file mapping each of a plurality of proprietary formats with the standardized format (908). The method includes transmitting, to the computing device, the translated identification, responsive to the received request (910).

In some embodiments, the storage delivery management service 610 receives a request for provisioning of a virtual storage resource 502. In one of these embodiments, the storage delivery management service 610 transmits the request to the storage system communication component 614. In another of these embodiments, in response, the storage system communication component 614 generates an identification of the storage system 632, the identification formatted for processing by the broker computer 106*b*. For example, and in still another of these embodiments, the storage system adapter 634 may transmit an identification of the storage system 632 in a vendor-specific format; the storage system communication component 614 may translate that identification into a format that the broker computer 100*a* can process.

Referring now to FIG. 9A, and in greater detail, an interface object receives, from a computing device, a request for provisioning, by a storage system, of a virtual storage resource (902). In one embodiment, the storage system communication component 614 includes an interface object 618 such as a universal SMI-S adapter 618. In another embodiment, the interface object 618 receives the request for provisioning of the virtual storage resource 640 from the storage system communication component 614. In still another embodiment, the interface object 618 receives the request for provisioning of the virtual storage resource 640 from the storage delivery management service 610. In yet another embodiment, the interface object 618 receives the request, indirectly or directly, from a broker computer 100*a*.

The method includes requesting, by the interface object, from a storage system interface object, provisioning of the virtual storage resource (904). In one embodiment, the interface object 618 communicates with an interface object provided to retrieve data about and issue commands to a storage system 632 in a storage area network 630. In another embodiment, the interface object is an adapter 634 as described above. In still another embodiment, the adapter provides a mechanism for external communication with a storage system 632, and thus provides an interface to the storage system 632. In yet another embodiment, a vendor or other provider of a storage system 632 creates an adapter that allows systems such as the storage delivery management service 610 to access functionality provided by the storage system 632. In some embodiments, the interface object 618 and the interface object 634 communicate according to a protocol for retrieving CIM OM data or according to a specification such as SMI-S. In one of these embodiments, the interface object 634 may format data according to an implementation by a provider of the storage systems 632 of SMI-S. In other embodiments, the provider of the storage system 632 may have implemented a customized version of SMI-S. In one of these embodiments, for example, the provider may provide additional functionality other than what is in the SMI-S, or may have specified a formatting detail about which the SMI-S was silent.

The method includes receiving, by the interface object, from the storage system interface object, an identification of the provisioned virtual storage resource (906). In one embodiment, the interface object 618 receives, from the storage system interface object 634, an identification of a provisioned virtual storage resource 506. In another embodiment, the interface object 618 receives, from the storage system interface object 634, an identification of an identified storage system 632. In still another embodiment, the interface object 618 receives, from the storage system interface object 634, a response to a request for data associated with the storage system 632. In still even another embodiment, the interface object 618 receives, from the storage system interface object 634, a response to a request for access to functionality provided by the storage system 632. In yet another embodiment, the interface object 618 receives, from the storage system interface object 634, a response to an instruction transmitted for execution by the storage system 632; for example, the interface object 618 may receive confirmation of execution of an instruction to provision a virtual storage resource. In some embodiments, by way of example, the interface object 618 receives authentication of an entity for which storage credentials were provided. In other embodiments, and as discussed in further detail below in connection with FIG. 9D, the interface object 618 receives a response to a request for a characteristic of the storage area network 630, such as an identification of available storage systems, storage nodes, pools, virtualized storage resources, or other resources. In further embodiments, the data received from the storage system interface object 634 is in a vendor-specific format and the same type of responses from different vendors of different storage systems 632 may have varying formats.

In one embodiment, an area of variability in vendor SMI-S provider implementations relates to where identifiers for storage systems, storage pools and storage volumes are stored within a data model provided in response to a request for the identifiers. In another embodiment, although much of that is well documented in the SMI-S specification, in practice, there is much variability between implementations as to which attributes are used for storing disk identifiers and storage system serial numbers, both of which are pieces of data used by the storage delivery management service 610 for device correlation purposes. In still another embodiment, the generation of a standardized identifier for vendor data can be configured by using custom settings in the interface translation file.

The method includes accessing an interface translation file to translate the identification of the provisioned virtual storage resource from a proprietary format implemented by the storage system interface object into a standardized format, the interface translation file mapping each of a plurality of proprietary formats with the standardized format (908). In one embodiment, a vendor of a storage system 632 provides an interface translation file, which is a configurable data file that describes how to translate data from a vendor-specific format to a standard format. In another embodiment, an entity managing the storage delivery management service 610 creates a version of the interface translation file, which may include a template for completion by a provider, and the provider of a storage system 632 completes the interface translation file so that the interface translation file includes a mapping between data requested by the storage delivery management service 610 and the interface object 634. In still another embodiment, the interface translation file contains a plurality of mappings for translating data from each of a plurality of providers of storage systems, resulting in a single file that allows the storage delivery management service 610 to translate data from a plurality of vendor-specific formats into a single, universal format for processing by the storage delivery management service 610, its subcomponents, and the systems with which it interacts. In yet another embodiment, providing a mapping that describes how to translate data rather than requiring generation of a new interface object 618 from each provider of a storage system is more efficient and cost-effective for both the provider of the storage system 632 and the administrator of the storage delivery management service 610. In some embodiments, the interface translation file is a dynamically extensible file written in a language such as the eXtensible Markup Language (XML). In other embodiments, the interface translation file may be updated by the provider of the storage system 632 upon providing new or modified functionality in the storage system 632. Appendix A includes, without limitation, a description of some of the types of information associated with a storage system for which a vendor may include a translation within an XML translation file.

In one embodiment, the interface object 618 receives a response to a request for data associated with a storage system 632, the response formatted in a vendor-specific format, and accesses the interface translation file to transform the data into a common format. Appendix A includes a flow diagram depicting one embodiment of a method for receiving data from a storage system interface object 634 in a vendor specific format.

The translated identification is transmitted to the computing device 106, responsive to the received request (910). In one embodiment, the interface object 618 transmits a translated identifier to a broker computer 100*a* directly. In another embodiment, the interface object 618 transmits a translated identifier indirectly, by providing it to the storage delivery management service 610, which may then transmit the translated identifier to the broker computer 100*a*. In some embodiments, the translated identifier is cached for later use.

Referring now to FIG. 9B, a block diagram depicts one embodiment of a portion of an interface translation file. In one embodiment, the interface translation file 512 provides a way of normalizing the identification of a storage device to a common format referred to as a storage node identifier, which contains requested information. As depicted in FIG. 5B, and in one embodiment, a common formatting style is applied; for example, the format may delimit data by a double underscore or other separator (VENDOR_MODEL_STORAGE-SYSTEM-SERIAL-NUMBER_STORAGE-DEVICE-IDENTIFER).

Figure 9C:
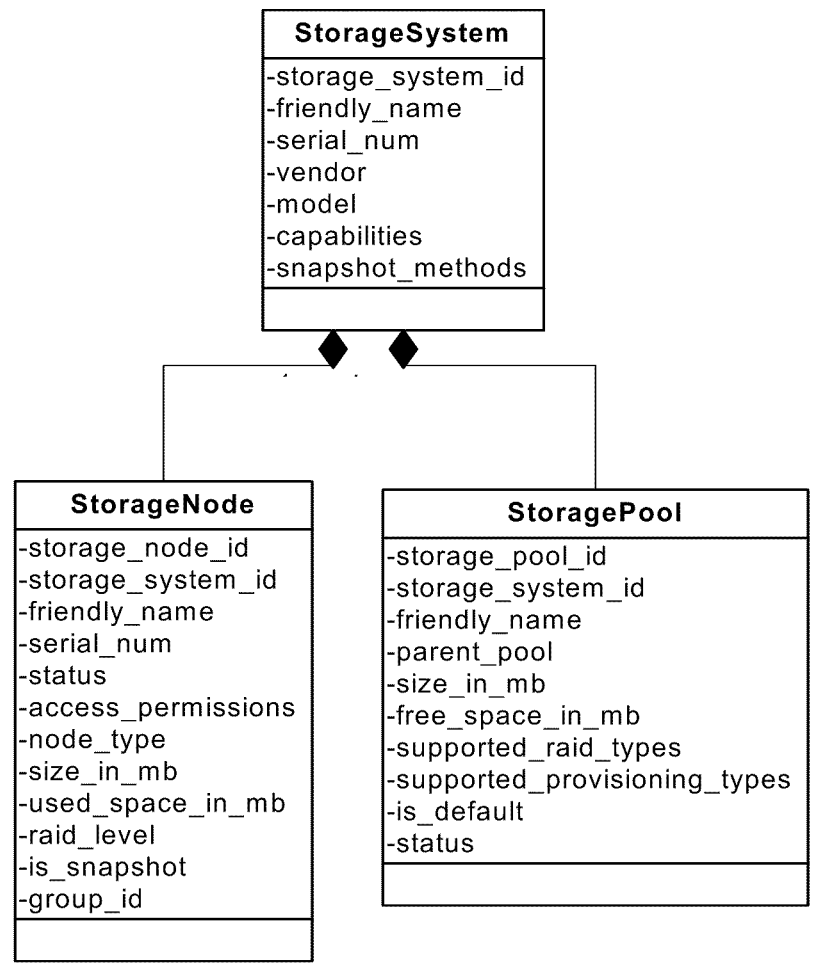
FIG. 9C is a block diagram depicting one embodiment of a data model identifying data associated with a storage system.

Referring now to FIG. 9C, a block diagram depicts one embodiment of a data model identifying data associated with a storage system and available for retrieval by a storage delivery management service 610. In one embodiment, data associated with a storage system includes, without limitation, an identifier, an alias, a serial number, a vendor name or identifier, a model identifier, an identification of at least one capability, and an identification of available functionality. In another embodiment, data associated with the storage system includes data associated with a storage node within the storage system including, without limitation, a node identifier, a system identifier, an alias, a serial number, a status, an access control list, a type of node, a size of the node, an amount of space used in a node, an amount of space available in a node, information associated with redundancy features, a group identifier, and an identifier of functionality available. In still another embodiment, data associated with the storage system includes data associated with a storage pool including, without limitation, a pool identifier, a system identifier, an alias, a parent pool identifier, a size of the pool, an amount of space used in a pool, an amount of space available in a pool, information associated with redundancy features, information associated with types of provisioning functionality availability, default configuration data, and status data.

Figure 9D:
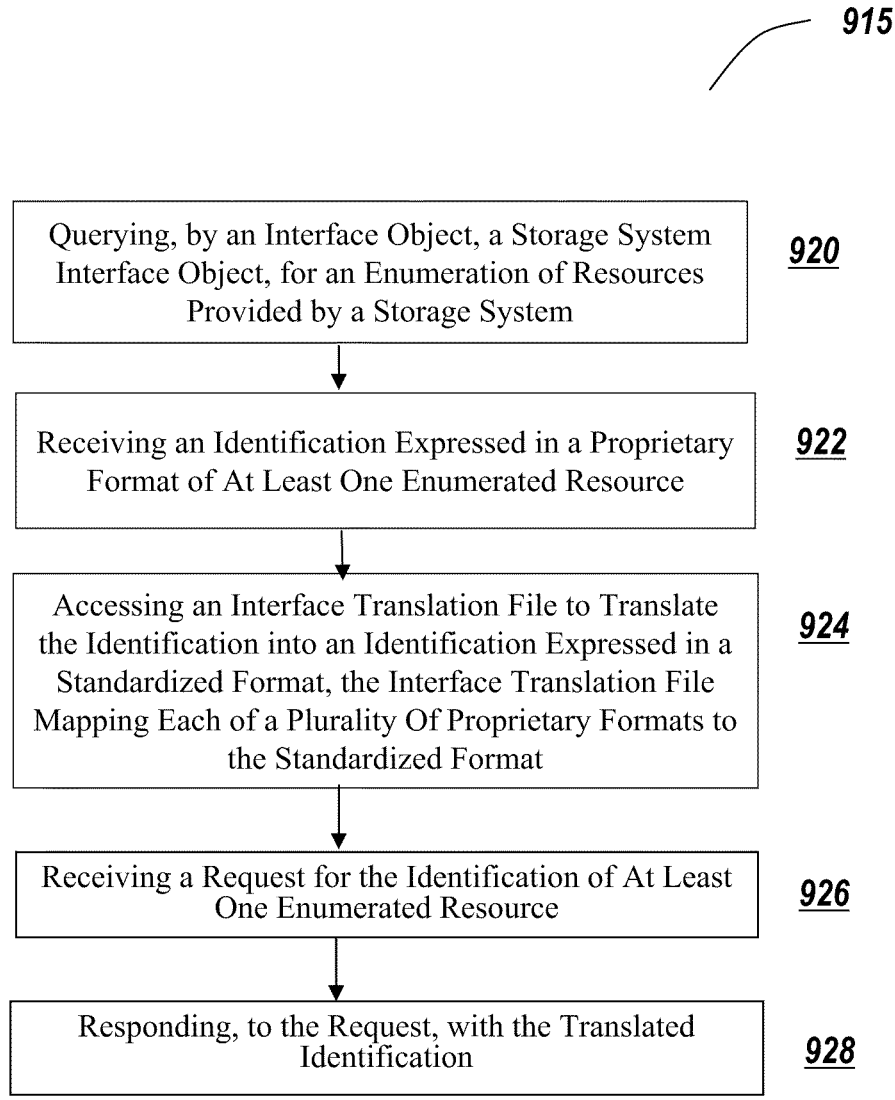
FIG. 9D is a flow diagram depicting another embodiment of a method for retrieving data from a storage system in a cloud computing environment.

Referring now to FIG. 9D, a flow diagram depicts another embodiment of another method for retrieving data from a storage system in a cloud computing environment. In brief overview, the method 515 includes querying, by an interface object, a storage system interface object, for an enumeration of resources provided by a storage system (920). The method includes receiving an identification expressed in a proprietary format of at least one enumerated resource (922). The method includes accessing an interface translation file to translate the identification into an identification expressed in a standardized format, the interface translation file mapping each of a plurality of proprietary formats to the standardized format (924). The method includes receiving a request for the identification of at least one enumerated resource (926). The method includes responding, to the request, with the translated identification (928).

Referring now to FIG. 9D, and in greater detail, the interface object 618 queries a storage system interface object 634 for an enumeration of resources provided by a storage system (920). In some embodiments, the interface object 618 undergoes a discovery process to develop an enumeration of resources that are available in advance of a request by the storage delivery management service 610. In other embodiments, the interface object 618 undergoes the discover process responsive to a request by the storage delivery management service 610.

The interface object 618 receives an identification expressed in a proprietary format of at least one enumerated resource (922). As described above in connection with FIG. 9A, the response from the storage system interface object 634 may be in a vendor-specific format, in spite of a vendor complying with a standard or specification.

The interface object 618 accesses an interface translation file to translate the identification into an identification expressed in a standardized format, the interface translation file mapping each of a plurality of proprietary formats to the standardized format (924). As described above, and in Appendix A, the interface object 618 uses the interface translation file to identify data within the vendor-specific response and to generate an identification of the data in a universal, standardized format.

The interface object 618 receives a request for the identification of at least one enumerated resource (926). In one embodiment, the interface object 618 receives the request from the storage system communication component 614. In another embodiment, the interface object 618 receives the request from the storage delivery management service 610.

The interface object 618 responds to the request with the translated identification (928). In one embodiment, the interface object 618 transmits the translated identification to the requesting entity. In another embodiment, the interface object 618 retrieves the translated identification from a cache, database, or other storage element and transmits the retrieved translated identification to the requestor.

In some embodiments, implementation of the methods and systems described herein provide a unified management interface for configuring storage area networks to provide virtual storage resources for access by computing devices on other networks. In one of these embodiments, a system in a cloud computing environment may include multiple virtual computing environments spanning the globe. In another of these embodiments, by using the methods and systems described herein, a customer of a storage system provider is insulated from having to address the administrative tasks that accompany management of a virtual computing environment. With administrative tasks processed by a centralized management service, in these embodiments, management becomes virtualized, alleviating administrative burdens of the customers. These embodiments allow users of cloud computing environments to make requests for provisioning without having to attend to the administrative details of carrying out the requests themselves. By insulating customers from administrative tasks of managing a virtual computing environment, such a centralized, automated, virtual storage management service allows customers to focus on provisioning and managing the services they provide to their own users and customers, such as access to applications, virtual machines, and other resources.

The following illustrative examples show how the methods and systems discussed above may be used for automated provisioning, by a storage delivery management service, of virtual machines in a cloud computing environment. These examples are meant to illustrate and not to limit the disclosure.

Example 1

In one embodiment, the storage delivery management system 610 receives, via a web services interface, a request from a broker computer 100a for provisioning of a virtual storage resource 640, such as a virtual disk, on behalf of a host computing device 106e. In another embodiment, the host computing device communication component 612 receives the request. In still another embodiment, the request for provisioning the virtual storage resource 640 occurs as part of a process for provisioning a virtual machine 166b for execution on the host computing device 106e. In some embodiments, the virtual storage resource 640 is a virtual disk. However, it should be understood that the virtual storage resource 640 may be any virtualized resource, including any of those described above in connection with FIG. 1A.

In one embodiment, the storage delivery management service 610 transmits the request for provisioning of the virtual storage resource 640 to the storage system communication component 614. In another embodiment, the storage system communication component 614 communicates with a storage system adapter 634 to identify an available storage system 632 providing resources required to provision the requested virtual storage resource. In still another embodiment, the storage system communication component 614 transmits an identification of the identified storage system 632 to the storage delivery management service 610. In still even another embodiment, the storage system communication component 614 transmits an identification of the provisioned virtual storage resource 640 to the storage delivery management service 610. In yet another embodiment, the storage delivery management service 610 stores the identification of the storage system 632 in a database accessible to the broker computer 100a. In some embodiments, the storage system communication component 614 and the storage system adapter 634 communicate according to WBEM or other storage protocol. In other embodiments, the storage system communication component 614 requests CIM OM data or SMI-S data associated with the storage system 632 from the storage system adapter 634.

In one embodiment, the broker computer 100a receives the identification of the storage system 632 from the host computing device communication component 612. In another embodiment, the broker computer 100a retrieves the identification of the storage system 632 from a database of available storage systems. In still another embodiment, the broker computer 100a confirms that the storage system 632 is able to provide the requested virtual storage resource. In yet another embodiment, the broker computer 100a transmits, to a host computing device 106e, an identification of the storage system 632.

In one embodiment, the host computing device 106e transmits, to the host computing device communication component 612, a request for access to the virtual storage resource 640. In another embodiment, the host computing device 106e transmits, to the host computing device communication component 612, a request for an identification of the virtual storage resource 640. In still another embodiment, the host computing device communication component 612 transmits, to the host computing device 106e, an identification of the virtual storage resource 640.

In one embodiment, the host computing device communication component 612 transmits, to the host computing device 106e, an instruction to request, from the switch fabric 620 an enumeration of storage systems 632 with which the host computing device 106e is authorized to communicate. In another embodiment, the host computing device 106e receives, from a component in the switch fabric 620, an enumeration of software systems 632 with which the host computing device 106e is authorized to communicate. In still another embodiment, the host computing device 106e communicates with the storage system 632 across the switch fabric 620 to access the virtual storage resource 640.

In one embodiment, the host computing device communication component 612 receives, from the broker computer 100a, a request to migrate the virtual machine 166b from the host computing device 106e to a host computing device 106f. In another embodiment, the host computing device communication component 612 receives, from the broker computer 100a, a notification that a migration of the virtual machine 166b from the host computing device 106e to a host computing device 106f is in progress. In still another embodiment, the host computing device 106e transmits, to at least one of the broker computer 100a and the storage delivery management service 610, a request for migration of the virtual machine 166b to a second host computing device 106e. In still even another embodiment, the host computing device communication component 612 receives the request to migrate the virtual machine from a control operating system 165a executing on at least one of the broker computer 100a, the host computing device 106e, and a third host computing device 106f, which provides management functionality for a network 38 on which the host computing devices reside. In yet another embodiment, the host computing device communication component 612 receives a request to allocate, to a second physical computing device 106f, access to the virtual storage resource 640. In some embodiments, the storage delivery management service 610 receives the request because without access to the virtual storage resource 640, the migration of the virtual machine 166b to the host computing device 106f is likely to terminate unexpectedly. In other embodiments, upon receiving the request to or indication of migration, the storage delivery management service 610 communicates with the components in the storage area network 630 and the switch fabric 620 required to change the access settings for the virtual storage resource 640 so that the second computing device may access the virtual storage resource 640.

In one embodiment, by executing the host computing device communication component 612 and the storage system communication component 614, the storage delivery management service 610 seamlessly transitions access to a virtual storage resource from a first computing device to a second computing device. In another embodiment, by executing the fabric management component 616, the storage delivery management service 610 configures the switch fabric 620 to allow access to the virtual storage resource 640 by a physical computing device executing a virtual machine requiring access to the virtual storage resource. In still another embodiment, by providing functionality for automatically updating access control lists and transmitting the identifiers needed to allow the storage system 632 and the second computing device 106 to establish a communication session and provide the virtual machine with access to the virtual resource, the storage delivery management service 610 provides automated, integrated support for provisioning and re-provisioning virtual resources in cloud computing environments.

Figure 10:
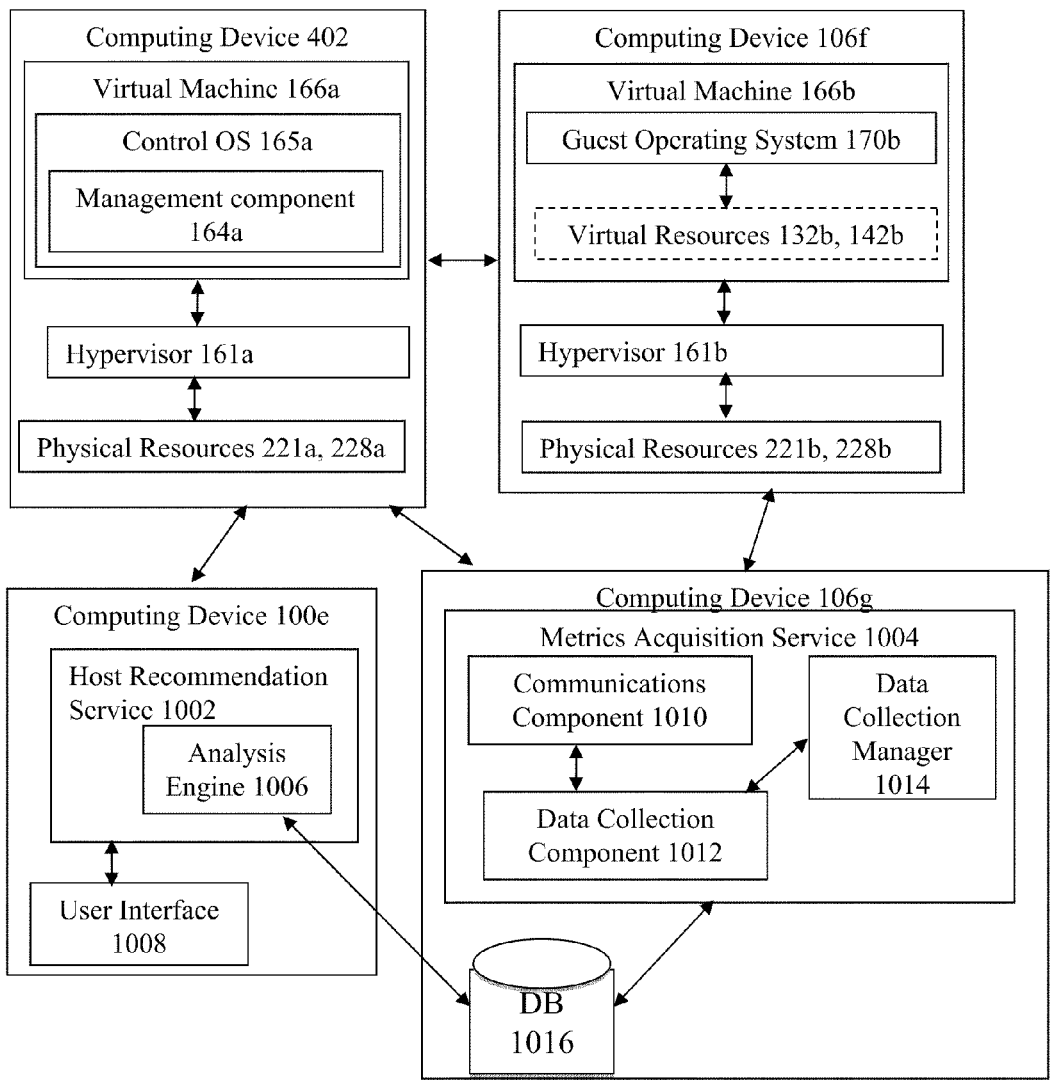
FIG. 10 is a block diagram depicting an embodiment of a system for evaluating historical metrics in selecting a physical host for execution of a virtual machine.

Referring now to FIG. 10, a block diagram depicts one embodiment of a system for evaluating historical metrics in selecting a physical host for execution of a virtual machine. In brief overview, the system includes a plurality of computing devices, at least one virtual machine 166, a pool management component 164a, a host recommendation service 1002, and an analysis engine 1006. As described above, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 166 executes is referred to as a physical host 100 or as a host machine 100. The pool management component 164*a* executes on a first computing device 106 and requests an identification of a physical host 100 on which to execute a virtual machine 166. In one embodiment, the pool management component 164*a* executes on the cloud bridge server 402. The host recommendation service 1002 executes on a second computing device 106*e* and receives the request for the identification of the physical host 100. The analysis engine 1006 executes on the second computing device 106*e* and receives, from the host recommendation service 1002, the request for the identification of the physical host 100. The analysis engine 1006 retrieves a plurality of metrics including a first metric identifying a current level of load on each of a plurality of physical hosts and including a second metric identifying a level of load on each of the plurality of physical hosts during a time period prior to the current time period. The analysis engine 1006 retrieves a plurality of metrics associated with the virtual machine, the plurality of metrics including at least one metric identifying a level of load placed on a physical host by the virtual machine during a time period prior to the current time period. The analysis engine 1006 determines a level of priority associated with at least one of the first metric identifying a current level of load on each of the plurality of physical hosts and the second metric identifying a level of load on each of the plurality of physical hosts during a time period prior to the current time period. The analysis engine 1006 assigns a score to each of the plurality of physical hosts, responsive to the retrieved pluralities of metrics and to the determined level of priority. The analysis engine 1006 transmits, to the host recommendation service 1002, an identification of one of the plurality of physical hosts 100 on which to execute the virtual machine.

In some embodiments, a management component communicates with a host recommendation service 1002 to identify a computing device on which to execute a virtual machine 166. In one of these embodiments, the host recommendation service 1002 transmits to the request to an analysis engine 1006, which evaluates present and historical metrics identifying levels of load on physical hosts (computing devices 100) that are available to execute the virtual machine 166 and applies an algorithm to the evaluated metrics to identify an optimal physical host 100 for executing the virtual machine 166. In another of these embodiments, the host recommendation service 1002 includes functionality allowing users to identify what characteristics to optimize—for example, whether to optimize for maximum performance of a virtual machine or to optimize for maximum density of virtual machines on physical hosts. In still another of these embodiments, the system includes a metrics acquisition service 1004 that provides functionality for collecting performance data from hypervisors, virtual machines, and physical hosts and generating metrics based upon the performance data for use in identifying an optimal physical host. In still even another of these embodiments, the host recommendation service 1002 includes functionality for allowing administrators the ability to define which hypervisor hosts will be monitored for performance data. In yet another of these embodiments, the host recommendation service 1002 includes functionality for generating reports regarding hypervisor and virtual machine performance data. In further embodiments, the host recommendation service 1002 includes functionality for making recommendations regarding virtual machine placement decisions relative to physical hosts.

Referring now to FIG. 10, and in greater detail, the pool management component requests an identification of a physical host 100 on which to execute a virtual machine 166. In one embodiment, the pool management component 164*a* requests an identification of a physical host 106*f* to which to migrate a virtual machine 166*b*. In another embodiment, the pool management component 164*a* requests an identification of a physical host 106*f* on which to provision a virtual machine 166*b*. In some embodiments, the pool management component 164*a* receives a request for execution of a virtual machine 166. In one of these embodiments, the pool management component 164*a* identifies a virtual machine image associated with the requested virtual machine 166. In other embodiments, the pool management component 164*a* includes a transmitter sending the request for the identification of the physical host to the host recommendation service 1002.

In one embodiment, the management component 164*a* is referred to as a pool management component. In another embodiment, a management operating system 165*a*, which may be referred to as a control operating system 165*a*, includes the management component. In some embodiments, the management component is referred to as a tools stack. In one of these embodiments, the management component is the tools stack 164 described above in connection with FIG. 1A. In other embodiments, the management component 164 provides a user interface for receiving, from a user such as an administrator, an identification of a virtual machine 166 to provision and/or execute. In still other embodiments, the management component 164 provides a user interface for receiving, from a user such as an administrator, the request for migration of a virtual machine 166*b* from one physical machine 100 to another. In further embodiments, the management component 164*a* identifies a computing device 100*f* on which to execute a requested virtual machine 166*d* and instructs the hypervisor 161*b* on the identified computing device 106*f* to execute the identified virtual machine; such a management component may be referred to as a pool management component.

The host recommendation service 1002 receives the request for the identification of the physical host 100 on which to execute the virtual machine 166. In one embodiment, the host recommendation service retrieves an identification of a virtual machine based upon information included in the request. In another embodiment, the recommendation service 1002 executes the analysis engine 1006 upon receiving a request for identification of the physical host 100 on which to execute the virtual machine 166. In some embodiments, for example, the host recommendation service 1002 may execute as part of a virtual machine management product, such as a lab management program, provisioning software, or other virtualization platform providing management capabilities.

In one embodiment, the host recommendation service includes a receiver for receiving, from the pool management component 164*a*, a request for an identification of a physical host on which to execute the virtual machine 166. In another embodiment, the host recommendation service includes a receiver for receiving, from the pool management component 164*a*, a request for an identification of a physical host to which to migrate the virtual machine 166. In still another embodiment, the host recommendation service 1002 includes a user interface for receiving a request for an identification of a physical host on which to execute the virtual machine 166. In yet another embodiment, the host recommendation service 1002 includes a user interface for receiving a request for an identification of a physical host to which to migrate the virtual machine 166.

In one embodiment, the host recommendation service 1002 includes a customization interface for receiving an identification of a characteristic required for execution of the virtual machine. In another embodiment, the host recommendation service 1002 includes a customization interface for receiving an identification of a customization to an algorithm applied to assign the score to each of the plurality of physical hosts. In still another embodiment, the host recommendation service 1002 is in communication with a reporting service that provides users with workload distribution and optimization reports; the reporting service may, for example, include, without limitation, functionality for displaying a report in a user interface, transmitting a report via electronic mail, implementing really simple syndication to distribute reports, and providing an application programming interface (API) allowing a user to poll for optimization recommendations and workload reports.

In one embodiment, the host recommendation service 1002 executes the analysis engine 1006. In another embodiment, the analysis engine applies an algorithm to generate a score assigned to at least one of the plurality of physical hosts. In still another embodiment, the analysis engine 1006 determines, for each of the plurality of physical hosts, whether a physical host includes a characteristic required for execution of the virtual machine. In yet another embodiment, the analysis engine 1006 includes a process that optimizes host/guest workload. In yet another embodiment, the analysis engine 1006 includes a service that generates recommendations for physical hosts on which to execute virtual machines.

The analysis engine 1006 executes on the second computing device 100c and is in communication with the host recommendation service 1002. In some embodiments, the analysis engine 1006 is a component of the host recommendation service 1002. In other embodiments, the analysis engine 1006 executes on a fourth computing device 106g.

The analysis engine 1006 retrieves a plurality of metrics including a first metric identifying a current level of load on each of a plurality of physical hosts and including a second metric identifying a level of load on each of the plurality of physical hosts during a time period prior to the current time period. The analysis engine 1006 retrieves a plurality of metrics associated with the virtual machine, the plurality of metrics including at least one metric identifying a level of load placed on a physical host by the virtual machine during a time period prior to the current time period. In one embodiment, the analysis engine 1006 includes a database interaction component for accessing the database 1016 and retrieving a plurality of metrics from the database 1016.

The analysis engine 1006 determines a level of priority associated with at least one of the first metric identifying a current level of load on each of the plurality of physical hosts and the second metric identifying a level of load on each of the plurality of physical hosts during a time period prior to the current time period. In one embodiment, a level of priority identifies a period of time to prioritize over other time periods in evaluating and assigning a score to a physical host. In another embodiment, a level of priority identifies a level of availability of a type of resource to prioritize over other resources in evaluating and assigning a score to a physical host. The analysis engine 1006 assigns a score to each of the plurality of physical hosts, responsive to the retrieved pluralities of metrics and to the determined level of priority. In one embodiment, the analysis engine 1006 applies an algorithm to at least one metric to generate a score assigned to one of the plurality of physical hosts. In another embodiment, the analysis engine 1006 transmits, to the host recommendation service 1002, an identification of one of the plurality of physical hosts 100 on which to execute the virtual machine.

In one embodiment, a metrics acquisition service 1004 acquires performance data and uses the performance data to generate a plurality of metrics including a first metric identifying a current level of load on each of a plurality of physical hosts and including a second metric identifying a level of load on each of the plurality of physical hosts during a time period prior to the current time period. In another embodiment, the metrics acquisition service 1004 acquires performance data and uses the performance data to generate a plurality of metrics associated with the virtual machine, the plurality of metrics including at least one metric identifying a level of load placed on a physical host by the virtual machine during a time period prior to the current time period. In still another embodiment, the metrics acquisition service 1004 is in communication with the host recommendation service 1002.

In one embodiment, the metrics acquisition service 1004 stores acquired metrics in a database 1016. In another embodiment, the metrics acquisition service 1004 stores data in an ODBC-compliant database. For example, the database 1016 may be provided as an ORACLE database, manufactured by Oracle Corporation of Redwood Shores, Calif.; as a Microsoft ACCESS database or as a Microsoft SQL server database, manufactured by Microsoft Corporation of Redmond, Wash.

In some embodiments, the metrics acquisition service 1004 is in communication with a separate metrics generation service (not shown). In one of these embodiments, the metrics generation service queries at least one of the plurality of physical hosts 100 to retrieve performance data including an identification of a level of load. In another of these embodiments, the metrics acquisition service 1004 generates the plurality of metrics for each of the plurality of physical hosts based upon performance data retrieved by the metrics generation service. In other embodiments, the metrics acquisition service 1004 queries at least one of the plurality of physical hosts for an identification of a level of load. In one of these embodiments, the metrics acquisition service 1004 generates the plurality of metrics for each of the plurality of physical hosts.

In some embodiments, the metrics acquisition service 1004 includes a communications component 1010, a data collection component 1012, and a data collection manager 1014. In one of these embodiments, the communications component 1010 provides functionality allowing a data collection component 1012 executing on a first computing device to communicate with a second data collection component 1012 executing on a second computing device. In another of these embodiments, the data collection manager 1014 identifies a type of hypervisor executing on a computing device 106f in a plurality of computing device 100. In still another of these embodiments, the data collection manager 1014 generates a data collection component 1012, responsive to the identified type of hypervisor.

In one of these embodiments, the data collection component 1012 communicates with at least one hypervisor to retrieve an identification of performance data for at least one virtual machine executing on a computing device in a pool of computing devices (for example, a computing device 106f); for example, the data collection component 1012 may query the at least one hypervisor 161 for an identification of performance data for each virtual machine 166 executed by the hypervisor. In another of these embodiments, the data collection component 1012 periodically polls at least one hypervisor 161 for performance data for at least one virtual machine 166 executed by the hypervisor 161. In still another of these embodiments, the data collection component 1012 stores the retrieved performance data in the database 1016. In yet another of these embodiments, the metrics acquisition service 1004 executes a plurality of data collection components 1012, each of the plurality of data collection components 1012 communicating with and retrieving performance data from a different type of hypervisor.

In some embodiments, the data collection component 1012 stores collected data in the database 1016. In one of these embodiments, the system includes a queue management component for managing a queue of data to be added to the database. In another of these embodiments, the system includes a queue worker component for retrieving data from a queue of data to be added to the database and storing the retrieved data in the database 1016.

In some embodiments, the metrics acquisition service 1004 is part of the host recommendation service 1002. In other embodiments, the metrics acquisition service 1004 executes on the same computing device 100 as the host recommendation service 1002. In still other embodiments, the metrics acquisition service 1004 executes on a different computing device 106g from the computing device on which the host recommendation service 1002 executes. In one of these embodiments, for example, there may be multiple metrics acquisition services 1004 in a network. In another of these embodiments, a computing device 100 on which the metrics acquisition service 1004 executes may be referred to as a data collection host 100. In still another of these embodiments, there may be a data collection host 100a that collects performance data as well as also coordinating the collection of performance data by data collection components 1012 and metrics acquisition services 1004 that execute on other data collection hosts 100b; such a data collection host 100a may be referred to as a master data collection host, with the other data collection hosts referred to as slave data collection hosts. In yet another of these embodiments, the master data collection host identifies hypervisors to be monitored and ensures that slave data collection hosts continue to collect performance data for identified hypervisors.

In some embodiments, a master data collection component 1012a of the metrics acquisition service 1004 communicates with a slave data collection component 1012b over an intranet or the Internet as described above in connection with FIGS. 1A-1H. In other embodiments, the master data collection component 1012a queries the database 1016 to identify at least one data collection slave 1012b, the hypervisor pools to be monitored and optimized, and the relationships between hypervisor pools and data collectors; the master data collection component 1012a assigns any unassigned hypervisor pools to a data collection host. In still other embodiments, the master data collection component 1012a monitors the status of slave data collection hosts and redistributes workload in the event that one of a plurality of data collection hosts terminates data collection. In yet other embodiments, a plurality of slave data collection components 1012b monitor the status of the master data collection component 1012a and, in the event that the master data collection component 1012a ceases to respond to status requests, the slave data collection components 1012b identify a replacement master data collection component 1012a from amongst the plurality of slave data collection components 1012b. In one of these embodiments, data collection hosts may provide both master and slave functionality. In further embodiments, data collection hosts are members of mutually trusted domains.

Figure 11:
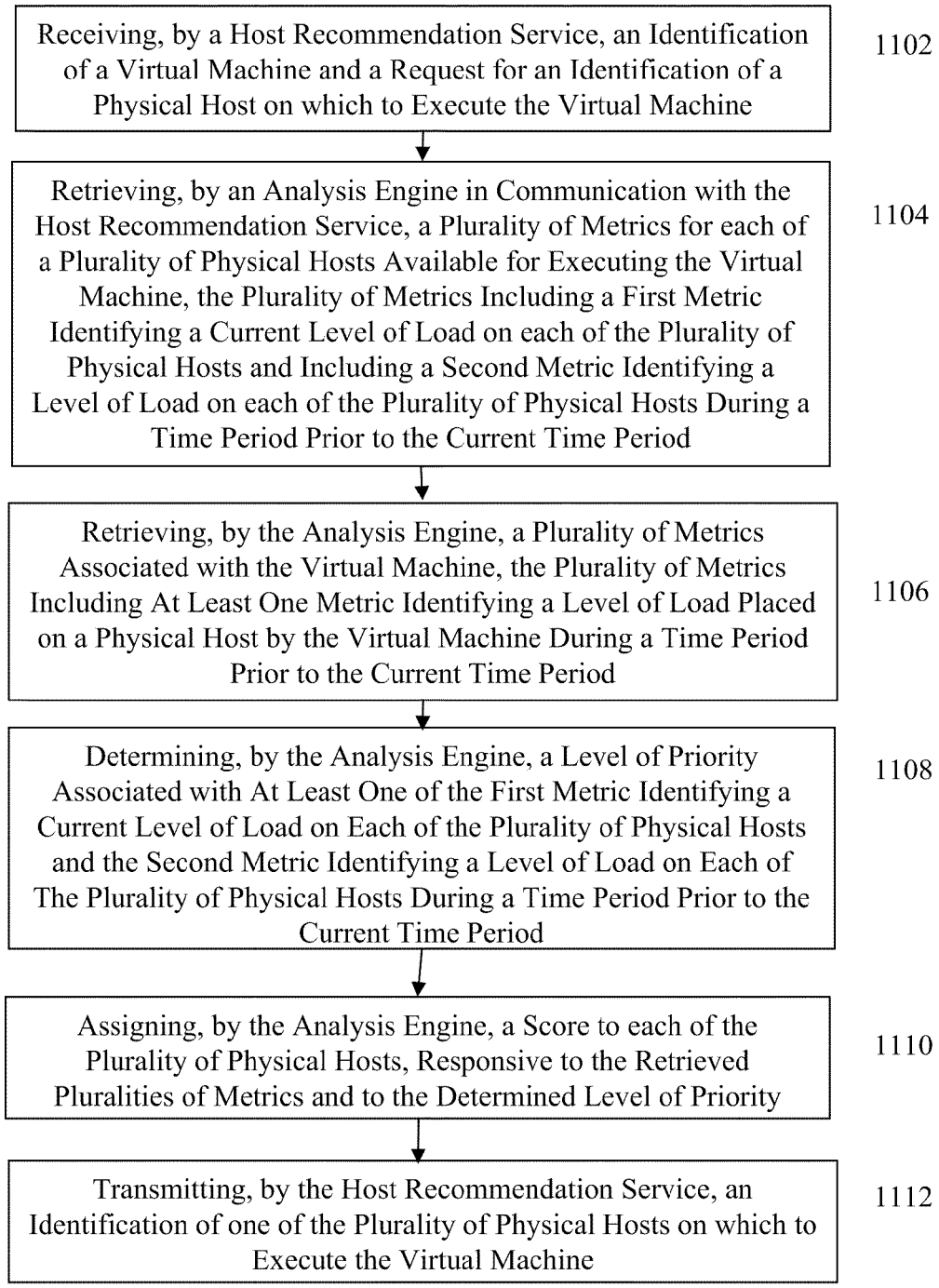
FIG. 11 is a flow diagram depicting an embodiment of a method for evaluating historical metrics in selecting a physical host for execution of a virtual machine.

Referring now to FIG. 11, a flow diagram depicts one embodiment of a method for evaluating historical metrics in selecting a physical host for execution of a virtual machine. In brief overview, the method includes receiving, by a host recommendation service, an identification of a virtual machine and a request for an identification of a physical host on which to execute the virtual machine (1102). The method includes retrieving, by an analysis engine in communication with the host recommendation service, a plurality of metrics for each of a plurality of physical hosts available for executing the virtual machine, the plurality of metrics including a first metric identifying a current level of load on each of the plurality of physical hosts and including a second metric identifying a level of load on each of the plurality of physical hosts during a time period prior to the current time period (1104). The method includes retrieving, by the analysis engine, a plurality of metrics associated with the virtual machine, the plurality of metrics including at least one metric identifying a level of load placed on a physical host by the virtual machine during a time period prior to the current time period (1106). The method includes determining, by the analysis engine, a level of priority associated with at least one of the first metric identifying a current level of load on each of the plurality of physical hosts and the second metric identifying a level of load on each of the plurality of physical hosts during a time period prior to the current time period (1108). The method includes assigning, by the host recommendation service, a score to each of the plurality of physical hosts, responsive to the retrieved pluralities of metrics and to the determined level of priority (1110). The method includes transmitting, by the host recommendation service, an identification of one of the plurality of physical hosts on which to execute the virtual machine (1112). In some embodiments, computer readable media having executable code for evaluating historical metrics in selecting a physical host for execution of a virtual machine are provided.

Referring now to FIG. 11, and in greater detail, a host recommendation service receives an identification of a virtual machine and a request for an identification of a physical host on which to execute the virtual machine (1102). In one embodiment, the host recommendation service 1002 receives the identification and the request from a pool management component 164, which manages workload on a plurality of physical computing devices in a pool. In another embodiment, the host recommendation service 1002 receives the identification and the request via a user interface, such as an interface providing a user access to administrative functionality over an intranet or the Internet. In still another embodiment, the host recommendation service 1002 receives an identification of a virtual machine image used to execute the virtual machine. In yet another embodiment, the host recommendation service 1002 receives an identification of a resource desired for execution of the virtual machine.

The analysis engine retrieves a plurality of metrics for each of a plurality of physical hosts available for executing the virtual machine, the plurality of metrics including a first metric identifying a current level of load on each of the plurality of physical hosts and including a second metric identifying a level of load on each of the plurality of physical hosts during a time period prior to the current time period (1104). In one embodiment, the analysis engine 1006 evaluates plurality of metrics and assigns a score to a physical host based upon the evaluation. In another embodiment, the analysis engine 1006 accesses a database 1016 to retrieve the plurality of metrics. In some embodiments, multiple physical hosts may be available to execute a virtual machine. In one of these embodiments, an optimal physical host is recommended by scoring all the potential hosts and recommending the host with the highest score; the score is calculated using metrics data and numerous, configurable criteria.

In some embodiments, the analysis engine 1006 retrieves an identification of at least one physical host available for executing the identified virtual machine. In one of these embodiments, the analysis engine 1006 retrieves an identification of a characteristic of the at least one physical host; for example, an identification of a characteristic may include, without limitation, an identification of a number of central processing units (CPUs), an identification of a processing speed of a CPU, an identification of an amount of memory available on a host, and an identification of a number of physical network interfaces provide by a host.

In one embodiment, the analysis engine 1006 retrieves a plurality of metrics including a first metric identifying a current level of load on each of the plurality of physical hosts. In another embodiment, the current level of load may include a level of load on a resource in a plurality of resources provided by each of a plurality of physical hosts. In still another embodiment, a user may specify a definition for a period of time classified as a current period of time. In yet another embodiment, and by way of example, an administrator may configure the analysis engine 1006 to retrieve a first metric identifying an average level of load over a five-minute period preceding the receipt of the request on each of the plurality of physical hosts; such a time interval may be referred to as a current time period.

In one embodiment, the analysis engine 1006 retrieves a plurality of metrics including a second metric identifying a level of load on each of the plurality of physical hosts during a time period prior to the current time period. In another embodiment, the level of load may include a level of load on a resource in a plurality of resources provided by each of a plurality of physical hosts. In still another embodiment, a user may specify a definition for a period of time classified as a period of time prior to the current period of time. In yet another embodiment, and by way of example, an administrator may configure the analysis engine 1006 to retrieve a second metric identifying an average level of load over a thirty-minute period preceding the five-minute period prior to receipt of the request on each of the plurality of physical hosts; such a time interval may be referred to as a recent time period.

In one embodiment, the analysis engine 1006 retrieves a plurality of metrics including a third metric identifying a level of load on each of the plurality of physical hosts during a time period prior to the time period for which the second metric identified the level of load on each of the plurality of physical hosts. In another embodiment, the analysis engine 1006 retrieves a third metric identifying a historical level of load on each of the plurality of physical hosts. In some embodiments, the analysis engine 1006 retrieves a third metric configured to identify an average level of load over a substantially longer period of time than the second metric. In other embodiments, the analysis engine 1006 retrieves a third metric configured to identify an average level of load for a substantially different period of time than the second metric. In still other embodiments, as with the second metric, a user may specify a definition for a period of time classified as a period of time prior to the current period of time. In one of these embodiments, and by way of example, an administrator may configure the analysis engine 1006 to retrieve a third metric identifying an average level of load over a twenty-four hour period preceding the five-minute period prior to receipt of the request on each of the plurality of physical hosts; such a time interval may be referred to as a historical time period.

In one embodiment, the plurality of metrics includes a metric identifying a threshold for utilization of a central processing unit (CPU) on a physical computing device; for example, if a computing device has a high or critical level of CPU utilization during the time period for which the analysis engine 1006 evaluates the computing device, the analysis engine 1006 may determine that the computing device cannot execute an additional virtual machine. In another embodiment, the plurality of metrics includes a metric identifying a threshold for available memory on a physical computing device; for example, if a computing device has a high or critical level of unavailable memory during the time period for which the analysis engine 1006 evaluates the computing device, the analysis engine 1006 may determine that the computing device cannot execute an additional virtual machine. In still another embodiment, the plurality of metrics includes a metric identifying a threshold for utilization of network resource by a physical computing device; for example, if a computing device has a high or critical level of network interface utilization during the time period for which the analysis engine 1006 evaluates the computing device, the analysis engine 1006 may determine that the computing device cannot execute an additional virtual machine. In yet another embodiment, the plurality of metrics includes a metric identifying a threshold for utilization of physical block device (disk utilization) on a physical computing device; for example, if a computing device has a high or critical level of disk utilization during the time period for which the analysis engine 1006 evaluates the computing device, the analysis engine 1006 may determine that the computing device cannot execute an additional virtual machine. In some embodiments, the analysis engine 1006 evaluates a metric for a first computing device and determines that the first computing device can execute an additional virtual machine but has a level of resource utilization associated with a lower score than a second computing device; for example, the first computing device may have a level of resource utilization closer to a threshold (such as a level categorized as medium or high) than the second computing device which may have a lower level of resource utilization. In one of these embodiments, the analysis engine 1006 may assign a different (e.g., lower) score to the first computing device for that metric.

The analysis engine retrieves a plurality of metrics associated with the virtual machine, the plurality of metrics including at least one metric identifying a level of load placed on a physical host by the virtual machine during a time period prior to the current time period (1106). In some embodiments, the analysis engine 1006 accesses a database 1016 to retrieve the plurality of metrics.

In one embodiment, the plurality of metrics includes a metric identifying a level of utilization of a central processing unit (CPU) by the virtual machine 166. In another embodiment, the plurality of metrics includes a metric identifying a level of utilization of memory by the virtual machine 166. In still another embodiment, the plurality of metrics includes a metric identifying a level of utilization of a network resource by the virtual machine 166. In yet another embodiment, the plurality of metrics includes a metric identifying a level of disk utilization by the virtual machine 166. In some embodiments, the plurality of metrics includes a metric identifying an average amount of resources required by a virtual machine; for example, the metric may identify, without limitation, an average amount of available memory, average amount of disk utilization, average amount of CPU utilization, and average amount of network resource utilization accessed by the virtual machine during previous executions of the virtual machine.

In some embodiments, the host recommendation service 1002 executes a customization interface 1008 with which a user, such as an administrator, can configure one or more weights to apply to a plurality of metrics and, therefore, customize a level of significance ascribed to each of the plurality of metrics for a particular physical host in determining whether to identify the physical host as the computing device on which to execute the virtual machine. In one of these embodiments, the customization interface 1008 provides functionality allowing a user to specify a level of priority to assign to a time period during which at least one metric is generated; for example, the customization interface 1008 may include an interface element allowing a user to specify that metrics generated during a historical time period are to be assigned greater level of priority than metrics generated during a current time period. In another of these embodiments, the customization interface 1008 provides functionality allowing a user to specify a weight to apply in scoring a metric generated during a user-specified time period.

In other embodiments, the host recommendation service 1002 executes a customization interface with which a user, such as an administrator, can configure one or more rules to apply in determining a score for a physical host. In one of these embodiments, for example, a rule may specify a quantity of an available resource—memory, disk utilization, or CPU utilization, for example—that a physical host should provide for a virtual machine. In other embodiments, the host recommendation service 1002 executes customization interface with which a user, such as an administrator, can configure one or more optimization preferences. In one of these embodiments, for example, a user may specify that the host recommendation service 1002 should assign higher scores to physical hosts that provide resources for maximizing performance of a virtual machine (which may be referred to as a maximum performance optimization mode). In another of these embodiments, for example, a user may specify that the host recommendation service 1002 should assign higher scores to physical hosts that provide resources for a plurality of virtual machines, minimizing the number of total physical hosts required to manage a total workload across a plurality of physical hosts (which may be referred to as a maximum density optimization mode). In still another of these embodiments, for example, a user may specify a time period in which the host recommendation service 1002 should operating according to an optimization mode. In yet another of these embodiments, for example, a user may specify a first time period in which the host recommendation service 1002 should operating according to a first optimization mode and a second time period in which the host recommendation service 1002 should operating according to a second optimization mode.

The analysis engine determines a level of priority associated with at least one of the first metric identifying a current level of load on each of the plurality of physical hosts and the second metric identifying a level of load on each of the plurality of physical hosts during a time period prior to the current time period (1108). In one embodiment, the analysis engine 1006 accesses a database of data stored by the host recommendation service 1002 and identifying a level of prioritization to apply to a metric. In another embodiment, for example, in assigning a score to the physical host providing a resource, such as disk space or CPU utilization, the analysis engine 1006 retrieves data identifying a weight to apply to a level of available resource utilization, such as a level of available disk space or a level of CPU utilization available; the analysis engine 1006 generates an initial score for a physical host based upon an evaluation of a level of availability for a resource provided by the physical host, determines that a weight is associated with the level of availability of the resource, and modifies the initial score for the physical host based upon the weight. In still another embodiment, and as another example, the analysis engine 1006 may retrieve data identifying a weight to apply to a time period for which a metric identifies a level of load on at least one of the physical host and a resource provided by the physical host; for example, the analysis engine 1006 generates an initial score for a physical host, determines that an evaluated metric identifies a level of load during a time period (e.g., the current time period or a historic time period) weight is associated with the metric and modifies the initial score according to the determined weight.

In some embodiments, the analysis engine 1006 retrieves an identification of an algorithm to apply in identifying a physical host to execute a virtual machine. In one of these embodiments, for example, the analysis engine 1006 retrieves an identification of an algorithm that generates higher scores for potential hosts providing resources for maximizing performance of a virtual machine. In another of these embodiments, and as another example, the analysis engine 1006 retrieves an identification of an algorithm that generates higher scores for potential hosts capable of executing multiple virtual machines, resulting in maximum density of virtual machines per physical host and a reduced number of physical hosts to manage a total amount of workload. In other embodiments, the analysis engine 1006 analyzes a metric in the plurality of metrics and a weight assigned to that metric in determining a level of resource utilization required by an execution of the virtual machine 166.

The analysis engine assigns a score to each of the plurality of physical hosts, responsive to the retrieved pluralities of metrics and to the determined level of priority (1110). In one embodiment, the analysis engine 1006 analyzes each of the metrics in the pluralities of metrics and assigns a score to each of the plurality of physical hosts. In another embodiment, the analysis engine 1006 determines, for each of the plurality of physical hosts, whether a physical computing device includes a storage repository required for execution of the virtual machine 166. In still another embodiment, the analysis engine 1006 determines, for each of the plurality of physical hosts, whether a physical computing device includes a level of available memory required for execution of the virtual machine 166. In yet another embodiment, the analysis engine 1006 determines, for each of the plurality of physical hosts, whether a physical computing device includes a level of available CPU required for execution of the virtual machine 166. In some embodiments, the analysis engine 1006 evaluates pool configuration data, host configuration data, and the pluralities of metrics to determine a score for each of the plurality of physical hosts.

In one embodiment, the analysis engine 1006 identifies a first physical host in the plurality of physical hosts for execution of the virtual machine, the first physical host having a higher score than a second physical host in the plurality of physical hosts. In another embodiment, the analysis engine 1006 identifies a first physical host in the plurality of physical hosts for execution of the virtual machine, the first physical host including at least one characteristic required for execution of the virtual machine as identified by a weight associated with a metric prioritizing a high level of availability of the at least one characteristic. In some embodiments, the analysis engine 1006 identifies a first physical host in the plurality of physical hosts for execution of the virtual machine, the first physical host executing a second virtual machine. In one of these embodiments, the analysis engine 1006 identifies a first physical host executing a plurality of virtual machines in order to maximize the density of virtual machines per physical host in the plurality of physical hosts.

In some embodiments, the analysis engine 1006 identifies a physical host executing multiple processors or a parallel processor with one or more cores. In one of these embodiments, for example, the physical host may be a computing device 100 as described above in connection with FIGS. 1A-1H. In another of these embodiments, the analysis engine 1006 identifies a processor in a plurality of processors on which to execute the virtual machine. In still another of these embodiments, the analysis engine 1006 identifies a portion of a multicore processor with which to execute the virtual machine. In yet another of these embodiments, the analysis engine 1006 identifies a subset of available processors on a physical host for execution of a virtual machine. In other embodiments, the analysis engine 1006 identifies both a physical host and a subset of available processors on a physical host for execution of a virtual machine. In still other embodiments, the analysis engine 1006 receives an identification of a physical host and, implementing the methods described herein, identifies a processor in a plurality of processors on which to execute a virtual machine.

In one embodiment, the analysis engine 1006 selects a physical host for execution of the virtual machine such that workload is distributed substantially evenly across a plurality of physical computing devices 100 in order to maximize the performance of each virtual machine. In another embodiment, the analysis engine 1006 selects a physical host for execution of the virtual machine such that each physical host in the plurality of computing devices hosts as many virtual machines as the physical host has resources to support, in order to minimize the number of physical hosts. In some embodiments, the analysis engine 1006 executes a customization interface with which a user, such as an administrator, can select an optimization mode in which the analysis engine 1006 should execute; for example, the administrator may configure the analysis engine 1006 to prioritize performance, placing a virtual machine on a physical host that will provide improved performance for the virtual machine, or, in another example, the administrator may configure the analysis engine 1006 to maximize density, minimizing the number of physical hosts required to run a total number of virtual machines (the workload for the pool of physical hosts).

In one embodiment, the analysis engine 1006 assigns a score including a sub-score assigned to a resource provided by each of the plurality of physical hosts, responsive to the retrieved pluralities of metrics. In another embodiment, the analysis engine 1006 generates a score based upon a plurality of sub-scores including scores assigned to, without limitation, a level of available CPU utilization, a level of available memory, a level of available network resource utilization, and a level of available disk utilization. In still another embodiment, each of a plurality of sub-scores are divided into metrics from a plurality of different time periods; for example, the plurality of different time periods may include a current time period, a recent time period, and a historical time period. In yet another embodiment, a level of available utilization of a resource is adjusted based on an anticipated level of utilization by the virtual machine; for example, an initial level of available CPU utilization may be identified as a percentage of total CPU utilization available and then reduced by an amount of CPU utilization used by the virtual machine in previous sessions.

In some embodiments, in which the analysis engine 1006 distributes virtual machine workload to as few physical hosts as possible, the scoring process may include computing a scaling factor to allow for a balance between performance and density with extra weights applied towards density. In other embodiments, in which the analysis engine 1006 distributes virtual machine workload to physical hosts able to maximize the performance of each virtual machine, the analysis engine 1006 may sort a plurality of virtual machines for which it has received requests for identifications of physical hosts, sorting the plurality of virtual machines into an enumerated list that, for example, places virtual machines with higher scores—and, therefore, greater requirements for resources than other virtual machines—at the beginning of the list. In one of these embodiments, by identifying a physical host for a virtual machine with a higher score sooner than for a virtual machine with a lower score, the analysis engine 1006 increases the probability that a physical host with the resources to maximize performance of the virtual machine will be available.

The host recommendation service transmits an identification of one of the plurality of physical hosts on which to execute the virtual machine (1112). In one embodiment, the analysis engine transmits the identification of one of the plurality of physical hosts on which to execute the virtual machine to the host recommendation service 1002. In some embodiments, the host recommendation service 1002 transmits the identification to the pool management component 164a. In other embodiments, the host recommendation service 1002 directs a display of the identification in a user interface from which the host recommendation service 1002 received the request. In other embodiments, the host recommendation service 1002 transmits data identifying workload-related trends with the identification. In further embodiments, the host recommendation service 1002 transmits workload-related reports with the identification.

In some embodiments, the host recommendation service 1002 provides pool optimization recommendations. In one of these embodiments, the analysis engine 1006 generates a pool optimization recommendation. In another of these embodiments, the analysis engine 1006 monitors a plurality of metrics for each of a plurality of physical hosts in a pool. In still another of these embodiments, the analysis engine 1006 determines, for each of the plurality of physical hosts, whether, for any of the metrics in the plurality of metrics, the physical hosts exceeds a configured limit for a specified threshold of time; for example, the analysis engine 1006 may determine that a physical host 106f has exceeded a threshold limiting an amount of CPU utilization. In another of these embodiments, the host recommendation service 1002 recommends migration of a virtual machine from a physical host that exceeds a threshold to a different physical host in order to optimize distribution of workload throughout the pool of physical hosts; the host recommendation service 1002 may identify the physical host to which to migrate the virtual machine using the methods and systems described above. In yet another of these embodiments, the host recommendation service 1002 provides a user with a notification of the exceeded threshold and any migration recommendations identified.

In some embodiments, the methods and systems described herein provide functionality facilitating the identification of physical hosts on which to execute virtual machines. In one of these embodiments, by evaluating historical data associated with both the physical hosts and the virtual machines, the methods and systems described herein provide optimized placement of virtual machines and improved management of workload levels for a plurality of physical hosts.

Figure 12:
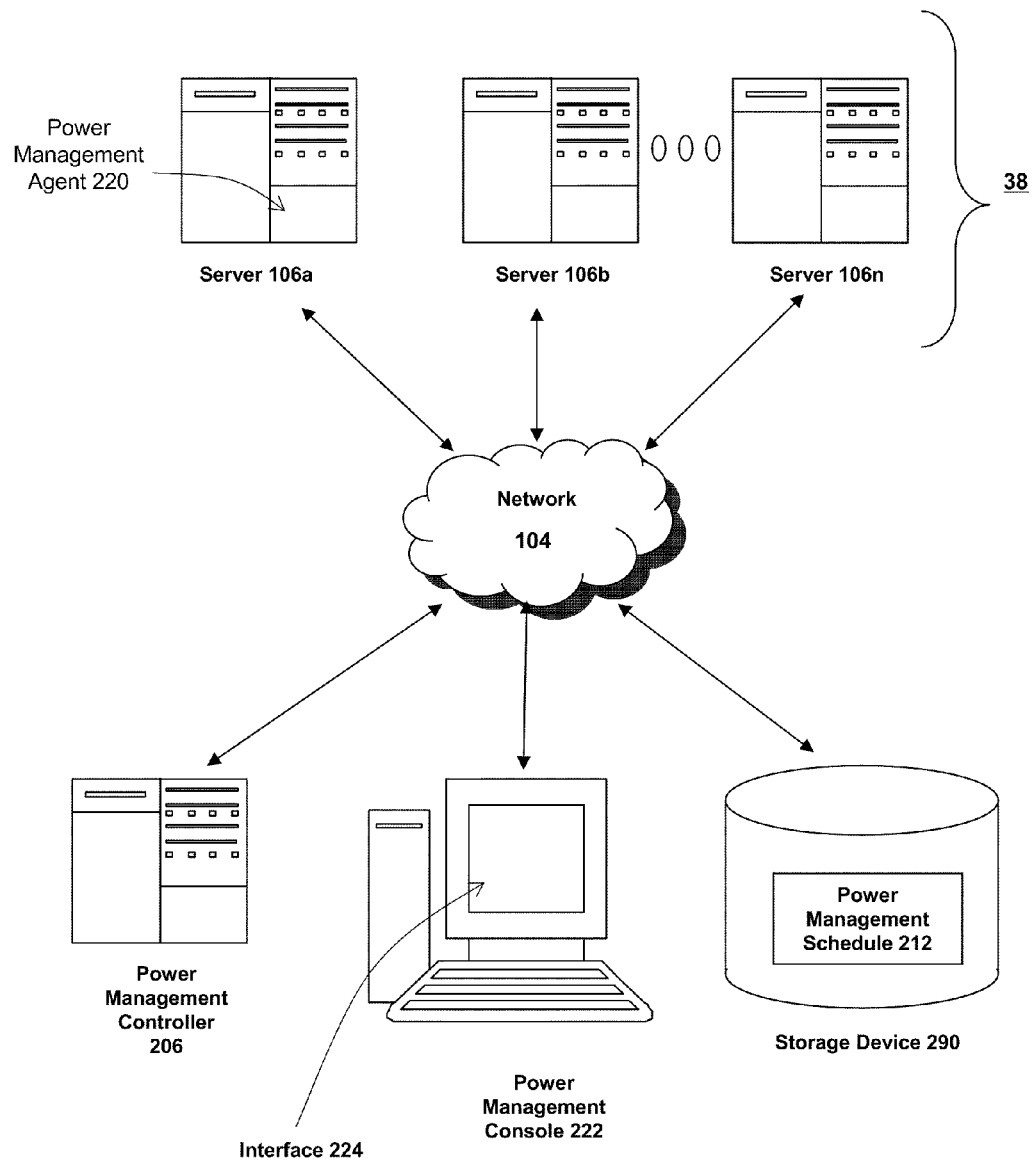
FIG. 12 is a block diagram depicting an embodiment of a system to adaptively load balance user sessions, and dynamically manage power modes for a plurality of servers, to reduce energy consumption.

Referring now to FIG. 12, a block diagram depicts an embodiment of a system for adaptively load balancing user sessions and dynamically managing power modes for a plurality of servers 106 to reduce energy consumption. In brief overview, the system includes a power management controller 1206, a power management console 1222, a storage device 1290 storing a power management schedule 1212, and a plurality of servers 106 monitored by at least one power management agent 1220. The power management console 1222 identifies a session type for each of a plurality of user sessions, defines a server group providing access to a subset of the plurality of user sessions having a common session type, and defines a power management schedule 1212 for the server group. The power management controller 1206 consolidates, onto at least one server 106 in the server group, the subset of the plurality of user sessions. The power management agent 1220 monitors a level of load on one of the plurality of servers 106. The power management console 1222, in communication with the power management agent 1220, defines a power management schedule 1212 for the one of the plurality of servers 106, the power management schedule 1212 generated responsive to the monitored level of load. The power management controller 1206, in communication with the power management console 1222 and the power management agent 1220, dynamically controls a level of power to the one of the plurality of servers 106, responsive to the power management schedule 1212.

In one embodiment, the at least one power management agent 1220 transmits information associated with user sessions provided by the plurality of servers 106, to at least one of the power management console 1222 and the power management controller 1206. In another embodiment, the power management console 1222 identifies a subset of the user sessions of a common session type and defines a server group to provide the subset of user sessions, responsive to the provided information. In still another embodiment, the power management console 1222 defines a power management schedule 1212 for the server group based on loading characteristics of the session type, to manage energy consumption. In yet another embodiment, the power management controller 1206, based on loading information received from the at least one power management agent 1220, and the power management schedule, controls the power level of a server 106 to reduce overall energy consumption.

Referring now to FIG. 12, and in greater detail, the system includes a server farm 38, the server farm 38 including a plurality of servers 106a-n (hereafter referred to generally as "a plurality of servers 106"). In one embodiment, the storage device 1290 resides in a machine 106' (not shown). In another embodiment, the plurality of servers 106, the power management controller 1206, the power management console 1222 and the machine 106' may be any type of computing device 100 described above in connection with FIGS. 1A-1I.

In one embodiment, a plurality of servers 106 provides users of client machines 102 with access to networked resources. In another embodiment, each of the plurality of servers 106 may provide at least one user session to at least one client 102. In still another embodiment, one of the plurality of servers 106 providing access to a user session may execute one or more applications or process one or more files. In still even another embodiment, providing access to a network resource such as a resource accessed within a user session or the user session itself, places a computational burden on the server 106—a level of load. In yet another embodiment, the level of load associated with a user session represents, for example, processing resources used in executing one or more resources or processing one or more data files to the user.

In one embodiment, the level of load associated with a user session represents the total amount of processing resources associated with the user session, such as the accumulated processing resources utilized over a predetermined period of time. In another embodiment, the level of load associated with a user session represents the average amount of processing resources associated with the user session, derived from any type of statistical averaging such as arithmetic mean, geometric mean, harmonic mean, median and mode. In still another embodiment, the statistical averaging may be an instantaneous average, or an averaging performed over any duration of time. In yet another embodiment, the average amount of processing resources associated with the user session is a predicted value determined from a history of the processing resources utilized over a predetermined period of time.

In some embodiments, a level of load represents how many processes are in a queue for access to a processor in a server 106. In other embodiments, a level of load is a measure of work a system is doing. In further embodiments, a level of load is determined using techniques known to one ordinarily skilled in the art.

In one embodiment, the level of load associated with a user session may be determined from performance metrics associated with the server 106 providing the user session. In another embodiment, the performance metrics may include central processing unit (CPU) load, memory usage, paging activity, network activity, disk activity, and end-user performance metrics such as response latency. In still another embodiment, a power management agent 1220 monitors the performance metrics on the server 106.

In one embodiment, the power management agent 1220 may include functionality provided by a monitoring agent 244, 297, 1604, a server agent 1824, or a client agent 120, residing in a server 106, a client 102, or a machine. In another embodiment, each of the plurality of servers 106 includes a power management agent 1220. In still another embodiment, the plurality of servers 106 includes at least one power management agent 1220. In yet another embodiment, a power management agent 1220 monitors the performance metrics associated with a subset of the plurality of servers 106.

In one embodiment, the power management agent 1220 monitors a level of load associated with providing at least one user session, based on the monitored performance metrics, and communicates the level of load to a power management console 1222. In another embodiment, the power management agent 1220 transmits the performance metrics to a power management console 1222. In still another embodiment, the power management console 1222 determines a level of load associated with a user session, based on the received performance metrics.

In one embodiment, the power management agent 1220 may associate a value from each monitored performance metric with each of a plurality of user sessions. In another embodiment, the power management agent 1220 determines the level of load associated with one of the plurality of user sessions based on the associated values. In still another embodiment, the power management agent 1220 communicates the determined level of load to a power management console 1222. In still even another embodiment, the power management agent 1220 transmits the performance metrics and values associated with a server 106 to a power management console 1222. In yet another of these embodiments, the power management console 1222 determines a level of load associated with a user session, based on the received performance metrics and values. In some embodiments, information associated with a level of load, and performance metrics and values associated with a user session is hereinafter referred to generally as "load information".

In one embodiment, the power management agent 1220 transmits load information to at least one of the power management console 1222 and the power management controller 1206. In another embodiment, the load information is transmitted on a regular basis, such as at a fixed time interval or according to a schedule. In another embodiment, the power management agent 1220 transmits the load information in response to a request from the power management console 1222 or the power management controller 1206. For example, a user may initiate a request from a user interface 1224 provided by the power management console 1222. In still another embodiment, a plurality of power management agents 1220 may work in concert or individually. For example, each of the plurality of power management agent 1220 may monitor a subset of the plurality of servers 106 or the server farm 38, and a central power management agent 1220 may collect the load information monitored by the plurality of power management agent 1220 before transmitting to at least one of the power management console 1222 and the power management controller 1206.

In one embodiment, the power management agent 1220 provides, to at least one of the power management console 1222 and the power management controller 1206, information for identifying a session type for at least one of the plurality of user sessions. In another embodiment, the information for identifying a session type for at least one of the plurality of user sessions includes load information. In still another embodiment, the information for identifying a session type for at least one of the plurality of user sessions includes information related to any application or data file included in the user session.

In one embodiment, an agent provided by a monitoring system transmits the performance metrics and values associated with a server 106 to at least one of the power management console 1222 and the power management controller 1206. In another embodiment, an agent provided by a monitoring system transmits load information to at least one of the power management console 1222 and the power management controller 1206. In still another embodiment, an agent provided by a monitoring system provides, to at least one of the power management console 1222 and the power management controller 1206, information for identifying a session type for at least one of the plurality of user sessions. In yet another embodiment, the monitoring system is a CITRIX EDGE-SIGHT system. In some embodiments, the agent includes functionality provided by a monitoring agent 244, 297, 1604, a server agent 824, or a client agent 120.

In one embodiment, a workflow system provides performance metrics and values associated with a server 106 to at least one of the power management console 1222 and the power management controller 1206. In another embodiment, a workflow system provides load information to at least one of the power management console 1222 and the power management controller 1206. In still another embodiment, a workflow system provides, to at least one of the power management console 1222 and the power management controller 1206, information for identifying a session type for at least one of the plurality of user sessions. In yet another embodiment, the workflow system is a CITRIX WORKFLOW STUDIO system.

In one embodiment, the information for identifying a session type includes information related to the usage profile or temporal nature of the user session, or the application or data file in the user session. For example, a user session or an application in the user session may be characterized as persistent or long-lived (such as a desktop session or an email client). In another embodiment, a user session or an application in the user session may be characterized as temporary, transient or short-lived (such as a telnet session or a web browser). In still another embodiment, a user session or an application in the user session may be characterized as ad-hoc (such as a file transfer protocol session or a fax software). In yet another embodiment, a user session or an application in the user session may be characterized as having a cyclic load pattern (such as a point-of-sale software application that is typically used heavily typically during the business hours of a day).

The power management console 1222 provides an interface for identifying a session type for each of a plurality of user sessions, defining a server group providing access to a subset of the plurality of user sessions having a common session type, and defining a power management schedule 1212 for the server group. The power management console 1222, in communication with the power management agent 1220, defines a power management schedule 1212 for one of the plurality of servers 106, the power management schedule 1212 generated responsive to the monitored level of load. In one embodiment, the power management console 1222 receives, from the power management agent 1220, the information for identifying a session type for each of the plurality of user sessions. In another embodiment, the power management console 1222 provides an interface for identifying a session type for each of the plurality of user sessions. In still another embodiment, the power management console 1222 automatically identifies a session type for each of the plurality of user sessions, responsive to the information received from the power management agent 1220. In yet another embodiment, a user identifies, via the provided interface, a session type for each of the plurality of user sessions.

In one embodiment, the session type for a user session is identified as an application session. For example, server 1206 may provide at least one application within an application session—such as a word processing or presentation program, (e.g., MICROSOFT POWERPOINT). In another embodiment, the session type for a user session is identified as a desktop session. For example, a server can provide a desktop session to a user at a client 102 from which the user may access a desktop environment that includes one or more applications and/or one or more data files. In still another embodiment, the session type for a user session is identified as a connection to a virtual machine. For example, the server 106 executes a hypervisor that provides a plurality of virtual machines on the server 106, and each of the plurality of virtual machines may be accessed via a connection to a client 102.

In one embodiment, a session type may be identified as a broad session type. In another embodiment, a broad session type may be further classified into a plurality of session types. For example, an application session, identified as a broad session type, may be further specified as one of a plurality of session types based on the usage profile or temporal nature of the application session. For example, an application or desktop session may be specified as one of the following session types: persistent, temporary, ad hoc and cyclic.

In one embodiment, the power management console 1222 receives, from a power management agent 1220, load information associated with a user session. In another embodiment, the power management console 1222 provides an interface for identifying a level of load, responsive to the received load information associated with a user session. In still another embodiment, the identified level of load is associated with the session type of the user session.

The power management console 1222 provides an interface 1224 for defining a server group providing access to a subset of the plurality of user sessions having a common session type. In one embodiment, the power management console 1222 provides a user an interface 1224 for defining a server group. In another embodiment, a subset of the plurality of user sessions is identified as having a common session type. In still another embodiment, a server group provides access to a subset of the plurality of user sessions having a common session type. In yet another embodiment, a server group includes at least one server 106 substantially optimized to provide user sessions of a common session type. For example, servers including an AMD OPTERON processor are substantially optimized to execute 64-bit applications processing large data files. In still even another embodiment, a server group may include at least one server 106 substantially optimized to consume less power when providing a user session of a certain session type. For example, blade servers may be less power intensive than standalone desktop computers for executing a plurality of point-of-sale software programs.

In one embodiment, the power management console 1222 provides an interface 1224 for defining a power management schedule 1212 for a server 106 in a plurality of servers 106. In another embodiment, the power management console 1222 provides an interface for defining a power management schedule 1212 for a server group. In still another embodiment, the power management console 1222 automatically defines the power management schedule 1212 responsive to identifying a session type for each of the plurality of user sessions. In yet another embodiment, the power management console 1222 automatically defines the power management schedule 1212 for a server group, responsive to defining the server group providing access to the subset of the plurality of user sessions having a common session type.

In one embodiment, a power management schedule 1212 indicates the peak and off-peak periods for at least one of the plurality of servers 106. In another embodiment, a peak period identifies a time period during which the at least one of the plurality of servers 106 should be kept powered up for providing at least one user sessions. In still another embodiment, an off peak period identifies a time period during which the at least one of the plurality of servers 106 can be shutdown or placed in a low-power mode. In yet another embodiment, a power management schedule 1212 may indicate time periods during which the at least one of the plurality of servers 106 is kept at a certain level of power, which may include a powered-down, a low power, an intermediate-power, and a high-power level. For example, a low power level may be represented by any of a sleep, dormant, standby, hibernation, power-saving, or low-power wait mode; an intermediate-power level may be represented by powering-down a subset of processors in a multi-core system.

In one embodiment, a power management schedule 1212 can be applied to a single server 106, a subset of the plurality of servers 106, a server group, or a server farm 38. In another embodiment, the power management schedule 1212 includes recommended directives for placing a server 106 in a certain level of power. In still another embodiment, the power management schedule 1212 includes compulsory directives for placing a server 106 in a certain level of power. In yet another embodiment, the power management schedule 1212 is stored in a storage device 1290.

In one embodiment, the storage device 1290 may be any type of memory 122 described above in connection with FIGS. 1B-1C. In another embodiment, the storage device 1290 may include a plurality of distributed storage devices residing in one or more of the plurality of servers 106, the power management console 1222, the power management controller 1206, and any other machine connected to the network 104. In still another embodiment, the storage device 1290 may be a persistent storage or a dynamic storage. In yet another embodiment, the storage device 1290 is a virtual disk provided in a virtual machine environment.

In one embodiment, the storage device 1290 may store at least one power management schedule 1212. In another embodiment, the storage device 1290 may store any form or type of information such as a level of load or power associated with a server 106 in the server farm 38, and lists of servers 106, user sessions, session types and server groups. In still another embodiment, the storage device 1290 provides information for display, via an interface 1224 provided by the power management console 1222, to a user.

In one embodiment, a user provides a power management schedule 1212 to the storage device 1290 via the interface 1224 provided by the power management console 1222. In another embodiment, the interface 1224 may receive a power management schedule 1212 from a user via a file. In still another embodiment, the interface 1224 is a command prompt interface. In yet another embodiment, the interface 1224 is a graphical user interface (GUI). In still even another embodiment, a user may generate a power management schedule 1212, via the provided interface.

In one embodiment, the interface 1224 may provide any form or type of information to help a user generate a power management schedule 1212. In another embodiment, the provided interface 1224 may provide a representation of the plurality of servers 106 in the server farm 38, the server groups, the plurality of user sessions and their associated session types, and the monitored level of load and power of a server 106 or the server farm 38. In still another embodiment, the provided interface 1224 may provide color coding and other visual aids to the representation, for example, to highlight an instance of server 106 loaded above a predetermined level of load or service level. In yet another embodiment, a hierarchical or structured representation of the server farm 38, server groups, and individual servers 106 may be provided as nodes in a GUI that can be collapsed or expanded via mouse or keyboard operations, for example. In still even another embodiment, the nodes may be expanded to reveal additional hierarchy and/or information, or collapsed to hide some hierarchy and/or information.

In one embodiment, the power management console 1222 dynamically changes the power management schedule 1212 for the server group, responsive to a change in a level of load on at least one server 106 in the server group. In another embodiment, the power management controller 1206 dynamically changes the power management schedule 1212 for the server group, responsive to a change in a level of load on at least one server 106 in the server group. In still another embodiment, the change in the level of load on the at least one server 106a in the server group may include exceeding a predetermined service level threshold such that another server 106b should be powered-up or revived from low-power mode, for example, to respond to a request for a new user session. In yet another embodiment, the change in the level of load may include falling below a predetermined service level threshold such that the server 106a can be powered-down or placed in low-power mode, for example, by migrating, in real-time, a virtual machine from the server 106a to another server 106b. In still even another embodiment, a server 106 may be powered-up or power-down for example, in anticipation for further changes in the level of load that may require higher or lower server capacity from the server group.

The power management controller 1206 consolidates, onto at least one server 106 in the server group, the subset of the plurality of user sessions. In one embodiment, a power management controller 1206 consolidates a subset of a plurality of user sessions having a common session type onto at least one server 106 in a server group. In another embodiment, the power management controller 1206 consolidates, onto at least one server 106 substantially optimized for a session type, the subset of the plurality of user sessions of the session type. In still another embodiment, a power management controller 1206 consolidates a subset of a plurality of user sessions having one or more session types onto at least one server 106 in a server group.

In one embodiment, a power management controller 1206 evaluates a power management schedule 1212 to determine whether to change a level of power on a server 106. In another embodiment, a power management controller 1206, in communication with the power management console and the power management agent 1220, dynamically controls a level of power to the server 106, responsive to the power management schedule. In still another embodiment, the power management controller 1206 includes an agent (not shown) to generate a command to the power management agent 1220 on the first server 106*a* to power down or enter into a low-power mode. For example, in one embodiment, a power management controller 1206 may duplicate session state associated with a desktop session provided by a first server 106*a* to a client 102, on a second server 106*b*, and replace the user's access to the desktop session provided by the first server 106*a* with access to the duplicated desktop session provided by the second server 106*b*; the power management controller 1206 may then power down the first server 106*a*. In yet another embodiment, the power management controller 1206 may migrate, in real-time, a virtual machine executing on a first server 106*a* to a second server 106*b*. In still another embodiment, the power management controller 1206 may consolidate all new user sessions having the common session type onto at least one server 106 in a server group.

In some embodiments, the power management controller 1206 includes an agent (not shown) to dynamically allocate an available resource within the server group. In other embodiments, the power management controller 1206 may provide a control system that evaluates the monitored level of load. In one of these embodiments, the control system includes a feedback mechanism to predict the level of load. In another of these embodiments, the control system may be able to react to moderately changing levels of load but not fast-changing levels of load. In still other embodiments, the power management controller 1206 may provide a dynamic response system to respond to fast-changing levels of load. In one of these embodiments, the dynamic response system may override a control system. In another of these embodiments, the dynamic response system may operate only when fast-changing levels of load are detected by the agent.

In one embodiment, a resource within the server group may be a processor in a multi-processor system, memory, a communication port, a bus, a virtual server 1275, or a server 106. In another embodiment, the power management controller 1206 may allocate or re-allocate a resource to provide user sessions within a server group. In still another embodiment, when a server group is overloaded with user sessions, the power management controller 1206 may allocate or re-allocate a resource across server groups. In still another embodiment, the power management controller 1206 may relocate at least one of the subset of the plurality of user sessions from a first server 106*a* in the server group to a second server 106*b* in the server group. In still even another embodiment, the power management controller 1206 may relocate at least one of the subset of the plurality of user sessions from a first server 106*a* in a first server group to a second server 106*b* in a second server group. In still another embodiment, the second server 106*b* may be powered up or revived from a power-saving mode to provide to relocated user sessions. In yet another embodiment, the power management controller 1206 generates a command to at least one power management agent 1220 to relocate a user session, power up a server 106, or revive a server 106.

In one embodiment, the power management controller 1206 dynamically changes the power management schedule 1212 for a server group, responsive to a change in a level of load on at least one server 106 in the server group. In another embodiment, the power management controller 1206 updates the power management schedule 1212 in response to at least one of the control system and the dynamic response system. In still another embodiment, the power management controller 1206 dynamically allocates or re-allocates a resource, or dynamically relocates a user session between two servers 106, without changing the power management schedule 1212. In yet another embodiment, the power management controller 1206 selects a power management schedule 1212, responsive to a change in a level of load on at least one server 106 in the server group, the power management schedule 1212 selected from at least one power management schedule 1212 stored in the storage device 1290.

The power management controller 1206, in communication with the power management console 1222 and the power management agent 1212, dynamically controls a level of power to the one of the plurality of servers 106, responsive to the power management schedule 1212. In one embodiment, an agent in the power management controller 1206 generates a command to direct a power management agent 1220 to change the level of power on a server 106. In another embodiment, the agent generates a command to direct a power management agent 1220 to place a server 106 in a power-down, low-power, intermediate-power, or high power state. In still another embodiment, the power management controller 1206 includes a transmitter (not shown) for sending a command to the power management agent 1220 to place the server 106 in a power-down, low-power, intermediate-power, or high power state. In yet another embodiment, the command may be transmitted to at least one power management agent 1220 to relocate one or more user sessions between servers 106, for example in conjunction with changing the level of power on a server 106.

In one embodiment, the power management controller 1206 receives status information associated with a server 106 from a power management agent 1220 in addition to load information. In another embodiment, the power management controller 1206 uses the status information to determine service limits on the server 106. For example, a service limit may include a predetermined level of memory swapping on a server 106 above which will result in reduced performance in an executing an application even though the CPU load is low. In still another embodiment, the power management console 1222 uses service limits in response to a power management schedule 1212 and/or a monitored level of load to determine whether to modify the power management schedule 1212, allocate or re-allocate a resource, or relocate a user session. In yet another embodiment, the absence of status information associated with a server 106 from a power management agent 1220 indicates that the server 106 is in a powered-down mode. In yet another embodiment, a transmission from a power management agent 1220 acts as a "heart beat" signal indicating that a server 106 is responsive and functional.

In one embodiment, the power management controller 1206 directs the power management agent 1220, in conjunction with a plurality of external power control means, to control a level of power of a server 106. For example, in the case of blade servers in an intelligent chassis, the power management agent 1220 can transmit a command to the intelligent chassis to power up or power down individual blade servers in the chassis. In another embodiment, the agent can transmit a command to control the power to a server 106 through network accessible power distribution controllers and/or uninterruptible power systems. In still another embodiment, the power management controller 1206 can instruct the operating system of a server 106, via a power management agent 1220, to direct the server 106 go into any power mode, and may make use of facilities such as Wake On LAN (WOL) to direct the server 106 to come out of a low power state. In yet another embodiment, WOL is a networking standard that allows a machine to be powered on or woken up remotely by a network message to the machine's network card or motherboard.

In one embodiment, the power management controller 1206 can send a command to a server's baseboard management controller, via a power management agent 1220, to control a level of power of the server 106, such as directing the server 106 to come out of a low power state. In another embodiment, the baseboard management controller is independent of the server's main processor and remains powered up when the server 106 is powered down. In still another embodiment, the power management agent 1220, may or may not reside on the server 106, and remains operational or powered up when the server 106 is powered down.

In one embodiment, by dynamically altering the number of active servers 106 available, the power management controller 1206 may trigger service limits such that other load evaluators (such as a load balancing controller) may attempt to spread the user session load across the server farm 38. In another embodiment, the consolidation process for reducing energy consumption can adapt to operate with a substantially optimal level of load on each server 106 using a minimal number of servers 106 while meeting minimum service levels.

Figure 13:
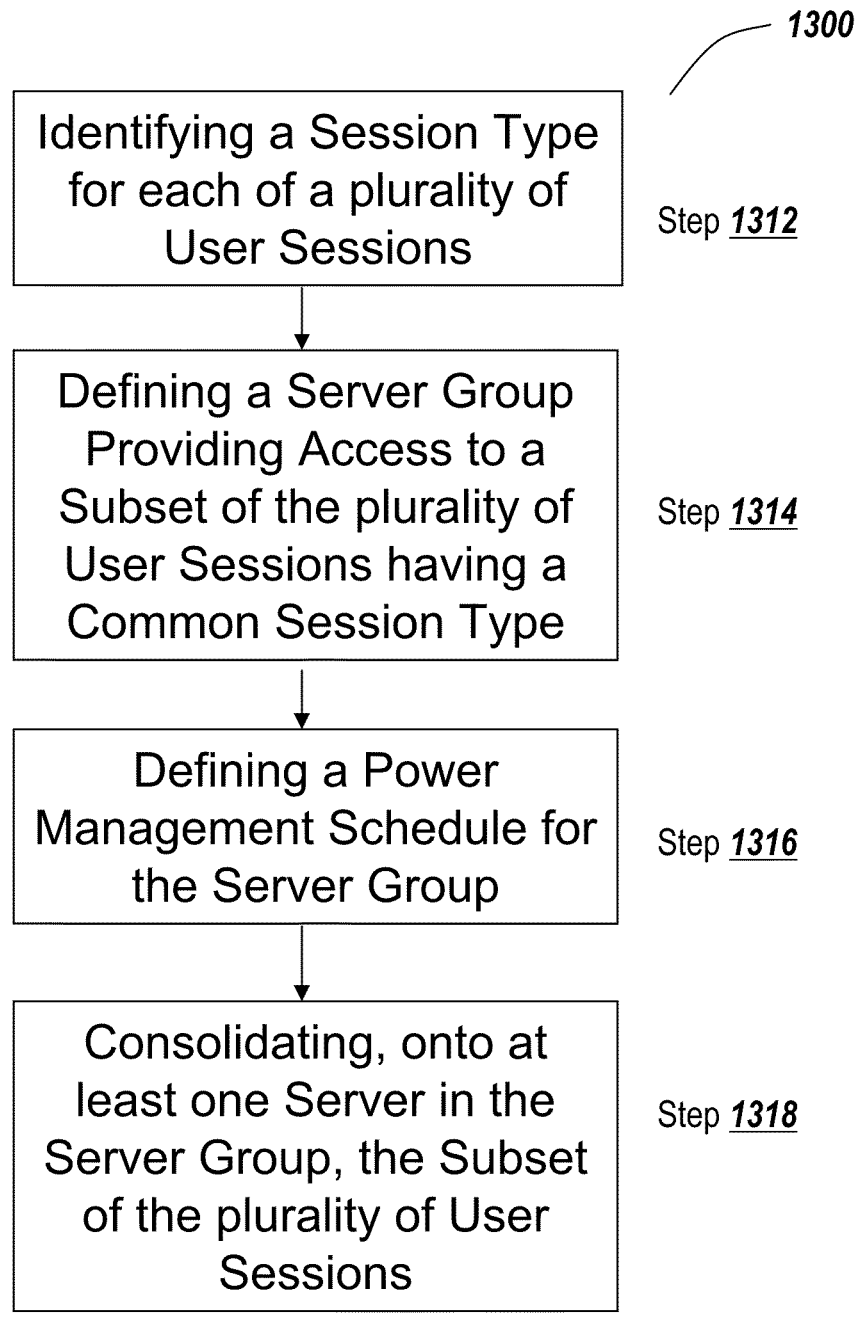
FIG. 13 is a flow diagram depicting one embodiment of the steps taken in a method to adaptively load balance user sessions to reduce energy consumption.

Referring now to FIG. 13, a flow diagram depicts one embodiment of the steps taken in a method 300 for adaptively load balancing user sessions to reduce energy consumption. In brief overview, the method includes identifying a session type for each of a plurality of user sessions (1312). The method includes defining a server group providing access to a subset of the plurality of user sessions having a common session type (1314). The method includes defining a power management schedule 1212 for the server group (1316). The method includes consolidating, onto at least one server 106 in the server group, the subset of the plurality of user sessions (1318).

Referring now to FIG. 13, and in greater detail, a power management console 1222 provides an interface 1224 for identifying a session type for each of a plurality of user sessions (1312). In one embodiment, a session type for each of a plurality of user sessions is identified based on information provided by a power management agent 1220, the information related to each of the plurality of user sessions. In another embodiment, the power management console 1222 receives, from the power management agent 1220, information for identifying a session type for each of the plurality of user sessions. In still another embodiment, the power management agent 1220 monitors a change in a level of load in each of the plurality of user sessions. In yet another embodiment, the power management agent 1220 provides load information to the power management console 1222, to identify the session type for each of the plurality of user sessions, wherein the load information includes a monitored change in a level of load in each of the plurality of user sessions. In still even another embodiment, the power management agent 1220 provides information related to any application or data file included in each of the plurality of user sessions, to identify the session type for each of the plurality of user sessions.

In one embodiment, the power management console 1222 automatically identifies the session type for each of the plurality of user sessions, based on the received information. In another embodiment, the power management console 1222 displays the received information, via the interface 1224, to a user. In still another embodiment, a user defines the session type for each of the plurality of user sessions, via the interface 1224 provided by the power management console 1222 based on the displayed information. In yet another embodiment, the power management console 1222 displays the session type for each of the plurality of user sessions to a user, via the interface 1224.

The power management console 1222 provides an interface 1224 for defining a server group providing access to a subset of the plurality of user sessions having a common session type (1314). In one embodiment, the power management console 1222 automatically defines a server group providing access to a subset of the plurality of user sessions having a common session type, responsive to identifying a session type for each of the plurality of user sessions. In another embodiment, the power management console 1222 automatically defines a server group providing access to a subset of the plurality of user sessions having a common session type, responsive to the information received from at least one power management agent 1220. In still another embodiment, a user defines, via an interface 1224 provided by the power management console 1222, a server group providing access to a subset of the plurality of user sessions having a common session type.

In one embodiment, the power management console 1222 defines a server group including at least one server 106 substantially optimized to provide user sessions of a common session type. In another embodiment, a user defines, via an interface provided by the power management console 1222, a server group including at least one server 106 substantially optimized to provide user sessions of a common session type. In still another embodiment, the user or the power management console 1222 selects the server 106 substantially optimized to provide user sessions of a common session type from the plurality of servers 106 in the server farm 38. In yet another embodiment, the user or the power management console 1222 defines the size of the server group, for example, based on the size of the plurality of user sessions and the monitored level of load on each of the plurality of user sessions.

The power management console 1222 provides an interface 1224 for defining a power management schedule for the server group (1316). In one embodiment, a user defines, via an interface 1224 provided by the power management console 1222, a power management schedule 1212 for the server group. In another embodiment, the power management console 1222 automatically defines a power management schedule 1212 for the server group, based on the received information from at least one power management agent 1220. In still another embodiment, the power management console 1222 or user selects a power management schedule 1212 for the server group, the power management schedule 1212 selected from at least one power management schedule 1212 stored in the storage device 1290. In yet another embodiment, the power management schedule 1212 is defined responsive to the definition of a server group. In still even another embodiment, a power management schedule 1212 is defined for at least one server 106 in a server group.

In one embodiment, the power management console 1222 dynamically modifies a power management schedule 1212 for the server group, responsive to a change in a level of load associated with a server 106. In another embodiment, the power management controller 1206 dynamically modifies the power management schedule for the server group, responsive to a change in a level of load associated with a server 106. In still another embodiment, an agent in the power management controller 1206 dynamically allocates or re-allocates an available resource within the server group, for example power up a server 106, responsive to a change in a level of load associated with a server 106. In yet another embodiment, an agent in the power management controller 1206 generates a command to at least one power management agent 1220 to allocate or re-allocate an available resource within the server group. In still even another embodiment, a transmitter on the power management console 1222 transmits the generated command to the at least one power management agent 1220.

In one embodiment, an agent in the power management controller 1206 generates a command to at least one power management agent 1220 to relocate at least one user session from a first server 106a in the server group to a second server 106b in the server group. In another embodiment, a transmitter on the power management console 1222 transmits the generated command to the at least one power management agent 1220 to relocate the at least one user session from a first server 106a in the server group to a second server 106b in the server group. In still another embodiment, an agent in the power management controller 1206 generates a command to the power management agent 1220 associated with the first server 106a to power down the first server 106a in the server group. In still even another embodiment, a transmitter on the power management controller 1206 transmits the generated command to the power management agent 1220 associated with the first server 106a to power down the first server 106a in the server group. In yet another embodiment, a user session may be relocated to a server 106 that consumes a lower level of power.

The power management controller 1206 consolidates, onto at least one server in the server group, the subset of the plurality of user sessions (1318). In one embodiment, the agent in the power management controller 1206 generates a command for at least one power management agent 1220 to consolidate, onto at least one server 106 in the server group, the subset of the plurality of user sessions. In another embodiment, a transmitter on the power management controller 1206 transmits the command to the at least one power management agent 1220 to consolidate, onto the at least one server 106 in the server group, the subset of the plurality of user sessions.

In one embodiment, using the methods and systems described herein results in the generation of a power management schedule 1212 applicable to each of a plurality of servers 106 and generated responsive to an attribute—such as a level of load or performance metric—of each of the plurality of servers 106. In another embodiment, using the methods and systems described herein results in a plurality of servers 106 identified as providing users with access to resources having a common session type—for example, providing users with access to resources placing substantially similar levels of load on servers 106 or to resources within sessions having substantially similar access times or length of access time—and in which a plurality of users sessions are consolidated onto the plurality of servers 106.

Figure 14:
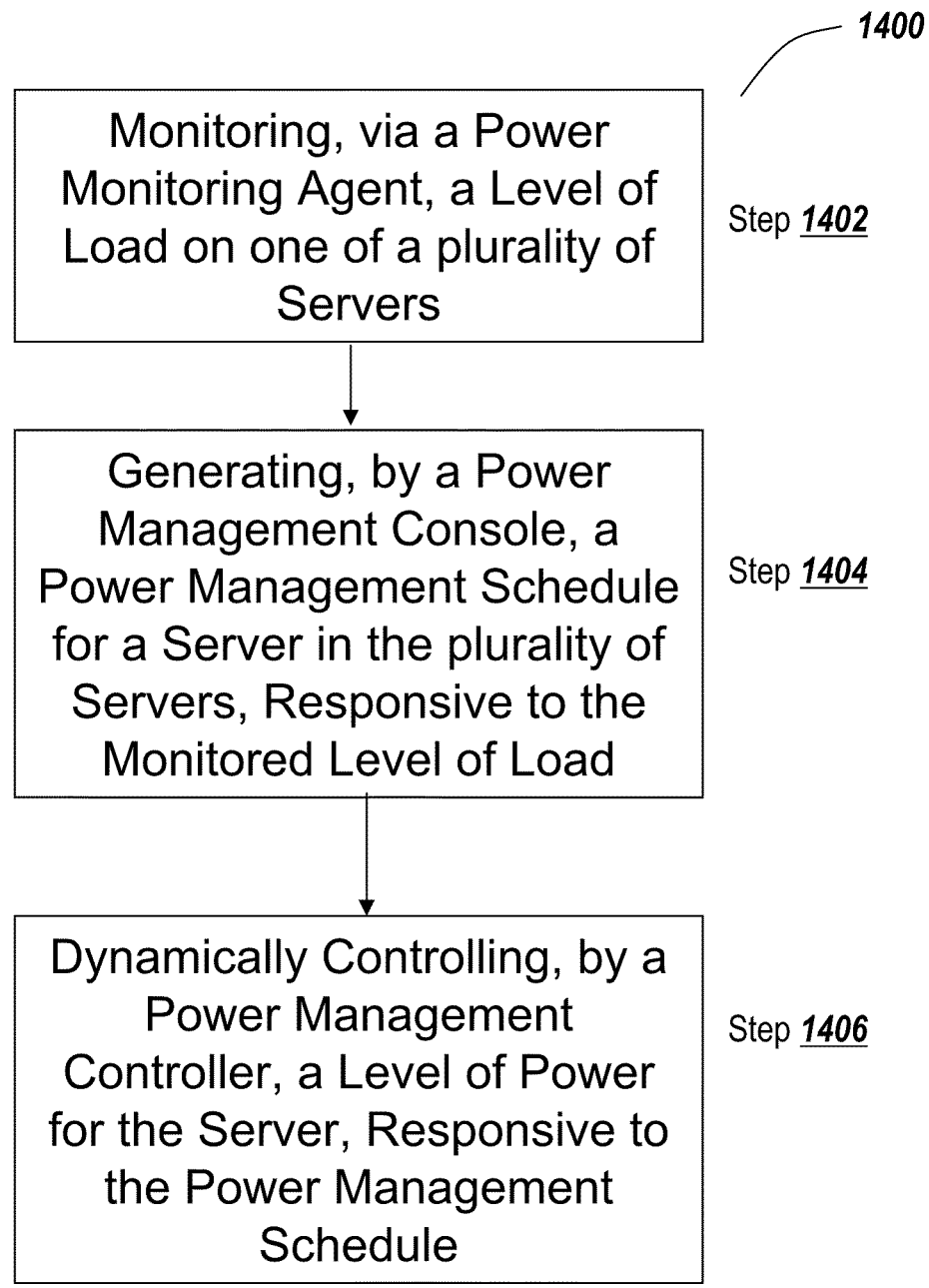
FIG. 14 is a flow diagram depicting one embodiment of the steps taken in a method for reducing energy consumption by dynamically managing power modes for a plurality of servers.

Referring now to FIG. 14, a flow diagram depicts one embodiment of the steps taken in a method 1400 for reducing energy consumption by dynamically managing power modes for a plurality of servers. In brief summary, the method includes monitoring, via a power monitoring agent 1220, a level of load on one of a plurality of servers (1402). The method includes generating, by a power management console 1222, a power management schedule 1212 for a server in the plurality of servers 106, responsive to the monitored level of load (1404). The method includes dynamically controlling, by a power management controller 1206, a level of power for the server 106, responsive to the power management schedule 1212 (1406).

Referring now to FIG. 14, and in greater detail, a power monitoring agent 1220 monitors a level of load on one of a plurality of servers 106 (1402). In one embodiment, a power management agent 1220 monitors a plurality of performance metrics on one of a plurality of servers 106. In another embodiment, the power management agent 1220 determines a level of load for the one of the plurality of servers 106, based on the monitored plurality of performance metrics. In still another embodiment, the power management agent 1220 determines a level of load for at least one user session on the one of the plurality of servers 106. In still even another embodiment, the power management agent 1220 provides the monitored level of load to at least one of the power management console 1222 and the power management controller 1206. In yet another embodiment, the power management agent 1220 provides load information to at least one of the power management console 1222 and the power management controller 1206. In still even another embodiment, the power management agent 1220 is in communication with a monitoring agent 244,297 1604, a client agent 120, or a server agent 824, providing the monitored level of load or load information.

The power management console 1222 generates a power management schedule 1212 for a server 106 in the plurality of servers 106, responsive to the monitored level of load (1404). In one embodiment, the power management console 1222 receives the monitored level of load from the power management agent 1220. In another embodiment, the power management console 1222 receives load information from the power management agent 1220. In still another embodiment, the power management console 1222 determines the level of load based on the load information. In still even another embodiment, the power management console 1222 dynamically generates a power management schedule 1212 for a server 106 in the plurality of servers 106, responsive to the monitored level of load. In still yet another embodiment, the power management console 1222 selects a power management schedule 1212 from at least one power management schedule 1212 stored in the storage device 1290.

In one embodiment, the power management console 1222 provides an interface 1224 to a user. In another embodiment, the power management console 1222 displays, via the interface 1224, the monitored level of load or the received load information to the user. In still another embodiment, the user defines a power management schedule 1212 for a server 106 in the plurality of servers 106. In yet another embodiment, the user selects a power management schedule 1212 from at least one power management schedule 1212 stored in the storage device 1290. In still even another embodiment, the power management console 1222 retrieves a power management schedule 1212 from the storage device 1290, responsive to the user selecting a power management schedule 1212 from at least one power management schedule 1212 stored in the storage device 1290.

In one embodiment, a user can manually override or update the power management schedule 1212, via the interface 1224.

For example, the user can use the interface to direct a server 106 to power down immediately, power down gracefully or power up. In another embodiment, a user can configure the power management controller 1206 to control the level of load or power on a server 106 via the interface 1224. For example, the user can define a sequence for servers 106 within a server group to be powered down or powered up in accordance with the power efficiency of each of the servers 106. In still another embodiment, a server 106 that uses more energy relative to their performance may be shut down before other servers in the server group. In some embodiments, the power management schedule 1212 is generated as described above in connection with FIGS. 12 and 13.

The power management controller 1206 dynamically controls a level of power for the server 106, responsive to the power management schedule 1212 (1406). In one embodiment, the power management controller 1206 dynamically controls a level of power for the server 106, responsive to a change in the level of load. In another embodiment, the power management controller 1206 dynamically modifies the power management schedule for a server 106 in the plurality of servers, responsive to the monitored level of load. In still another embodiment, the agent in the power management controller 1206 generates a command to a power management agent 1220 to dynamically control a level of power for the server 106. In yet another embodiment, the transmitter in the power management controller 1206 transmits the command to a power management agent 1220 to dynamically control a level of power for the server 106.

In one embodiment, the power management console 1222 includes a default server selection algorithm to determine whether to commission or decommission a server 106 while maximizing power savings. In another embodiment, the default server selection algorithm is based on a capacity-per-watt metric for each of the plurality of servers 106. In still another embodiment, a nominal ranking value is assigned to each server 106, so that, for example, a server 106 with a higher ranking value may be powered on before servers 106 of lower ranking. Conversely, a lower ranked server 106a can be powered off before higher ranked servers 106b. For example, to avoid thermal hotspots in a data center blade enclosure that includes a plurality of blade servers 106, each of the blade servers 106 may be assigned a round-robin ranking according to physical position; this can reduce the likelihood that any one blade server 106 is excessively powered on relative to other blade servers 106 in the enclosure. In another embodiment, ranking can be applied to a plurality of blade enclosures to further reduce thermal hotspots between blade enclosures.

In one embodiment, an administrator can apply ranking to control and balance power distribution across a plurality of power distribution units (PDUs). In another embodiment, a plurality of servers 106 may be assigned a default ranking. In still another embodiment, the server selection algorithm randomly selects one of a plurality of servers 106 having the same ranking value to power up or down. In yet another embodiment, the default server selection algorithm can be modified, such as by combining capacity-per-watt metric with ranking, or any other combination of metrics, to drive the server selection.

In one embodiment, user session requests may be queued against one or more servers 106, for example to prevent spreading user sessions across a plurality of servers 106 during periods of high request rates. In another embodiment, user profiling may be applied to predict how long a user may maintain a user session; this data can, for example, be used to direct potentially long-lived sessions to base load servers 106.

In still another embodiment, to allow for greater opportunity to consolidate or migrate user sessions, graceful shutdown of servers 106 may be preferred to minimize any loss of data.

In one embodiment, user session consolidation operates in conjunction with a load balancing system. In another embodiment, user session consolidation is performed by manipulating the load balancing system. For example, the power management console 1222 may send a command to modify the load value (but not the actual level of load) for one or more servers to influence load balancing decisions by the load balancing system. In still another embodiment, a failsafe approach involves disengaging user session consolidation if a failure is detected, so that normal load-balancing can resume. For example, if a power management agent 1220 for a server 106 detects that the power management controller 1206 is no longer available (for example, when the connection is lost), the power management agent 1220 assumes the server 106 is no longer managed for power reduction, and triggers an automatic failsafe procedure to revert the load value on the server 106.

In one embodiment, fault tolerance features may include the ability to manually disengage the load consolidation functionality to at least one server 106 and/or at least one user sessions. If there is a fault with the control of one particular user session, this user session can be disengaged independently of the others. For example, if a server 106 reports an erroneous load or capacity value that is affecting the dynamics of the user session consolidation, an administrator can manually disengage the server 106 or the associated user sessions from the user session consolidation process.

Figure 15A:
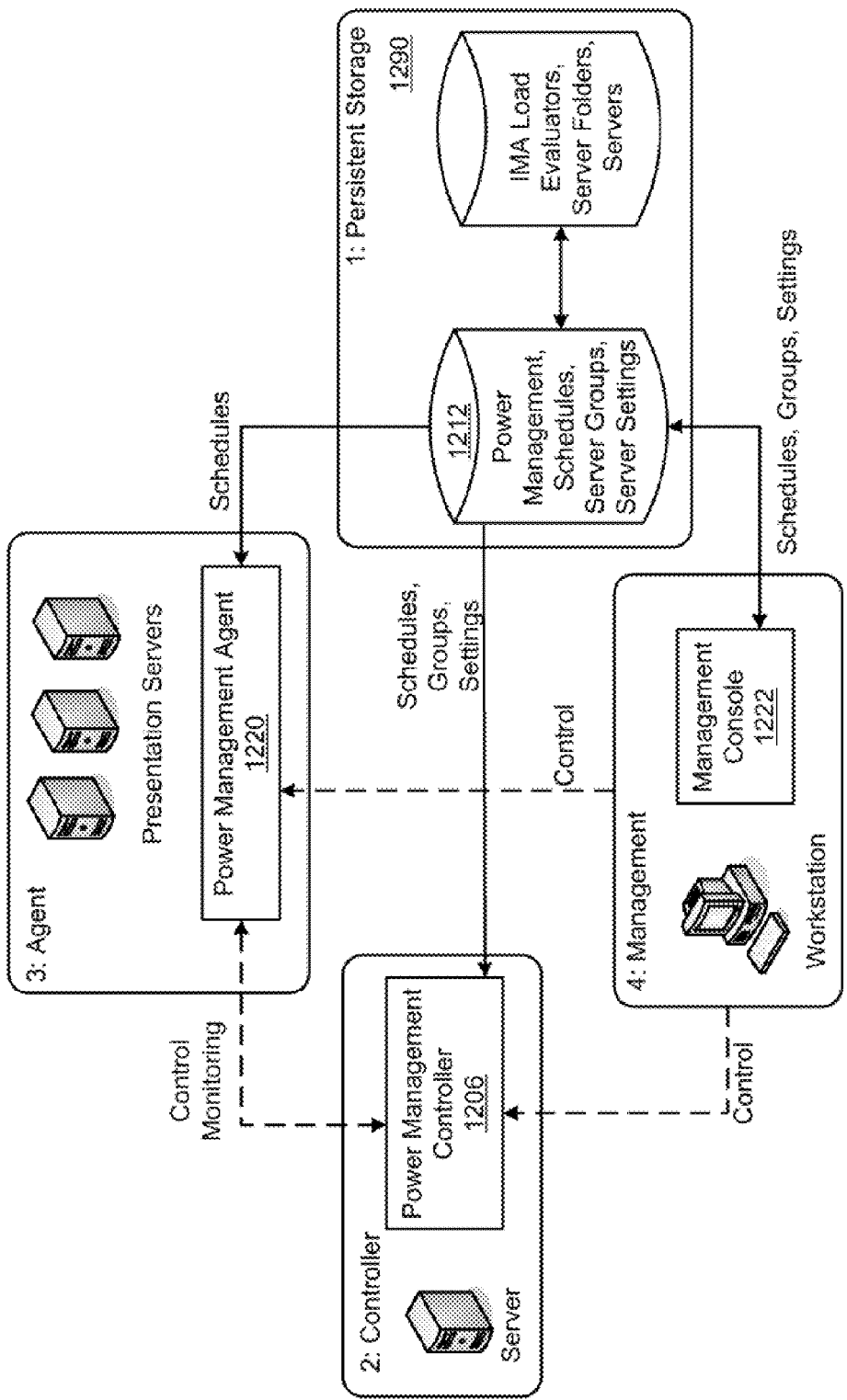
FIG. 15A is a block diagram depicting an embodiment a system to adaptively load balance user sessions, and dynamically manage power modes for a plurality of presentation servers, to reduce energy consumption.

Referring now to FIG. 15A, a block diagram depicts one embodiment of a system for reducing energy consumption in a server farm 38. In brief overview, the system includes a power management agent 1220 on each of the plurality of servers 106, a power management console 1222, a power management controller 1206, and a persistent storage 1290 storing a power management schedule 1212.

Referring now to FIG. 15A, and in greater detail, the system may include virtual machines that execute on the plurality of physical servers 106. In one embodiment, a single physical server 106 may provide access to at least one virtual machine. A server 106 can terminate a virtual machine executing on the server 106 and save the state of the virtual machine to a disk. In another embodiment, the remote presentation system may migrate, in real-time, a running virtual machine from a first physical server 106a to a second physical server 106. Such capabilities can be leveraged to consolidate virtual machines or virtual servers onto a smaller number of physical servers 106 to reduce energy consumption in the server farm 38.

In one embodiment, the server 106 can serve at least one of a desktop session and an individual application session, to a remote client 102. In another embodiment, the server 106 may be powered down when the server 106 is not providing any user sessions to a client 102.

In one embodiment, a plurality of server groups may be defined and associated with a plurality of session types. For example, a plurality of server groups may be defined to consolidate user sessions of different session length or session load. In another embodiment, long lived or persistent applications may be consolidated onto a first subset of the plurality of servers 106 that are the last to be powered down. In still another embodiment, resources which users access for shorter periods of time may be consolidated onto a second subset of the plurality of servers 106. In yet another embodiment, a session type may also be referred to as an application or session silo.

In one embodiment, a plurality of server groups may be defined in the power management console 1222 to consolidate user sessions of different levels of load. In another embodiment, a level of load may be determined by a power management agent 1220 based on at least one performance metric associated with a user session. For example, a user session related to a point-of-sale (POS) software application, such as a transaction application used by a sales representative, may be characterized as having a high level of load throughout a typical business day. In still another embodiment, a plurality of server groups may be defined to consolidate user sessions associated with different usage patterns. For example, a user session related to an email client may be characterized by periodic load or activity throughout a day. In yet another embodiment, a user session related to a fax software application or a web browser may be characterized by ad-hoc usage levels.

In one embodiment, the power management agent 1220 of each server 106 communicates session characteristics and load information to the power management console 1222 of the system. In another embodiment, the power management console 1222 determines the session type for each user session, based on the received session characteristics and load information. In still another embodiment, the power management console 1222 provides a user interface 1224 through which a user can define the plurality of server groups, as well as a power management schedule 1212 for each of the plurality of server groups.

In one embodiment, servers 106 substantially optimized to provide user sessions of a session type are allocated to a server group providing user sessions of the session type. In another embodiment, the power management controller 1206 operates, in conjunction with a load balancing system, to consolidate user sessions of the session type onto a plurality of servers 106 in the server group. For example, point-of-sale software applications may be consolidated onto a server group 1501 optimized for high levels of load. In still another embodiment, since the point-of-sale software applications are typically active and operational during business hours, some of the plurality of servers 106 may power down after business hours to reduce energy consumption.

In one embodiment, applications such as web browsers and fax software, may for example, be consolidated into a server group 1502 comprising servers with lower processing power and capacity. In another embodiment, the ad hoc usage pattern associated with such applications can be a significant characteristic for determining consolidation strategies for reducing energy consumption. For example, the servers providing such user sessions may be selected for being very power efficient while in sleep mode, and can recover quickly from sleep mode to operational mode in response to a session request.

Figure 15B:
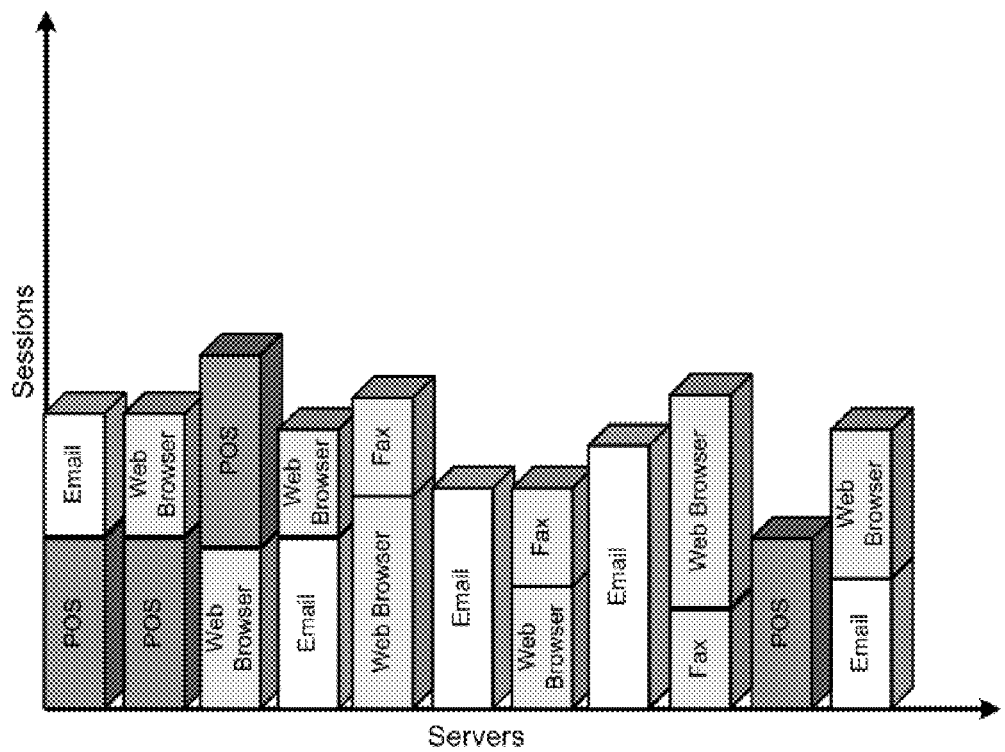
FIGS. 15B and 15C are charts depicting embodiments of a plurality of user sessions before and after consolidation into server groups in connection with the methods and systems described herein.

Referring now to FIG. 15B, a chart depicts an embodiment of session loading across a plurality of servers 106 using a typical load balancing approach. In one embodiment, a typical load balancing approach distributing user sessions across all servers may reduce the opportunity for power saving. In another embodiment, different user sessions of different session types may be distributed substantially evenly across a plurality of servers 106. In still another embodiment, none of the servers are powered-down, and very few servers may qualify to be placed in a low-power sleep mode. In yet another embodiment, one or more of the servers 106 may not be substantially optimized to minimize power consumption while providing the user sessions. In still even another embodiment, power consumption overhead may occur even on servers 106 with low levels of load and may not be reduced further or avoided unless the servers 106 are placed in sleep mode or powered down.

Figure 15C:
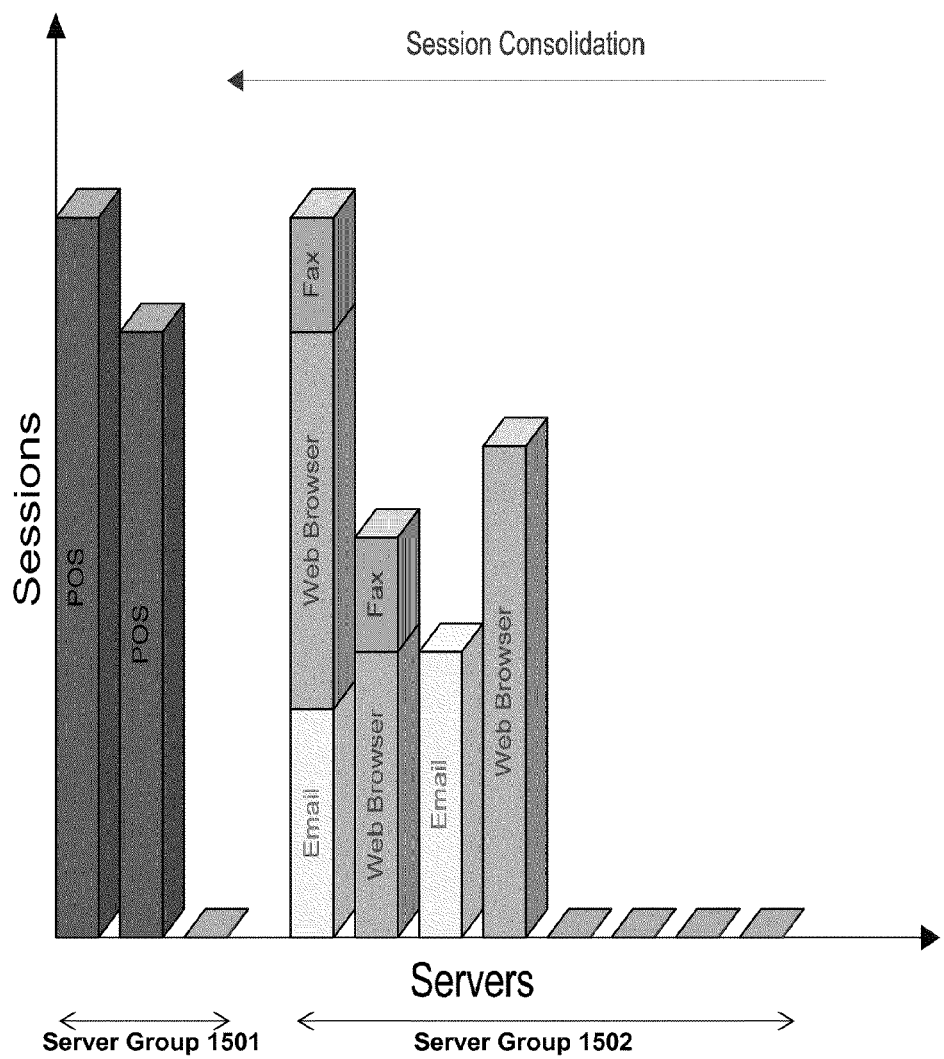

Referring now to FIG. 15C, a chart depicts an embodiment of session loading across a plurality of servers 106 resulting from a power-saving session consolidation process. In brief overview, a plurality of servers 106 are divided into two server groups 1501, 1502, each of the server groups dedicated to providing user sessions of a specific session type.

In one embodiment, point-of-sale software application sessions (e.g., persistent application sessions associated with high levels of load) are consolidated into the first three servers forming a first server group 1501. In another embodiment, user sessions related to fax software, email clients and web browsers (i.e., application sessions associated with low levels of load and/or ad-hoc usage patterns) are consolidated onto eight servers forming a second server group 1502. In still another embodiment, new user sessions are provided from servers 106 from left to right, resulting in a higher probability of servers 106 on the right side to be idle. In yet another embodiment, new user sessions are provided by the leftmost server 106 of each server group until the server 106 reaches capacity or falls below a service level. In still even another embodiment, idle servers, especially the rightmost servers in each server group, may be candidates for power savings by placing in low-power mode or powering down. In still yet another embodiment, the temporal nature of user sessions, such as the length and load profile of the user sessions, can thus facilitate the consolidation process of new user sessions for power reduction.

In one embodiment, some of the active servers 106a may be powered down to conserve energy when the user sessions they provide can be migrated to other servers 106b without exceeding service limits. In another embodiment, a server 106a may re-direct session requests from one or more clients to other servers 106b in preparation to go into power-saving mode. In still another embodiment, the server 106a does not provide new user sessions and waits for existing sessions on the server 106a to end before powering down. In yet another embodiment, the system may migrate virtual machine sessions, in real-time, from a first server 106a to a second server 106b, or replace a user's inactive desktop session with another desktop session on a second server 106b.

In one embodiment, a power-saving consolidation system can operate in conjunction with a load balancing system, as a combined system, to apply service limits on the servers 106 while achieving power savings. In another embodiment, evaluation of load against these service limits may affect how new user sessions are load balanced across each server group and whether to commission new servers out of power-saving modes. For example, load evaluators of a traditional load balancing system may be adapted to operate with the present system to consolidate user sessions and schedule servers 106 for off-peak periods. In still another embodiment, such a combined system can allow user sessions to be spread across a plurality of servers 106 in order to achieve optimal performance for each session and to achieve the consolidation goal.

In one embodiment, the combined system may set both upper and lower thresholds for service limits to prevent the combined system from oscillating around a single threshold. As an illustration, and in one embodiment, a consolidation scheme may have a single service limit threshold set for a first server 106a such that a second server 106b will be powered up to provide new user sessions if the level of load on the first server 102a exceeds the threshold. If the level of load on the first server 106a fluctuates around the threshold and the level of load of new sessions are low, the second server 106b may powered up and down in tandem with the fluctuations, leading to operational and energy inefficiency. In contrast, if upper and lower thresholds for service limits are set to span a substantial portion of the fluctuations in the level of load, the second server 106*b* can remain powered-down or powered-up for longer periods of time. In some embodiments, this pattern of powering up and down is referred to as hysteresis.

In one embodiment, as users log off, for example after business hours, an increasing number of servers 106 can be powered down to conserve energy. In another embodiment, as more users requests new user sessions, for example during peak periods, additional servers 106*b* can be powered up as the level of load on active servers 106*a* reaches the upper thresholds of their service limits. In still another embodiment, a power management agent 1220 on each server 106 can transmit load information to a power management console 1222 and a power management controller 1206 so that any dynamic allocation of resources, such as servers 106 to provide new user sessions, can be made. In yet another embodiment, the power management agent 1220 on each server 106 can transmit updated load information to the power management console 1222 and the power management controller 1206 for updating the power management schedule 1212 and/or dynamically adjusting the number of active servers to handle the number of user sessions. In still even another embodiment, the power management console 1222 and the power management controller 1206 can monitor the load pattern over time and preemptively start servers 106 before they are required in order to reduce the delay associated with provisioning a new server 106.

In one embodiment, the systems and methods described herein may be used for adaptively load balancing virtual machines executing on a plurality of servers 106 to reduce energy consumption. Referring again to FIG. 12, in an embodiment, the method includes identifying a virtual machine session type for each of a plurality of virtual machines. The method includes defining a server group providing access to a subset of the plurality of virtual machines having a common virtual machine session type. The method includes defining a power management schedule 1212 for the server group. The method includes consolidating, onto at least one server 106 in the server group, the subset of the plurality of virtual machines. In one embodiment, the method includes receiving, from a power management agent 1220, information identifying a virtual machine session type for at least one of the plurality of virtual machines. In another embodiment, the method includes defining a server group including at least one server substantially optimized to provide virtual machine sessions of the common virtual machine session type. In another embodiment, the method includes monitoring, by a power management agent 1220, a change in a level of load.

In one embodiment, the method includes dynamically modifying the power management schedule 1212 for the server group, responsive to a change in a level of load. In another embodiment, the method includes dynamically allocating an available resource within the server group. In still another embodiment, the method includes relocating at least one of the subset of the plurality of virtual machines from a first server 106*a* in the server group to a second server 106*b* in the server group. In still even another embodiment, the method includes powering down the first server 106*a* in the server group. In yet another embodiment, the method includes powering up a virtual machine. In still yet another embodiment, the method includes powering down a virtual machine.

In some embodiments, the systems and methods described herein may be provided by a power control system (PCS). In one embodiment, a power control system controls a plurality of servers 106 providing a user session of a particular session type. In another embodiment, the plurality of servers 106 may include an application server, a desktop server, a virtual server 1275, or a web server. In still another embodiment, the power control system may manage at least one CITRIX PRESENTATION server, CITRIX XENAPP server, or CITRIX XEN DESKTOP server.

In one embodiment, a power control system includes all of the components described above in connection with FIG. 12. In another embodiment, a power control system manages a plurality of servers 106 at a plurality of sites. In still even another embodiment, the power control system controls a plurality of servers 106 such that a minimum number of servers 106 are powered up to provide the user sessions while maintaining required service levels. In yet another embodiment, a power control system improves server utilization and reduces energy consumption compared to maintaining the plurality of servers 106 powered up all the time or for extended periods of time.

In one embodiment, a power control system is a closed-loop control system that monitors the load and capacity of a plurality of servers 106. For example, in another embodiment, the monitored load and server capacity are used as feedback in the power control system to drive available capacity to meet desired service level requirements by controlling the number of servers 106 for handling a plurality of user sessions. In still another embodiment, a power control system controls the plurality of servers 106 based on a plurality of setpoint parameters. In yet another embodiment, the plurality of setpoint parameters specifies a desired level of capacity in relation to a level of load on the plurality of servers 106. In still even another embodiment, the plurality of setpoint parameters represents the service level thresholds derived from a service level agreement (SLA), for example.

In one embodiment, the setpoint parameters are maintained by any number of external entities including administrators, workflows, automation scripts, schedules, or higher-order control systems such as a service-based control automation (SBCA) system, described below in connection with FIGS. 17A and 17B.

In one embodiment, the service-based control automation system provides resource management by balancing available hardware resources between different workload types. In another embodiment, the service-based control automation system may provide automated provisioning, for example via CITRIX PROVISIONING SERVER. In still another embodiment, the service-based control automation system can receive input from sources such as temperature sensors, power distribution unit sensors and other management systems. In yet another embodiment, the service-based control automation system is in communication with a monitoring system such as the CITRIX EDGESIGHT system, to report on power and cost savings.

In one embodiment, the power control system provides failover from servers 106 in the primary data center to a data recovery site. In another embodiment, during normal operation all servers 106 in the data recovery site are left on standby power. In still another embodiment, partial failover can occur where some servers are unavailable or where there is insufficient capacity to meet the number of user session requests. In yet another embodiment, a complete failover of the data center may require a redundant power control system in the data recovery site to take control of the data recovery servers. In still even another embodiment, a partial failover may require a primary power control system to continue to manage local servers while spilling over excess capacity to servers in the remote data recovery site. In yet another embodiment, the primary power control system communicates, to the redundant power control system, the additional capacity required to meet a shortfall. In further embodiments, the redundant power control system provides data recovery servers to meet the shortfall, in response to the communication with the primary power control system.

In one embodiment, when service and capacity is restored at the primary data center, user sessions are migrated back to the primary data center. In another embodiment, a rack of redundant servers in the data center may serve as a data recovery site or a spill-over server group. In still another embodiment, a plurality of spill-over server groups may exist within a primary data center or a primary server group. In yet another embodiment, the plurality of spill-over server groups may be ranked for preference in handling capacity spillover.

In one embodiment, the power control system can place a server 106 into low-power "standby" mode when all user sessions provided by the server 106 become disconnected or are identified to be idle. In another embodiment, when a user session becomes active or attempts to reconnect, the server 106 providing the user session will automatically resume an appropriate, higher power level. In still another embodiment, the power control system includes an agent that monitors for user session activity or client reconnection activity.

Figure 16A:
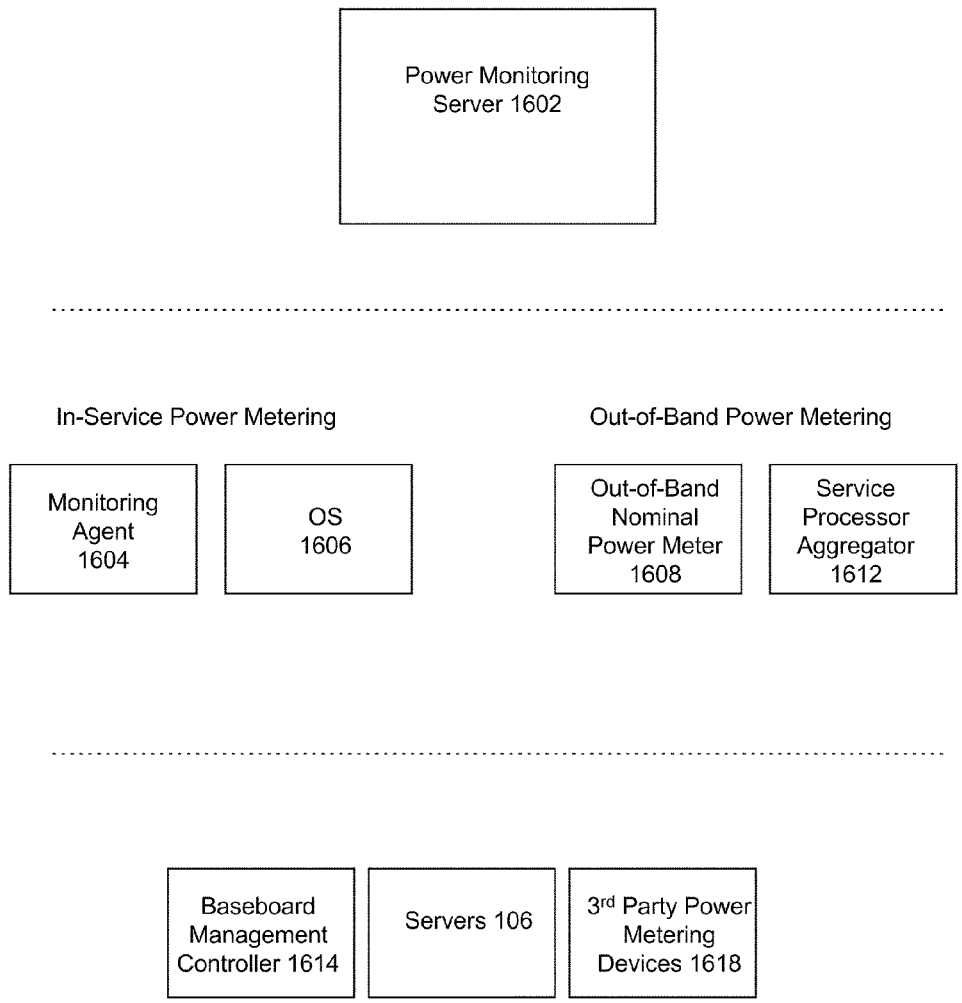
FIGS. 16A and 16B are block diagrams depicting embodiments of a system for power metering and reporting.

Referring now to FIG. 16A, a block diagram depicts one embodiment of a system for power metering and reporting. In brief overview, the system includes a power monitoring server 1602, a monitoring agent 1604, an operating system 1606 (OS), an out-of-band nominal power meter 1608, a service processor aggregator 1612, a baseboard management controller 1614, a plurality of servers 1206, and third-party power metering devices 1618.

Referring now to FIG. 16A, and in more detail, the power monitoring server 1602 provides monitoring and reporting of power consumption for the system. In one embodiment, the power monitoring server 1602 may be a CITRIX EDGESIGHT server. In another embodiment, the power monitoring server 1602 is in communication with a console (not shown). In still another embodiment, power consumption may be reported via the console. In yet another embodiment, a level of power associated with a user session may be reported via the console.

Figure 16B:
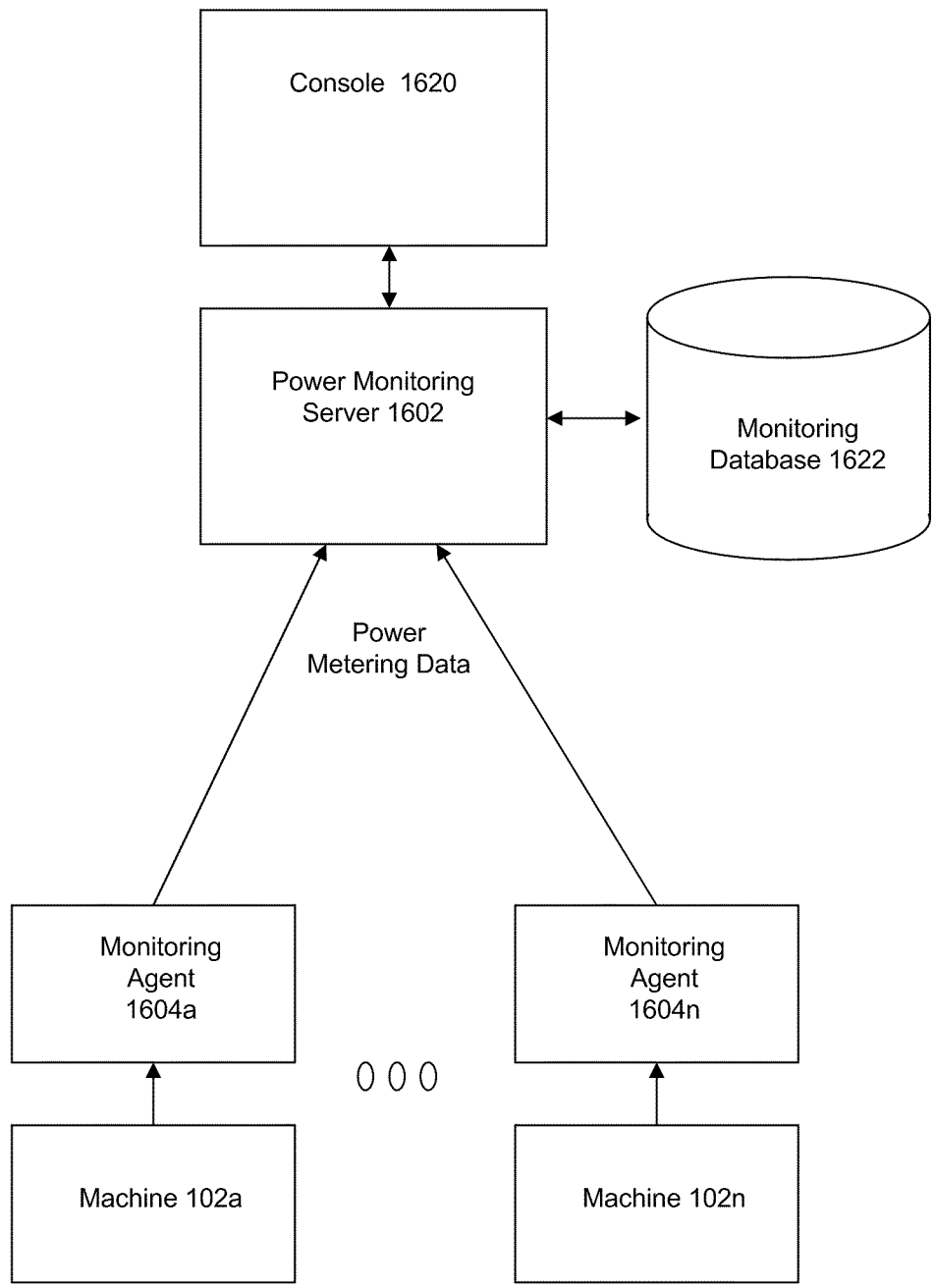

Referring now to FIG. 16B, and in one embodiment, the plurality of servers 106 can be homogenous and supported by in-service power metering. In another embodiment, in-service power metering is provided by at least one monitoring agent 1604, such as a CITRIX EDGESIGHT agent, in communication with the operating systems 1606 of the plurality of servers 106. In still another embodiment, a monitoring agent 1604 collects or determines power metrics of a monitored server 106 and sends the power metrics to the power monitoring server 1602. In yet another embodiment, the monitoring agent 1604 includes functionality provided by a monitoring agent 244, 297, a server agent 1824, or a client agent 120 residing in a server 106, a client 102, or other machine.

In one embodiment, the plurality of servers 106 can be heterogeneous, including a range of vendor-specific service processors, hardware platforms and management interfaces. In another embodiment, an out-of-band power meter can support the heterogeneous plurality of servers 106, alone or in combination with in-service metering. In still another embodiment, out-of-band metering is provided by at least one of an out-of-band nominal power meter 1608 and a service processor aggregator 1612. In yet another embodiment, an out-of-band power meter may be used to monitor the power consumption of a server 106 while in standby mode. In still another embodiment, out-of-band or in-server meter may support virtual servers 1275 and virtual machine power metering.

In one embodiment, out-of-band power metering may be required to monitor the power consumption for "bare metal" machines, for example, machines that do not have substantial functionality to communicate in-service with the monitoring agent 1604. In another embodiment, power data can be collected from a "bare metal" machine if a baseboard management controller on the machine is powered up.

In one embodiment, where an out-of-band power meter is not available, a nominal power meter 1608 can be provided. In another embodiment, nominal power metering involves specifying nominal power consumption values (e.g., in Watts) for each type of server 106, for example, a best estimate of the average power consumption of each type of server 106 when powered up. In yet another embodiment, the nominal power consumption values are specified by an administrator or provided in server specifications. In yet another embodiment, nominal power metering can be useful in providing power estimates and trend analysis.

Figure 17A:
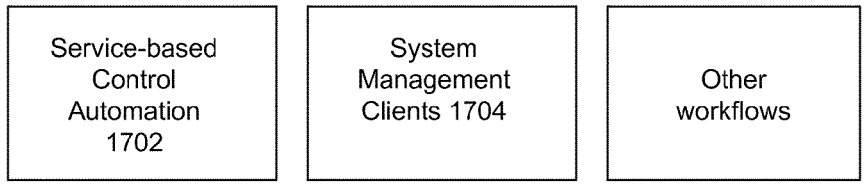
FIGS. 17A and 17B are block diagrams depicting embodiments of a system for controlling server consolidation to reduce power consumption.
Figure 17A:
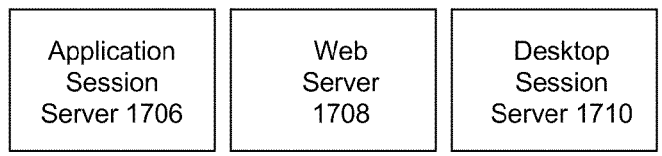
Figure 17A:
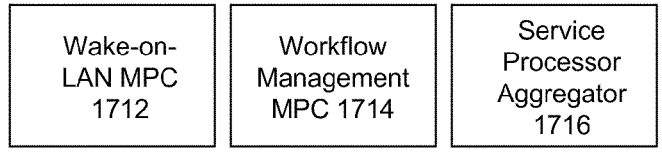
Figure 17A:
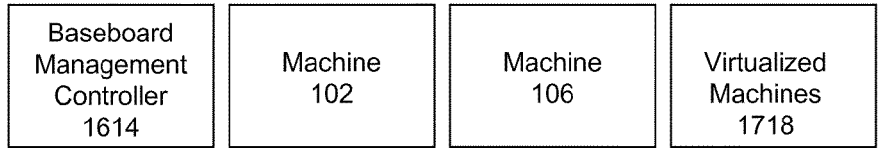
Figure 17B:
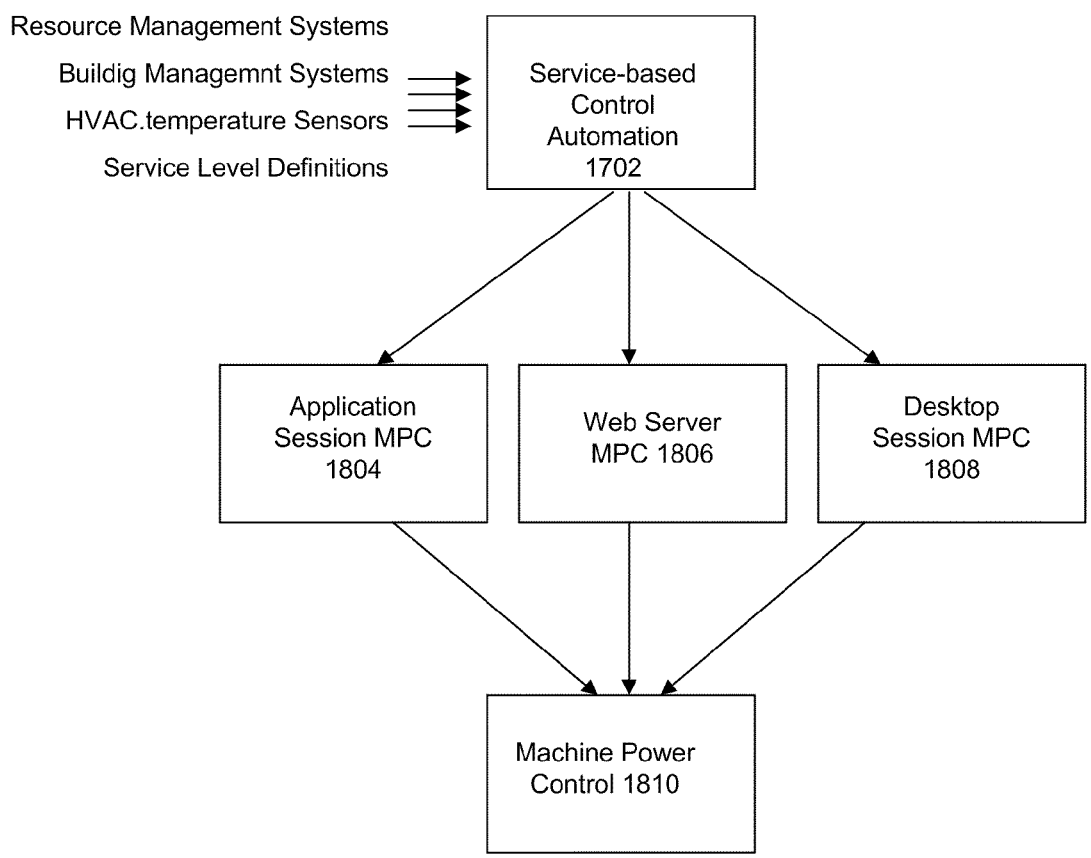

Referring now to FIG. 17A, a block diagram depicts one embodiment of a system for controlling server consolidation to reduce power consumption including control layers in the system. In one embodiment, the system includes control layers for high order controllers, power control systems, machine power control and machine-level control. In another embodiment, higher order controllers, such as a service-based control automation (SBCA) system 1702, dynamically allocates and reallocates resources from a plurality of servers 106 to provide user sessions based on service level policies. FIG. 17B shows one embodiment of inputs to a service-based control automation system 1702 and the control flow from the service-based control automation system 1702 to the machine power control layer.

In one embodiment, at the power control system layer, each power control system manages a plurality of servers 106 at one site, the plurality of servers 106 may include application servers, desktop servers, web servers, virtual servers, or other types of servers. In another embodiment, a multi-site server farm 38 may have a plurality of power control systems, for example, one power control system for each site. In still another embodiment, interfaces for resource selection and setpoint parameter changes are provided by the power control system to the higher order controllers, such as a service-based control automation system 1702. In yet another embodiment, an interface is provided by a power control system to a power management console 1222 to administer the power control system. In still even another embodiment, reporting functionalities are performed, for example, via a power management console 1222, on a power control system database stored in a storage device 1290. In some embodiments, the service-based control automation system 1702 is in communication with at least one machine power control.

In one embodiment, a machine power control (MPC) layer includes controls for powering off/on a server 106 and changing the power level of a server 106, for example, placing a server 106 into standby mode. In another embodiment, as described above in connection with FIG. 12, a command is directed to a power management agent 1220 to control the power level of a server 106. For example, in one embodiment, the power management agent 1220 communicates with the OS to control the power level of a server 106. In another embodiment, remote agent-less control may be implemented with a platform like MICROSOFT WINDOWS Remote Management (WinRM). In still another embodiment, Wake-on-LAN (WOL) controls 1712 may be used to activate a server 106 from low-power standby mode. In yet another embodiment, an Intelligent Platform Management Interface (IPMI) may be implemented in a server's service processors or baseboard management system to activate a server 106 from low-power standby mode.

In one embodiment, a workflow solution, such as CITRIX WORKFLOW STUDIO, may be used as an interface for a machine power control to manage consolidation and/or load-balancing of a plurality of servers 106. For example, Wake-on-LAN activity can be controlled within an interface provided by the workflow solution. The workflow solution can also coordinate machine power control activities across a plurality of heterogeneous servers 106 by providing custom interfaces with each type of server 106. In another embodiment, a service processor aggregator 1716, such as an AVOCENT MERGEPOINT service processor aggregator, may provide a portion of the workflow solution. In still another embodiment, a service processor aggregator 1716 provides an interface for communicating with service control processors from a plurality of vendors. In yet another embodiment, a workflow solution manages at least one of a service-based control automation system, a machine power control and a power control system.

Figure 18:
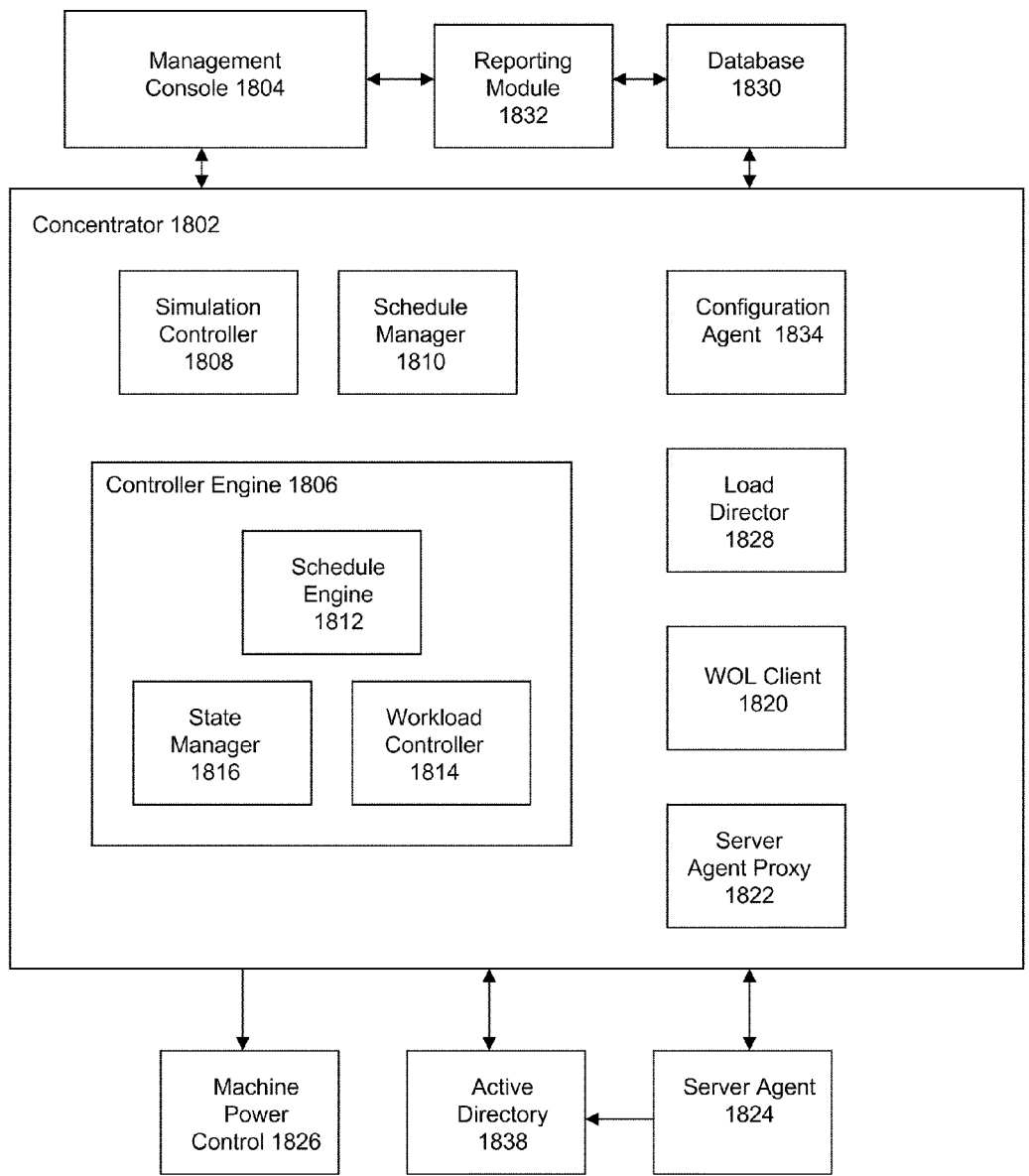
FIG. 18 is a block diagram depicting an embodiment of a system for reducing energy consumption in a plurality of servers.

Referring now to FIG. 18, a block diagram depicts one embodiment of a system for reducing energy consumption in a plurality of servers 106. In brief overview, the system includes a concentrator 1802, a management console 1804, a machine power control 1826, a reporting module 1832, a database 1830, an active directory 1838 and a server agent 1824. In one embodiment, the concentrator 1802 includes a simulation controller 1808, a schedule manager 1810, a controller engine 1806, a wake-on-LAN (WOL) client 1820, a load director 1828, a configuration agent 1834 and a server agent proxy 1822. In another embodiment, the controller engine 1806 includes a schedule engine 1812, a workload controller 1814 and a state manager 1816.

Referring now to FIG. 18, and in greater detail, the concentrator 1802 communicates with at least one server agent 1824 associated with a plurality of servers 106, the plurality of servers 106 being power managed to reduce power consumption. In one embodiment, the concentrator 1802 communicates with the management console 1804 and handles workflow, automation script, and other management and monitoring requests. In another embodiment, the concentrator 1802 may be a power management controller 1206 as described in connection with FIGS. 12-15.

In one embodiment, the concentrator 1802 provides a failover clustering model supporting at least two nodes, i.e., a cluster of two nodes. In another embodiment, one node in the cluster is a master concentrator and all other active nodes will be slave concentrators. In still another embodiment, the synchronization of states between master and slave concentrators in a cluster occurs via a structured query language (SQL) server database. In yet another embodiment, failover support is directed through the SQL server database; each active slave concentrator can continually poll the state of the master concentrator, for example, by observing whether the master concentrator has been actively updating the database. In still even another embodiment, if no updates have been made for a period of time, one of the active slave concentrators may replace the master concentrator and update the database. In still yet another embodiment, database record locking and concurrency management may be used to provide a synchronization mechanism to prevent more than one slave from replacing the master concentrator simultaneously.

In one embodiment, the master concentrator is in communication with a plurality of server agents 1824. In another embodiment, when a server agent 1824 attempts to connect (or reconnect after failover), the server agent 1824 accesses an active directory 1838 to identify a list of active concentrators. In still another embodiment, the listening ports of slave concentrators may be closed so as not to connect to the server agents 1824. In yet another embodiment, the server agent 1824 sequentially attempts to connect with the list of concentrators until a connection is established with the master concentrator.

In one embodiment, the concentrator 1802 provides a range of administrative and automation interfaces for configuring the operation of the system, such as interfaces for the management console, scripts (e.g., MICROSOFT POWERSHELL scripts), workflow activities (e.g., CITRIX WORKFLOW STUDIO activities), WinRM, MICROSOFT Visual Studio, MICROSOFT System Center Operations Manager, and other systems management clients. In another embodiment, the concentrator 1802 provides a simulation controller interface with the simulation controller 1808 for initiating, monitoring and managing simulation control processes in communication with a simulator controller 1808. In still another embodiment, the concentrator 1802 provides a controller interface for operating a controller engine 1806, including providing manual override and control system disengagement directives. In yet another embodiment, the concentrator 1802 provides a scheduler interface to the workload controller 1814 to manage workload controller schedules.

In one embodiment, the concentrator 1802 provides a state management interface to manage and observe the running state of the system, including manipulating workloads and server state. In another embodiment, the concentrator 1802 provides a configuration interface for making a change in system-wide configuration settings. In still another embodiment, the concentrator 1802 provides a resources interface to control server resources available to the user sessions of a session type.

In one embodiment, the concentrator 1802 provides a Wake-on-LAN (WOL) client interface to power on or "wake-up" servers 106 in an environment where power-managed servers 106 support Wake-on-LAN. In another embodiment, the concentrator 1802 provides a machine power control (MPC) interface to communicate with an external machine power control 1826. For example, this interface may be in the form of an external application, workflow, or script that is capable of waking or powering on a machine, whether a physical bare metal machine or a virtual machine. In still another embodiment, the concentrator 1802 provides a machine selector interface for invoking custom-written machine selectors external to the concentrator 1802. In yet another embodiment, the concentrator 1802 provides a load balancing system interface to track, via the state manager 1816, the maintenance state of servers 106. In still even another embodiment, the concentrator 1802 provides a SQL server database interface to access the SQL server database 1830. In still yet another embodiment, the concentrator 1802 provides an active directory 1838 to publish a session control protocol (SCP) associated with the concentrator 1802.

In one embodiment, the system includes a database 1830, for example, a SQL server database, accessed by the concentrator 1802 and a reporting module 1832. In another embodiment, the database 1830 provides the common store of data for a plurality of servers 106 in a server group or server farm 38. In still another embodiment, data stored in the database

1830 includes concentrator node registrations, workload definitions, managed servers 106 and workload mappings, managed server power event log files, server profiles and capacity schedule definitions, and utilization and load metrics. In yet another embodiment, the database 1830 provides a database interface to provide access to database data via SQL. In still even another embodiment, the database 1830 may be stored in a storage device 1290.

In one embodiment, the system includes a reporting module 1832 providing a set of pre-defined reports. In another embodiment, the reporting module 1832 can generate reports of monitored utilization and load metric data in tabular or chart format. In still another embodiment, types of reports available include system-wide utilization reports, system-wide load vs. capacity reports, workload specific utilization reports, workload specific load vs. capacity reports, server specific utilization reports, and server specific load vs. capacity reports. In still even another embodiment, reports may be generated covering different periods and at different granularities (e.g. hourly, daily, weekly) to present server trends and the effect of control system changes. In yet another embodiment, power-related reports can be generated, for example, by populating a report with data collected by a CITRIX EDGESIGHT monitoring system.

In one embodiment, the reporting module 1832 accesses the database 1830 for information to generate reports. In another embodiment, the reporting module 1832 stores reports into the database 1830. In still another embodiment, the reporting module 1832 provides a reporting interface with a web services front end for executing, displaying or printing reports.

In one embodiment, the concentrator 1802 includes a controller engine 1806 providing closed-loop power control of managed servers 106 within a server group for each session type. In another embodiment, the concentrator 1802 instantiates one controller engine 1806 to manage a set of user sessions, with additional instances for each simulation run initiated by the simulation controller 1808. In still another embodiment, the controller engine 1806 tracks the state of workloads and server groups to maintain sufficient capacity to service demand. In yet another embodiment, the controller engine 1806 is controlled with a set of setpoint parameters that is maintained and updated by a schedule engine 1812 or by an external agent. In still even another embodiment, each controller engine 1806 instance hosts a schedule engine 1812 that executes based on schedule definitions managed by a scheduler manager 1810. In some embodiments, a controller engine 1806 provides functionality of a power management controller 1206 as described above in connection with FIGS. 12-15.

In one embodiment, the controller engine 1806 includes a workload controller interface for communicating with a workload controller 1814. For example, in some embodiments, the controller engine 1806 overrides the schedule engine 1812 with specific setpoint parameters for each workload, and for disengaging/reengaging the control system. In another embodiment, the controller engine 1806 includes a state management interface for monitoring a running state of system, for example, by communicating with the state manager 1816 to monitor the user sessions and server states on a server 106. In still another embodiment, the controller engine 1806 includes a Wake-on-LAN (WOL) client interface for each controller engine 1806 instance to power on or "wake-up" servers 106 in environments that support Wake-on-LAN, via communication with a machine power control 1826. In yet another embodiment, the controller engine 1806 includes a machine power control (MPC) interface for each controller engine 1806 instance to power on or "wake-up" servers 106, for example, to supplement WOL.

In one embodiment, the controller engine 1806 includes a load balancing system interface for each controller engine 1806 instance, which is used by the state manager 1816 for tracking the "maintenance" state of servers 106—a server 106 is in "maintenance" when the server 106 is disabled from accepting new user sessions or is not participating in load balancing. In another embodiment, the controller engine 1806 includes a server agent interface allowing a controller engine 1806 instance to communicate with a server agent 1824, for example, to send a command for the server agent 1824 to reduce the amount of capacity provided by a server 106. In still another embodiment, the controller engine 1806 may instruct the server agent 1824, via the server agent interface, to direct session requests away from a server 106 in preparation to decommission the server 106. In still another embodiment, the controller engine 1806 includes a data access layer for accessing the database 1830.

In one embodiment, the controller engine 1806 includes a workload controller 1814. In another embodiment, the workload controller 1814 controls a plurality of servers 106 to drive server capacity to particular setpoint levels. In another embodiment, the workload controller 1814 selects servers 106 to power up or down for changing session type capacity levels. In still another embodiment, the workload controller 1814 may use a selection algorithm based on an amount of capacity change required for a server group, and/or preference and ranking values set against each server 106 in the server group. In still even another embodiment, the selection algorithm can be overridden with a custom implementation invoked via an external application, workflow or script.

In one embodiment, the workload controller 1814 includes a schedule control interface, used by the schedule engine 1812 to request setpoint parameter changes when a scheduled event occurs, for example, to update a power management schedule 1212. In another embodiment, the workload controller 1814 includes an external control interface for overriding the schedule engine 1812 with specific setpoint parameters and for disengaging/reengaging the control system, for example, for each session type. In still another embodiment, a state manager interface is provided for obtaining the persistent and dynamic state of user sessions and servers 106, including load and capacity, for selecting servers 106 from the server group. In yet another embodiment, a Wake-on-LAN client interface is provided for each workload controller instance to power on or "wake-up" servers 106 in communication with Wake-on-LAN clients in environments where WOL is supported.

In one embodiment, the workload controller 1814 communicates with the Machine Power Control 1826 and provides a machine power control (MPC) Interface for workload controller instances to power on or "wake-up" machines in communication with a machine power control 1826, for example, to supplement WOL. In another embodiment, the workload controller 1814 provides a machine selector interface for invoking custom-written server selectors external to the concentrator 1802.

In one embodiment, the controller engine 1806 includes a schedule engine 1812 for initiating setpoint parameter changes to the workload controller 1814 when a scheduled time occurs. In another embodiment, the schedule engine 1812 interfaces with the schedule manager 1810 to obtain schedule definitions. In still another embodiment, a schedule engine 1812 can be instantiated and started by each controller engine 1806 instance, and remains active in processing schedule events until deactivated.

In one embodiment, the schedule engine 1812 provides a schedule control interface and maintained by the workload controller 1814 for requesting setpoint parameter changes when a scheduled event occurs. In another embodiment, a schedule manager interface is provided for obtaining schedule definitions and to determine the next scheduled event on which to act.

In one embodiment, the controller engine 1806 includes a state manager 1816 that monitors the persistent and runtime state of the user sessions, servers 106 and other objects in the system. In another embodiment, the state manager 1816 instance executes as part of a controller engine 1806 instance. In another embodiment, in a simulated controller engine, a state manager 1816 instance is duplicated from an active ("live") controller engine's state manager 1816. In still another embodiment, the state manager 1816 instance may be disassociated from the database 1830 and other discovery mechanisms. In still even another embodiment, when a simulation run is complete, the simulation controller 1808 deactivates the associated controller engine and state manager instances. In yet another embodiment, the metadata related to a simulation run and the metric data collected during the simulation run can be analyzed using the database's reporting facility.

In one embodiment, a persistent state of a server group is synchronized with the database 1830 and the runtime state is derived from external sources, such as emulated inputs. In another embodiment, the persistent state includes user session and session type definitions, server identities with associated control mode setting, preference group, ranking, associated server profile and associated workload. In still another embodiment, the persistent state includes recent power action requests and results for each server 106, and server profiles and associated capacity settings. In still even another embodiment, the runtime state includes current server farm load and capacity metrics and current user session load and capacity metrics. In yet another embodiment, the runtime state includes current server load and capacity metrics, server power on/off state, and server maintenance mode state.

In one embodiment, while a simulation is actively running, the persistent state for the simulation may be fixed. In another embodiment, the state manager 1816 is not affected by changes to the database 1830 and the runtime state is driven by emulated inputs. In still another embodiment, all concentrator nodes in a cluster can maintain, via the corresponding state managers 1816, the persistent state. In still even another embodiment, the master concentrator manages the runtime state via the state manager 1816 in the master concentrator. In yet another embodiment, if there is a failover and a change in master concentrator, the new master concentrator can attempt to resynchronize the runtime state via the state manager 1816 in the master concentrator. In still yet another embodiment, a period of time may be required for a plurality of server agents 1824 to reconnect to the new master concentrator and for the persistent and/or runtime state to be re-established.

In one embodiment, the state manager 1816 provides a state management interface for accessing persistent and runtime state, and setting persistent state values. In another embodiment, the state manager 1816 provides a resource management interface to enable a server agent 1824 to register, deregister and update various state values associated with a server 106. In still another embodiment, the state manager 1816 provides a load balancing system interface to track the "maintenance" state of servers 106. In yet another embodiment, the state manager 1816 provides a data access layer for synchronizing persistent state with the database.

In one embodiment, a simulation controller 1808 in the concentrator 1802 instantiates and manages simulation runs upon request. In another embodiment, an instance of the controller engine 1806 is created for each simulation. In still another embodiment, the results of a simulation are stored in the database 1830 and controller engine 1806 instance is deactivated after the simulation. In still even another embodiment, the simulation controller 1808 may allow multiple simulations to run concurrently. In yet another embodiment, a simulation is used to analyze data monitored by a server agent 1824. In another embodiment, a simulation may provide data to make predictions or provide recommendations to update power management schedules 1212. For example, a simulation may provide results that predict a higher level of load at 9 a.m. compared with 5 a.m., and recommends changing the power management schedule 1212 to power up more servers 106 at 18.30 a.m. to handle the higher level of load.

In one embodiment, each instance of a controller engine 1806 corresponding to a simulation creates an instance of the schedule engine 1812, the state manager 1816, and the workload controller 1814. In another embodiment, a controller engine 1806 instance, whether live or simulated, shares a common group of schedule definitions via the schedule manager 1810.

In one embodiment, the simulation controller 1808 provides a simulation interface for initiating, monitoring and managing simulation runs. In another embodiment, the simulation controller 1808 provides a controller engine interface for creating and managing simulation controller engine 1806 instances. In still another embodiment, the simulation controller 1808 provides a data access layer for storing simulation metadata to the database 1830.

In one embodiment, a schedule manager 1810 in the concentrator 1802 provides workload schedule definitions for use by a schedule engine 1812 instance within each controller engine 1806 instance, for both live and simulated controller engines 1806. In another embodiment, schedules are stored in the database 1830, mapped against user sessions, and define schedule items for setpoint parameters change events. In still another embodiment, a server group of a session type without a schedule is essentially an unmanaged server group and will not be power-controlled by the system. In yet another embodiment, the schedule manager 1810 includes modules for creating, modifying, and deleting schedules. In still another embodiment, the schedule manager 1810 allows schedules to be duplicated for use with other server groups.

In one embodiment, the schedule manager 1810 provides a scheduler interface for managing schedule definitions. In another embodiment, the schedule manager 1810 provides a controller engine interface for creating and managing simulation controller engine 1806 instances. In still another embodiment, the schedule manager 1810 provides a data access layer for retrieving and manipulating schedule definitions in the database. In yet another embodiment, the schedule manager 1810 may provide functionality for a power management console 1222 or a power management controller 1206 as described in connection with FIGS. 12-15.

In one embodiment, the concentrator 1802 includes a configuration agent 1834 that manages system-wide configuration settings. In another embodiment, changes to configuration settings are applied to the database 1830 and shared with other concentrator 1802 instances in the cluster. In still another embodiment, concentrator instance-specific settings may be written to a registry. In yet another embodiment, the configuration agent provides a configuration interface for changing system-wide configuration settings. In still even another embodiment, the configuration agent 1834 provides a data access layer for retrieving and manipulating configuration settings in the database 1830.

In one embodiment, a concentrator 1802 includes a load director 1828 to modify the default behavior of a load balancer to achieve user session consolidation. In another embodiment, the load director 1828 provides a module that modifies the load state for each server 106 in each server group to direct new user sessions to be provided from servers 106 that have not reach their capacity. In still another embodiment, the load director 1828 sends a command to at least one server agent 1824 to modify the load state of the servers 106. In yet another embodiment, this process may be referred as load modulation.

In one embodiment, for each workload, the process of power controlling servers 106 in the server group may operate independently from the load director 1828. In another embodiment, for example, a server group can have its servers 106 power-controlled while the user sessions are not consolidated—such as when the server group includes critical performance criteria in which user session consolidation poses a risk. Conversely, user sessions provided by a plurality of servers 106 may be consolidated onto at least one server 106 of a server group while power controlling the servers 106.

In one embodiment, the load director 1828 operates based on concentrator configuration settings maintained by the configuration agent 1834. In another embodiment, the load director 1828 provides a state management interface for obtaining server group definitions and server states, including load information collected from a server agent 1824. In still another embodiment, the load director 1828 provides a server agent interface for initiating load modulation requests, via at least one server agent 1824, to a plurality of servers 106.

In one embodiment, the concentrator 1802 includes a Wake-on-LAN client 1820 for powering on or "waking-up" servers 106, as directed by the workload controller 1814. In another embodiment, Wake-on-LAN (WOL) is the default mechanism to power on a server 106. In still another embodiment, an override for the default mechanism is provided in the configuration settings by an external machine power control 1826 (MPC), workflow, script or application. In yet another embodiment, the Wake-on-LAN Client 1820 provides a Wake-on-LAN client interface to power on or "wake-up" a server 106 from standby mode when provided with the server's media access control (MAC) address and/or internet protocol (IP) address. In still even another embodiment, the Wake-on-LAN Client 1820 provides a network interface for transmitting Wake-on-LAN packets. In still another embodiment, the Wake-on-LAN Client 1820 communicates, via a server agent proxy 1822, with a server agent 1824 to power on or "wake-up" a server 106.

In one embodiment, the concentrator 1802 includes a server agent proxy 1822 that acts as an intermediary for requests to server agents 1824. In another embodiment, incoming requests may include server registrations and server state changes. In still another embodiment, outgoing requests from the workload controller 1814 may include a request to allow existing user sessions to complete/terminate on a server 106 followed by the powering down of the server 106. In yet another embodiment, outgoing requests from the load director 1828 include a request to modulate load on a plurality of servers 106.

In one embodiment, a server agent proxy 1822 publishes a concentrator node in an active directory 1838, as a service connection point (SCP) that includes address and binding information. In another embodiment, the server agent proxy 1822 accepts connection requests with server agents 1824 when the concentrator 1802 is the master concentrator.

In one embodiment, the server agent proxy 1822 provides a server agent interface for communications with at least one server agents 1824. In another embodiment, the server agent proxy 1822 provides a server agent proxy interface for concentrator components, such as the load director 1828, to forward requests to a server agent 1824. In still another embodiment, the server agent proxy 1822 provides a resource management interface maintained by the state manager 1816 for forwarding registration requests and server state change events from a server agent 1824.

In one embodiment, the system includes at least one server agent 1824, each server agent 1824 executing on each server 106 managed by the system. In another embodiment, a server agent 1824 registers a server 106, monitors various server state variables and acts on requests issued by the concentrator 1802. In still another embodiment, the server agent 1824 may include functionality provided by a CITRIX EDGESIGHT agent, a power management agent 1220, a monitoring agent 244, 1604, or a client agent 120, and may reside in a machine, server 106 or client 102. In yet another embodiment, a server agent 1824 identifies the server agent's concentrator endpoint (or cluster of concentrators) by querying a session control protocol (SCP) in an active directory 1838.

In one embodiment, a server agent 1824 may report a change in state, such as a change in load or in the number of sessions provided by the server 106, to the concentrator 1802. In another embodiment, the server agent 1824 can respond to concentrator requests to modulate load, or to prepare to decommission a server 106. In still another embodiment, if a connection to a master concentrator is lost, such as when a slave concentrator takes over as the master concentrator, the server agent 1824 may failover to other concentrators that have published their endpoints in an active directory 1838. In yet another embodiment, when a server agent 1824 loses a connection with the concentrator 1802, the associated server 106 becomes unmanaged and the server agent 1824 relinquishes control of the server 106 and undoes any load balancing changes that the server agent 1824 has made to the server 106.

In one embodiment, the server agent 1824 provides an agent interface to allow a master concentrator to make requests to the server agent 1824. In another embodiment, this interface operates when a dual communication channel is established between the server agent 1824 and the concentrator 1802. In another embodiment, the server agent 1824 provides a server agent interface for registering a server 106 and notifying state changes and changes in session type to a concentrator 1802. In still another embodiment, the server agent 1824 provides a load balancing system interface for tracking state variables for a server 106. For example, a state variable may indicate whether a server 106 is in maintenance and another state variable may include information on the current load. In yet another embodiment, the server agent 1824 publishes a concentrator session control protocol (SCP) in an active directory 1838.

In one embodiment, the system includes a management console 1804 for administering and monitoring the state of the system via the concentrator 1802. In another embodiment, the management console 1804 may include modules for simulation management, controller management, schedule management, state management and monitoring, system-wide configuration, and reporting. In still another embodiment, the management console 1804 provides a simulation controller interface for initiating, monitoring and managing simulation control processes. In yet another embodiment, the management console 1804 provides a controller interface for controlling the operation of a live controller engine. In still even another embodiment, the management console 1804 is a power management console 1206.

In one embodiment, the management console 1804 provides a scheduler interface for managing workload controller schedules. In another embodiment, the management console 1804 provides a state management interface for managing and observing the running state of the system. In still another embodiment, the management console 1804 provides a configuration interface for changing system-wide configuration settings. In yet another embodiment, the management console 1804 provides a reporting interface for executing, displaying and printing pre-defined system reports.

Figure 19:
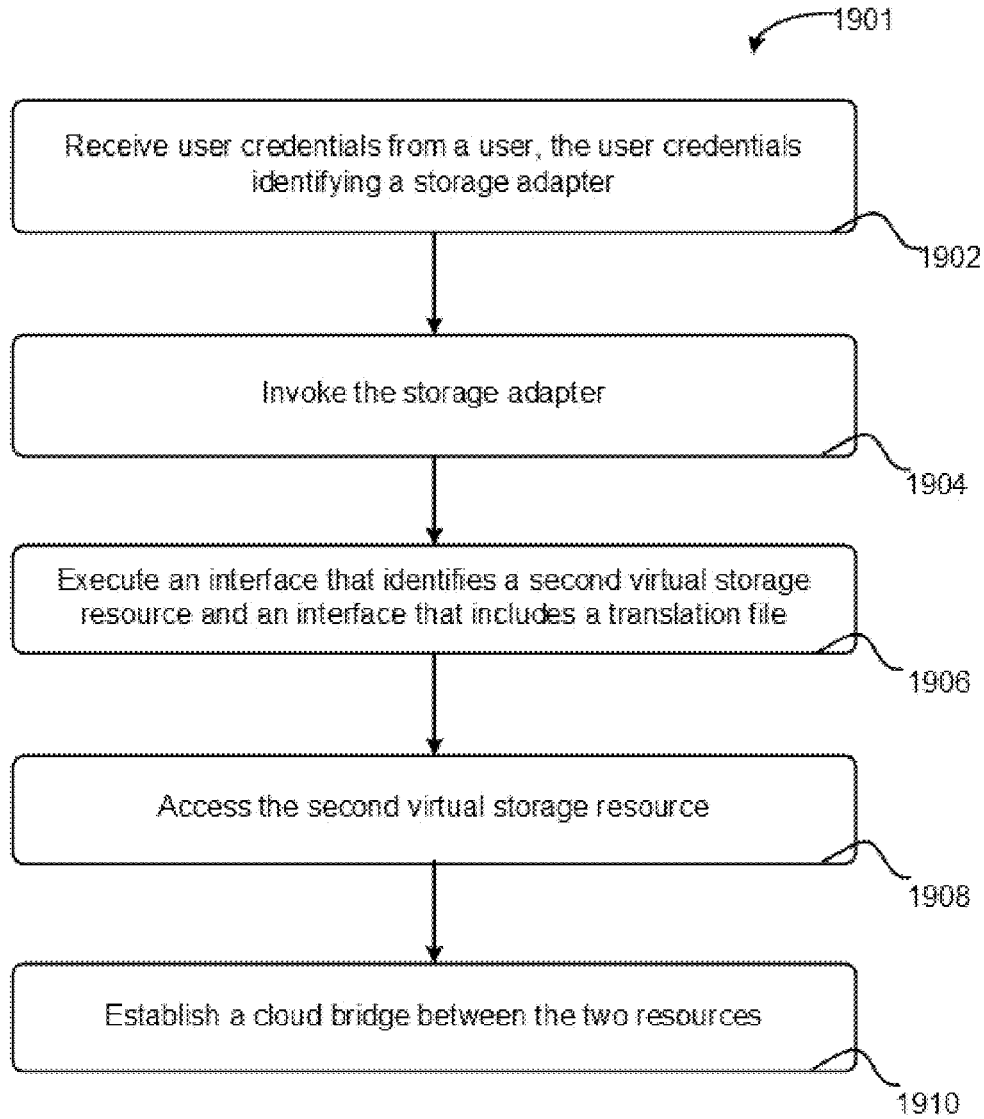
FIG. 19 is a flow diagram depicting an embodiment of a method for establishing a bridge between at least two clouds.

Illustrated in FIG. 19 is one embodiment of a method 1901 for establishing a cloud bridge between two virtual storage resources. A virtual storage resource receives user credentials from a user, where the user credentials identify a storage adapter (Step 1902). The virtual storage resource invokes the storage adapter identified in the user credentials (Step 1904), and the storage adapter executes an interface that both identifies another virtual storage resource, and that includes a translation file (Step 1906). The virtual storage resource can then access the other virtual storage resource (Step 1908) and can establish a cloud bridge between the two resources (Step 1910).

Further referring to FIG. 19, and in more detail, in some embodiments the virtual storage resource, or cloud, can receive user credentials from a user (Step 1902). In some embodiments, this can include passing credentials to the service or virtual storage resource using a "storage-credential-add" command. For example, the following command can be issued to the virtual storage resource to pass to the resource user credentials: CVSM>storage-credential-add name=sys1 module=ACME ipaddress=10.10.10.10 username=admin password=pwd. In some embodiments, the user credentials can identify a storage adapter of another virtual storage resource.

In some embodiments, the step can further include receiving, by a storage delivery management service executing within the virtual storage resource, the user credentials transmitted to the virtual storage resource by the user. The storage delivery management service, in some embodiments, can store the credentials in a database or other storage repository.

In one embodiment, the storage delivery management service can enumerate a list of storage adapters associated with the user. In another embodiment, the storage delivery management service can enumerate a list of virtual storage resources associated with either the user or a storage adapter identified in the user credentials. Enumerating the virtual storage resources can include calling a function, e.g. enumerateStorageSystems( ), stored on a storage adapter identified in the user credentials. The storage adapter, in some embodiments can be an application or program that can execute with the virtual storage resource. In other embodiments, the storage adapter can be a virtual hardware device that can be used to interface with other virtual storage resources.

In still other embodiments, any number of storage discovery methods can be used. In one embodiment, storage discovery methods can permit the storage delivery management service to discover information about the storage systems, pools, volumes, target ports and other information of other virtual storage systems. This information, in some aspects, can be used to interface with and carry out operations with other virtual storage systems.

The following are examples of certain embodiments of storage discovery methods or functions available to a virtual storage system:
enumerateStorageSystems
This method allows the a manager of the virtual storage resource service to identify other virtual storage resources that can be accessed and managed using the user login credentials supplied by the administrator for your storage adapter. Once the storage systems have been discovered users can begin executing operations to interface and use them. In some instances, at startup, once the storage systems have been discovered, the virtual storage resource service issues one or more additional calls to the storage adapter or storage interface to discover additional details about the other virtual storage system. These calls can include enumeration calls such as enumerateStoragePools, and enumerateStorageNodes.
getStorageSystemInfo
This method is similar, in some embodiments, to the enumerateStorageSystems application program interface. In other embodiments, it differs in that it requests information for a particular virtual storage system rather than information about any available virtual storage system, where availability is based in part on user credentials. In still other embodiments, a given management or user credential (IP address, username, password) maps one-to-one to a single virtual storage system. In such cases the application program interface for one virtual storage system is substantially identical to the other application program interface for the other virtual storage system. In this embodiment, the following command can be used in lieu of the above: return enumerateStorageSystems (cred). In other embodiments, a given credential provides access to a management appliance through which multiple storage systems can be managed. In either case, the above command or method can return storage system information for a specific or particular virtual storage system identified in the input argument, e.g. the storageSystemId input argument.
enumerateStorageNodes
Storage nodes may also be known in the SMI-S model as a Storage Volume and very commonly in the industry as a Virtual Disk or a LUN (logical unit number.) In other embodiments, the term Storage Node is used and may also refer to additional Storage Node types (such as NAS storage). In some embodiments, the term storage node and storage volume are used interchangeably. This method may return a list of exposable storage nodes in the virtual storage system. This may include storage nodes that are already assigned to hosts.
getStorageNodeInfo
This method is similar, in some embodiments, to enumerateStorageNodes. In other embodiments, it differs in that it is requesting information about a specific Storage Node.
enumerateStoragePools
In some embodiments, a storage pool is a pool of storage from which a storage node (aka Storage Volume) can be created. Common vendor names for a storage pool include names like RAID Group, Volume Group, and Disk Group. The logical entity from which one can create Storage Volumes can be a Storage Pool. Some virtual storage systems have Storage Pools that have a RAID type associated with them. Others have a set of RAID types that the administrator can select when the storage node is being created.
getStoragePoolInfo
This method is similar, in some embodiments, to enumerateStoragePools. In other embodiments, it differs in that it is requesting information about a specific or particular storage pool. This particular storage pool can be specified in the argument passed to the method.

enumerateInitiatorPorts

In one embodiment, this returns a list of initiator ports that are logged into the virtual storage system. An initiator port, in some embodiments, can be a port used to initiate a connection or to communicate with another port.

enumerateTargetPorts

In one embodiment, this returns a list of all front-end ports (both FC and iSCSI) in a virtual storage system. Front-end ports can be ports used to communicate with a virtual storage system or resource. In some embodiments, the target port or front-end port can be used to expose a storage to a host.

In some instances, there can be added support for the LUN masking/storage assignment methods. The term 'storage assignment' can refer to LUN masking & mapping. In one embodiment, there are four methods that one could use to enable support for LUN masking, these include: enumerateStorageAssignments, getStorageAssignmentInfo, assignStorage and unassignStorage. The first two methods are discovery methods and the second two are methods for assigning and unassigning access of storage to one or more host initiator ports. In still another embodiment, the assignStorage method can be called with a single storage node. In even another embodiment, the list of host initiator ports passed to the assignStorage call can be a set of host initiator ports that reside within the same host. In yet another embodiment, LUN masking may result in providing access to one or more Storage Nodes, via one or more Storage System Target Ports (front-end ports), to one or more Host Initiator (HBA) ports.

In some instances, the storage delivery management service executing on a computer and within the virtual storage resource, can invoke the storage adapter (Step 1904). Invoking the storage adapter can occur in response to receiving the user credentials.

In response to being invoked, the storage adapter can execute an interface that identifies a second virtual storage resource and that includes a translation file (Step 1906). In some embodiments, the storage adapter can use the supplied user credentials (10.10.10.10, admin, pwd) to call a management application program interface, or interfaces, specific to the storage adaptor. These interfaces can gather requested information, and can return the information. For example, they can return one or more CXSSAStorageSystemInfo instances. In other embodiments, identification of the second virtual storage resource can include identifying a storage system object or an identifier. The identifier can be formed using a vendor identifier, a model identifier, and a serial number of the storage system. For example, the vendor and model portion may be provided as ACME_A300_, for a (hypothetical) ACME Corporation A300 model of storage system. In still another embodiment, a serial number example might be "ABCDEF1235", resulting in a storage ID of ACME_A300_ABCDEF12345. In yet another embodiment, non-alphanumeric characters are converted into hexadecimal characters.

In one embodiment, the translation file included or identified by the interface can include XML code. For example, the vendor can supply the XML code to describe a SCSI device ID processor for its storage adapter. In another embodiment, the XML code is utilized to process responses to requests for identifiers into identifiers expressed in a common, cross-vendor format.

The process 1901 can further include a step of creating a snapshot of virtual storage resources. In some embodiments, the method 1901 can include the step of cloning existing storage resources. In some embodiments, storage vendors with an SMI-S compliant storage provider can integrate their SMI-S provider with the interface object 218. The following sections describe, without limitation, one embodiment of a method for integrating with the interface object 218 and providing an interface translation file.

The storage delivery management system can interact with virtual storage systems from multiple storage vendors. The SMI-S model can provide vendors with the means to represent the descriptive data and management application program interfaces for their storage systems (and methods for configuration) in a standardized way. However, the SMI-S model, as it evolves, typically lags behind the capabilities of storage system technologies, particularly regarding those high-performance storage system features that are difficult to standardize in the model precisely because those features are intensely vendor-specific. In addition, in some conventional environments, SMI-S is a highly normalized model, requiring high volumes of individual query calls in order to fully assemble all the data describing instances of some classes (storage volumes and physical disk drives for example), which can result in performance issues on the client side. In some embodiments, implementation of the methods and systems described herein improve performance.

In one embodiment, other customization features exposed by the interface translation file (which may be referred to as a vendor options file, or VOF) allow a client to take advantage of vendor-specific properties and class names to, for example, more accurately interpret the meaning of those properties, and/or filter lists of certain classes according to "subtype". In another embodiment, additional properties in a given object can relieve the client of the expense of needing to perform additional queries in order to assemble all the descriptive data for a given object.

In some embodiments, when creating an interface translation file, a vendor may opt to rely on default values. In one of these embodiments, as a result, the interface object 218 will look in the SMI-S standard locations for attributes and objects that it needs to access. In another of these embodiments, as a result, many of the optimization features described herein are completely optional.

In some embodiments, an interface translation file may include the following items:

1. The vendor's <VendorOptions . . . > tag, with its "VendorPattern" and "ModelPattern" attributes. In one embodiment, this tag encloses the vendor's set of options, and the two attributes in this tag specify how the vendor's systems should be identified (from high-level SMI-S Product information).

2. The <XssaVendorString> string can specify the vendor string that VSM will use within the ID strings for storage systems and storage nodes from that vendor. In other embodiments, other XML attributes are optional, and can be included in the vendor's XML data if that vendor implements features that enable the client to take advantage of the given vendor-specific features or optimizations.

In some embodiments, an interface translation file may include at least one XML tag. The following table—in which the storage delivery management service is referred to as a virtual storage manager (VSM)—describes some of the tags that may be included in one embodiment of the interface translation file:

| Option Tag Name | Description | Default Value |
| --- | --- | --- |
| VendorOptions | Identifies the Vendor Options section by system vendor and model name patterns, includes the VendorPattern and ModelPattern attributes. | For VendorPattern and ModelPattern attributes, no default. |
| vsmVendorString | Vendor substring of VSM ssid created for this vendor. | None. |
| vsmModelString | Model substring of VSM ssid created for this vendor. | "SYSTEM" |
| SysNameTrimString | System serial number prefix delimiter. | None, name string used in ssid. |
| VolumeRaidLevelProperty | SMI-S Storage Volume property that contains the Volume's Raid Level string. | None. Raid Level is determined through Pool or StorageSetting data. |
| VolumeIdProperty | SMI-S Storage Volume property used for the VSM node ID | Name |
| VolumeIdToken | Number of the token within the Volume ID property (when tokenized by space char) used for the VSM node ID. | None. Node ID contains the Volume ID property. |
| ViewFilterProperty | SMI-S SCSI ProtocolController (SPC) property used to filter which SPCs are to be kept when enumerated (for host-based Lun Masking operations). | None, all Views (SPCs) are kept. |
| ViewFilterValue | If ViewFilterProperty is specified, this is the value used to perform the test. Views whose filter property matches this value are kept. | None. |
| ViewFilterClassNameToken | Alternate method of filtering SPCs, based on vendor's SMI-S class name. For a view to be kept, its class name must contain this token. | None, all SPCs are kept. |
| PoolIdProperty | SMI-S Storage Pool property used for the VSM Pool's friendly name. | ElementName. |
| PoolFilterProperty | SMI-S StoragePool property used to filter which Pools are to be kept when enumerated (for Volume creation operations). | None, all non-primordial pools are kept. |
| PoolFilterValue | If PoolFilterProperty is specified, this is the value used to perform the test. Pools whose filter property matches this value are kept. | None. |
| ExposePathElementNameParam | Optional (vendor-specific) parameter name for "friendly name" in Lun Masking (View/SPC creation). | None. |
| ViewNameSupported | Specifies whether vendor supports friendly names on View/SPC objects. | false |
| NodeNameSupported | Specifies whether vendor supports friendly names on Volume objects. | false |
| IPortNameSupported | Specifies whether vendor supports friendly names on initiator port objects. | false |
| MaxElementNameLength | If friendly names are supported on some objects, specified maximum number of characters allowed. | No limit. |

The following section provides additional detail associated with each of the tags listed above.

<VendorOptions>

In one embodiment, this tag contains the tokens by which the VSM (virtual storage manager) module can recognize and identify a given Vendor/Model storage system, from data in that array's "Top Product" CIM (common information model) instance, and can enclose the entire Vendor Options section for the storage system type identified by attributes in this tag.

In another embodiment, array providers implement the "Physical Product" profile, in which an instance of the CIM_Product class represents the product data for the system as a whole. The key fields in this CIM-Product instance may include the two properties: "Vendor": The vendor name; and "Name": The name of the storage system product (i.e., model). For example, the object path of an Acme Systems array model AZ1000 might look like the following: Acme_ArrayProduct.IdentifyingNumber="12345", Name="AZ1000",Vendor="Acme Systems Inc.",Version="1.2.3" This path may contains these properties: IdentifyingNumber: the serial number; Name: the name of the product, i.e., the model; Vendor: the storage vendor name; and Version: the version of the product, e.g., the master firmware version.

In one embodiment, the VSM module can examine the data in this "Top Product" instance from the array's SMI-S provider and use certain regular expression matching to match the values in the Vendor and Name attributes from this instance to tokens within "VendorOptions" sections in the Vendor Options file. These regular expression patterns can include:
- Direct match: for example, pattern "Acme" matches vendor "Acme" and only vendor "Acme".
- Trailing wild card: for example, pattern "Acme*" matches "Acme" and "Acme Systems", but not "Northwest Acme".
- Leading wind card: for example, pattern "*Acme" matches "Acme" and "Northwest Acme" but not "Acme Systems".
- Leading and trailing wind card: for example, pattern "*Acme*" matches any vendor string in which the token "Acme" occurs anywhere, including "Acme", "Northwest Acme" and "Acme Systems".
- Wild card: pattern "*" matches anything at all.

The following are some examples of how a definition of the Acme AZ1000 might be setup in the CVSM Vendor Options XML file:

<VendorOptions VendorPattern="Acme*" ModelPattern="AZ1000" >
    ... vendor/model-specific options, see below
</VendorOptions>

This example would match the vendor "Acme" per the examples above, and for the model would match only the AZ1000. Other examples for the Model Pattern might include:
- ModelPattern="AZ*": matches any "AZ" model, including AZ, AZ1000, AZ500.
- ModelPattern="AZ1*": matches any "AZ 1000 series" model, including AZ1000, AZ1500.
- ModelPattern="*": matches any product/model.

In summary, the VSM pattern matching rules may require an exact match, require a leading match, require a trailing match, match anything, or be a pattern that can occur anywhere. At the end of the pattern matching search, in one embodiment, the VSM module can identify a "VendorOptions" section of the vendor options XML file which matches the storage system in question and contains options and flags specific for that type of storage system.

<CvsmVendorString>
<CvsmModelString>

These values are, in one embodiment, the substrings that the VSM module uses to construct the VSM "Storage System ID" ("ssid") for the specific storage system vendor/model, according to the specific VSM ssid format. For example, the Acme Systems model AZ1000, serial number 12345, might have an ssid of "ACME_AZ__12345". Or if all Acme models behave exactly the same way, it might simply be "ACME_SYSTEM__12345". While the vendor and model information used by VSM to pattern match/identify a specific type of array and construct the vendor and model portions of the ssid comes from the storage system's "Top Product" SMI-S instance, the serial number portion of the ssid does not need to come from the "IdentifyingNumber" property of this CIM_ Product instance. Rather it may come, for example, from the "Name" property of the actual instance of CIM_ComputerSystem representing the storage system itself.

The translation of the vendor and model patterns into the CVSM tokens within the CVSM ssid is not necessarily literal or simply a shift to uppercase. For example, the VSM module might create ssid strings for storage systems from the "Consolidated Excelsior Incorporated" company to something like "CONEX_SYSTEM__123SerialNumber456".

In some embodiments, possible alternatives to a vender specifying a VSM SSID Token include:
- The vendor supplies their own XML options file per this document, excluding VSM vendor/model token strings, and submits this file.
- Vendors' XML options files are read individually by the VSM module, according to registry data.
- The VSM keeps (and updates, as vendors submit their files) a master XML file to coordinate the options for all vendors, and defines/sets certain internal options such as the VSM ssid tokens for the vendors.

If the <vsmModelString> tag is not included in the vendor's file, this value may assume a fixed default value, such as, for example, "SYSTEM".

<SysNameTrimString>

This option provides, in one embodiment, a means for the serial number portion of the VSM ssid to exclude certain irrelevant prefix characters. For example, a system's CIM_ComputerSystem.Name property might always prefixed with additional characters delimited by, for example, an underscore character, such as: "AZSeries__12345". The options file can specify a "SysNameTrimString" tag, in this case an underscore, such as:

<SysNameTrimString>_</SysNameTrimString>

This may cause the VSM module remove the prefix before the underscore character, and use the remainder for the serial number portion of the generated ssid for that system.

<VolumeRaidLevelProperty>

The actual "Raid Level" for a given SMI-S Storage Volume may be determined by its association to that Volume's instance of StorageSetting. In addition, the "Raid Level" in the terms of SMI-S data, may be the result of calculations involving numeric data including number of data copies, number of spindles that can fail, parity types, etc. Because, in some embodiments, the lookup of StorageSetting data for each and every Volume in the system is extremely expensive, and because Raid Level determination may be very client-unfriendly, and some vendors opt to simply populate a property on the Volume with a "raid level string", either using an existing StorageVolume property or by adding a vendor-specific one. If the vendor provides this data in a StorageVolume property, this VSM Vendor Option tag contains the name of that SMI-S Storage Volume property, which may result in the VSM avoiding the extra expense.

<VolumeIdProperty>

In some embodiments, the default SMI-S StorageVolume property used by VSM to generate the VSM "node ID" is "Name". If, in other embodiments, a different StorageVolume property contains better data for this purpose for some reason (such as "DeviceID", or perhaps "AcmeVolID"), this VSM Vendor Option contains the name of that SMI-S StorageVolume property.

<VolumeIdToken>

Sometimes the value for the SMI-S property used for the Volume ID includes a series of space-delimited substrings. In this case, the VolumeIdToken can be specified as a numeric indicator (zero-based) as to which token within this data field is to be isolated and used in the VSM Node ID. For example, if a vendor specifies (using the VolumeIdProperty option) that the StorageVolume "DeviceID" property is to be used, and the SMI-S StorageVolume instances' DeviceID values are in the form of, for example, "Acme 1234567890", specifying the VolumeIdToken as "1" will result in only the second portion of those DeviceID strings will be used in the VSM Node ID strings.

If not specified, then by default the entire VolumeIdProperty value may be used.

<ViewFilterProperty>

In some embodiments, when the Views (also known as the SMI-S "SCSIProtocolController", or "SPC", objects, and known within VSM as "Storage Assignments") for a storage system are enumerated, the default behavior is that all SPC objects are propagated to the VSM as Storage Assignment objects. However, in other embodiments, storage systems from many vendors instantiate different types of SPC objects for different purposes, not necessarily just for the host-based Lun Mapping/Masking of Storage Volumes. VSM allows the filtering of SPCs based on the value of certain SMI-S SPC properties by specifying the SPC property name to be examined. In further embodiments, any SPC object whose value for this property does match the filter value (see the ViewFilterValue vendor option below) may be excluded from the enumerated list.

<ViewFilterValue>

In one embodiment, this option specifies the value for the SMI-S SPC property, whose property name is specified by the ViewFilterProperty vendor option described above, which will allow a given SPC object, returned from a View enumeration operation, to be included in the list of Views returned to VSM to be converted into VSM Storage Assignment objects.

<ViewFilterClassNameToken>

Some vendors, as explained above, instantiate different types of View/SPC objects which the VSM would wish to exclude from its list of Storage Assignment objects, and these can be filtered using the ViewFilterProperty and ViewFilterValue options. However, in other embodiments, the SPC objects from some vendors do not include a property used for VSM filtering, and this filtering methodology cannot be used. In one of these embodiments, an alternate option can be employed, using the ViewFilterClassNameToken vendor option. In other embodiments, this option looks at the vendor-specific SMI-S class name for each view object, looks for a certain substring within that class name, and keeps those View objects that contain a match.

For example, if the option string is specified as "LunMasking", then an SPC object whose class name is "Acme_LunMaskingProtocolController" will match, while a class name of "Acme_BackendProtocolController" will not.

<PoolIdProperty>

In one embodiment, the default SMI-S StoragePool property used by VSM to generate the VSM friendly name (i.e. display name for the VSM GUI) for the pool is "ElementName". In another embodiment, if a different StoragePool property contains better data for this purpose for some reason (such as "PoolID"), this VSM Vendor Option contains the name of that SMI-S StoragePool property.

<PoolFilterProperty>

In one embodiment, when the StoragePool objects for a storage system are enumerated, the default behavior is that all pool objects are propagated to CVSM. However, in other embodiments, storage systems from some vendors instantiate different types of pool objects for different purposes, not necessarily just for the creation of Storage Volumes. In one of these embodiments, the VSM allows the filtering of Pools based on the value of certain SMI-S pool properties by specifying the pool property name to be examined. In another of these embodiments, a pool object whose value for this property does match the filter value (see the PoolFilterValue vendor option below) may be excluded from the enumerated list.

<PoolFilterValue>

In one embodiment, this option specifies the value for the SMI-S pool property, whose property name is specified by the PoolFilterProperty vendor option described above, which will allow a given pool object, returned from a Pool enumeration operation, to be included in the list of Pools returned to CVSM to be converted into CVSM pool objects.

<ExposePathsElementNameParam>

In one embodiment, the creation of a CVSM "Storage Assignment" object, which joins access between Volumes/Nodes and host initiator ports through the "LUN Mapping and Masking" operations, uses the SMI-S configuration method "ExposePaths".

In one embodiment, to specify the ElementName of the created SPC some vendors have augmented their ExposePaths method signature to include an additional parameter, used to specify this friendly name input. In another embodiment, since this enhancement is not part of the standard SMI-S specification (and therefore the name of this additional parameter is not standardized), any implementation of this additional capability is by definition vendor-specific.

If the vendor provides this additional input parameter on their ExposePaths method call, the name of that parameter can be specified using this vendor option.

<MaxElementNameLength>

In some embodiments, for those vendors that provide the ability to input friendly names on created objects (such as Volumes, Pools, Initiator Ports, Views, etc) but have limitations on the length of those names, the maximum name length can be specified using this option.

<ViewNameSupported>
<NodeNameSupported>
<IPortNameSupported>

In some embodiments, some vendors provide the ability to input friendly names on various types of created objects (such as Volumes, Pools, Initiator Ports, Views, etc). These vendor option flags specifically enumerate which types of objects on which a given vendor supports user naming A friendly name, in some embodiments, can be supported on creating storage volumes (e.g. NodeNameSupported), on creating initiator ports (e.g. IPortNameSupported) or on creating SPC/Views (e.g. ViewNameSupported.)

The following is an example of one embodiment of an interface translation file with relatively few non-default options, other than supporting a wide variety of friendly names of limited length.

```
<?xml version="1.0" encoding="utf-8"?>
<SmisModuleVendorOptionList>
    <VendorOptions VendorPattern="Acme*" ModelPattern="AZ*" >
        <XssaVendorString>ACME</XssaVendorString>
        <XssaModelString>AZARRAY</XssaModelString>
        <ViewNameSupported>1</ViewNameSupported>
        <NodeNameSupported>1</NodeNameSupported>
        <IPortNameSupported>1</IPortNameSupported>
        <MaxElementNameLength>24</MaxElementNameLength>
    </VendorOptions>
</SmisModuleVendorOptionList>
```

The following is an example of one embodiment of an interface translation file including a plurality of configurable options:

```
<?xml version="1.0" encoding="utf-8"?>
<SmisModuleVendorOptionList>
    <VendorOptions VendorPattern="Consolidated Excelsior*" ModelPattern="*" >
        <XssaVendorString>CONEX</XssaVendorString>
        <SysNameTrimString>_</SysNameTrimString>
        <VolumeIdProperty>CEIWWN</VolumeIdProperty>
        <VolumeRaidLevelProperty>ErrorMethodology</VolumeRaidLevelProperty>
        <VolumeIdToken>1</VolumeIdToken>
        <ViewFilterProperty>CEIRole</ViewFilterProperty>
        <ViewFilterValue>LUNMASK</ViewFilterValue>
        <PoolFilterProperty>Usage</PoolFilterProperty>
        <PoolFilterValue>2</PoolFilterValue>
        ExposePathElementNameParam>CEIElementName</ExposePathElementNameParam>
        <ViewNameSupported>1</ViewNameSupported>
        <NodeNameSupported>1</NodeNameSupported>
    </VendorOptions>
</SmisModuleVendorOptionList>
```

The following is an example of one embodiment of an interface translation file including a minimum in their configuration XML. In some embodiments, it would be assumed that this vendor would be depending on the SMI-S standard with no additional enhancements:

```
<?xml version="1.0" encoding="utf-8"?>
<SmisModuleVendorOptionList>
    <VendorOptions VendorPattern="Simple*" ModelPattern="*" >
        <XssaVendorString>SSI</XssaVendorString>
    </VendorOptions>
</SmisModuleVendorOptionList>
```

In some embodiments, SCSI device ID generation is accomplished by gathering=SCSI inquiry page information from all the LUNs discovered at the host and then processing it to create VSM Storage Node Identifiers for each node. The location of the information for form a Storage Node Identifier is specified and unique to each storage system so, in one of these embodiments, each vendor specifies how to create one. Rather than hard-coding this into the VSM service, in another of these embodiments, a vendor may specify this information in XML as a "SCSI Device ID Processor". The following are some examples of SCSI ID processors for various storage systems from various hardware vendors:

```
<?xml version="1.0" encoding="utf-8"?>
<ScsiDeviceIDProcessors
xmlns:xsi="http://www.w3.org/2001/XMLSchema-instance"
    xsi:noNamespaceSchemaLocation='scsi_device_id_config.xsd'>
    <ScsiDeviceIDProcessor>
        <InquiryMatch>
            <Vendor>DGC</Vendor>
        </InquiryMatch>
        <VendorID value="EMC">
        </VendorID>
        <ProductID value="CLARIION">
        </ProductID>
        <EnclosureID page="128" offset="4" length="14">
        </EnclosureID>
        <DeviceID page="131" offset="8" length="16" fmt="hex">
        </DeviceID>
    </ScsiDeviceIDProcessor>
    <ScsiDeviceIDProcessor>
        <InquiryMatch>
            <Vendor>HP</Vendor>
            <Product>HSV300</Product>
```

-continued

```
        </InquiryMatch>
        <VendorID value="HP">
        </VendorID>
        <ProductID value="EVA">
        </ProductID>
        <EnclosureID page="0" offset="154" length="16">
        </EnclosureID>
        <DeviceID page="131" offset="8" length="16" fmt="hex">
        </DeviceID>
    </ScsiDeviceIDProcessor>
    <ScsiDeviceIDProcessor>
        <InquiryMatch>
            <Vendor>HP</Vendor>
            <Product>MSA2212fc</Product>
        </InquiryMatch>
        <VendorID value="HP">
        </VendorID>
        <ProductID value="MSA">
        </ProductID>
        <EnclosureID page="131" offset="36" length="7">
        </EnclosureID>
        <DeviceID page="128" offset="4" length="32">
        </DeviceID>
    </ScsiDeviceIDProcessor>
    <ScsiDeviceIDProcessor>
        <InquiryMatch>
            <Vendor>HP</Vendor>
            <Product>MSA2212i</Product>
        </InquiryMatch>
        <VendorID value="HP">
        </VendorID>
        <ProductID value="MSA">
```

```
            </ProductID>
            <EnclosureID page="131" offset="36" length="7">
            </EnclosureID>
            <DeviceID page="128" offset="4" length="32">
            </DeviceID>
    </ScsiDeviceIDProcessor>
    <ScsiDeviceIDProcessor>
            <InquiryMatch>
                <Vendor>NETAPP</Vendor>
                <Product>LUN</Product>
            </InquiryMatch>
            <VendorID value="NETAPP">
            </VendorID>
            <ProductID value="LUN">
            </ProductID>
            <EnclosureID page="192" offset="20" length="4" fmt="hex">
            </EnclosureID>
            <DeviceIDpage="131" offset="21" length="12" fmt="hex">
            </DeviceID>
    </ScsiDeviceIDProcessor>
</ScsiDeviceIDProcessors>
```

In one embodiment, the InquiryMatch information is used to determine if a given LUN with its VENDOR and PRODUCT strings in the STD INQUIRY page are a match with this SCSI ID processor. If so, the values under VendorID and Product ID are used to form the first half of the Storage Node ID. In another embodiment, the information in the Enclosure ID tag is used to extract information from the indicated SCSI VDP page to form the Enclosure ID portion of the Storage Node ID. In still another embodiment, the device ID is extracted. In yet another embodiment, the final storage node id may take the form: VENDORID_PRODUCTID_ENCLOSUREID_DEVICEID. In some embodiments, this will match the Storage Node ID layout generated by the storage system interface object 234 (see enumerateStorageNodes, getStorageNodeInfo) or specified in the interface translation XML file for SMI-S based integrations.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for delivering resources between local and remote enterprise hosting sites, it will now become apparent to one of skill in the art that other embodiments incorporating the concepts of the disclosure may be used.

What is claimed is:

1. A method for establishing a cloud bridge between a first virtual storage resource and a second virtual storage resource for transmitting data from one of either the first virtual storage resource and the second virtual storage resource to the other of the first virtual storage resource and the second virtual storage resource, the method comprising:

receiving, by a storage delivery management service executing on a computer within a first virtual storage resource provisioned on at least one storage system comprising one or more hardware devices, user credentials of a user;

enumerating a list of storage adapters associated with the user responsive to receiving the user credentials;

invoking, by the storage delivery management service responsive to receiving the user credentials, a storage adapter identified in the enumerated list of storage adapters associated with the user;

executing, via an interface for the invoked storage adapter, an instruction to identify a second virtual storage resource provisioned on at least one storage system comprising one or more hardware devices, wherein the interface comprises an interface translation file mapping each of a plurality of proprietary management profile formats to a standardized management profile format;

accessing, by the storage delivery management service via the storage adapter, the second virtual storage resource; and establishing, by the storage delivery management service, a cloud bridge between the first virtual storage resource and the second virtual storage resource using management profile information stored in a format proprietary to the second virtual storage resource, the information translated by the storage adapter using the interface translation file.

2. The method of claim 1, wherein invoking the storage adapter further comprises:
selecting a storage adapter from the enumerated list of storage adapters; and
invoking the selected storage adapter.

3. The method of claim 1, further comprising enumerating a list of virtual storage resources associated with the storage adapter responsive to invoking the storage adapter.

4. The method of claim 1, further comprising enumerating a list of access ports in the second virtual storage resource responsive to invoking the storage adapter.

5. The method of claim 4, further comprising:
selecting an access port from the list of access ports; and
issuing a connection request to the selected access port, the connection request translated by the storage adapter using the interface translation file.

6. The method of claim 5, further comprising:
establishing a connection to the selected access port of the second virtual storage resource; and
accessing data stored in the second virtual storage resource via the access port.

7. A system for establishing a cloud bridge between a first virtual storage resource and a second virtual storage resource for transmitting data from one of either the first virtual storage resource and the second virtual storage resource to the other of the first virtual storage resource and the second virtual storage resource, the system comprising:

a first virtual storage resource provisioned on at least one storage system comprising one or more hardware devices; and a storage delivery management service executing on a computer within the first virtual storage resource to:

receive user credentials of a user, enumerate a list of storage adapters associated with the user responsive to receiving the user credentials;

invoke, responsive to receiving the user credentials, a storage adapter identified in the enumerated list of storage adapters associated with the user, execute, via an interface for the invoked storage adapter, an instruction to identify a second virtual storage resource provisioned on at least one storage system comprising one or more hardware devices, wherein the interface comprises an interface translation file mapping each of a plurality of proprietary management profile formats to a standardized management profile format, access, via the storage adapter, the second virtual storage resource, and establish a cloud bridge between the first virtual storage resource and the second virtual storage resource using management profile information stored in a format proprietary to the second virtual storage resource, the information translated by the storage adapter using the interface translation file.

8. The system of claim 7, wherein the storage delivery management service selects a storage adapter from the enumerated list of storage adapters, and invokes the selected storage adapter.

9. The system of claim 7, wherein the storage delivery management service enumerates a list of virtual storage resources associated with the storage adapter responsive to invoking the storage adapter.

10. The system of claim 7, wherein the storage delivery management service enumerates a list of access ports in the second virtual storage resource responsive to invoking the storage adapter.

11. The system of claim 10, wherein the storage delivery management service selects an access port from the list of access ports, and issues a connection request to the selected access port, the connection request translated by the storage adapter using the interface translation file.

12. The system of claim 11, wherein the storage delivery management service establishes a connection to the selected access port of the second virtual storage resource, and accesses data stored in the second virtual storage resource via the access port.

* * * * *